Oct. 2, 1951 H. W. BALZER ET AL 2,569,650

AUTOMATIC TELEPHONE SYSTEM INVOLVING SEPARATE OPERATOR AND SUBSCRIBER REGISTER SENDER APPARATUS

Filed Dec. 28, 1946 21 Sheets-Sheet 1

Inventors
Harvey W. Balzer
John E. Ostline

By
Davis, Lindsey, Smith & Shonts
Attorneys

Oct. 2, 1951 H. W. BALZER ET AL 2,569,650

AUTOMATIC TELEPHONE SYSTEM INVOLVING SEPARATE OPERATOR AND SUBSCRIBER REGISTER SENDER APPARATUS

Filed Dec. 28, 1946 21 Sheets-Sheet 2

Inventors
Harvey W. Balzer
John E. Ostline

By Davis, Lindsey, Smith & Shonts
Attorneys

Oct. 2, 1951 H. W. BALZER ET AL 2,569,650

AUTOMATIC TELEPHONE SYSTEM INVOLVING SEPARATE OPERATOR AND SUBSCRIBER REGISTER SENDER APPARATUS

Filed Dec. 28, 1946 21 Sheets-Sheet 3

Inventors
Harvey W. Balzer
John E. Ostline
By Davis, Lindsey, Smith & Shonts
Attorneys Oct. 2, 1951 H. W. BALZER ET AL 2,569,650

AUTOMATIC TELEPHONE SYSTEM INVOLVING SEPARATE OPERATOR AND SUBSCRIBER REGISTER SENDER APPARATUS

Filed Dec. 28, 1946 21 Sheets-Sheet 4

Inventors
Harvey W. Balzer
John E. Ostline

By Davis, Lindsey, Smith & Shonts

Attorneys

Inventors
Harvey W. Balzer
John E. Ostline
By
Davis, Lindsey, Smith & Shonts
Attorneys Oct. 2, 1951 H. W. BALZER ET AL 2,569,650

AUTOMATIC TELEPHONE SYSTEM INVOLVING SEPARATE OPERATOR AND SUBSCRIBER REGISTER SENDER APPARATUS

Filed Dec. 28, 1946 21 Sheets-Sheet 6

Inventors
Harvey W. Balzer
John E. Ostline

By Davis, Lindsey, Smith & Shonts
Attorneys

Oct. 2, 1951 H. W. BALZER ET AL 2,569,650

AUTOMATIC TELEPHONE SYSTEM INVOLVING SEPARATE OPERATOR AND SUBSCRIBER REGISTER SENDER APPARATUS

Filed Dec. 28, 1946 21 Sheets-Sheet 7

Inventors
Harvey W. Balzer
John E. Ostline
By
Davis, Lindsey, Smith & Shonts
Attorneys Oct. 2, 1951 H. W. BALZER ET AL 2,569,650

AUTOMATIC TELEPHONE SYSTEM INVOLVING SEPARATE OPERATOR AND SUBSCRIBER REGISTER SENDER APPARATUS

Filed Dec. 28, 1946 21 Sheets-Sheet 8

Inventors
Harvey W. Balzer
John E. Ostline

By Davis, Lindsey, Smith & Shonts
Attorneys

Oct. 2, 1951 H. W. BALZER ET AL 2,569,650

AUTOMATIC TELEPHONE SYSTEM INVOLVING SEPARATE OPERATOR AND SUBSCRIBER REGISTER SENDER APPARATUS

Filed Dec. 28, 1946 21 Sheets-Sheet 9

INVENTORS
Harvey W. Balzer
John E. Ostline
BY
Davis, Lindsey, Smith & Shonts
Attorneys INVENTORS
Harvey W. Balzer
John E. Ostline
BY
Davis, Lindsey, Smith & Shoots
Attorneys Oct. 2, 1951 H. W. BALZER ET AL 2,569,650

AUTOMATIC TELEPHONE SYSTEM INVOLVING SEPARATE OPERATOR AND SUBSCRIBER REGISTER SENDER APPARATUS

Filed Dec. 28, 1946 21 Sheets-Sheet 11

INVENTORS
Harvey W. Balzer
John E. Ostline

BY Davis, Lindsey, Smith & Shonts
Attorneys

Oct. 2, 1951 H. W. BALZER ET AL 2,569,650

AUTOMATIC TELEPHONE SYSTEM INVOLVING SEPARATE OPERATOR AND SUBSCRIBER REGISTER SENDER APPARATUS

Filed Dec. 28, 1946 21 Sheets-Sheet 12

INVENTORS
Harvey W. Balzer
John E. Ostline

BY Davis, Lindsey, Smith & Shonts
Attorneys

Inventors
Harvey W. Balzer
John E. Ostline
By
Davis, Lindsey, Smith & Shonts
Attorneys Oct. 2, 1951 H. W. BALZER ET AL 2,569,650

AUTOMATIC TELEPHONE SYSTEM INVOLVING SEPARATE OPERATOR AND SUBSCRIBER REGISTER SENDER APPARATUS

Filed Dec. 28, 1946 21 Sheets-Sheet 14

Inventors
Harvey W. Balzer
John E. Ostline

By Davis, Lindsey, Smith & Shonts
Attorneys

Inventors
Harvey W. Balzer
John E. Ostline
By Davis, Lindsey, Smith & Shonts
Attorneys Oct. 2, 1951 H. W. BALZER ET AL 2,569,650

AUTOMATIC TELEPHONE SYSTEM INVOLVING SEPARATE OPERATOR AND SUBSCRIBER REGISTER SENDER APPARATUS

Filed Dec. 28, 1946 21 Sheets-Sheet 16

Inventors
Harvey W. Balzer
John E. Ostline

By Davis, Lindsey, Smith & Shonts
Attorneys

Oct. 2, 1951 H. W. BALZER ET AL 2,569,650

AUTOMATIC TELEPHONE SYSTEM INVOLVING SEPARATE OPERATOR AND SUBSCRIBER REGISTER SENDER APPARATUS

Filed Dec. 28, 1946 21 Sheets-Sheet 17

Inventors
Harvey W. Balzer
John E. Ostline
By
Davis, Lindsey, Smith & Shonts
Attorneys Oct. 2, 1951 H. W. BALZER ET AL 2,569,650

AUTOMATIC TELEPHONE SYSTEM INVOLVING SEPARATE OPERATOR AND SUBSCRIBER REGISTER SENDER APPARATUS

Filed Dec. 28, 1946 21 Sheets-Sheet 18

*INVENTORS*
Harvey W. Balzer
John E. Ostline

*BY* Davis, Lindsey, Smith & Shonts
Attorneys

INVENTORS
Harvey W. Balzer
John E. Ostline
BY
Davis, Lindsey, Smith & Shonts
Attorneys INVENTORS
Harvey W. Balzer
John E. Ostline
BY
Davis, Lindsey, Smith & Shonts
Attorneys AUTOMATIC TELEPHONE SYSTEM INVOLVING SEPARATE OPERATOR AND SUBSCRIBER REGISTER SENDER APPARATUS Filed Dec. 28, 1946 21 Sheets-Sheet 21

INVENTORS
Harvey W. Balzer
John E. Ostline
BY
Davis, Lindsey, Smith & Shonts
Attorneys Patented Oct. 2, 1951

2,569,650

UNITED STATES PATENT OFFICE 2,569,650

AUTOMATIC TELEPHONE SYSTEM INVOLVING SEPARATE OPERATOR AND SUBSCRIBER REGISTER SENDER APPARATUS

Harvey W. Balzer, Downers Grove, and John E. Ostline, Chicago, Ill., assignors to Automatic Electric Laboratories, Inc., Chicago, Ill., a corporation of Delaware Application December 28, 1946, Serial No. 719,026

20 Claims. (Cl. 179—7.1)

The present invention relates to telephone systems and, more particularly, to improved automatic switching apparatus for setting up toll and trunk connections involving toll switchboards and subscriber substations disposed in different offices and exchanges of the system.

It is an object of the present invention to provide in an automatic telephone system, switching apparatus that may be selectively controlled from operator switchboards and from calling subscriber substations disposed in the same or different offices to set up connections over the trunk lines in the same group to the called subscriber substations in other exchanges.

Another object of the invention is to provide in a telephone system of the multi-office or exchange type mentioned, recording apparatus that is selectively controlled in response to the setting up of trunk connections from subscriber substations in order automatically to record in conjunction therewith items of information pertaining to the connection, thereby to facilitate billing for the trunk connections of the subscriber substations involved therein.

Another object of the invention is to provide in an automatic telephone system, wherein the automatic switches utilized in extending a connection are set under the control of a register sender, an improved arrangement for automatically delaying the operation of the sender when the connection is extended to a switching stage in which a trunk or line hunting operation is required.

According to another object of the invention, facilities are provided for delaying the operation of the sender under the control of the automatic switching apparatus in an exchange disposed remote from the originating office in which the sender is located.

A further object of the invention is to provide an improved trunk circuit over which trunk connections from calling operator switchboards and from calling subscriber substations may be selectively extended by the automatic switching apparatus, wherein control and supervisory signals received over the associated trunk are repeated selectively and in proper form to the switching apparatus in order to bring about appropriate controls related to the origin of the call.

In accordance with a further object of the invention an improved trunk circuit is provided which comprises facilities for controlling withholding operation of a connected register sender in accordance with the operation of a connected switching stage, and additional facilities for repeating supervisory signals received from the switching stage mentioned back over the connection to the point of origin.

Further features of the invention pertain to the particular arrangement of the circuit elements of the system whereby the above-outlined and additional operating features are attained.

Figure 14:
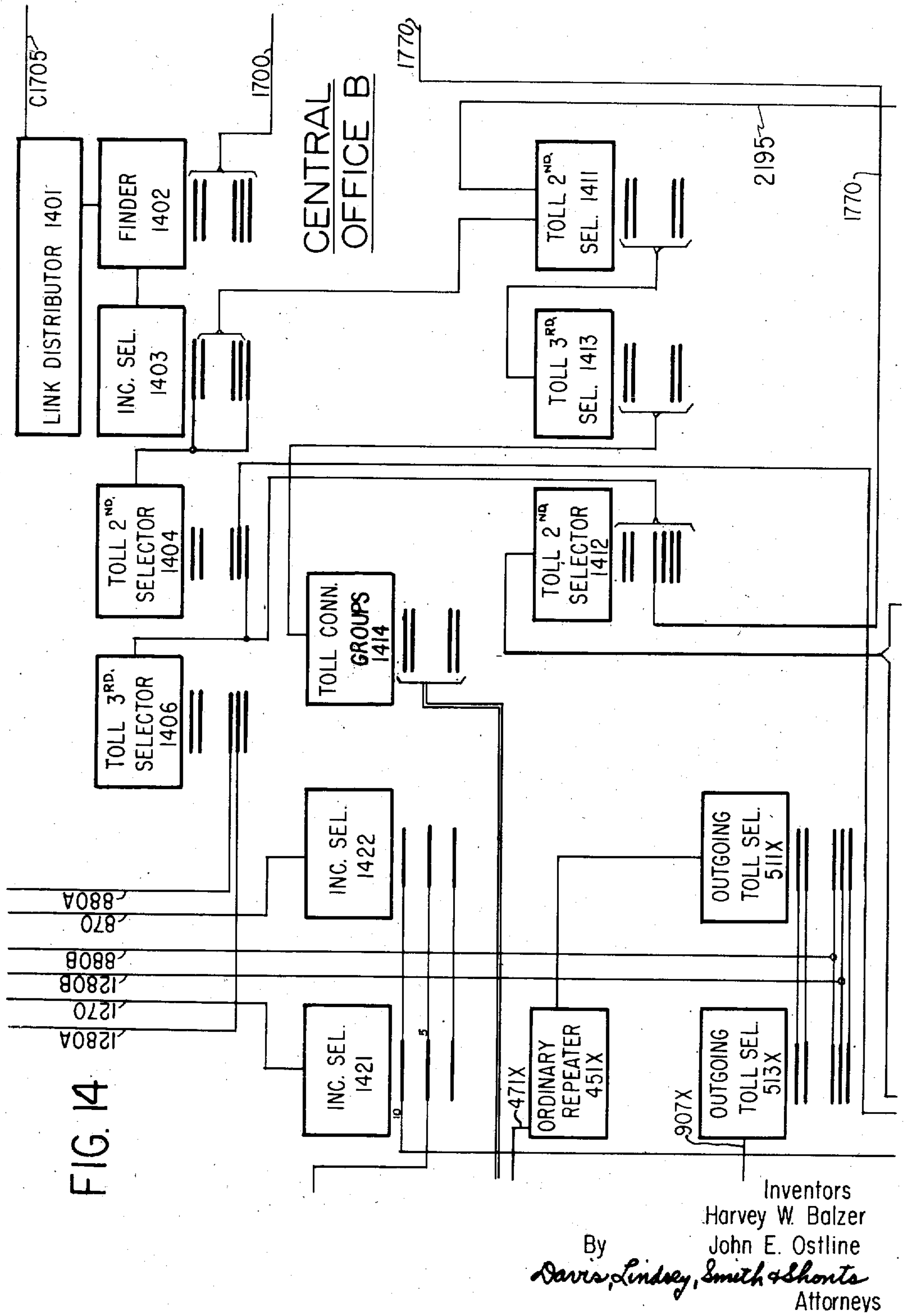
Figures 15, 22, 23:
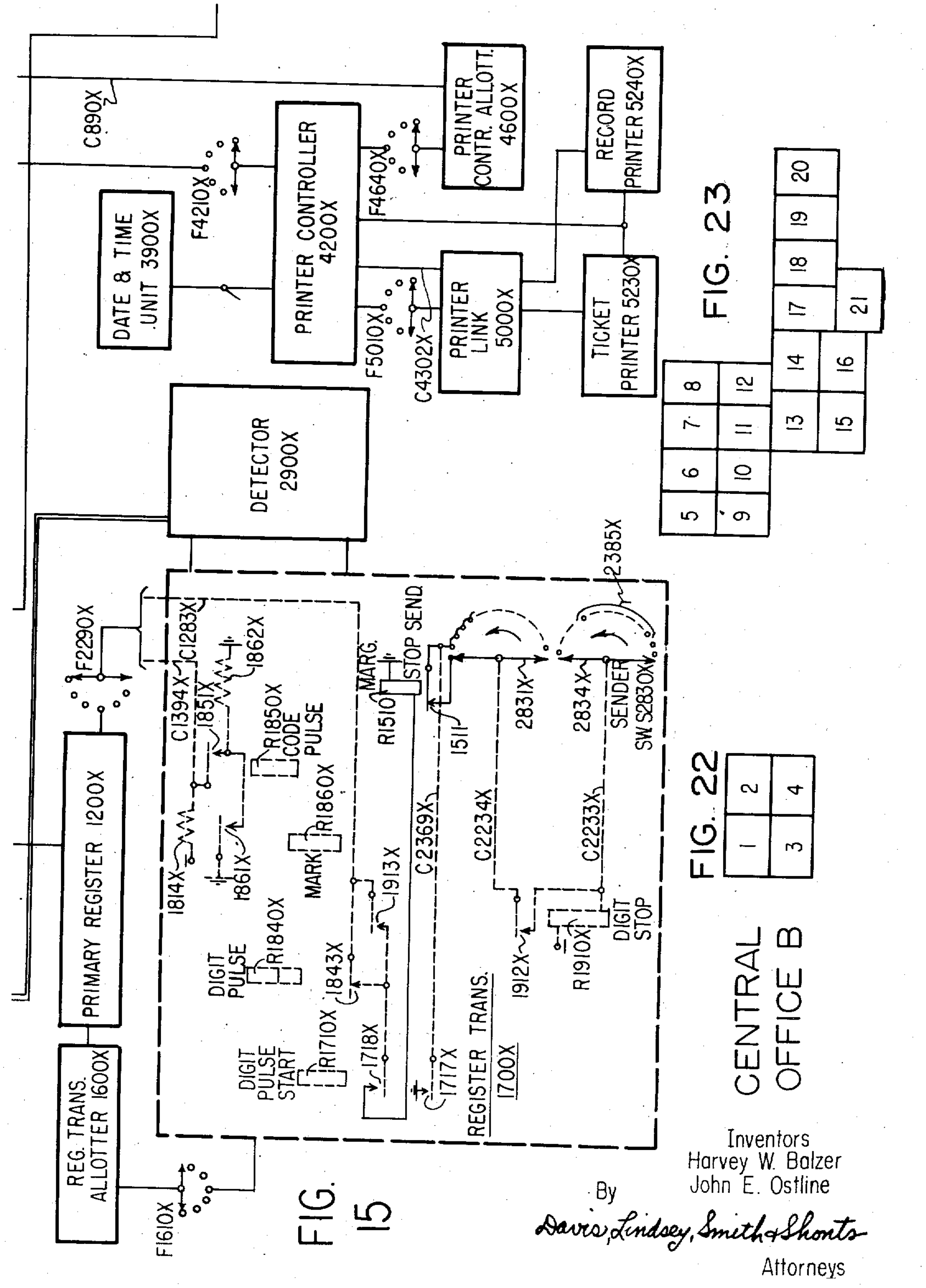

The invention, both as to its organization and method of operation, together with further objects and advantages thereof, will best be understood with reference to the following specification taken in connection with the accompanying drawings, in which Figs. 1 to 4, inclusive, taken together, illustrate the general arrangement of the apparatus incorporated in a telephone system embodying the present invention; Figs. 5 to 21, inclusive, taken together, illustrate the details of the apparatus having incorporated therein the features of the invention, as briefly outlined above; Fig. 22 illustrates the mode of combining Figs. 1 to 4, inclusive, to form a unified diagram of the general arrangement of the telephone system; and Fig. 23 illustrates the mode of combining Figs. 5 to 21, inclusive, to form a unified diagram of the details of the apparatus incorporated in the telephone system.

Figure 13:
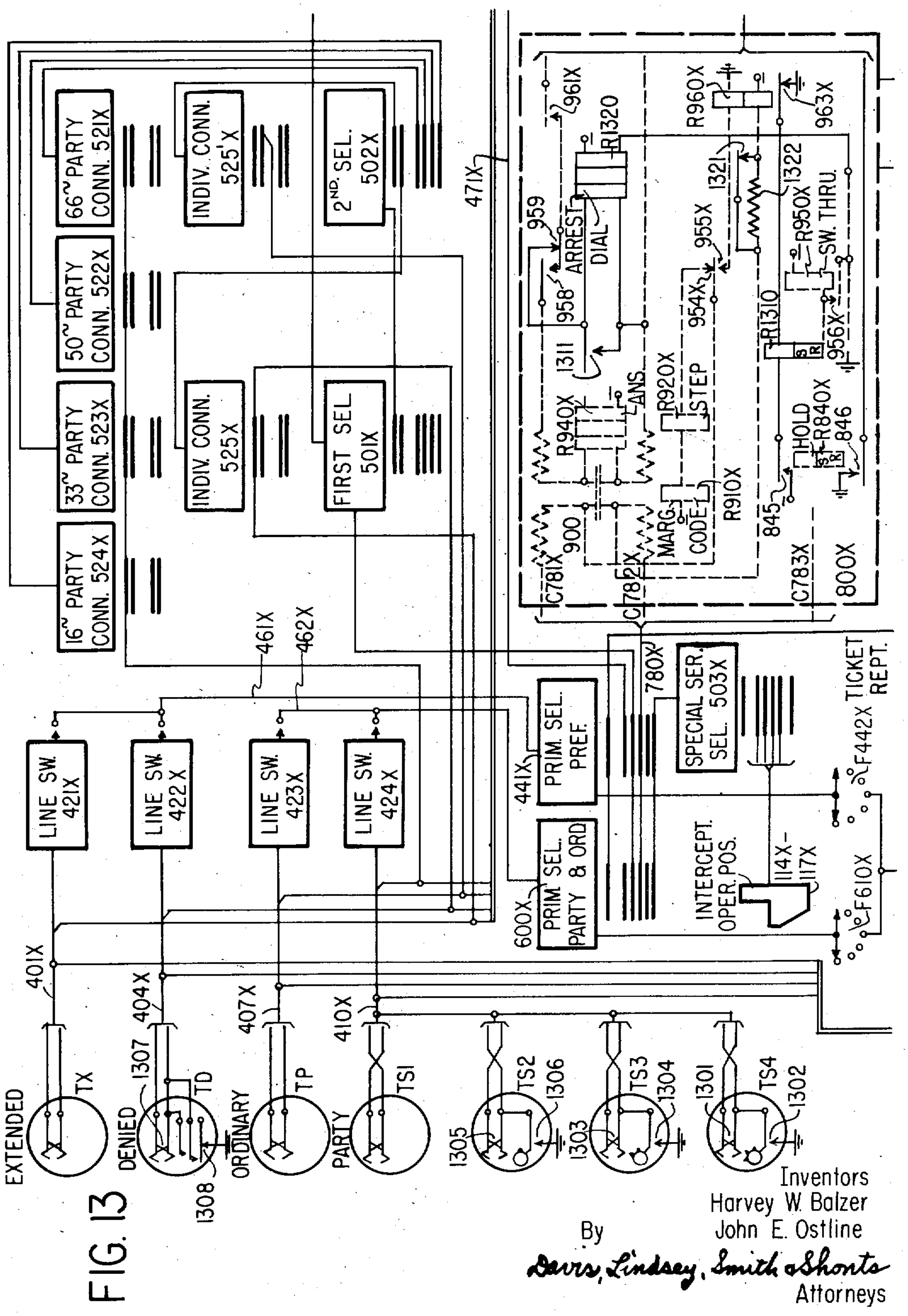
Figure 16:
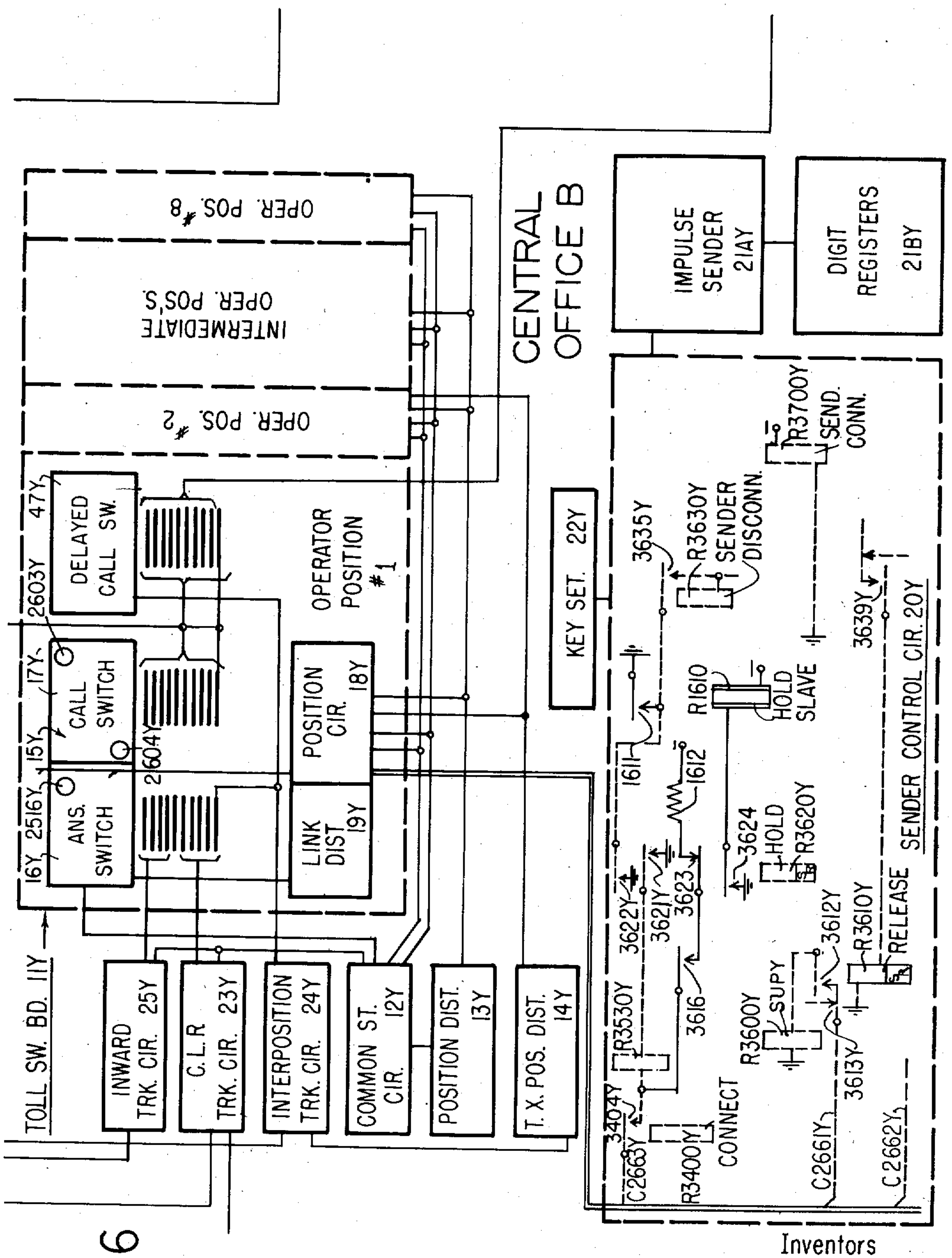
Figure 17:
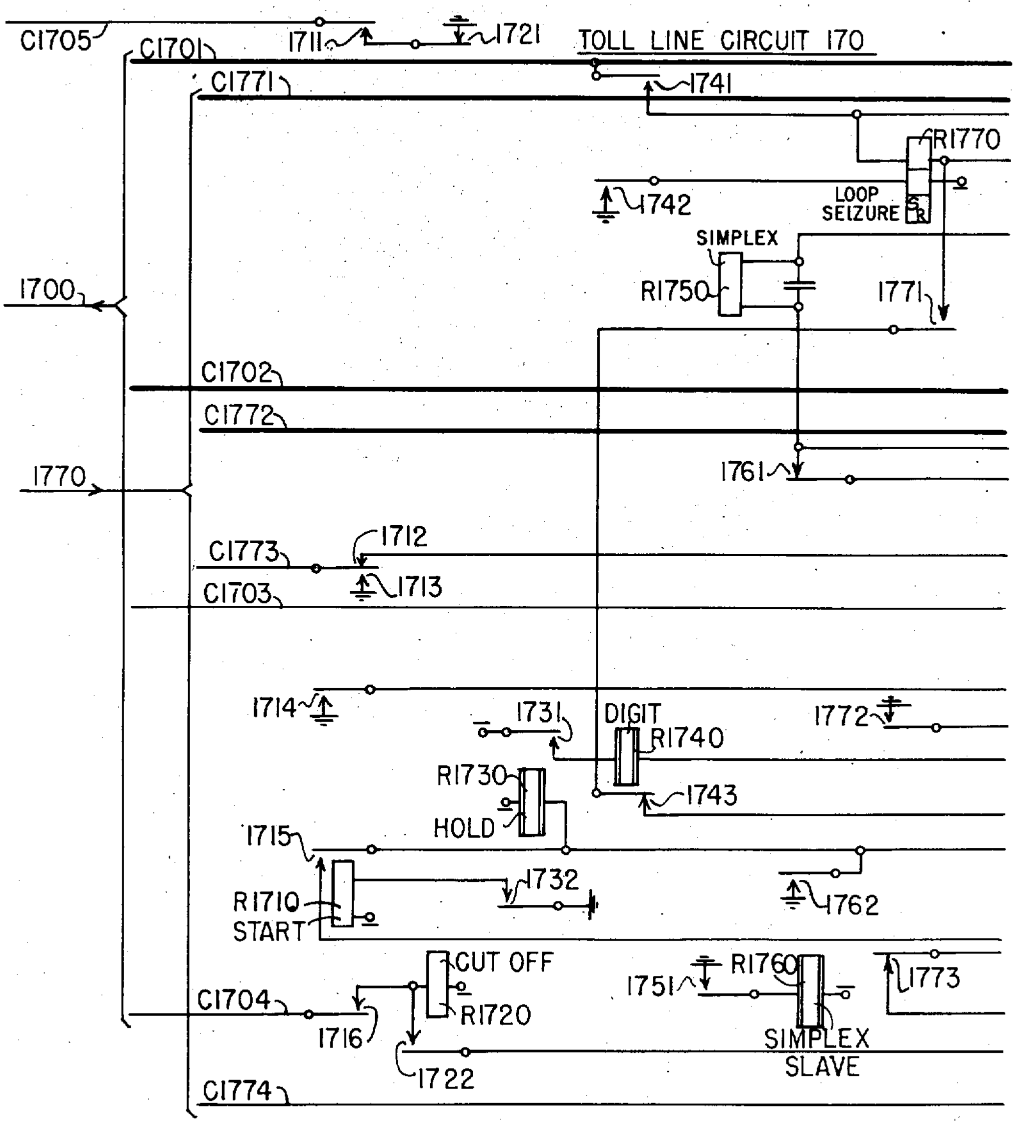
Figure 18:
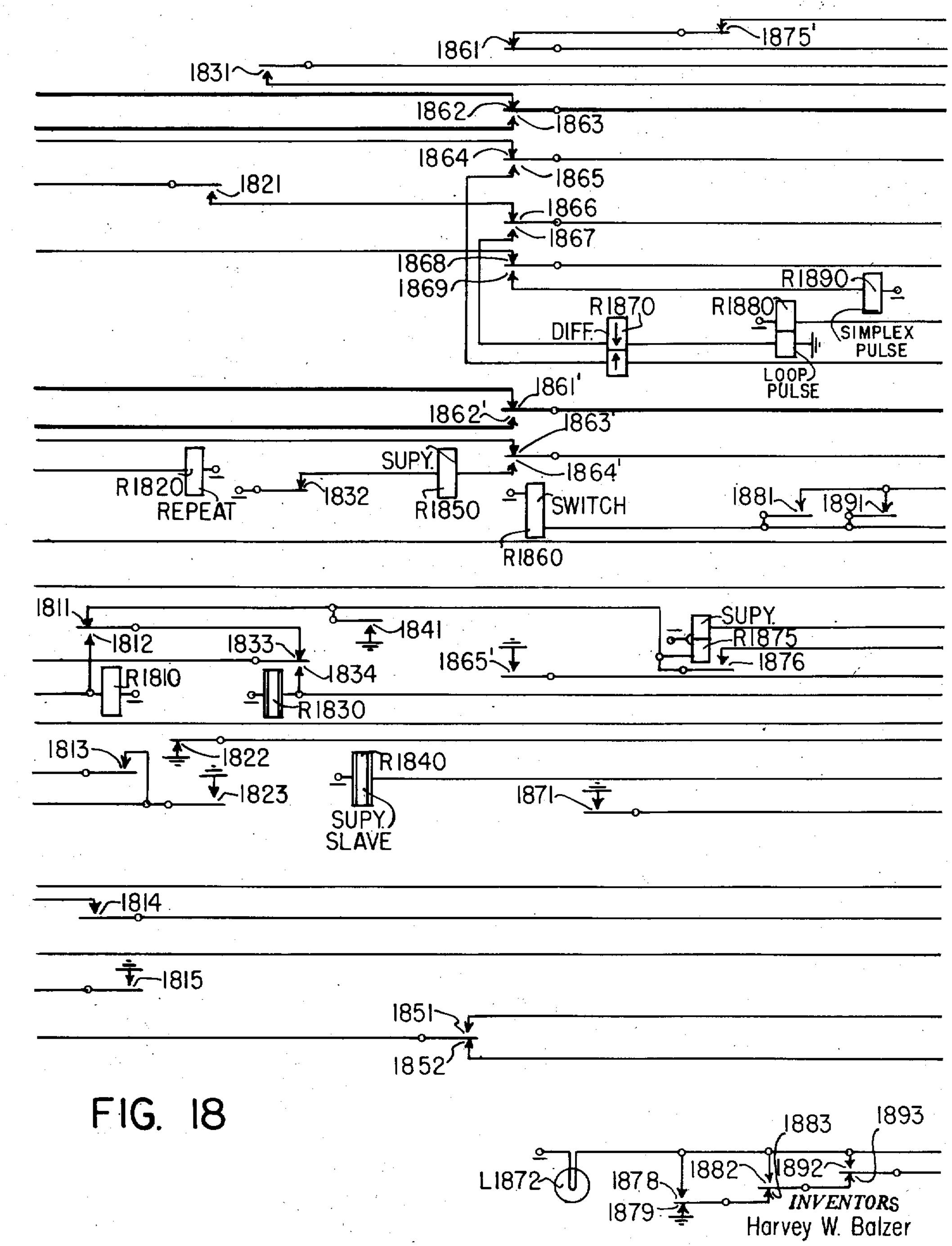
Figure 19:
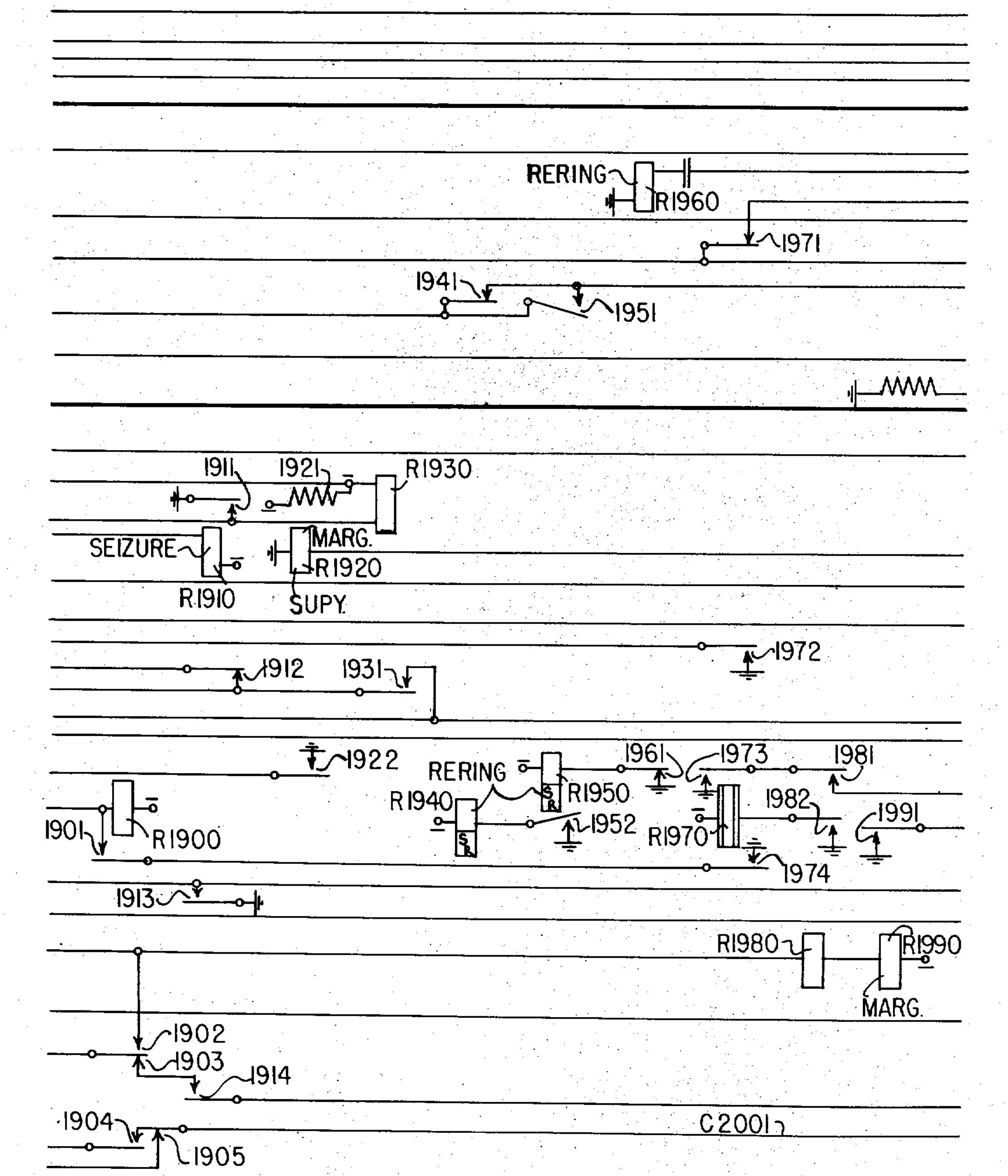

More particularly, Figs. 1 to 4, inclusive, taken together, illustrate schematically the area served by the telephone system, including the various offices and exchanges incorporated therein, and show diagrammatically certain of the apparatus incorporated in the central office B of the telephone system. Figs. 5 to 8, inclusive, taken together, illustrate the details of one of the trunk circuits disposed in the central automatic office B and terminating a trunk extending to the near automatic exchange C. Figs. 9 to 12, inclusive, taken together, illustrate the details of one of the trunk circuits disposed in the central automatic office B and terminating a trunk extending to the remote automatic exchange D. Fig. 13 illustrates generally certain apparatus incorporated in the central automatic office B, as well as the details of one of the toll ticket repeaters disposed therein. Fig. 14 illustrates generally certain switching apparatus incorporated in the central automatic office B. Fig. 15 illustrates generally certain apparatus incorporated in the central automatic office B, as well as the details of one of the register translators disposed therein. Fig. 16 illustrates generally the arrangement of the toll switchboard in the central automatic office B, as well as the details of one of the sender control circuits associated therewith. Figs. 17 to 20, inclusive, taken together, illustrate the details of one of the toll line circuits disposed in the central automatic office B and terminating a toll line extending to the distant automatic office A. Fig. 21 illustrates the details of one of the local trunk circuits disposed in the central automatic office B.

*The general arrangement of the telephone system*

Referring now more particularly to Figs. 1 to 4, inclusive, it will be observed that the automatic telephone system serves an area including a distant automatic office A, a central automatic office B, a near automatic exchange C, and the remote automatic exchange D. The distant office A and the central office B are interconnected by a number of two-way toll lines, including the toll line 2060; the central office B and the near exchange C are interconnected by a number of two-way trunk lines, including the trunk line 500; and the central office B and the remote exchange D are interconnected by a number of two-way trunk lines, including the trunk line 900. Both the distant office A and the central office B terminate a large number of subscriber lines and comprise automatic switching apparatus as well as a toll switchboard, while both the near exchange C and the remote exchange D terminate a large number of subscriber lines and comprise automatic switching apparatus.

A toll call originating in the distant office A is routed via the automatic switching apparatus to the toll switchboard therein and then extended therefrom via the automatic switching apparatus to one of the toll lines extending to the central office B. This toll call thus routed to the central office B may be completed by the automatic switching apparatus to the toll switchboard therein or to a subscriber line terminating at the central office B. Also this toll call thus routed to the central office B may be extended via the automatic switching apparatus therein to one of the trunk lines extending to the near exchange C or to one of the trunk lines extending to the remote exchange D. In the event this toll call is extended to the near exchange C, it may be completed by the automatic switching apparatus therein to one of the subscriber lines terminating thereat; and in the event this toll call is extended to the remote exchange D, it may be completed by the automatic switching apparatus therein to one of the subscriber lines terminating thereat.

A toll call originating in the central office B is first routed via the automatic switching apparatus to the toll switchboard therein and is then extended therefrom via the automatic switching apparatus to one of the toll lines extending to the distant office A. This toll call thus routed to the distant office A may be completed by the automatic switching apparatus to the toll switchboard therein or to a subscriber line terminating at the distant office A. Also a toll call originating in the central office B and routed via the automatic switching apparatus to the toll switchboard therein, may be extended via the automatic switching apparatus to one of the trunk lines extending to the near exchange C or to one of the trunk lines extending to the remote exchange D. This toll call routed to the near exchange C may be completed by the automatic switching apparatus therein to a subscriber line terminating thereat, and similarly this toll call routed to the remote exchange D may be completed by the automatic switching apparatus therein to a subscriber line terminating thereat.

A trunk call originating in the near exchange C is first routed via the automatic switching apparatus therein to one of the trunk lines extending to the central office B; which trunk call may be extended via the automatic switching apparatus to the toll switchboard therein or to a subscriber line terminating at the central office B. Similarly, a trunk call originating in the remote exchange D is first routed via the automatic switching apparatus therein to one of the trunk lines extending to the central office B, which trunk call may be extended via the automatic switching apparatus to the toll switchboard therein or to a subscriber line terminating at the central office B. However, a trunk call originating at the near exchange C that is to be extended to the remote exchange D, as well as a trunk call originating at the remote exchange D that is to be extended to the near exchange C, must first be routed to the toll switchboard at the central office B and completed by the operator thereat.

A trunk call originating in the central office B that is to be extended to the near exchange C is first routed via the automatic switching apparatus in the central office B to one of the trunk lines extending to the near exchange C and is then completed by the automatic switching apparatus in the near exchange C to one of the subscriber lines terminating thereat. A trunk call originating in the central office B that is to be extended to the remote exchange D is first routed via the automatic switching apparatus in the central office B to one of the trunk lines extending to the remote exchange D and is then completed by the automatic switching apparatus in the remote exchange D to one of the subscriber lines terminating thereat.

Preferably, the central office B comprises a 10,000 line terminal unit; and the subscriber lines terminating thereat comprise both private subscriber lines and party subscriber lines; the private subscriber lines including ordinary subscriber lines, denied trunk service subscriber lines, and extended trunk service subscriber lines; and the party subscriber lines being of the four-substation type. The party subscriber lines are arranged on a terminal-per-substation basis, thereby reducing the actual number of lines terminating at the central office B.

In the automatic telephone system the various local and the permitted trunk calls previously described are set up by the automatic switching apparatus under the control of the subscriber substation equipment, including the usual calling device or dial; whereas the toll calls, as well as certain of the trunk calls, are set up by the operator at the toll switchboard, utilizing a register-sender associated therewith and controlled by a key-set. Accordingly, the calls that may be completed by a subscriber, without the aid of an operator at the toll switchboard, may be dialed directly as listed in the directory. More particularly, the directory number of each subscriber substation in the telephone system comprises a code portion including three digits and a numerical portion including four digits. More specifically, the directory number of each subscriber substation in the central office B comprises a code portion including the three digits 8, 4 and 4; the directory number of each subscriber substation in the near exchange C comprises a code portion including the three digits 4, 5 and 6; and the directory number of each subscriber substation in the remote exchange D comprises a code portion including the three digits 2, 7 and 9. Since the party subscriber lines in the central office B are arranged on a terminal-per-substation basis, the directory number of each party subscriber line therein comprises the code portion including the three digits 8, 4 and 4 and a numerical portion including only four digits, no suffix digits being necessary.

Also the central office B comprises automatic trunk ticketing apparatus which is employed automatically to produce a ticket in conjunction with, and at the conclusion of, certain permitted trunk calls that may be set up directly under the control of the calling subscriber substations. More particularly, an ordinary subscriber substation, as well as a party subscriber substation in the central office B, may control the automatic switching apparatus to set up a trunk call either to the near exchange C or to the remote exchange D as previously noted, which trunk call is automatically ticketed by the apparatus mentioned in the central office B. Similarly, an extended trunk service subscriber substation in the central office B may control the automatic switching apparatus to set up a trunk call either to the near exchange C or to the remote exchange D as previously noted, which trunk call is automatically ticketed by the apparatus mentioned in the central office B only in the event the trunk call mentioned is extended to the remote exchange D. In other words, extended trunk service subscriber substations in the central office B are permitted to make free individual trunk calls to the near exchange C in view of the fact that these subscriber substations are billed on a different basis for telephone service than are the ordinary subscriber substations and the party subscriber substations. More specifically, the ordinary subscriber substations and the party subscriber substations are billed for individual trunk calls on a monetary basis by the automatic ticketing apparatus; whereas the extended trunk service subscriber substations are billed for individual trunk calls on a unit call basis by the automatic ticketing apparatus. Finally, the denied trunk service subscriber substations are not permitted to make trunk calls either to the near exchange C or to the remote exchange D without the aid of the operator at the toll switchboard; and in the event a trunk call either to the near exchange C or to the remote exchange D is initiated at a denied trunk service subscriber substation in the central office B, the automatic switching apparatus is controlled to extend the call to an interceptor operator position provided in the central office B, whereby the calling subscriber may be advised that such trunk calls may not be directly extended without the aid of the operator at the toll switchboard.

*The apparatus incorporated in the central office B*

The central office B, as best shown in Figs. 1 to 4, inclusive, comprises automatic switching equipment serving a maximum of 10,000 terminals, three of the terminals respectively terminating the private subscriber lines 401X, 404X and 407X, respectively extending to the extended trunk service subscriber substation TX, to the denied trunk service subscriber substation TD, and to the ordinary subscriber substation TP; and four of the terminals commonly terminating the party subscriber line 410X commonly extending to the party subscriber substations TS1, TS2, TS3 and TS4. Also the switching apparatus comprises a number of line switches individually associated with the subscriber lines, the line switches 421X, 422X, 423X and 424X being respectively associated with the subscriber lines 401X, 404X, 407X and 410X.

The line switches 421X, etc. terminating the extended trunk service subscriber lines and the line switches 422X, etc. terminating the denied trunk service subscriber lines are arranged in a first group; while the line switches 423X, etc. terminating the ordinary subscriber lines, and the line switches 424X, etc. terminating the party subscriber lines are arranged in a second group. Also the switching apparatus comprises a first group of primary selectors, including the primary selector 441X, which is accessible to the various line switches 421X, 422X, etc. in the first group; as well as a second group of primary selectors, including the primary selector 600X, which is accessible to the various line switches 423X, 424X, etc. in the second group. Each primary selector is provided with an individually associated finder having access to a group of primary registers, the finders F442X and F610X being respectively associated with the primary selectors 441X and 600X.

Also the central office B is provided with a group of primary registers, including the primary register 1200X, which is accessible to the various finders individually associated with the primary selectors in the two groups mentioned, as well as a group of register translators, including the register translator 1700X; and a register translator allotter 1600X. The register translator allotter 1600X comprises a finder F1610X having access to the group of register translators mentioned; and each register translator comprises a finder having access to the group of primary registers mentioned, the register translator 1700X comprising the finder F2290X having access to the group of primary registers mentioned. At this point it is noted that the group of primary registers is larger than the group of register translators in order to effect a saving in equipment, in view of the fact that the connection and arrangement of a primary register is much more simplified than the relative complex connection and arrangement of a register translator.

Also the central office B is provided with a local switch train comprising a number of groups of first selectors, one of the groups including the first selector 501X; a number of groups of second selectors, one of the groups including the second selector 502X; a number of groups of individual connectors, two of the groups respectively including the individual connectors 525X and 525'X; a number of special service selectors, including the special service selector 503X; and a number of groups of party connectors, four of the groups respectively including the party connectors 521X, 522X, 523X, and 524X. An interceptor operator position 114X—117X is arranged in the central office B and terminates four groups of trunks, whereby calls routed over the respective trunk groups to the interceptor operator position 114X—117X are readily identified thereat with reference to their origins in a manner more fully explained hereinafter.

Further, the central office B is provided with ticketing apparatus comprising, in addition to the number of register translators, including the register translator 1700X, a number of groups of ticket repeaters, one of the groups including the ticket repeater 800X, a detector 2900X, a number of printer controllers, including the printer controller 4200X, a printer controller allotter 4600X, a date and time unit 3900X, a printer link 5000X, a toll ticket printer 5230X and a record printer 5240X. The printer controller allotter 4600X comprises a finder F4640X having access to the printer controllers; and each printer controller comprises a finder having access to the ticket repeaters; the printer controller 4200X comprising the finder F4210X having access to the ticket repeaters 800X, etc. The printer link 5000X comprises a finder F5010X having access to the printer controllers 4200X, etc., and is directly connected to the toll ticket printer 5230X and to the record printer 5240X; while the date and time unit 3900X is commonly associated with the printer controllers 4200X, etc.

The central office B comprises a group of ordinary repeaters, including the ordinary repeater 451X, and a group of outgoing selectors, including the outgoing selector 511X; the ordinary repeaters 451X, etc., in the group being individually associated with the outgoing selectors 511X, etc., in the group. Also a plurality of groups of outgoing toll selectors are provided, one of the groups including the outgoing toll selector 513X; which groups of outgoing toll selectors are individually associated with the different groups of ticket repeaters and, individually connected to the ticket repeaters in the associated groups; for example, the ticket repeater 800X is directly connected to the outgoing toll selector 513X.

The two-way toll lines extending between the distant office A and the central office B terminate in toll line circuits in the two offices mentioned; the toll line 2060 terminating in the toll line circuit 170 disposed in the central office B. Similarly, the two-way trunk lines extending between the near exchange C and the central office B terminate in trunk circuits in the exchange and in the office mentioned; the trunk line 500 terminating in the trunk circuit 50 in the central office B. Similarly, the two-way trunk lines extending between the remote exchange D and the central office B terminate in trunk circuits in the exchange and in the office mentioned, the trunk line 900 terminating in the trunk circuit 90 in the central office B.

Also the central office B comprises a toll switch train including an incoming selector-finder link group, this group including the link consisting of the incoming selector 1403 and the connected finder 1402. The finders of the links have access to the toll line circuits mentioned, the finder 1402 having access to the trunk 1700 extending to the toll line circuit 170. Also a link distributor 1401 is provided for the purpose of assigning idle ones of the incoming selector-finder links for the use of calling ones of the toll line circuits. Further the incoming selectors 1403, etc., have access to groups of toll second selectors, two of the groups respectively including the toll second selectors 1404 and 1411. The toll second selectors in the group, including the toll circuit selector 1404, have access to groups of toll third selectors, one of these groups including the toll third selector 1406. The group of toll third selectors, including the toll third selector 1406, has access to the two groups of trunk circuits respectively including the trunk circuits 50 and 90. Specifically, the toll third selector 1406 has access to the trunks 880A and 1280A, respectively extending to the trunk circuits 50 and 90. The group of toll second selectors, including the toll second selector 1411, has access to other groups of toll third selectors, one of these groups including the toll third selector 1413. The group of toll third selectors, including the toll third selector 1413, have access to toll connector groups indicated generally at 1414. The various toll connector groups 1414 have access to the various groups of subscriber lines, including the subscriber lines 401X, 404X, 407X and 410X.

Further the toll switch train in the central office B comprises a group of incoming selectors, including the incoming selector 1421, individually connected to the group of trunk circuits, including the trunk circuit 90; the incoming selector 1421 being directly connected by the trunk 1270 to the trunk circuit 90. Also this toll switch train comprises another group of incoming selectors, including the incoming selector 1422, individually connected to the group of trunk circuits, including the trunk circuit 50; the incoming selector 1422 being directly connected by the trunk 870 to the trunk circuit 50. The groups of incoming selectors, respectively including the incoming selectors 1421 and 1422, have access to the groups of first selectors, one of which includes the first selector 501X. Also the two groups of primary selectors, respectively including the primary selectors 441X and 600X, also have access to the group of first selectors, including the first selector 501X. The groups of outgoing toll selectors, including the outgoing toll selector 513X, have access to two groups of trunks respectively extending to the two groups of trunk circuits, respectively including the trunk circuits 50 and 90. Specifically, the outgoing toll selector 513X has access to the two trunks 880B and 1280B respectively extending to the trunk circuits 50 and 90 in the two groups mentioned. The first group of primary selectors, including the primary selector 441X, has access to the group of ordinary repeators, including the ordinary repeater 451X; whereas this group of ordinary repeaters is not accessible to the second group of primary selectors, including the primary selector 600X. The group of outgoing selectors, including the outgoing selector 511X, has access to the group of trunks extending to the group of trunk circuits, including the trunk circuit 50. More specifically, the outgoing selector 511X has access to the trunk 880B extending to the trunk circuit 50. Also the groups of primary selectors, respectively including the primary selectors 441X and 600X, have access to the groups of special service selectors, including the special service selector 503X. The group of special service selectors, including the special service selector 503X, has access to the groups of trunks extending to the interceptor operator position, 114X—117X, as previously noted.

The central office B also comprises a further group of toll second selectors, including the toll second selector 1412, which have access both to the group of toll third selectors, including the toll third selector 1406, and to the group of toll line circuits, including the toll line circuit 170. Specifically, the toll second selector 1412 has access to the trunk 1770 extending to the toll line circuit 170. The group of toll second selectors, including the toll second selector 1411, are individually connected to a group of local trunk circuits, including the local trunk circuit 210, arranged in the central office B; the toll second selector 1411 being individually connected by the trunk 2195 to the local trunk circuit 210.

Further, the central office B comprises a toll switchboard 11Y including eight positions, operator position No. 1, being diagrammatically illustrated. Each operator position at the toll switchboard 11Y comprises equipment substantially identical to that provided at operator position No. 1, which equipment includes a position circuit 18Y, a connected link distributor 19Y, and a connected sender control circuit 20Y. In turn, the sender control circuit 20Y is governed by a keyset 22Y disposed at this operator position and is connected to an impulse sender-digit register unit 21Y, which unit comprises an impulse sender 21AY and a digit register 21BY. Also operator position No. 1 is provided with a plurality of links individual thereto, any one of which may be connected by the link distributor 19Y to the position circuit 18Y, the links mentioned each comprising an answer switch and a call switch. One of the links 15Y, individual to operator position No. 1, is diagrammatically illustrated as comprising an answer switch 16Y and a call switch 17Y. The links in the various operator positions at the toll switchboard 11Y comprise a portion of the toll switch train; which switch train also comprises a group of delayed call selectors, including the delayed call selector 47Y. The call switches of the different links at the various operator positions at the toll switchboard 11Y, as well as the delayed call selectors, have access to the group of toll second selectors, including the toll second selector 1412, to the group of local trunk circuits, including the local trunk circuit 210, and to a group of interposition trunks. The group of interposition trunks individually terminate in a group of interposition trunk circuits, including the interposition trunk circuit 24Y, which in turn are accessible to the answer switches of the different links at the various operator positions at the toll switchboard 11Y, which groups of interposition trunk circuits, including the interposition trunk circuit 24Y, is provided with a T. X. position distributor 14Y associated with the position circuits 18Y, etc., at the respective operator positions at the toll switchboard 11Y.

Also the answer switches of the different links at the various operator positions at the toll switchboard 11Y have access to a group of inward trunk circuits, including the inward trunk circuit 25Y, which in turn are accessible to the group of toll second selectors, including the toll second selector 1404. Also the answer switches of the links mentioned have access to a group of C. L. R. trunk circuits, including the C. L. R. trunk circuit 23Y, which in turn are accessible both to the two groups of incoming selectors, respectively including the incoming selectors 1421 and 1422, and to the two groups of primary selectors, respectively including the primary selectors 441X and 600X. The group of inward trunk circuits, including the inward trunk circuit 25Y, and the group of C. L. R. trunk circuits, including the C. L. R. trunk circuit 23Y, are associated with a common start circuit 12Y; which, in turn, is associated both with a position distributor 13Y and with the various operator positions at the toll switchboard 11Y. Also the position distributor 13Y is associated with the position circuits 18Y, etc., disposed at the various operator positions at the toll switchboard 11Y.

In connection with the toll switchboard 11Y, it is noted that at each operator position the associated link distributor automatically controls the connection of idle ones of the links thereat to the associated position circuit. For example, at operator position No. 1, the link distributor 19Y automatically connects the various links 15Y, etc., to the position circuit 18Y. The position distributor 13Y is arranged to select for use in a predetermined order idle ones of the operator positions at the toll switchboard 11Y; and, in turn, is governed by the common start circuit 12Y; which, in turn, is governed by the groups of inward trunk circuits and C. L. R. trunk circuits. More particularly, when a call in either one of the groups of trunk circuits mentioned is waiting to be answered, the calling trunk circuit initiates operation of the common start circuit 12Y. At this time the common start circuit 12Y causes the call to be routed to the operator position at the toll switchboard 11Y selected by the position distributor 13Y; and specifically the link at the selected operator position is employed that has been previously selected by the associated link distributor. For example, in the event the positioned distributor 13Y selects operator position No. 1 at the toll switchboard 11Y to answer the call, a link individual to this position previously selected by the link distributor 19Y is employed and specifically the link 15Y thereat may be employed. In this case the answer switch 16Y of the link 15Y selected by the link distributor 19Y operates to find the calling trunk circuit as marked thereto by the common start circuit 12Y and the individual calling trunk circuit accessible thereto.

Further it is noted that the answer switch of each link at each operator position at the toll switchboard 11Y also has access to the group of delayed call selectors, including the delayed call selector 47Y.

In the central office B the group of first selectors, including the first selector 501X, has access to the group of second selectors, including the second selector 502X; which, in turn, has access to the two groups of individual connectors respectively including the individual connectors 525X and 525'X, and to the four groups of party connectors, respectively including the four party connectors 521X, 522X, 523X and 524X. The group of individual connectors, including the individual connector 525X, has access to 100 private subscriber lines, including the private subscriber lines 401X and 404X; which group of individual connectors, including the individual connector 525'X, has access to 100 private subscriber lines, including the private subscriber line 407X. Each of the four groups of party connectors, respectively including the party connectors 521X, 522X, 523X and 524X, has access to 100 party subscriber lines, including the party subscriber line 410X. Thus the party subscriber line 410X is accessible to the four party connectors 521X, 522X, 523X and 524X, which party connectors are adapted respectively to project ringing current thereover of the respective frequencies in cycles of seconds of 66, 50, 33, and 16.

The detector 2900X has access to each subscriber line terminating in the central office B and is commonly associated with the various register translators 1700X, etc. Further, each printer controller 4200X, etc., is accessible to the printer controller allotter 4600X and has access to each toll ticket repeater 800X, etc. Further, each printer controller 4200X, etc., is accessible to the printer link 5000X; while the printer link 5000X is directly connected to the toll ticket printer 5230X and to the record printer 5240X. Moreover, the date and time unit 3900X is commonly associated with each printer controller 4200X, etc.

In the central office B each subscriber substation is provided with substation apparatus including a telephone instrument, a ringer and a calling device or dial. The calling devices, disposed at each ordinary private subscriber substation, at each extended trunk service private subscriber substation, and at each first party subscriber substation are of conventional construction and arrangement; while the calling devices disposed at each denied trunk service private subscriber substation and at each second, third, and fourth party subscriber substation are of special construction. More particularly, the calling device disposed at each denied trunk service private subscriber substation is of the construction and arrangement of that disclosed in United States Patent No. 1,858,863, John E. Ostline, granted May 17, 1932; while the calling device disposed at each second, third, and fourth party subscriber substations is of the construction and arrangement of that disclosed in United States Patent No. 2,366,647, John E. Ostline, granted January 2, 1945.

For example, the calling device disposed at the denied trunk service private subscriber substation TD is of the special construction mentioned and comprises, as best shown in Fig. 13, in addition to a set of impulse springs 1307, a set of cam springs 1308. In this calling device the set of impulse springs 1307 is operated in accordance with the pull of the associated finger wheel in order to transmit a corresponding variable series of switch control impulses; while the set of cam springs 1308 is operated by an associated cam governed by the finger wheel in order to transmit a first ground impulse when the finger wheel is moved away from its home position and then to transmit a second ground impulse when the finger wheel is returned to its home position. Accordingly, each time the finger wheel of this calling device is pulled in accordance with any digit, the associated cam operates the set of cam springs 1308 to transmit two ground impulses over the associated private subscriber line 404X.

Also the calling devices respectively disposed at the second party subscriber substation TS2, at the third party subscriber substation TS3, and at the fourth party subscriber substation TS4 connected to the party subscriber line 410X, are of the special construction mentioned; each comprising, as best shown in Fig. 13, in addition to a set of impulse springs, a set of cam springs. In each of these calling devices the set of impulse springs is operated in accordance with the pull of the associated finger wheel in order to transmit a corresponding series of switch control impulses; while the set of cam springs is operating by an associated cam, governed by the associated finger wheel, in order to transmit a fixed number of substation identifying ground impulses. More specifically, when the finger wheel of the calling device at the second party subscriber substation, TS2, is pulled in accordance with a digit, 2 or greater, the associated cam operates the set of cam springs 1306 to transmit one substation identifying ground impulse over the associated party subscriber line 410X. Similarly, when the finger wheel of the calling device at the third party subscriber substation TS3 is pulled in accordance with a digit, 2 or greater, the associated cam operates the set of cam springs 1304 to transmit two substation identifying ground impulses over the associated party subscriber line 410X. Finally, when the finger wheel of the calling device at the fourth party subscriber substation TS4 is pulled in accordance with a digit, 2 or greater, the associated cam operates the set of cam springs 1302 to transmit three substation identifying ground impulses over the associated party subscriber line 410X.

Figure 1:
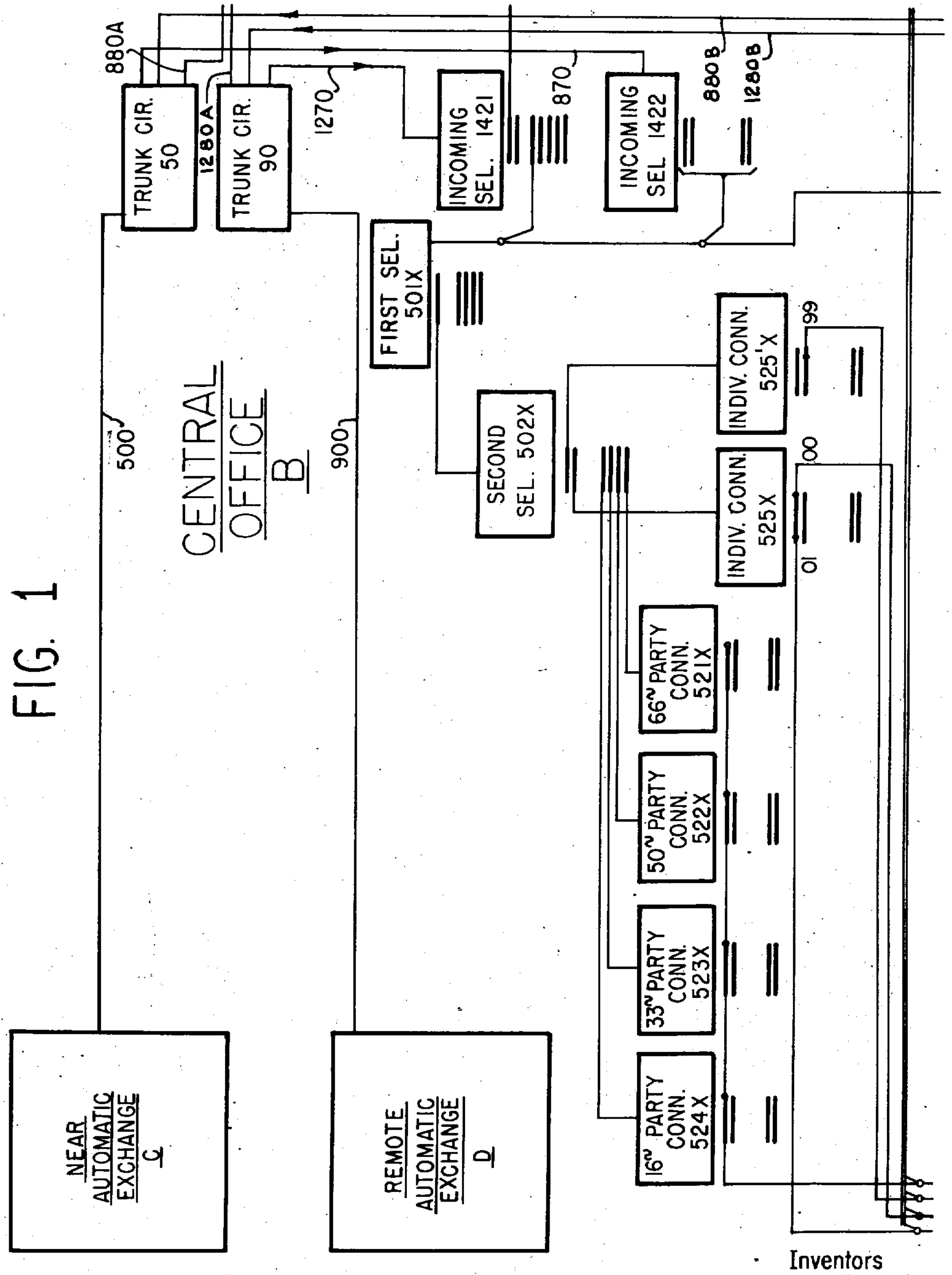
Figure 2:
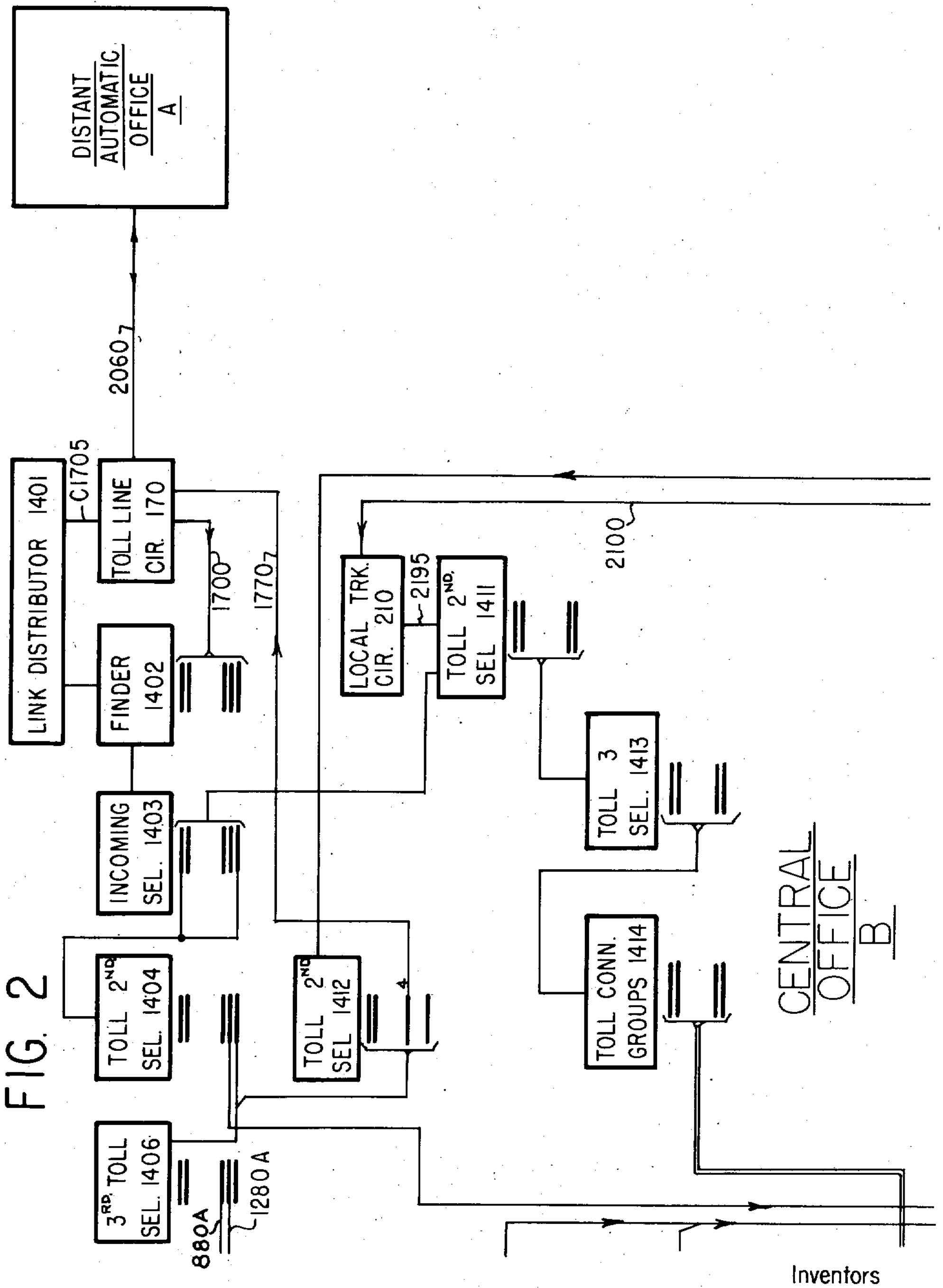
Figure 3:
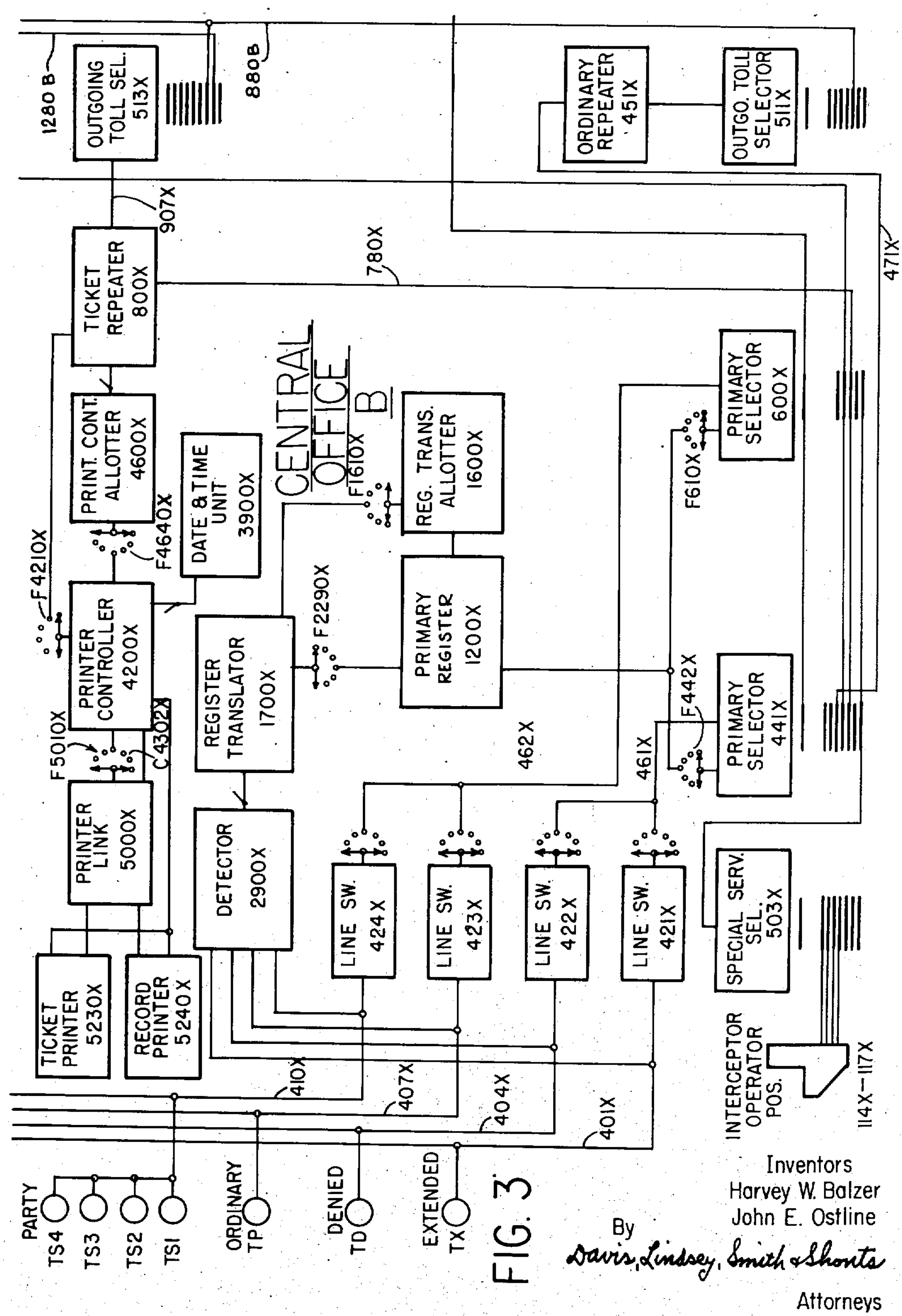
Figure 4:
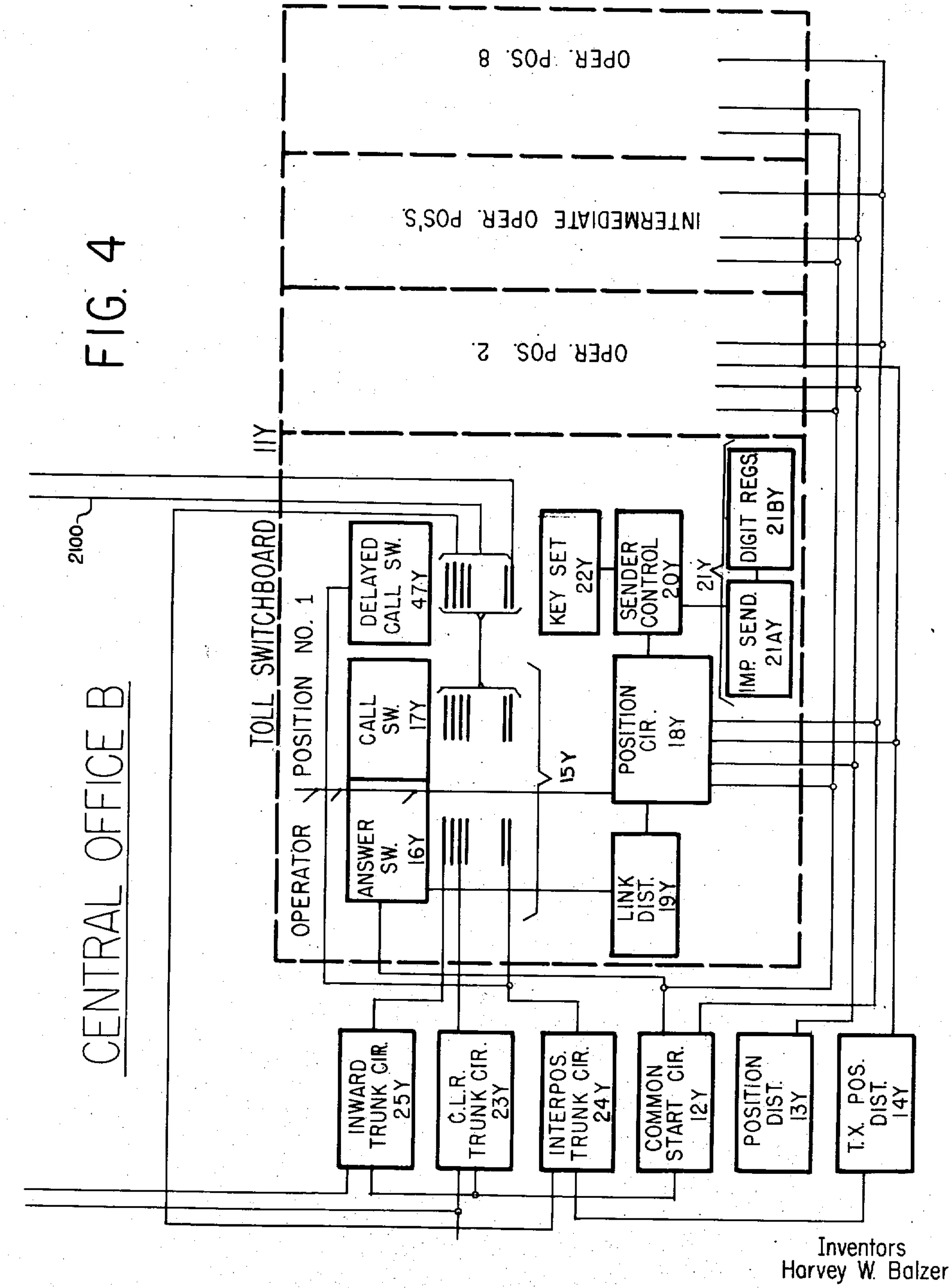

Preferably, the line switches 421X, 422X, 423X, 424X, etc., diagrammatically illustrated in Fig. 13, are of conventional construction and arrangement and respectively correspond to the line switches 421, 422, 423 and 424, etc., diagrammatically illustrated in Fig. 4 of the copending application of John E. Ostline, Serial No. 453,799, filed August 6, 1942. Preferably, each of the primary selectors 441X, etc., included in the first group, diagrammatically illustrated in Fig. 13, is identical to the corresponding primary selector 441, shown in skeleton outline in Fig. 4 of the Ostline application; while each of the primary selectors 600X, etc., included in the second group, diagrammatically illustrated in Fig. 13, is identical to the corresponding primary selector 600, shown in Figs. 6 and 7 of the Ostline application. Preferably, the finders, F442X, F610X, etc., diagrammatically illustrated in Fig. 13, are identical to the respectively corresponding finders F442, F610, etc., respectively, diagrammatically illustrated in Fig. 4 and shown in Fig. 6 of the Ostline application.

Preferably, each of the primary registers 1200X, etc., diagrammatically illustrated in Fig. 15, is identical to the corresponding primary register 1200, shown in Figs. 12 to 16, inclusive, of the Ostline application. Preferably, the register translator allotter 1600X, diagrammatically illustrated in Fig. 15, is identical to the corresponding register translator allotter 1600, shown in Fig. 16 of the Ostline application. Preferably, the finders F2290X, etc., which are individually associated with the register translators 1700X, etc., diagrammatically illustrated in Fig. 15, are identical to the corresponding finders F2290, etc., shown in Fig. 22 of the Ostline application. Preferably, each of the register translators 1700X, etc., shown in skeleton outline in Fig. 15, is substantially identical to the corresponding register translator 1700, shown in Figs. 17 to 28, inclusive, of the Ostline application. However, the register translator 1700X comprises, in addition to the relay combination shown in the corresponding register translator 1700 mentioned, a stop send relay R1510 that operates with the relay combination and with the sender switch S2830X incorporated in the register translator 1700X, in a manner more fully explained hereinafter. Preferably, the detector 2900X, diagrammatically illustrated in Fig. 15 is identical to the corresponding detector 2900, shown in Figs. 29 to 38, inclusive, of the Ostline application. Preferably, each of the ticket repeaters, 800X, etc., shown in skeleton outline in Fig. 13, is substantially identical to the corresponding ticket repeater 800, shown in Figs. 8 to 11, inclusive, of the Ostline application. However, the ticket repeater 800X comprises, in addition to the relay combination shown in the corresponding ticket repeater 800 mentioned, a control relay R1310 and an arrest dial relay R1320 that cooperate with the relay combination in a manner more fully explained hereinafter.

Preferably, the date and time unit 3900X, diagrammatically illustrated in Fig. 15, is identical to the corresponding date and time unit 3900, shown in Figs. 39 to 41, inclusive, of the Ostline application. Preferably, the finders F4210X, etc., individually associated with the printer controllers 4200X, etc., diagrammatically illustrated in Fig. 15, are identical to the corresponding finder F4210, shown in Fig. 42 of the Ostline application. Preferably, each of the printer controllers 4200X, etc., diagrammatically illustrated in Fig. 15, is identical to the corresponding printer controller 4200, shown in Figs. 42 to 49, inclusive, of the Ostline application. Preferably, the printer controller allotter 4600X, diagrammatically illustrated in Fig. 15, is identical to the corresponding printer controller allotter 4600, shown in Fig. 46 of the Ostline application. Preferably, the printer link 5000X, diagrammatically illustrated in Fig. 15, is identical to the corresponding printer link 5000, shown in Figs. 50 and 51 of the Ostline application.

Preferably, the ticket printer 5230X, diagrammatically illustrated in Fig. 15, is identical to the corresponding ticket printer 5230, shown in skeleton outline in Fig. 52 of the Ostline application, which ticket printer 5230 is of the construction and arrangement of that disclosed in United States Patent No. 2,360,789, John E. Ostline, granted October 17, 1944. More specifically, the mechanical construction and arrangement of the ticket printer 5230 comprises an automatic typewriter of the character known as the "Electromatic" typewriter, having the general construction and arrangement shown in United States Patent No. 1,777,055, Russell G. Thompson, granted September 30, 1930.

Preferably, the record printer 5240X, diagrammatically illustrated in Fig. 15, is identical to the corresponding record printer 5240, shown in skeleton outline in Fig. 52 of the Ostline application; and may take the form of an automatic typewriter of the general character of that known as the "Electromatic" typewriter. The record printer 5240X is so connected and arranged that it is adapted to be controlled from any one of the printer controllers 4200X, etc., to print a record sheet of the character of that shown in Figs. 55 and 61 of the Ostline application, and containing all of the necessary record information in conjunction with each trunk call which is extended from the central office B that is to be automatically ticketed. More specifically, the record printer 5240X, prints one line across the record sheet for each trunk call mentioned and includes the following information:

1. The month, the day, the hour and the minute of the termination of the call.
2. The three digit code portion, as well as the four digit numerical line terminal, of the directory number of the calling subscriber substation.
3. The three digit code portion, as well as the four digit numerical line terminal, of the directory number of the called subscriber substation.
4. The time duration of the call in minutes.
5. The rate factor applicable to the call.
6. The class of service rendered the calling subscriber substation.
7. The identification numbers of the register translator, the ticket repeater and the printer controller utilized in setting up the call and in controlling the record printer 5240X.

The ticket printer 5230X is so connected and arranged that it is adapted to be controlled from any one of the printer controllers 4200X, etc., and the printer link 5000X to print and produce tickets of the character of that shown in Figs. 56 to 60, inclusive, and 62 of the Ostline application; and containing all of the necessary record information in conjunction with each trunk call which is extended from the central office B that is to be automatically ticketed. More specifically, the ticket printer 5230X produces a ticket individual to each trunk call mentioned and includes the following information arranged in five lines on the ticket:

1. The month, the day, the hour and the minute of the termination of the call.
2. The three digit code portion, as well as the four digit numerical line terminal, of the directory number of the calling subscriber substation.
3. The three digit code portion, as well as the four digit numerical line terminal, of the directory number of the called subscriber substation.
4. The time duration of the call in minutes, the rate factor applicable to the call and the class of service rendered the calling subscriber substation.
5. The cost of the call on the appropriate charge basis (either the monetary basis or the unit call basis).

Figure 5:
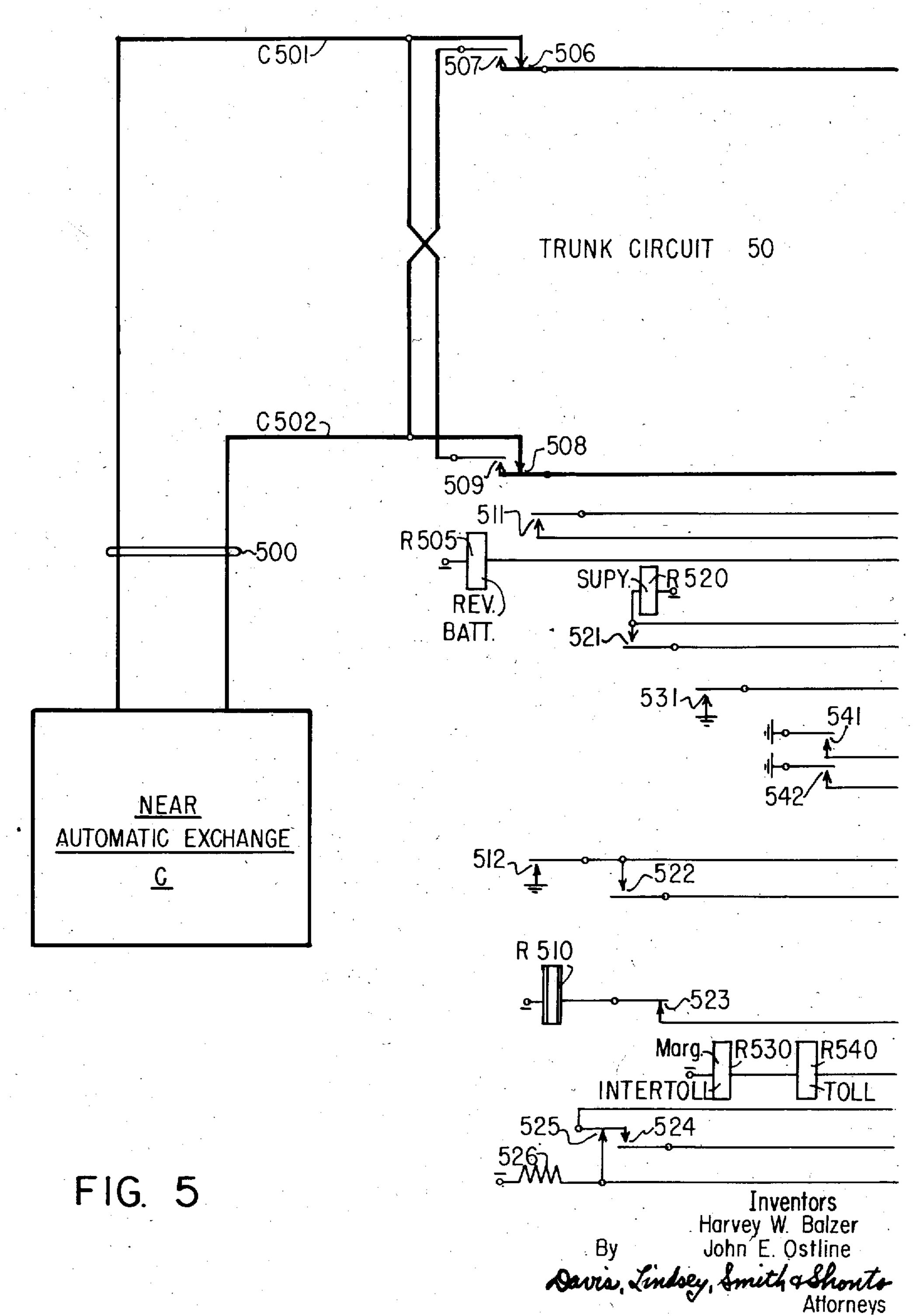
Figure 6:
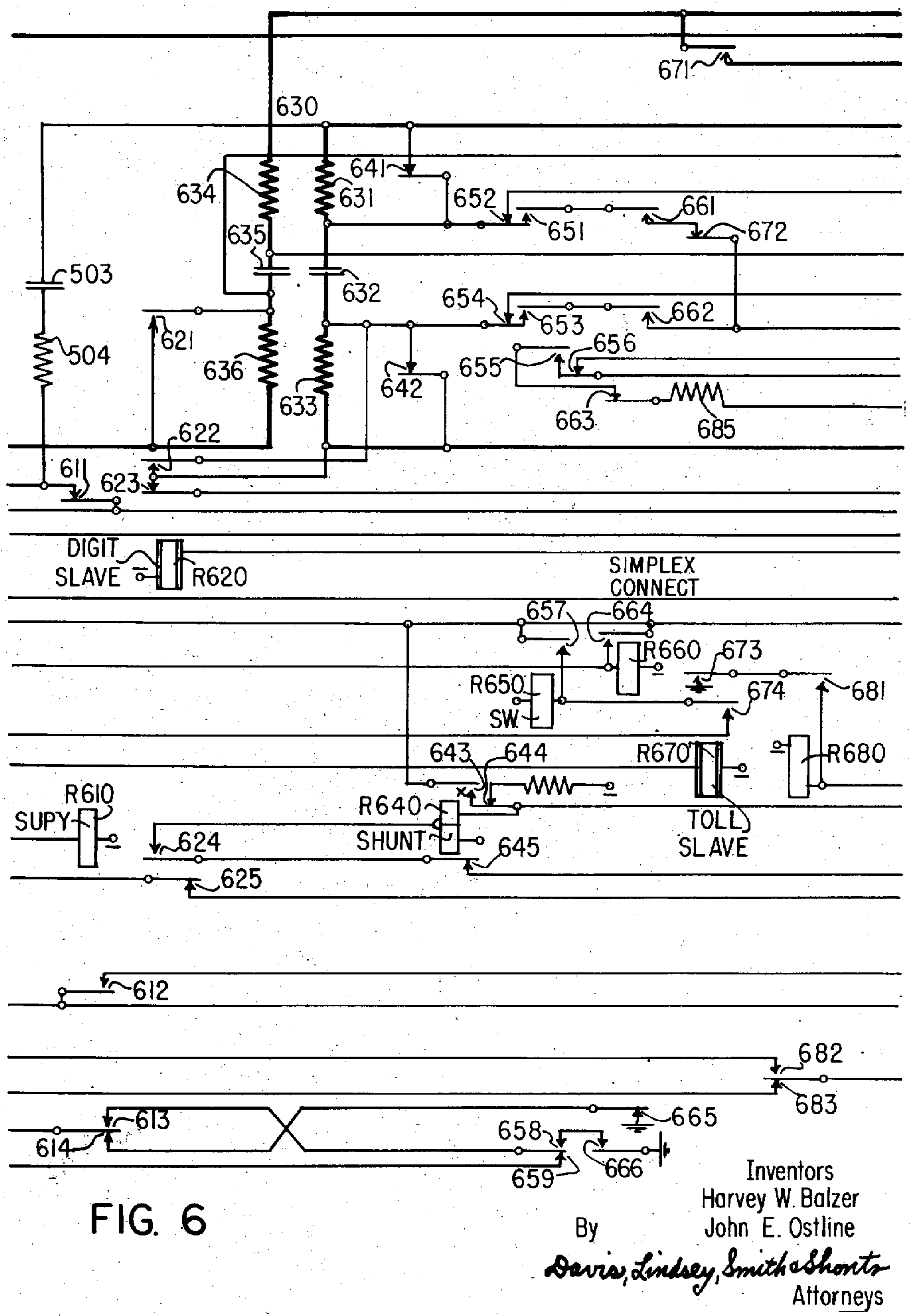
Figure 7:
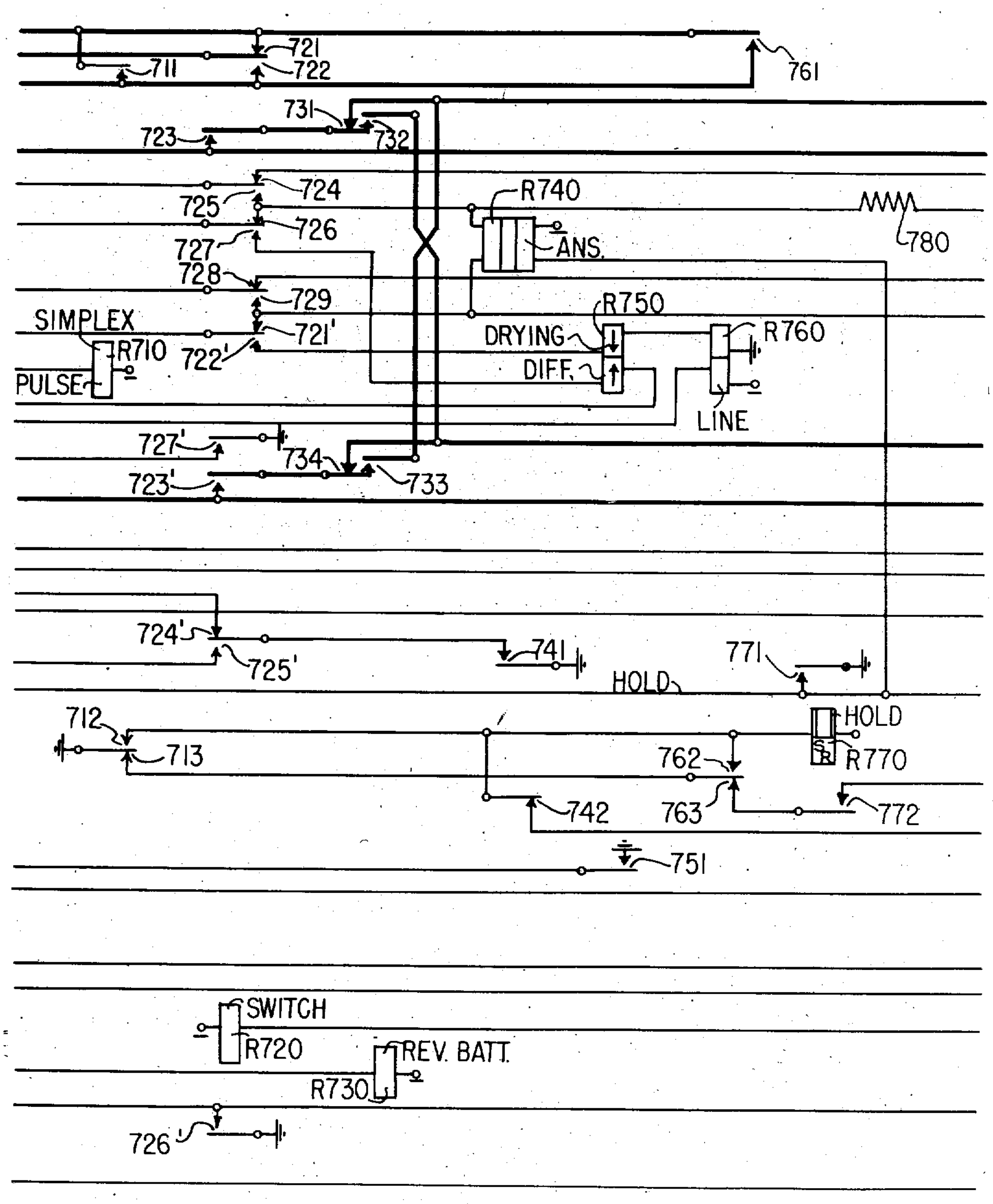
Figure 8:
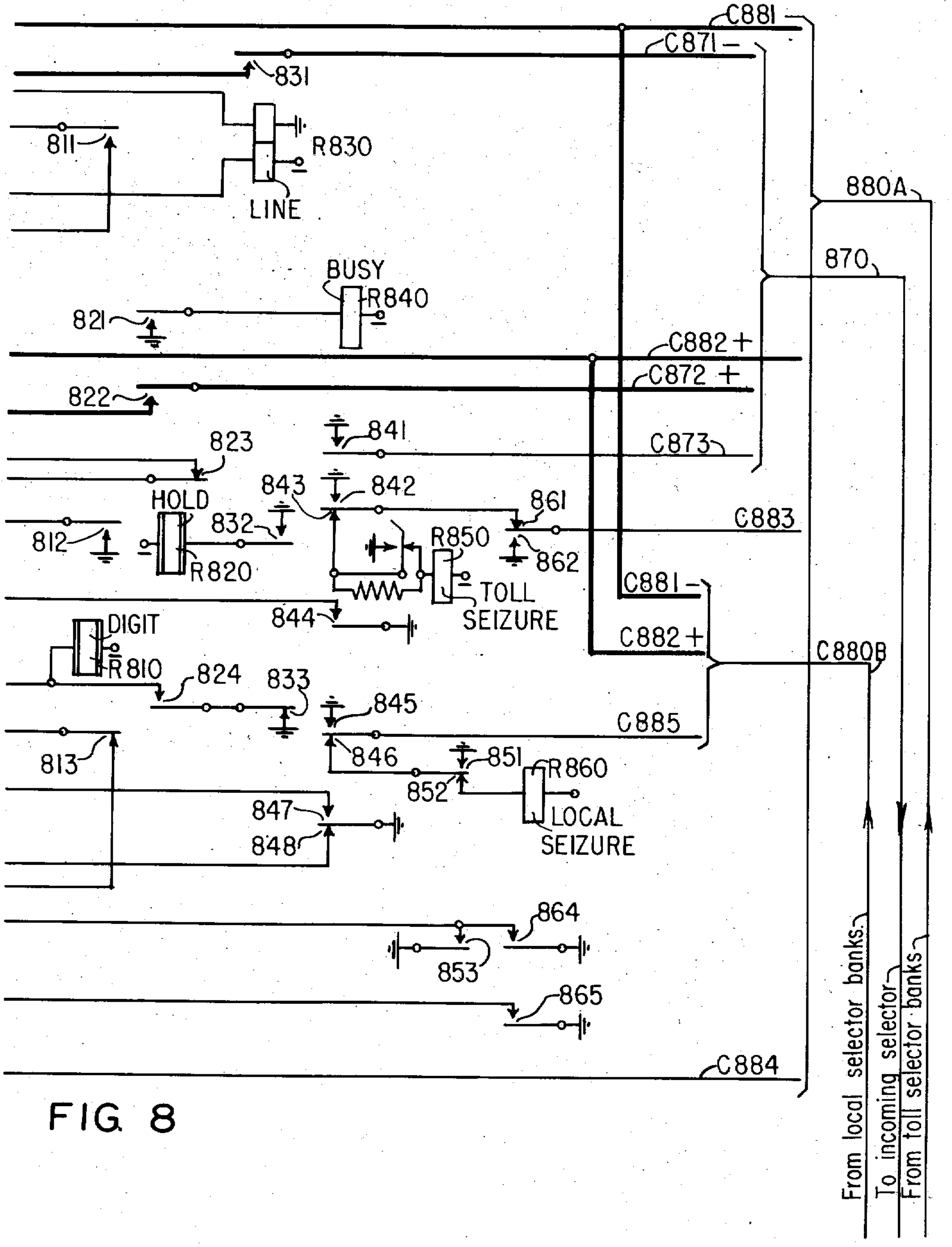
Figure 9:
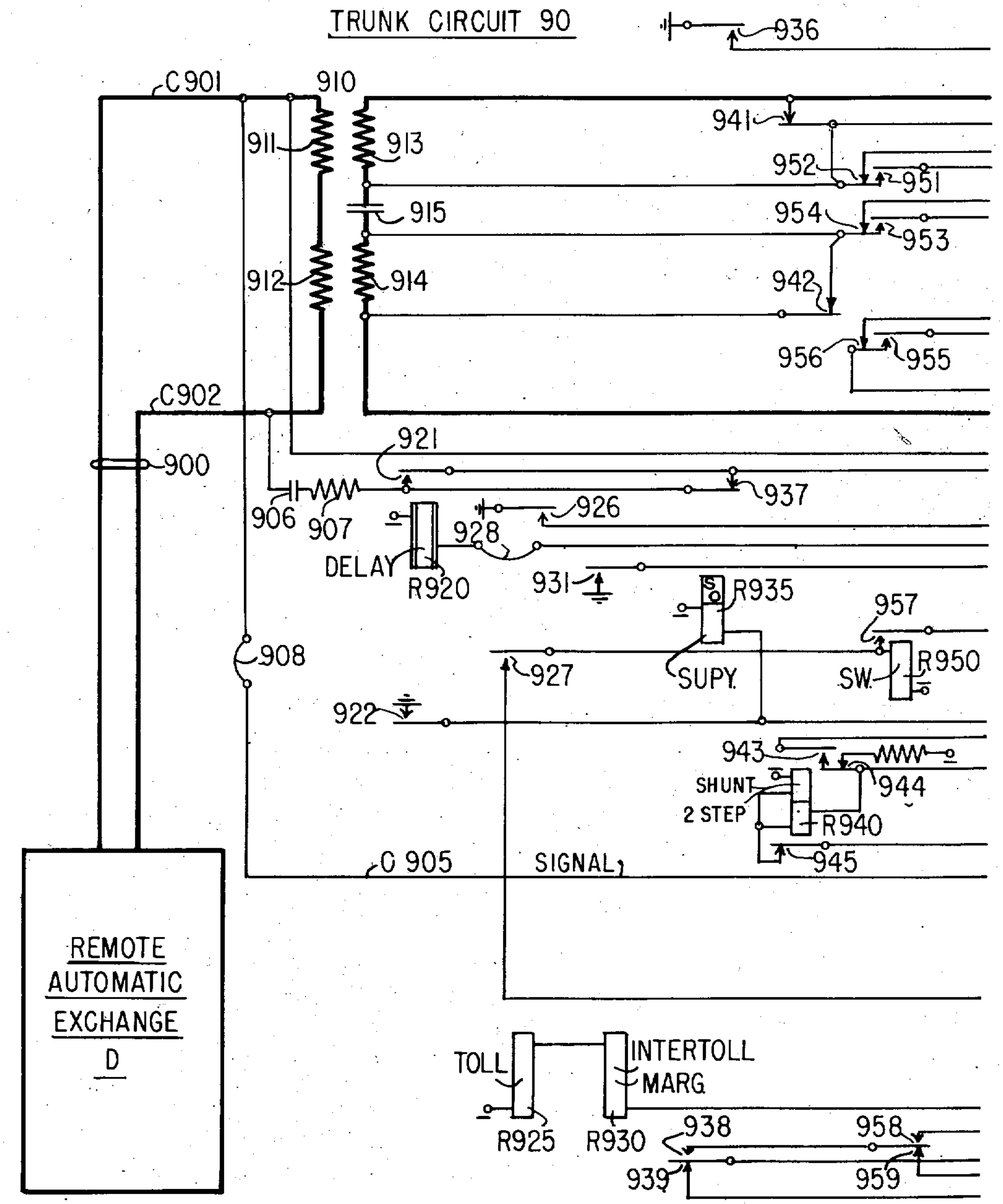
Figure 10:
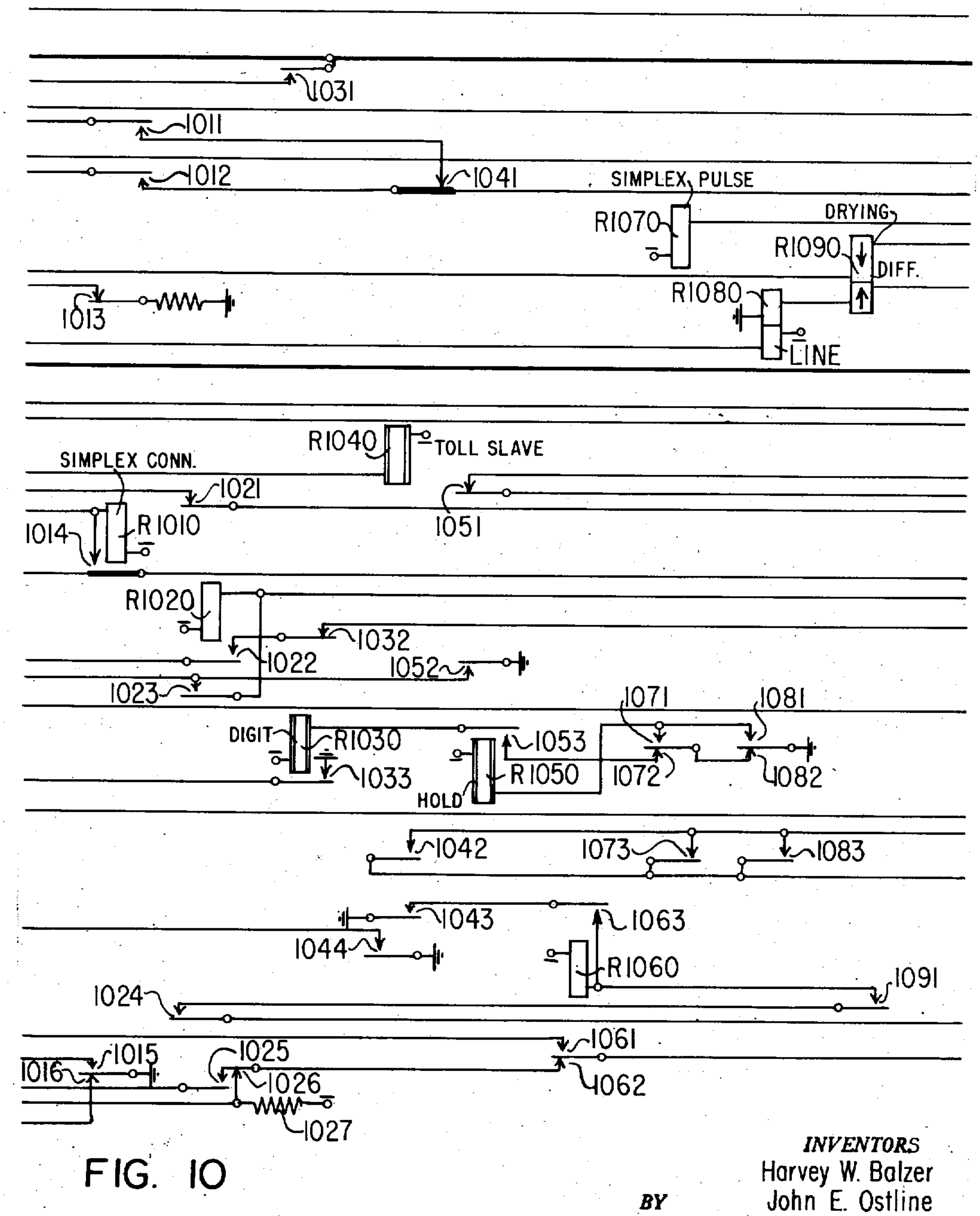
Figure 11:
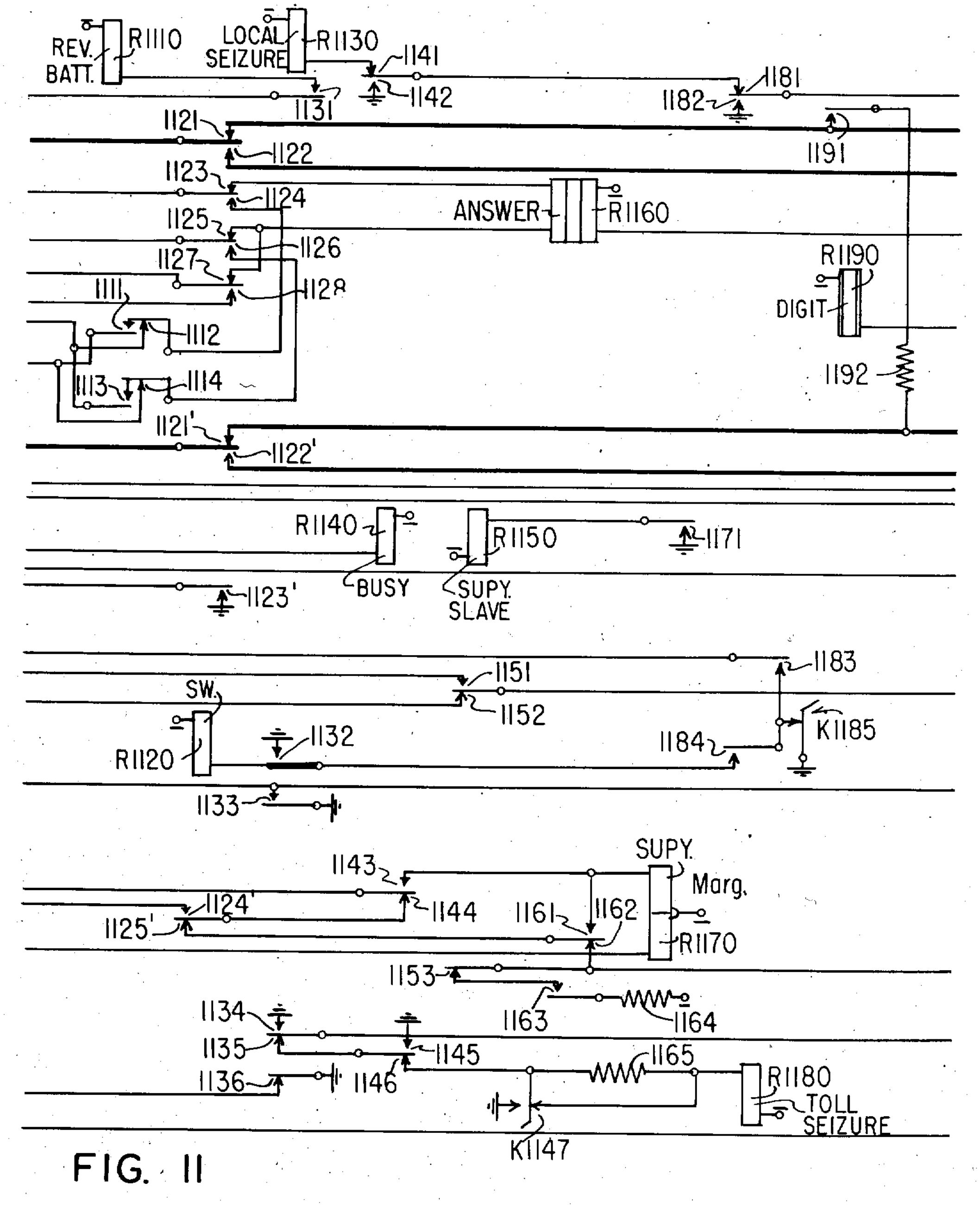
Figure 12:
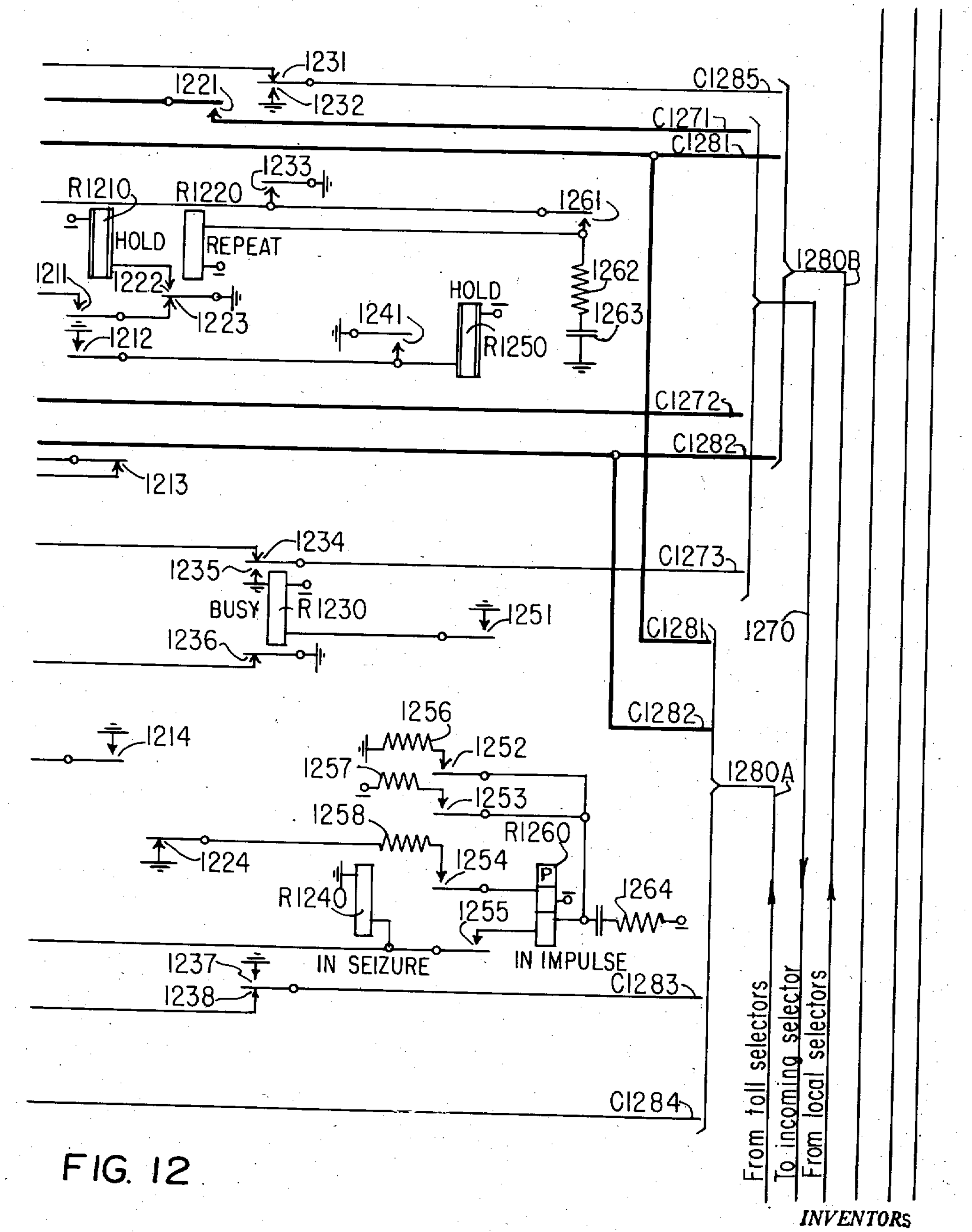

Preferably, each first selector 501X, etc., each second selector 502X, etc., each individual connector 525X, 525'X, etc., each special service selector 503X, etc., each party connector 521X, 522X, 523X, 524X, etc., all diagrammatically illustrated in Fig. 13, respectively correspond to the similarly numbered elements, diagrammatically illustrated in Fig. 5 of the Ostline application and are of the well-known Strowger type. It is noted that the special service selector 503X is of the well-known drop-back Strowger type. Further, the interceptor operator position 114X—117X, diagrammatically illustrated in Fig. 13, corresponds to the interceptor operator position 114—117, diagrammatically illustrated in Fig. 5 of the Ostline application, and comprises conventional position apparatus for answering calls and for extending calls, when such is desirable, in a well-known manner.

Preferably, the link distributor 1401, diagrammatically illustrated in Fig. 14, is of conventional connection and arrangement; while each of the associated finder-incoming selector links, such for example, as the link, including the finder 1402 and the incoming selector 1403, diagrammatically illustrated in Fig. 14, is of the well-known Strowger type.

Preferably, each of the toll second selectors 1404, 1411, 1412, etc., each of the toll third selectors 1406, 1413, etc., each of the incoming selectors 1421, 1422, etc., and the toll connected groups 1414, all diagrammatically illustrated in Fig. 14, are of the well-known Strowger type. Further the outgoing toll selector 511X, 513X, etc., diagrammatically illustrated in Fig. 14, correspond to the outgoing toll selectors 511, 513, etc., diagrammatically illustrated in Fig. 5 of the Ostline application, and are of the well-known Strowger type.

The ordinary repeater 451X, etc., diagrammatically illustrated in Fig. 14, corresponds to the ordinary repeaters 451, etc., diagrammatically illustrated in Fig. 4 of the Ostline application, and are substantially identical to the ticket repeaters 800X, etc.; except that the ordinary repeater 451X is of more simplified connection and arrangement than the ticket repeater 800X, since the ordinary repeater 451X does not perform the storage of ticketing information and related functions of the ticket repeater 800X, as will be explained more fully hereinaafter.

Preferably, the toll switchboard 11Y, diagrammatically illustrated in Fig. 16, is identical to the corresponding toll switchboard 11, disclosed in United States Patent No. 2,353,212, Harvey W. Balzer, granted July 11, 1944; which toll switchboard 11Y comprises operator position No. 1 that in turn includes the position circuit 18Y, a connected link distributor 19Y and a connected sender control circuit 20Y. In turn, the sender control circuit 20Y is governed by a key set 22Y disposed at this operator position and is connected to an impulse sender digit register unit 21Y, which unit comprises an impulse sender 21AY and a digit register 21BY, all diagrammatically illustrated in Fig. 16. The position circuit 18Y is identical to the corresponding position circuit 18, shown in Figs. 29, 30, 31, 32, 33, 39, 40 and 41 of the Balzer patent mentioned; the link distributor 19Y, diagrammatically shown in Fig. 16, is identical to the corresponding link distributor 19, shown in Fig. 38 of the Balzer patent; and the sender control circuit 20Y, shown in skeleton outline in Fig. 16, is substantially identical to the corresponding sender control circuit 20 shown in Figs. 34, 35, 36 and 37 of the Balzer patent. However, the sender control circuit 20Y comprises, in addition to the relay combination of the sender control circuit 20, a hold slave relay R1610, that cooperates with the relay combination in a manner more fully explained hereinafter. The key set 22Y is identical to the corresponding key set 22, diagrammatically illustrated in Fig. 37 of the Balzer patent and is of conventional construction and arrangement. The impulse sender 21AY is identical to the corresponding impulse sender 21A shown in Figs. 42 and 43 of the Balzer patent; and the digit register 21BY is identical to the corresponding digit register 21B shown in Figs. 44 and 45 of the Balzer patent.

The links 15Y, etc., individual to operator position No. 1, diagrammatically illustrated in Fig. 16, are identical to the corresponding link 15 shown in Figs. 24, 25 26A and 26B of the Balzer patent. Each of the delayed call selectors 47Y, etc., diagrammatically illustrated in Fig. 16, is identical to the corresponding delayed call selector 47, diagrammatically illustrated in Fig. 26B of the Balzer patent, and is of the well-known Strowger type.

Preferably, the common start circuit 12Y, associated with the toll switchboard 11Y, diagrammatically illustrated in Fig. 16, is identical to the corresponding common start circuit 12 shown in Figs. 27 and 28 of the Balzer patent; and the position distributor 13Y, associated with the toll witchboard 11Y, diagrammatically illustrated in Fig. 16, is identical to the corresponding position distributor 13 shown in Fig. 39 of the Balzer patent. Also, the TX position distributor 14Y, diagrammatically illustrated in Fig. 16, is identical to the corresponding TX position distributor 14 shown in Fig. 39 of the Balzer patent.

Preferably, the C.L.R. trunk circuits 23Y, etc., and the interposition trunk circuits 24Y, etc., both diagrammatically illustrated in Fig. 16, are respectively identical to the C.L.R. trunk circuit 23 and to the interposiiton trunk circuit 24, diagrammatically illustrated in Fig. 26B of the Balzer patent; which two groups of trunk circuits are of conventional connection and arrangement. Preferably, each of the inward trunk circuits 25Y, etc., diagrammatically illustrated in Fig. 16, are identical to the corresponding inward trunk circuit 25 shown in Fig. 23B of the Balzer patent.

Preferably, each of the toll line circuits in the central office B, terminating the toll lines extending to the distant office A, is identical to the toll line circuit 170, which comprises, as best shown in Figs. 17 to 20, inclusive, two connected repeaters 2050 and 2030 and a relay group including a start relay R1710, a cutoff relay R1720, a hold relay R1730, a digit relay R1740, a simplex relay R1750, a simplex slave relay R1760, a loop seizure relay R1770, a control relay R1810, a repeat relay R1820, a control relay R1830, a supervisory slave relay R1840, a supervisory relay R1850, a switch relay R1860, a control relay R1870, a superivsory relay R1875, a loop pulse relay R1880, a simplex pulse relay R1890, a control relay R1900, a seizure relay R1910, a supervisory relay R1920, a control relay R1930, three rering relays R1940, R1950 and R1960, three control relays R1970, R1980, and R1990, a simplex connect relay R2010, a switch relay R2020 and a signal relay R2040; connected and arranged in a manner more fully explained hereinafter.

Preferably, each of the trunk circuits in the central office B, terminating the trunk lines extending to the near exchange C, is identical to the trunk circuit 50, which comprises, as best shown in Figs. 5 to 8, inclusive, a repeater 630 and a relay group including a reverse battery relay R505, a control relay R510, a supervisory relay R520, an intertoll relay R530, a toll relay R540, a supervisory relay R610, a digit slave relay R620, a shunt relay R640, a switch relay R650, a simplex connect relay R660, a toll slave relay R670, a control relay R680, a simplex pulse relay R710, a switch relay R720, a reverse battery relay R730, an answer relay R740, a drying relay R750, a line relay R760, a hold relay R770, a digit relay R810, a hold relay R820, a line relay R830, a busy relay R840, a toll seizure relay R850, and a local seizure relay R860; connected and arranged in a manner more fully explained hereinafter.

Preferably, each of the trunk circuits in the central office B, terminating the trunk lines extending to the remote exchange D, is identical to the trunk circuit 90, which comprises, as best shown in Figs. 9 to 12, inclusive, a repeater 910 and a relay group including a delay relay R920, a toll relay R925, an intertoll relay R930, a supervisory relay R935, a shunt relay R940, a switch relay R950, a simplex connect relay R1010, a control relay R1020, a digit relay R1030, a toll slave relay R1040, a hold relay R1050, a control relay R1060, a simplex pulse relay R1070, a line relay R1080, a drying relay R1090, a reverse battery relay R1110, a switch relay R1120, a local seizure relay R1130, a busy relay R1140, a supervisory slave relay R1150, an answer relay R1160, a supervisory relay R1170, a toll seizure relay R1180, a digit relay R1190, a hold relay R1210, a repeat relay R1220, a busy relay R1230, an inseizure relay R1240, a hold relay R1250, and an inimpulse relay R1260; connected and arranged in a manner more fully explained hereinafter.

Preferably, each of local trunk circuits in the group connected to the group of toll second selectors, including the toll second selector 1411, is identical to the local trunk circuit 210 shown in Fig. 21. The local trunk circuit 210 comprises a repeater 2170 and a relay group including a busy cutoff relay R2110, a seizure relay R2115, a switch relay R2120, a busy relay R2130, a coin relay R2140, a ringup relay R2150, a ring relay R2160, a test relay R2175, a control relay R2180 and a supervisory relay R2190 connected and arranged in a manner more fully explained hereinafter.

*The apparatus incorporated in the distant office A, the near exchange C, and the remote exchange D*

Figure 20:
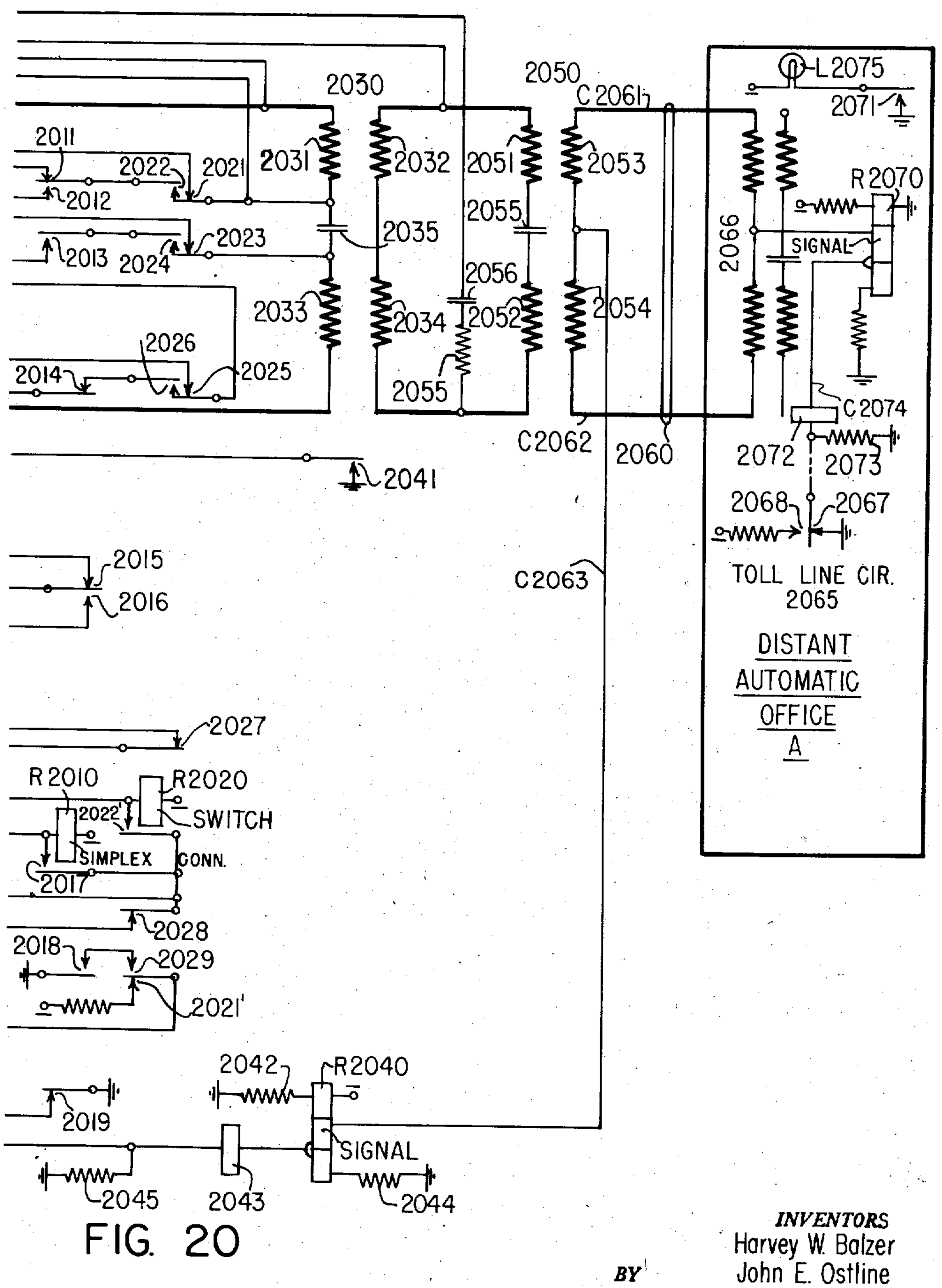
Figure 21:
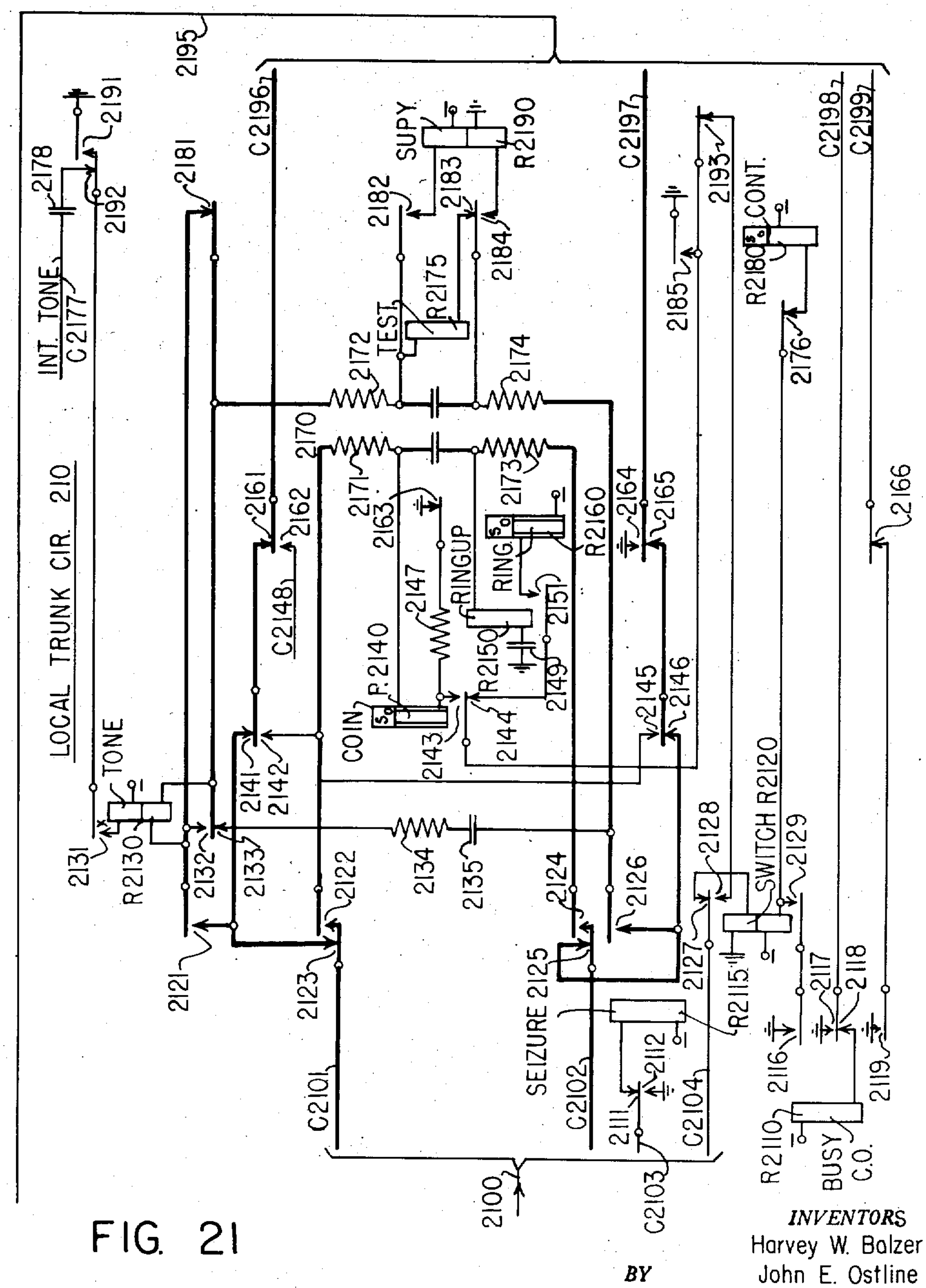

As previously noted, the distant office A comprises, in addition to a switch train, an operator position, not shown, and equipment including a toll line circuit 2065, diagrammatically illustrated in Fig. 20, terminating the toll line 2060 extending between the distant office A and the central office B. Preferably, the toll line circuit 2065 is substantially identical to the toll line circuit 170 and includes, among other elements, a repeater 2066 and a signal relay R2070.

As previously noted, the near exchange C comprises a switch train and equipment including a trunk circuit, not shown, substantially identical to the trunk circuit 50 and terminating the trunk line 500 extending between the central office B and the near exchange C.

Similarly, as previously noted, the remote exchange D comprises a switch train and equipment including a trunk circuit, not shown, substantially identical to the trunk circuit 90 and terminating the trunk line 900 extending between central office B and the remote exchange D.

A better understanding of the connection and arrangement of the apparatus incorporated in the telephone system will be facilitated from a consideration of the detailed operation of the various pieces of apparatus in the extension of various calls among the different offices and exchanges, as will appear hereinafter.

*Call from the distant office A to the central office B*

A toll call originating in the distant office A, or extended thereto from a more remote point, is ultimately routed to the toll switchboard therein; whereupon the operator at the toll switchboard mentioned governs her position equipment in order to cause the automatic switching apparatus in the distant office A to seize and connect to the toll line circuit 2065 therein, thereby seizing the toll line 2060 extending between the distant office A and the central office B. This operation is based upon the assumption that the toll line 2060 is idle at this time; whereupon ground potential normally applied at the contacts 2067 in the toll line circuit 2065 via the impedance element 2072 to the signal conductor C2074 is removed and resistance battery potential at the contacts 2068 is applied via the impedance element 2072 to the signal conductor C2074. The application of ground potential to the signal conductor C2074 marks the toll line 2060 as idle in the toll line circuit 2065; whereas the application of resistance battery potential to the signal conductor C2074 marks the toll line 2060 as busy in the toll line circuit 2065. Also, this application of resistance battery potential to the signal conductor C2074 effects seizure in the distant office A of the toll line 2060, since this resistance battery potential upon the signal conductor C2074 extends by way of the intermediate winding of the signal relay R2070 to the simplex of the outgoing windings of the repeater 2066 and therefrom by way of the line conductors C2061 and C2062 of the toll line 2060 to the central office B. In the central office B the line conductors C2061 and C2062 of the toll line 2060 are connected by way of the windings 2053 and 2054 of the repeater 2050 to the simplex conductor C2063; which simplex conductor C2063 is connected by way of the intermediate winding of the signal relay R2040 and the impedance element 2043 to the grounded resistor 2045. The grounded resistor 2045 is connected to the signal conductor C2001, which at this time is connected by way of the contacts 1905, 1893, 1883 and 1879 to ground potential. Also, the lower winding of the signal relay R2040 is connected between the impedance element 2043 and the grounded resistor 2044. Finally, both the upper winding of the signal relay R2040 in the toll line circuit 170 and the upper winding of the signal relay R2070 in toll line circuit 2065 are energized. Accordingly, at this time, the circuit traced above is completed for energizing the intermediate winding of the signal relay R2070 in series with both the intermediate and the lower windings of the signal relay R2040. The signal relays R2070 and R2040 are so connected and arranged that when the above mentioned condition persists, the signal relay R2070 does not operate, whereas the signal relay R2040 does operate.

Upon operating the signal relay R2040 completes, at the contacts 2041, a circuit including the contacts 1863' and 1761 for operating the repeat relay R1820. Upon operating the repeat relay R1820 completes, at the contacts 1823, an obvious circuit for operating the hold relay R1730. Upon operating the hold relay R1730 completes, at the contacts 1732, an obvious circuit for operating the start relay R1710. Upon operating the start relay R1710 interrupts, at the contacts 1712, an obvious path for applying battery potential by way of the winding of the seizure relay R1910 to the control conductor C1773 of the trunk 1770; and completes, at the contacts 1713, an obvious path for applying ground potential to the control conductor C1773 of the trunk 1770. The removal of battery potential from and the application of ground potential to the control conductor C1773 of the trunk 1770 marks this trunk, and consequently the toll line circuit 170, as busy to the group of toll second selectors, including the toll second selector 1412. Also the start relay R1710 completes, at the contacts 1714, a circuit including the contacts 1833 and 1811 for energizing the lower winding of the supervisory relay R1875; whereby the latter relay operates. Further, the start relay R1710 completes, at the contacts 1711, a path including the contacts 1721 for applying ground potential to the start conductor C1705 extending to the link distributor 1401, thereby to cause the link distributor to initiate operation of the finder of an idle one of the associated finder-incoming selector links previously selected thereby. Also, this application of ground potential to the start conductor C1705 marks the level of the trunk 1700 extending from the toll line circuit 170 and appearing before the finders of the links mentioned. Further, the start relay R1710 completes, at the contacts 1716, a path including the winding of the cutoff relay R1720 for applying battery potential to the control conductor C1704 of the trunk 1700, thereby to mark the rotary position of this trunk before the finders of the links mentioned.

Upon operating the supervisory relay R1875 interrupts, at the contacts 1875', a normally completed shunt path including the contacts 1861, the condenser 2056 and the resistor 2055 across the windings 2032 and 2034 of the repeater 2030; and interrupts at the contacts 1879 the previously traced path for applying ground potential to the signal conductor C2001. Finally, the supervisory relay R1875 completes, at the contacts 1878, a path including the contacts 1883, 1893 and 1905 for applying battery potential by way of the ballast lamp L1872 to the signal conductor C2001. The removal of ground potential from and the application of battery potential to the signal conductor C2001 completes a holding circuit for energizing in multiple the lower and intermediate windings of the signal relay R2040 and causes battery potential to be applied to the simplex conductor C2063, whereby the intermediate and lower windings of the signal relay R2070 in the toll line circuit 2065 in the distant office A are energized in series over the toll line 2060, affecting operation of this signal relay R2070. Upon operating the signal relay R2070 completes, at the contacts 2071, a circuit for illuminating the lamp L2075 associated with the calling operator position at the toll switchboard in the distant office A, thereby to indicate to the operator that the toll line 2060 has been seized in the distant office A, but that the switching apparatus in the central office B is not in readiness to receive the first digit. In other words, at this time the toll line circuit 170 returns over the toll line 2060 a stop-in-dial signal to the calling operator position at the toll switchboard in the distant office A.

As previously noted, the application of ground potential to the start conductor C1705, extending between the toll line circuit 170 and the link distributor 1401, causes the link distributor 1401 to initiate operation of the finder of the previously selected idle one of the associated links. Assuming that the link illustrated, including the finder 1402 and the incoming selector 1403, is selected by the link distributor 1401, operation of the finder 1402 is initiated at this time. More particularly, the finder 1402 operates and finds the trunk 1700, extending from the toll line circuit 170, and applies ground potential to the control conductor C1704 thereof in order to complete a circuit including the contacts 1716 for operating the cutoff relay R1720. Upon operating the cutoff relay R1720 interrupts, at the contacts 1721, the previously mentioned path for applying ground potential to the start conductor C1705 extending to the link distributor 1401, thereby indicating that the calling toll line circuit 170 has been found.

Also, at this time, a loop circuit is completed between the toll line circuit 170 and the incoming selector 1403 via the finder 1402 and the trunk 1700, battery and ground potentials in the incoming selector 1403 being applied to the line conductors C1701 and C1702 of the trunk 1700. This loop circuit extends from the line conductor C1701 by way of the contacts 1862, the winding 2031 of the repeater 2030, the contacts 2021 and 1864, the upper winding of the loop seizure relay R1770, the contacts 1821, 1866 and 2023, the winding 2033 of the repeater 2030 and the contacts 1861' to the line conductor C1702; whereby the upper winding of the loop seizure relay R1770 is energized causing this relay to operate and complete, at the contacts 1772, an obvious circuit for operating the control relay R1810. Upon operating the control relay R1810 interrupts, at the contacts 1811, the previously traced circuit for energizing the lower winding of the supervisory relay R1875, thereby, to cause the latter relay to restore. Also, the control relay R1810 completes, at the contacts 1812, a holding circuit for itself, including the contacts 1833 and 1714; and completes, at the contacts 1815, a holding circuit for the cutoff relay R1720, including the contacts 1722. Further, the control relay R1810 completes, at the contacts 1813, a path including the contacts 1823, 1743 and 1771 for applying ground potential directly to one terminal of the upper winding of the loop seizure relay R1770, whereby direct ground potential is applied in the toll line circuit 170 by way of a portion of the path previously traced to the line conductor C1702 of the trunk 1700 extending to the incoming selector 1403. This application of direct ground potential in the toll line circuit 170 to the line conductor C1702 of the trunk 1700 is hereinafter referred to as an unbalance; whereby, at this time, the control relay R1810 has unbalanced the trunk 1700 extending to the incoming selector 1403; which unbalance of the trunk 1700 is without effect in the incoming selector 1403 at this time. Upon restoring the supervisory relay R1875 interrupts, at the contacts 1878, the previously traced path for applying battery potential to the signal conductor C2001 and recompletes at the contacts 1879 the previously traced path for applying ground potential to the signal conductor C2001; whereby the signal relay R2040 in the toll line circuit 170 is retained in its operated position and the signal relay R2070 in the toll line circuit 2065 restores. Upon restoring the signal relay R2070 interrupts, at the contacts 2071, the previously mentioned circuit for illuminating the lamp L2075 associated with the calling operator position at the toll switchboard in the distant office A, thereby to indicate to the operator mentioned that the switching apparatus in the central office B is in readiness to receive the first digit. Accordingly, when ground potential is replaced upon the signal conductor C2001 in the toll line circuit 170, the delay-in-dial signal is removed from the simplex conductor C2063 and from the toll line 2060 extending back into the distant office A.

The operator at the calling operator position at the toll switchboard in the distant office A then proceeds to dial the first digit; whereby the associated equipment interrupts the application of battery potential, at the contacts 2068, and applies ground potential, at the contacts 2067, and then interrupts the application of ground potential, at the contacts 2067, and applies battery potential, at the contacts 2068, with respect to the signal conductor C2074, thereby to transmit the impulses of the digit thereover and consequently over the toll line 2060. The signal relay R2070 in the toll line circuit 2065 does not follow the dialed impulses; however, the signal relay R2040 in the toll line circuit 170 does follow the dialed impulses. Each time the signal relay R2040 restores and then reoperates it interrupts and then recompletes, at the contacts 2041, the previously traced circuit for operating the repeat relay R1820 thereby to cause the latter relay to follow. Upon the first restoration of the repeat relay R1820 it completes, at the contacts 1822, a circuit including the contacts 2027 and 1731 for operating the digit relay R1740. Upon operating the digit relay R1740 completes, at the contacts 1742, an obvious circuit for energizing the lower winding of the loop seizure relay R1770; thereby to retain the latter relay in its operated position during dialing, the loop seizure relay R1770 being of the slow-to-release type. Also the digit relay R1740 interrupts, at the contacts 1743, the previously traced path for unbalancing the trunk 1700 extending to the incoming selector 1403. Further, the digit relay R1740 completes, at the contacts 1741, a path including the contacts 1862, 2021 and 1864 for short-circuiting the winding 2031 of the repeater 2030, thereby to reduce the impedance of the loop circuit extending over the trunk 1700 to the incoming selector 1403. Both the hold relay R1730 and the digit relay R1740 being of the slow-to-release type remain operated during the digit; and the impulses of the digit are repeated by the repeat relay R1820, at the contacts 1821, over the loop circuit to the incoming selector 1403, causing the latter to operate in accordance with the first digit.

At the conclusion of the first digit the signal relay R2040 remains operated, whereby the repeat relay R1820 remains operated, effecting the restoration of the digit relay R1740 shortly thereafter. Upon restoring the digit relay R1740 interrupts, at the contacts 1741, the previously traced path for short-circuiting the winding 2031 of the repeater 2030; and interrupts, at the contacts 1742, the previously mentioned holding circuit for energizing the lower winding of the loop seizure relay R1770. However, the loop seizure relay remains operated at this time since the upper winding thereon is energized over the loop circuit including the trunk 1700 and now extending via the finder 1402 and the incoming selector 1403 to the toll second selector in the particular group that has been selected by the incoming selector 1403. It will be understood that the incoming selector 1403 responds to the first digit to select a corresponding group of the toll second selectors and then operates automatically to select an idle toll second selector in the selected group; such, for examples, as the toll second selector 1404 in one of the groups and the toll second selector 1411 in another of the groups, depending, of course, upon the ultimate extension of the connection. Also, upon restoring, the digit relay R1740 recompletes, at the contacts 1743, the previously traced path for unbalancing the trunk 1700 extending to the particular selected toll second selector; which operation has no effect in the selected toll second selector at this time. The calling operator at the toll switchboard in the distant office A then proceeds with the dialing of the second digit, thereby further to extend the connection in a manner more fully explained hereinafter.

*Routing the call to the toll switchboard in the Central office B*

Now, assuming that the call extended from the calling operator position at the toll switchboard in the distant office A via the toll line 2060, the toll line circuit 170 and the finder 1402 to the incoming selector 1403 is to be extended to the toll switchboard 11Y in the central office B, the first digit that was received by the incoming selector 1403 effected operation thereon to seize a toll second selector in the group, including the toll second selector 1404. Assuming that the incoming selector 1403 seized the particular toll second selector 1404, the second digit received by the toll line circuit 170 from the calling operator position at the toll switchboard in the distant office A is repeated by the toll line circuit 170 over the loop circuit including the trunk 1700, in the manner previously explained, to the toll second selector 1404, thereby to cause the toll second selector 1404 to operate and select the group of inward trunk circuits appearing before idle inward trunk circuit in this group; such, for example, as the inward trunk circuit 25Y.

On the other hand, in the event either the incoming selector 1403 or the toll second selector 1404 encounters an all-trunks-busy condition, the particular switch operates to open the loop circuit extending back over the trunk 1700 to the toll line circuit 170 and to cause 120 ground impulses per minute or 120 ground impulses and 120 battery impulses per minute, interspersed, to be applied to the control conductor C1703 of the trunk 1700. When the loop circuit mentioned is thus opened, the loop seizure relay R1770 in the toll line circuit 170 restores in order to complete, at the contacts 1773, a circuit, including the contacts 1823, 1715, 2028 and 1814, for operating in series the control relays R1980 and R1990. Upon operating, the control relay R1990 completes, at the contacts 1991, an obvious circuit for operating the simplex connect relay R2010; and upon operating, the control relay R1980 completes, at the contacts 1982, an obvious circuit for operating the control relay R1970. Upon operating, the control relay R1970 completes, at the contacts 1973, a circuit, including the contacts 1981, for operating the switch relay R2020. Upon operating, the switch relay R2020 interrupts, at the contacts 2028, the previously traced circuit for operating the control relays R1980 and R1990, thereby to cause the latter relays to restore. Upon restoring, the control relay R1980 interrupts, at the contacts 1982, the previously mentioned circuit for retaining operated the control relay R1970; thereby to cause the latter relay to restore shortly thereafter, it being of the slow-to-release type. Upon operating, the simplex connect relay R2010 interrupts, at the contacts 2015, the normally completed connection between the winding of the supervisory relay R1920 and the control conductor C1703 of the trunk 1700, and completes, at the contacts 2016, an obvious connection between the control conductor C1703 of the trunk 1700 and the upper winding of the supervisory relay R1875. The 120 ground impulses per minute or the same and 120 battery impulses per minute, interspersed, applied to the control conductor C1703 of the trunk 1700 effects corresponding operation and restoration of the supervisory relay R1875; whereby ground and battery potentials are reversed at this frequency upon signal conductor C2001 in order to retain operated the signal relay R2040 in the toll line circuit 170 and to cause the signal relay R2070 in the toll line circuit 2065 to follow. This intermittent operation of the signal relay R2070 causes corresponding flashing of the lamp L2075 associated with the calling operator position at the toll switchboard in the distant office A, thereby to indicate the condition noted to the operator mentioned.

Now, returning to the operation of the toll second selector 1404, and assuming that it has seized the inward trunk circuit 25Y at this time, when this is effected, a circuit is completed for energizing in series the winding of the supervisory relay R1920 in the toll line circuit 170 and a relay, not shown, in the inward trunk circuit 25Y, which circuit includes the contacts 2015 and the control conductor C1703 of the trunk 1700. When this circuit is completed, the supervisory relay R1920 does not operate, as it is of the marginal type; however, the relay mentioned in the inward trunk circuit 25Y does operate, drying therein the line conductor C1701 of the trunk of the loop seizure relay R1770, causing the latter relay to restore.

Upon restoring the loop seizure relay R1770 interrupts, at the contacts 1771, the previously traced path for unbalancing the trunk 1700, and completes, at the contacts 1773, a circuit including the contacts 1823, 1715, 2028 and 1814, for operating in series the control relays R1980 and R1990. Upon operating the control relay R1980 completes, at the contacts 1982, an obvious circuit for operating the control relay R1970. Upon operating the control relay R1990 completes, at the contacts 1991, an obvious circuit for operating the simplex connect relay R2010. Upon operating the control relay R1970 completes, at the contacts 1973, a circuit including the contacts 1981 for operating the switch relay R2020.

Upon operating the simplex connect relay R2010 completes, at contacts 2017, a holding circuit for energizing the winding thereof, including the contacts 1715 and 1823; and upon operating the switch relay R2020 completes, at the contacts 2022′, a holding circuit for energizing the winding thereof, including the contacts 1715 and 1823. Also, the simplex connect relay R2010 interrupts, at the contacts 2015, the previously traced circuit for energizing the winding of the supervisory relay R1920 in the toll line circuit 170 in series with the relay mentioned in the inward trunk circuit 25Y, which circuit included the control conductor 1703 of the trunk 1700. Also, the simplex connect relay R2010 completes, at the contacts 2016, an obvious path for connecting battery potential by way of the upper winding of the supervisory relay R1875 to the control conductor C1703 of the trunk 1700, for a purpose more fully explained hereinafter. Also, the switch relay R2020 interrupts, at the contacts 2021 and 2023, further points in the previously traced loop circuit including the line conductors C1701 and C1702 of the trunk 1700; completes at the contacts 2024, a circuit for energizing the winding of the simplex relay R1750 in the toll line circuit 170 in series with a relay in the inward trunk circuit 25Y; which circuit extends from ground at the contacts 2041 by way of the contacts 1863′, the winding of R1750, the contacts 1868, 2013 and 2024, the winding 2033 of the repeater 2030 and the contacts 1861′, to the line conductor C1702 of the trunk 1700 and includes the winding of the relay mentioned in the inward trunk circuit 25Y. When this series circuit is completed, the simplex relay R1750 operates to complete, at the contacts 1751, an obvious circuit for operating the simplex slave relay R1760. Upon operating the simplex slave relay R1760 completes, at the contacts 1762, an obvious multiple circuit for holding operated the hold relay R1730, the simplex connect relay R2010 and the switch relay R2020. Also the simplex slave relay R1760 interrupts, at the contacts 1761, the previously traced circuit for retaining operated the repeat relay R1820, thereby to cause the latter relay to restore. Further, the switch relay R2020 interrupts, at the contacts 2028, the previously traced circuit for retaining operated the control relays R1980 and R1990, thereby to cause the latter relays to restore. Upon restoring the control relay R1980 interrupts, at the contacts 1982, the previously mentioned circuit for retaining operated the control relay R1970, thereby to cause the latter relay to restore shortly thereafter, it being of the slow-to-release type. Upon restoring the control relay R1970 completes, at the contacts 1971, a simplex circuit for retaining operated the simplex relay R1750; which simplex circuit includes the branch extending from ground, at the contacts 2041, by way of the contacts 1863′, the winding of the relay R1750, the contacts 1868, 1971, 2012 and 2022, the winding 2031 of the repeater 2030 and the contacts 1862 to the line conductor C1701 of trunk 1700 extending through to the inward trunk circuit 25Y.

When the inward trunk circuit 25Y is seized by the toll second selector 1404, in the manner explained above, it controls the common start circuit 12Y, which, in turn, controls the position distributor 13Y. More particularly, the position distributor 13Y assigns this inward call to be answered at one of the operator positions at the toll switchboard 11Y; such, for example, as operator position No. 1, illustrated. Accordingly, at this time, both the common start circuit 12Y and the position distributor 13Y forward controls to the position circuit 18Y at operator position No. 1, whereby operation of the answer switch of one of the associated links is initiated, the particular link having been previously assigned by the associated link distributor 19Y. Assuming that the link distributor 19Y has previously assigned the link 15Y at this time, the answer switch 16Y of the link 15Y operates to find the inward trunk circuit 25Y; the position of the inward trunk circuit 25Y before the answer switch 16Y being marked thereto by the common start circuit 12Y and by the inward trunk circuit 25Y; all as described in detail in the Balzer patent. Accordingly, at this time, the inward trunk circuit 25Y is connected via the answer switch 16Y of the link 15Y to the position circuit 18Y at operator position No. 1 at the toll switchboard 11Y.

When the answer switch 16Y of the link 15Y at operator position No. 1 at the toll switchboard 11Y seizes the inward trunk circuit 25Y, in the manner noted, the inward trunk circuit 25Y operates to cause ground potential to be returned over the control conductor C1703 of the trunk 1700, thereby to complete a circuit including the contacts 2016 for energizing the upper winding of the supervisory relay R1875; whereupon the latter relay operates to interrupt, at the contacts 1879, the previously traced path for applying ground potential to the signal conductor C2001 and to complete, at the contacts 1878, the previously traced path for applying battery potential to the signal conductor C2001. This transfer between ground and battery potential upon the signal conductor C2001, and consequently upon the simplex conductor C2063, holds operated the signal relay R2040 in the toll line circuit 170 and effects operation of the signal relay R2070 in the toll line circuit 2065 in the manner previously explained. Upon operating the signal relay R2070 completes, at the contacts 2071, the previously mentioned circuit for illuminating the lamp L2075 associated with the calling operator position at the toll switchboard in the distant office A, thereby to indicate to the operator thereat that the call has been extended to the toll switchboard 11Y in the central office B and that the latter operator may be advised with reference to the further extension of the call.

Upon learning the destination of the call, the operator at position No. 1 at the toll switchboard 11Y actuates the key set 22Y, thereby to govern the sender control circuit 20Y and the connected impulse sender 21AY and digit registers 21BY; whereby digits are registered in the digit registers 21BY. The impulse sender 21AY is then governed by the digit registers 21BY in order to operate the call switch 17Y of the link 15Y; whereby first a group of trunks is selected and then an idle trunk in the selected group is seized by the call switch 17Y. Thereafter the impulse sender 21AY transmits the loop impulses of the subsequent digits over the call switch 17Y to the outgoing toll switch train in a well known manner. After the call is thus extended by the operator at operator position No. 1 at the toll switchboard 11Y, the sender control circuit 20Y, the impulse sender 21AY and the digit registers 21BY are automatically released; thereafter, the link 15Y is disconnected from the position circuit 18Y.

In the event it is necessary for the operator at the calling operator position at the toll switchboard in the distant office A again to signal the operator at position No. 1 at the toll switchboard 11Y in the central office B, this may be accomplished by the control of the equipment at the calling operator position at the toll switchboard in the distant office A; whereby resistance battery potential is removed and ground potential is placed upon the signal conductor C2074, and conversely, whereby the signal relay R2070 in the toll line circuits 2065 is held and the signal relay R2040 in the toll line circuit 170 is repeatedly restored and operated. The signal relay R2040 following the signals mentioned repeats at the contacts 2041, the signals over the trunk 1700 to the inward trunk circuit 25Y; whereby the inward trunk circuit 25Y controls the link 15Y employed in the established connection in order to cause the rear supervisory lamp 2603Y thereof to flash. The operator at position No. 1 at the toll switchboard 11Y observes the flashing of the rear supervisory lamp 2603Y, and effects the reconnection of the link 15Y again to the position circuit 18Y; whereby conversation between the operator at position No. 1 at the toll switchboard 11Y in the central office B and the calling operator position at the toll switchboard in the distant office A may commence.

Similarly, in the event it is necessary for the operator at position No. 1 at the toll switchboard 11Y in the central office B to signal the operator at the calling position at the toll switchboard in the distant office A, this may be accomplished by the reconnection of the link 15Y to the position circuit 18Y at operator position No. 1 at the toll switchboard 11Y in the central office B. The operator at position No. 1 at the toll switchboard 11Y manipulates her ring rear key, thereby to effect operation of a relay in the inward trunk circuit 25Y; whereby ground potential is repeatedly removed from and replaced upon the control conductor C1703 of the trunk 1700. When ground potential is removed from the control conductor C1703, the previously traced circuit for energizing the upper winding of the supervisory relay R1875 is interrupted, causing the latter relay to restore. When ground potential is replaced upon the control conductor C1703, the previously traced circuit for energizing the upper winding of the supervisory relay R1875 is recompleted, whereby the latter relay reoperates. Each time the supervisory relay R1875 restores and then reoperates it interrupts, at the contacts 1878, the application of battery potential to the signal conductor C2001 and completes, at the contacts 1879, the application of ground potential to the signal conductor C2001; then repeats these operations in converse order; whereby the signal relay R2040 in the toll line circuit 170 is held and the signal relay R2070 in the toll line circuit 2065 is restored and then reoperated. The restoration and subsequent operation of the signal relay R2070 effects flashing of the lamp L2075 associated with the calling operator position at the toll switchboard in the distant office A in an obvious manner. At this time the last mentioned operator reenters the connection, whereby conversation with the operator at position No. 1 at the toll switchboard 11Y in the central office B may commence.

At the conclusion of the connection the operator at the calling operator position at the toll switchboard in the distant office A initiates the release of the connection by controlling the associated position equipment; whereby battery potential is removed from and ground potential is connected to signal conductor C2074; thereby to transmit a release signal over the simplex conductor C2063, in a manner similar to that previously explained effecting restoration of the signal relay R2040 in the toll line circuit 170. At this time, the signal relay R2040 remains in its restored position, interrupting, at the contacts 2041, the previously mentioned circuit for energizing, in series, the winding of the simplex relay R1750 in the toll line circuit 170 and the relay mentioned in the inward trunk circuit 25Y; whereby both of these relays restore. More particularly, the inward trunk circuit 25Y is controlled in order to cause the rear supervisory lamp 2603Y to be illuminated steadily, thereby giving the operator at position No. 1 at the toll switchboard 11Y disconnect supervision. The operator at position No. 1 at the toll switchboard 11Y then effects the release of the link 15Y and the outgoing switch train in a manner described in detail in the Balzer patent.

Upon restoring the simplex relay R1750 interrupts, at the contacts 1751, the circuit for operating the simplex slave relay R1760; thereby to cause the latter relay to restore shortly thereafter, it being of the slow-to-release type. Upon restoring the simplex slave relay R1760 interrupts, at the contacts 1762, the previously traced circuit for holding operated the hold relay R1730, the simplex connect relay R2010 and the switch relay R2020; whereby the relays mentioned restore, the restoration of the hold relay R1730 being slightly delayed since it is of the slow-to-release type. Upon restoring, the hold relay R1730 interrupts, at the contacts 1732, the previously mentioned circuit for holding operated the start relay R1710. Upon restoring the start relay R1710 interrupts, at the contacts 1714, the circuit for holding operated the control relay R1810; and interrupts, at the contacts 1716, the circuit for holding operated the cut-off relay R1720 and for maintaining operated the incoming selector 1402 and the toll second selector 1404, whereby the latter selectors are released. When the toll second selector 1404 is thus released, the inward trunk circuit 25Y is released. Also the start relay R1710 interrupts, at the contacts 1713, the previously mentioned path for applying ground potential to the control conductor C1773 of the trunk 1770 and recompletes, at the contacts 1712, the previously mentioned path for applying battery potential by way of the winding of the seizure relay R1910 to the control conductor C1773 of the trunk 1770; thereby to mark the trunk 1770 as idle to the group of toll second selectors, including the toll second selector 1412 having access thereto. At this time, the apparatus involved in the previously established connection between the calling operator position at the toll switchboard in the distant office A and operator position No. 1 at the toll switchboard 11Y in the central office B is completely released; both ends of the toll line 2060 being marked as idle in the respective toll line circuits 170 and 2065 by the application of ground potential to the respective signal conductors C2001 and C2074; whereby the respective signal relays R2040 and R2070 occupy their restored positions.

*Routing the call to a subscriber substation in the central office B*

Now, assuming that the call extended from the calling operator position at the toll switchboard in the distant office A via the toll line 2060, the toll line circuit 170 and the finder 1402 to the incoming selector 1403, is to be extended to a subscriber substation in the central office B; such, for example, as the ordinary subscriber substation TP, the first digit received by the incoming selector 1403 effected operation thereof to seize a toll second selector in the group, including the toll second selector 1411. Assuming that the incoming selector 1403 seized the particular toll second selector 1411, the second digit received by the toll line circuit 170 from the calling operator position at the toll switchboard in the distant office A is repeated by the toll line circuit 170 over the loop circuit including the trunk 1700, in the manner previously explained, to the toll second selector 1411; thereby to cause the toll second selector 1411 to operate and select the group of toll third selectors, including the toll third selector 1413, and then to select an idle toll third selector in this group. Assuming that the toll second selector 1411 seizes the particular toll third selector 1413, the third digit received from the calling operator position at the toll switchboard in the distant office A effects operation of the toll third selector 1413 to select a group of toll connectors in the toll connector group 1414 and then to select an idle toll connector in this group having access to the line extending to the ordinary subscriber substation TP. The fourth and fifth digits received are effective to bring about operation of the selected toll connector in the group 1414; whereby the line extending to the ordinary subscriber substation TP is selected and tested in order to determine the idle or busy condition thereof, all in a conventional manner.

After the toll connector in the group 1414 responded to the impulses of the fifth digit that were received through the switch train over the loop from the toll line circuit 170 in the manner previously explained it drives or interrupts the flow of current over this loop circuit; whereby the loop seizure relay R1770 restores. Upon restoring the loop seizure relay R1770 interrupts, at the contacts 1771, the previously traced path for unbalancing the trunk 1770 and completes, at the contacts 1773, the previously traced circuit for operating in series the control relay R1980 and R1990. Upon operating the control relay R1980 effects operation of the control relay R1970; and upon operating the control relay R1990 effects operation of the simplex connect relay R2010; and upon operating the control relay R1970 effects operation of the switch relay R2020; all in the manner previously explained. Upon operating, the switch relay R2020 interrupts, at the contacts 2028, the previously traced series circuit for operating the control relays R1980 and R1990; thereby to cause these relays to restore; the control relay R1980 effecting the restoration of the control relay R1970 shortly thereafter in the manner previously explained. At this time ground potential, at the contacts 2041, of the operated signal relay R2040 is connected by way of the contacts 1863', the winding of the simplex relay R1750 and the contacts 1868 to the contacts 1971; while the contacts 1971 are connected by way of the contacts 2012 and 2022, the winding 2031 of the repeater 2030 and the contacts 1862 to the line conductor C1701 of the trunk 1700; and the contacts 1971 are connected by way of the contacts 2013 and 2024, the winding 2033 of the repeater 2030 and the contacts 1861' to the line conductor C1702 of the trunk 1700; further, the line conductors C1701 and C1702 of the trunk 1700 are connected by way of the switch train to a repeater coil disposed in the toll connector in the group 1414; however, battery potential in the last mentioned toll connector is not at this time connected to the repeater coil mentioned. Accordingly, while there is completed at this time a conversation connection between the toll line circuit 170 and the toll connector in the group 1414, the simplex circuit included in this connection is not completed; whereby the simplex relay R1750 in the toll line circuit 170 is not operated. Thus, there is maintained the previously traced circuit, including the contacts 2041, 1863' and 1761, for retaining operated the repeat relay R1820, thereby to retain operated the hold relay R1730, the simplex connect relay R2010 and the switch relay R2020.

The toll connector in the group 1414 proceeds with the testing of the line extending to the ordinary subscriber substation TP, as previously noted; and in the event the line extending to the called ordinary subscriber substation is tested as being busy, the toll connector in the group 1414 operates in order to cause busy tone current to be returned over the switch train to the toll line circuit 170 and thence over the toll line 2060 to the calling operator position at the toll switchboard in the distant office A, thereby to indicate the condition noted to the operator mentioned. It is also noted that in the event any one of the preceding switches in the switch train, such, for example, as the incoming selector 1403, the toll second selector 1411 or the toll third selector 1413, encounters an all-trunks-busy condition, it operates to open the loop circuit extending back over the trunk 1700 to the toll line circuit 170 and returns 120 ground impulses per minute or the same and 120 battery impulses per minute, interspersed, over the control conductor C1703 of the trunk 1700; thereby to cause the toll line circuit 170 to operate and return a corresponding busy signal over the toll line 2060 to the calling operator position at the toll switchboard in the distant office A, in the manner previously described.

On the other hand, assuming that the toll connector in the group 1414 tests the line extending to the ordinary subscriber substation TP as being idle, ringing current in this toll connector is projected thereover in a conventional manner; thereafter, and when the subscriber at the called ordinary subscriber substation TP answers the call, the toll connector in the group 1414 switches through in order to complete a conversation connection between the calling operator position at the toll switchboard in the distant office A and the called ordinary subscriber substation TP in the central office B. Also, at this time, the toll connector in the group 1414 operates to cause ground potential to be applied to the control conductor C1703 of the trunk 1700 effecting operation of the supervisory relay R1875; whereby ground potential is removed and battery potential is applied to the signal conductor C2001, as previously explained. This reversal of potentials upon the signal conductor C2001 retains operated the signal relay R2040 in the toll line circuit 170 and brings about operation of the signal relay R2070 in the toll line circuit 2065; whereby the lamp L2075, associated with the calling operator position at the toll switchboard in the distant office A, is illuminated steadily, thereby to indicate that the call has been answered at the called ordinary subscriber substation TP in the central office B.

The subscriber at the called ordinary subscriber substation TP may transmit switchhook and release supervisions back to the calling operator position at the toll switchboard in the distant office A by control of the switchhook at the ordinary subscriber substation TP in a conventional manner. For example, when the subscriber at the ordinary subscriber substation TP replaces his receiver upon its associated switchhook the toll connector in the group 1414 is controlled to remove the application of ground potential from the control conductor C1703 of the trunk 1700 effecting the restoration of the supervisory relay R1875; whereby the signal relay R2040 in the toll line circuit 170 is retained operated and the signal relay R2070 in the toll line circuit 2065 is restored. When the signal relay R2070 is restored, the lamp L2075 associated with the calling operator position at the toll switchboard in the distant office A is extinguished, thereby indicating to the operator thereat that the subscriber at the called ordinary subscriber substation TP in the central office B is transmitting release supervision. The subsequent release of the apparatus involved in the above described connection is brought about by the operator at the calling operator position at the toll switchboard in the distant office A, when the associated position equipment is controlled in order to remove battery potential from, and to replace ground potential upon, the signal conductor C2074; whereby the signal relay R2040 in the toll line circuit 170 is restored, effecting the release of the toll line circuit 170, the finder 1402, the incoming selector 1403, the toll second selector 1411, the toll third selector 1413 and the toll connector in the group 1414 in an obvious manner analogous to that previously described.

In the foregoing example, the call extended from the calling operator position at the toll switchboard in the distant office A was completed to the ordinary subscriber substation TP in the central office B; and it will be understood that this call may be completed in a substantially identical manner to any other one of the subscriber substations in the central office B by control of a toll connector in the proper group 1414 over the toll third selector 1413 and the switch train extending back to the toll line circuit 170. Specifically, it is noted that the numerical portions of the directory numbers of the denied trunk service subscriber substation TD and of the preferred trunk service subscriber substation TX are respectively 0900 and 0901; whereby the same toll connector in the group 1414 has access to both of these subscriber substations. On the other hand, the numerical portions of the directory number of the ordinary subscriber substation TP is 0099; whereby another toll connector in the group 1414 has access to this subscriber substation. Finally, the directory numbers of the party subscriber substations TS1, TS2, TS3 and TS4 include the respective numerical portions 0100, 0200, 0300 and 0400; whereby four respective toll connectors in the group 1414 have access to these subscriber substations, respectively. Further, it is again noted that the respective four toll connectors project ringing currents of the frequencies 16, 33, 50 and 66, in cycles per second, over the respective terminals of the subscriber line 410X commonly extending to these four party subscriber substations in order to bring about selective operations of the ringing apparatus disposed thereat in a well known manner.

*Routing the call to a subscriber substation in the near exchange C.*

Now, assuming that the call extended from the calling operator position at the toll switchboard in the distant office A via the toll line 2060, the toll line circuit 170 and the finder 1402 to the incoming selector 1403, is to be extended to a subscriber substation in the near automatic exchange C, the first digit received by the incoming selector 1403 effected operation thereof to seize a toll second selector in the group, including the toll second selector 1404. Assuming that the incoming selector 1403 seized the particular toll second selector 1404, the second digit received by the toll line circuit 170 from the calling operator position at the toll switchboard in the distant office A is repeated by the toll line circuit 170 over the loop circuit including the trunk 1700, in the manner previously explained, to the toll second selector 1404; thereby to cause the toll second selector 1404 to operate and select the group of toll third selectors, including the toll third selector 1406 and then to select an idle toll third selector in this group. Assuming that the toll second selector 1404 seizes the particular toll third selector 1406, the third digit received effects operation of the toll third selector 1406 to select the group of trunks extending to the group of trunk circuits including the trunk circuit 50 and then to seize an idle trunk in this group. Assuming that the toll third selector 1406 seizes the particular trunk 880A, extending to the trunk circuit 50; this trunk circuit 50 is marked as idle by the application of battery potential by way of the winding of the toll seizure relay R850 and the contacts 843 and 861 to the control conductor C883 of the trunk 880A. At this time ground potential, at the contacts 1815 of the operated control relay 1810 in the toll line circuit 170, is applied by way of the previously traced path to the control conductor C1704 of the trunk 1700 and is forwarded by way of the interposed switch train to the control conductor C883 of the trunk 880A, thereby completing an obvious operating circuit for the toll seizure relay R850 in the trunk circuit 50.

Upon operating the toll seizure relay R850 interrupts, at the contacts 852, a normally completed path, including the contacts 846 for applying battery potential to the control conductor C885 of the trunk 880B; and completes, at the contacts 851, a path, including the contacts 846, for applying ground potential to the control conductor C885 of the trunk 880B, thereby to mark the trunk 880B, and consequently the trunk circuit 50, as busy to the outgoing toll selectors 513X, etc., and the outgoing toll selectors 511X, etc., in the two groups having access thereto. Also the toll seizure relay R850 completes, at the contacts 853, an obvious circuit for operating the switch relay R720. Also, when the trunk 880A is seized by the toll third selector 1406, battery potential is applied to the control conductor C884 of the trunk 880A in the trunk circuit 50; battery potential being connected via the resistor 526 and the contacts 525 and 683 directly to the control conductor C884 of the trunk 880A, which control conductor is connected at that time by way of the interposed switch train to the control conductor C1703 of the trunk 1700. This application of battery potential upon the control conductor C1703 of the trunk 1700 completes a circuit, including the contacts 2015, for operating the supervisory relay R1920 in the toll line circuit 170. Upon operating the supervisory relay R1920 completes, at the contacts 1922, an obvious circuit for operating the supervisory slave relay R1840. Upon operating the supervisory slave relay R1840 completes, at the contacts 1841, an obvious circuit for energizing the lower winding of the supervisory relay R1875, thereby to cause the latter relay to operate. Upon operating the supervisory relay R1875 disconnects ground potential from and connects battery potential to the signal conductor C2001, thereby to hold operated the signal relay R2040 in the toll line circuit 170 and to effect operation of the signal relay R2070 in the toll line circuit 2065. Upon operating, the signal relay R2070 illuminates the lamp L2075 associated with the calling operator position at the toll switchboard in the distant office A. Accordingly, at this time, the delay-in-dial signal is transmitted from the toll line circuit 170 over the toll line 2060 to the calling operator position at the toll switchboard in the distant office A in order to indicate to the operator thereat that further dialing should not take place, since the switching apparatus in the near exchange C is not ready at this time.

Returning now to the trunk circuit 50, upon operating the switch relay R720 completes, at the contacts 723, 727, 722′ and 723′, a connection between the line relay R760 and the drying relay R750 and the line conductors C881 and C882 of the trunk 880A; this connection extending from ground by way of the upper windings of the line relay R760 and the drying relay R750, the contacts 722′, 654, 642, 723′ and 734, to the line conductor C882; and from battery by way of the lower winding of the line relay R760, the contacts 656, the lower winding of the drying relay R750, the contacts 727, 652, 641, 723 and 731, to the line conductor C881. When the line relay R760 and the drying relay R750 are thus bridged in series across the line conductors of the trunk 880A, these two relays are operated, since the trunk 1700 is unbalanced at this time in the toll line circuit 170 incident to the restoration of the digit relay R1740 shortly following the conclusion of the third digit and prior to complete operation of the toll third selector 1406. More particularly, ground potential, at the contacts 1823 of the operated repeat relay R1820 in the toll line circuit 170 is connected by way of the contacts 1813, 1743 and 1771 to one terminal of the upper winding of the loop seizure relay R1770, which connection is extended by way of the previously traced path, including the upper winding of the loop seizure relay R1770 to the line conductor C1701 of the trunk 1700, and extended by way of the previously traced path directly to the line conductor C1702 of the trunk 1700; whereby direct ground potential applied to the line conductor C1702 of the trunk 1700 is connected directly to the line conductor C882 of the trunk 880A effecting short-circuiting of the upper windings of the drying relay R750 and the line relay R760. Further, at this time, the lower windings of the line relay R760 and of the drying relay R750, are energized over the connection, including the line conductors C881 and C1701 of the trunks 880A and 1700, respectively, by way of the upper winding of the loop seizure relay R1770 in the toll line circuit 170. Accordingly, the line relay R760 and the drying relay R750 in the trunk circuit 50 are operated and the loop seizure relay R1770 in the toll line circuit 170 is retained in its operated position.

Also, upon operating, the switch relay R720 completes, at the contacts 726′, a circuit, including the contacts 523, for operating the control relay R510. Upon operating the control relay R510 completes, at the contacts 512, an obvious circuit for operating the supervisory relay R610. Upon operating the supervisory relay R610 completes, at the contacts 612, a circuit, including the contacts 726′ for operating the reverse battery relay R730. Upon operating the reverse battery relay R730 effects at the contacts 731, 732, 733 and 734, the reversal of polarity of the line relay R760 and the drying relay R750 with respect to the line conductors C881 and C882 of the trunk 880A. More particularly, at this time, the lower windings of the line relay R760 and the drying relay R750 are energized over the line conductor C882 of the trunk 880A; and the upper windings of the line relay R760 and the drying relay R750 are short-circuited in series over the line conductor C881 of the trunk 880A with the upper winding of the loop seizure relay R1770. Accordingly, at this instant, the line relay R760 and the drying relay R750 in the trunk circuit 50 are retained operated, and the upper winding of the loop seizure relay R1770 in the toll line circuit 170 is short-circuited, rendering the latter relay additionally slow-to-release. At this point, it is noted that the loop seizure relay R1770 does not restore at this time; and shortly thereafter an alternative circuit, traced hereinafter, is completed in the trunk circuit 50 for energizing the upper winding thereof.

Returning now to the trunk circuit 50, upon operating the line relay R760 completes, at the contacts 762, a circuit including the contacts 713 for operating the hold relay R770. Upon operating the hold relay R770 completes, at the contacts 771, an obvious circuit for energizing the right-hand winding of the answer relay R740, thereby to render the latter relay fast-to-operate when the left-hand winding thereof is subsequently energized and properly poled, since the answer relay R740 is of the shunt-field type. Upon operating the drying relay R750 completes, at the contacts 751, an obvious circuit for operating the control relay R680. Upon operating the control relay R680 interrupts, at the contacts 683, the previously traced path including the resistor 526 for applying battery potential to the control conductor C884 of the trunk 880A and completes, at the contacts 682, an obvious alternative path including in series the windings of the intertoll relay R530 and the toll relay R540 for applying battery potential to the control conductor C884 of the trunk 880A; whereby the circuit is completed for maintaining operated the supervisory relay R1920 in the toll line circuit 170 and for operating the intertoll relay R530 and the toll relay R540 in the trunk circuit 50. Upon operating the toll relay R540 completes, at the contacts 542, an obvious circuit for operating the toll slave relay R670; and upon operating the intertoll relay R530 completes, at the contacts 531, an obvious circuit for operating the simplex connect relay R660. Upon operating the toll slave relay R670 completes, at the contacts 674, a circuit, including the contacts 541, for operating the switch relay R650. Upon operating the switch relay R650 completes, at the contacts 657, a circuit, including the contacts 771, for holding itself operated. Upon operating the simplex connect relay R660 completes, at the contacts 664, a circuit including the contacts 771 for holding itself operated. Also, the toll slave relay R670 completes, at the contacts 673, a circuit including the contacts 681 for holding operated the control relay R680.

Further, the switch relay R650 interrupts, at the contacts 652 and 656, the previously traced circuit for energizing in series the lower windings of the drying relay R750 and the line relay R760; whereby the relays mentioned restore. Further, the switch relay R650 completes, at the contacts 653, a circuit including the contacts 662, 642, 723′ and 733, the line conductor C881 of the trunk 880A, the interposed switch train, the line conductor C1701 of the trunk 1700, the contacts 1862, the winding 2031 of the repeater 2030, the contacts 2021, 1864, 1771, 1743, 1813 and 1823 for energizing in series the winding of the simplex pulse relay R710 in the trunk circuit 50 and the upper winding of the loop seizure relay R1770 in the toll line circuit 170; whereby the simplex pulse relay R710 operates and the loop seizure relay R1770 is retained in its operated position.

Upon operating the simplex pulse relay R710 completes, at the contacts 712, an obvious alternative circuit for maintaining operated the hold relay R770 subsequent to the restoration of the line relay R760. Also, the simplex pulse relay R710 completes, at the contacts 711, a point in multiple to the contacts 671 of the operated toll slave relay R670 in the loop circuit including the trunk line 500 extending to the near exchange C; whereby the loop circuit mentioned is not interrupted at the contacts 761 incident to restoration of the line relay R760. The original loop circuit mentioned was completed at the contacts 761 incident to the operation of the line relay R760 and extended from the line conductor C501 of the trunk line 500 by way of the contacts 506, 722 and 761, the winding 634 of the repeater 630, the contacts 729, the left-hand winding of the answer relay R740, the contacts 725, the winding 636 of the repeater 630 and the contacts 508 to the line conductor C502 of the trunk line 500. When this loop circuit was originally completed the trunk circuit in the near exchange C operated to cause the automatic switching apparatus to be associated therewith; which operation consumes some time. Also, the left-hand winding of the answer relay R740 was energized in this loop circuit, but the polarity of the trunk line 500 was such that the latter relay was not operated. At this time the above traced loop circuit is completed through the alternative multiple point, at the contacts 671 and 711, of the operated toll slave relay R670 and simplex pulse relay R710, respectively.

When the switching apparatus in the near exchange C is associated with the trunk line 500 and is in readiness to receive a digit, battery and ground potentials in the near exchange C are reversed over the line conductors of the trunk line 500; whereby the left-hand winding of the answer relay R740 in the trunk circuit 50 is poled to operate. Upon operating the answer relay R740 completes, at the contacts 741, a circuit including the contacts 725′ for operating the supervisory relay R520. Upon operating the supervisory relay R520 completes, at the contacts 521, a circuit including the contacts 771 for holding itself operated; and interrupts, at the contacts 523, the previously traced circuit for maintaining operated the control relay R510. Shortly thereafter the control relay R510, being of the slow-to-release type, restores and interrupts, at the contacts 512, the previously mentioned circuit for maintaining operated the supervisory relay R610. Upon restoring the supervisory relay R610 interrupts, at the contacts 612, the previously traced circuit for maintaining operated the reverse battery relay R730. Upon restoring the reverse battery relay R730 interrupts, at the contacts 733, the previously traced connection for applying battery potential by way of the winding of the simplex pulse relay R710 to the line conductor C881 of the trunk 880A; and completes, at the contacts 734, a path substantially identical to that previously traced for applying battery potential by way of the winding of the simplex pulse relay R710 to the line conductor C882 of the trunk 880A. When the winding of the simplex pulse relay R710 is thus disconnected from the line conductor C881 and connected to the line conductor C882 of the trunk 880A, the previously traced series circuit for maintaining operated the simplex pulse relay R710 in the trunk circuit 50 and the loop seizure relay R1770 in the toll line circuit 170 is interrupted; whereby the relays mentioned restore, the loop seizure relay R1770 being slightly slow-to-release. Upon restoring the simplex pulse relay R710 interrupts, at the contacts 712, the previously mentioned circuit for maintaining operated the hold relay R770; however, the latter relay being of the slow-to-release type does not restore prior to the reoperation of the simplex pulse relay R710, as explained more fully hereinafter. Also, it is noted that the restoration of the simplex pulse relay R710, does not effect the transmission of an impulse at the contacts 711, over the loop circuit including the trunk line 500, since the toll slave relay R670 occupies its operated position at this time closing, at the contacts 671, a point in multiple to the contacts 711 of the restored simplex pulse relay R710.

As previously explained, when the reverse battery relay R730 in the trunk circuit 50 restores in order to reverse the polarity of the simplex pulse relay R710, with respect to the line conductors C881 and C882 of the trunk 880A, the previously traced series circuit for maintaining operated the simplex pulse relay R710 and the loop seizure relay R1770 is interrupted; whereby the simplex pulse relay R710 restores immediately and the loop seizure relay R1770 restores shortly thereafter. Upon restoring the loop seizure relay R1770 completes, at the contacts 1773, the previously traced circuit for operating in series the control relays R1980 and R1990; the control relay R1980 effecting operation of the control relay R1970; the control relay R1990 effecting operation of the simplex connect relay R2010; and the control relay R1970 effecting operation of the switch relay R2020; all in the manner previously explained. Upon operating the simplex connect relay R2010 interrupts, at the contacts 2015, the previously traced series circuit for retaining operated the supervisory relay R1920 in the toll line circuit 170 and the intertoll relay R530 and the toll relay R540 in the trunk circuit 50; whereby the relays mentioned restore. Upon restoring the supervisory relay R1920 interrupts, at the contacts 1922, the previously mentioned circuit for maintaining operated the supervisory slave relay R1840; whereby the latter relay restores shortly thereafter, it being of the slow-to-release type. Upon restoring the supervisory slave relay R1840 interrupts, at the contacts 1841, the previously traced original circuit for energizing the lower winding of the supervisory relay R1875; however, at this time, there is completed an alternative hold circuit for energizing the lower winding of the supervisory relay R1875 including the contacts 1876 and the contacts 1972 of the operated control relay R1970; whereby the supervisory relay R1975 is maintained operated.

Also, upon operating the switch relay R2020 effects the restoration of the control relays R1980 and R1990; and upon restoring the control relay R1980 effects the restoration of the control relay R1970 shortly thereafter; all in the manner previously explained. Upon restoring the control relay R1970 interrupts, at the contacts 1972, the alternative circuit for maintaining operated the supervisory relay R1875; whereby the latter relay restores in order to effect the reversal of battery potential to ground potential upon the signal conductor C2001, thereby to maintain operated the signal relay R2040 in the toll line circuit 170 and to bring about restoration of the signal relay R2070 in the toll line circuit 2065, as previously explained. Upon restoration the signal relay R2070 extinguishes the lamp L2075 associated with the calling operator position at the toll switchboard in the distant office A, thereby to indicate to the operator thereat that she may proceed with dialing, since the switching apparatus in the near exchange C is now in readiness to receive the first digit.

Also, upon restoring the control relay R1970 completes, at the contacts 1971, the previously traced simplex circuit including the contacts 2041 for connecting the winding of the simplex relay R1750 to the line conductors C1701 and C1702 of the trunk 1700; whereby the simplex relay R1750 in the toll line circuit 170 is operated in series with the simplex pulse relay R710 in the trunk circuit 50, since the simplex pulse relay R710 is connected to the line conductor C882 of the trunk 880A, as previously explained. Upon operating the simplex relay R1750 effects operation of the simplex slave relay R1760; that, in turn, effects restoration of the repeat relay R1820, all in the manner previously explained.

In the trunk circuit 50 upon restoring the toll relay R540 interrupts, at the contacts 542, the previously mentioned circuit for maintaining operated the toll slave relay R670, thereby to cause the latter relay to restore shortly thereafter, it being of the slow-to-release type. Upon restoring the toll slave relay R670 completes, at the contacts 672, a path including the contacts 661, 651, 641, 723 and 731 for connecting the winding of the simplex pulse relay R710 to the line conductor C881 of the trunk 880A. Accordingly, at this time, there is completed a full simplex connection between the simplex pulse relay R710 in the trunk circuit 50 and the simplex relay R1750 in the toll line circuit 170. Further, the toll slave relay R670 interrupts, at the contacts 673, the previously traced circuit for maintaining operated the control relay R680. Upon restoring the control relay R680 disconnects, at the contacts 682, the control conductor C884 of the trunk 880A from the intertoll relay R530 and the toll relay R540; and prepares, at the contacts 683, a path for applying ground potential to the control conductor C884. Further, the toll slave relay R670 interrupts, at the contacts 671, the previously mentioned point in multiple to the contacts 711 of the operated simplex pulse relay R710; whereby the loop circuit extending to the near exchange C is at this time controllable by the operated simplex pulse relay R710.

The operator at the calling operator position at the toll switchboard in the distant office A then proceeds to dial the next digit over the toll line 2060 in order to cause the signal relay R2040 in the toll line circuit 170 to follow and to repeat, at the contacts 2041, the impulses of the digit through the simplex relay R1750 in the toll line circuit 170 to the simplex pulse relay R710 in the trunk circuit 50; whereby the relays mentioned follow. The operation and restoration of the simplex relay R1750 in the toll line circuit 170 is without effect since the associated simplex slave relay R1760 is of the slow-to-release type; however, the first time the simplex pulse relay R710 in the trunk circuit 50 restores, it completes, at the contacts 713, a circuit including the contacts 763 and 772 for operating the digit relay R810. Upon operating the digit relay R810 completes, at the contacts 811, a shunt, including the resistor 780, around the left-hand winding of the answer relay R740 in order to reduce the impedance of the dialing loop circuit extending by way of the trunk line 500 to the switching apparatus in the near exchange C. Of course, the answer relay R740 restores, however, this is without effect at this time. Also the digit relay R810 completes, at the contacts 812, an obvious circuit for operating the digit slave relay R620. Upon operating the digit slave relay R620 completes, at the contacts 621, a shunt around the winding 636 of the repeater 630, thereby further to reduce the impedance of the dialing loop including the trunk line 500; and completes, at the contacts 622, a further shunt around the winding 633 of the repeater 630. Also the digit slave relay R620 completes, at the contacts 624, a path including the contacts 645 and 848 for connecting ground potential to the junction between the upper and lower windings of the shunt relay R640; the other terminal of the lower winding of the shunt relay R640 being connected directly to battery potential and the other terminal of the upper winding of the shunt relay R640 being connected by way of the contacts 644 to resistance battery potential. When the upper and lower windings of the shunt relay R640 are thus energized it operates the first step to complete, at the contacts 643, a path including the contacts 771 for applying ground potential to the other terminal of the upper winding thereof and interrupts, at the contacts 644, the previously traced path for connecting the other terminal of the upper winding thereof to resistance battery potential. Accordingly, the upper winding of the shunt relay R640 is short-circuited at this time preventing this relay from operating a second step, the shunt relay R640 being of the two-step type.

Each time the simplex pulse relay R710 restores and then reoperates it interrupts and then recompletes, at the contacts 711, the loop circuit extending by way of the trunk line 500 to the switching apparatus in the near automatic exchange C; whereby the first switching stage of the switching apparatus mentioned is controlled in accordance with the present digit. Since both the hold relay R770 and the digit relay R810 are of the slow-to-release type, they are retained operated during impulsing by the simplex pulse relay R710. At the conclusion of the digit the signal relay R2040 in the toll line circuit 170 is maintained in its operated position, thereby maintaining operated the simplex relay R1750 in the toll line circuit 170 and the simplex pulse relay R710 in the trunk circuit 50. The operated simplex pulse relay R710 retains completed, at the contacts 711, the loop circuit extending by way of the trunk line 500 to the switching apparatus in the near exchange C; and maintains operated, at the contacts 712, the hold relay R770. Further, the simplex pulse relay R710 interrupts, at the contacts 713, the previously traced circuit for maintaining operated the digit relay R810, thereby to cause the latter relay to restore shortly thereafter, since it is of the slow-to-release type. Upon restoring the digit relay R810 interrupts, at the contacts 811, the previously traced shunt around the left-hand winding of the answer relay R740, thereby to cause the latter relay to reoperate in the loop circuit including the trunk line 500. Also, the digit relay R810 interrupts, at the contacts 812, the previously mentioned circuit for retaining operated the digit slave relay R620, thereby to cause the latter relay to restore shortly thereafter, since it is of the slow-to-release type. Upon restoring the digit slave relay R620 interrupts, at the contacts 624, the previously traced path for short-circuiting the upper winding of the shunt relay R640, whereby the upper and lower windings of the shunt relay R640 are energized in series circuit relationship by way of a circuit including the contacts 643 and 771. At this time the shunt relay R640 takes its second step, or operates fully, thereby to interrupt, at the contacts 641 and 642, the normally completed shunts around the windings 631 and 633 of the repeater 630 in order to prepare the repeater 630 for telephone conversation between the calling operator position at the toll switchboard in the distant office A and the called subscriber substation in the near exchange C. Further, the digit slave relay interrupts, at the contacts 621 and 622, the previously mentioned shunts around the windings 636 and 633, respectively, of the repeater 630, thereby further to prepare the repeater 630 for telephone conversation.

At this time the operator at the calling operator position at the toll switchboard in the distant office A has completed the dialing of the first digit into the near exchange C; which digit was repeated to the automatic switching apparatus in the near exchange C over the trunk line 500 by the trunk circuit 50; the digit being repeated to the trunk circuit 50 by the toll line circuit 170. The operator at the calling operator position at the toll switchboard in the distant office A then proceeds to dial the second and remaining digits over the toll line 2060 to the toll line circuit 170; whereby in response to each digit the toll line circuit 170 controls the trunk circuit 50 which, in turn, controls the switching apparatus in the near exchange C in the manner previously explained. At this time the final stage of the switching apparatus in the near exchange C has selected the line extending to the called subscriber substation and operates immediately to test the idle or busy condition thereof.

Assuming that the final switching stage in the near exchange C tests the line extending to the called subscriber substation as being idle, ringing current in this final switching stage is projected thereover in a conventional manner; thereafter, when the subscriber at the called subscribed substation answers the call, the final switching stage in the near exchange C switches through in order to complete a conversation connection between the calling operator position at the toll switchboard in the distant office A and the called subscriber substation in the near exchange C. Also, at this time, the final switching stage in the near exchange C operates in order to reverse battery and ground potentials over the trunk line 500; whereby the left-hand winding of the answer relay R740 in the trunk circuit 50 is poled in such a manner that it restores. Upon restoring the answer relay R740 completes, at the contacts 742, a circuit including the contacts 712, 813, 625 and 522 for operating the supervisory relay R610. Upon operating the supervisory relay R610 interrupts, at the contacts 611, the normally completed termination circuit including the condenser 503, the resistor 504 and the contacts 823 and 623 around the windings 633 and 631 of the repeater 630. Also, the supervisory relay R610 completes, at the contacts 612, a circuit including the contacts 726' for operating the reverse battery relay R730, whereby the line conductors C881 and C882 of the trunk 880A are reversed in the connection between the simplex pulse relay R710 in the trunk circuit 50 and the simplex relay R1750 in the toll line circuit 170; which operation is without effect at this time. Further, the supervisory relay R610 completes, at the contacts 613, a path including the contacts 666, 658, 524 and 683 for applying ground potential to the control conductor C884 of the trunk 880A, and consequently to the control conductor C1703 of the trunk 1700, thereby to complete the previously traced circuit for energizing the lower winding of the supervisory relay R1875 in the toll line circuit 170, in order to cause the latter relay to operate. Upon operating the supervisory relay R1875 interrupts the application of ground potential from and applies battery potential to the signal conductor C2001, thereby to retain operated the signal relay R2040 in the toll line circuit 170 and to effect operation of the signal relay R2070 in the toll line circuit 2065. Upon operating the signal relay R2070 illuminates the lamp L2075, thereby to indicate to the operator at the calling operator position at the toll switchboard in the distant office A that the call has been answered by the subscriber at the called subscriber substation in the near exchange C.

The subscriber at the called subscriber substation in the near exchange C may transmit switchhook and release supervisions to the operator at the calling operator position at the toll switchboard in the distant office A by manipulating the switchhook at the called subscriber substation. For example, when the subscriber at the called subscriber substation in the near exchange C replaces the receiver of the telephone instrument thereat upon its associated switchhook, the final switching stage in the near exchange C operates in order to reverse the application of ground and battery potentials upon the trunk line 500, thereby to pole the left-hand winding of the answer relay R740 in the trunk circuit 50 in such a manner that the latter relay operates. Upon operating the answer relay R740 interrupts, at the contacts 742, the previously traced circuit for maintaining operated the supervisory relay R610. Upon restoring the supervisory relay R610 interrupts, at the contacts 613, the previously traced path for applying ground potential to the control conductor C884 of the trunk 880A, and consequently to the control conductor C1703 of the trunk 1700, thereby to effect the restoration of the supervisory relay R1875 in the toll line circuit 170; whereby the latter relay, upon restoring, interrupts the application of battery potential from and completes the application of ground potential to the signal conductor C2001 in order to retain operated the signal relay R2040 in the toll line circuit 170 and to effect restoration of the signal relay R2070 in the toll line circuit 2065. Upon restoring the signal relay R2070 extinguishes the lamp L2075, associated with the calling operator position at the toll switchboard in the distant office A, in order to indicate the condition noted to the operator mentioned.

The operator at the calling operator position at the toll switchboard in the distant office A then proceeds with the release of the toll line 2060, thereby to effect release of the toll line circuit 170, all in a manner previously described. When the toll line circuit 170 is released, the finder 1402, the incoming selector 1403, the toll second selector 1404 and the toll third selector 1406 are all released in a conventional manner. When the toll third selector 1406 is thus released, both the toll seizure relay R850 and the simplex pulse relay R710 in the trunk circuit 50 restore. Upon restoring the simplex pulse relay R710 interrupts, at the contacts 711, the previously traced loop circuit extending between the left-hand winding of the answer relay R740 and the final switching stage in the near exchange C; whereby the answer relay R740 restores and all of the switching apparatus in the near exchange C is released, in order to mark as idle the line extending to the called subscriber substation therein.

Also, upon restoring the simplex pulse relay R710 interrupts, at the contacts 712, the previously traced circuit for retaining operated the hold relay R770, whereby the latter relay restores shortly thereafter, since it is of the slow-to-release type. Upon restoring, the hold relay R770 interrupts, at the contacts 771, the previously traced circuits for retaining operated the simplex connect relay R660, the switch relay R650, the shunt relay R640 and the supervisory relays R610 and R520, whereby the relays mentioned restore. Upon restoring the toll seizure relay R850 interrupts, at the contacts 853, the previously traced circuit for maintaining operated the switch relay R720; and upon restoring the switch relay R720 interrupts, at the contacts 726', the previously traced circuit for maintaining operated the reverse battery relay R730. Finally, the toll seizure relay R850 interrupts, at the contacts 851, the previously traced path for applying ground potential to the control conductor C885 of the trunk 880B and recompletes, at the contacts 852, a normal path for applying battery potential by way of the winding of the local seizure relay R860 to the control conductor C885 of the trunk 880B, thereby to mark the trunk 880B and consequently the trunk circuit 50 as idle to the outgoing toll selectors 513X, etc., and the outgoing toll selector 511X, etc., having access thereto. At this time the trunk circuit 50 is completely released and the trunk line 500 extending between the central office B and the near exchange C is available for further use.

In conjunction with the extension of the above described call from the calling operator position at the toll switchboard in the distant office A by way of the central office B to a called subscriber substation in the near exchange C, the incoming selector 1403, the toll second selector 1404 or the toll third selector 1406 may encounter an all-trunks-busy condition, whereupon the switch encountering the all-trunks-busy condition operates to open the loop circuit extending back over the trunk 1700 to the toll line circuit 170 and to apply either 120 ground impulses per minute or 120 ground impulses per minute and 120 battery impulses per minute, interspersed, to the control conductor C1703 of the trunk 1700. When the loop circuit including the trunk 1700 is interrupted the loop seizure relay R1770 restores effecting operation of the control relays R1980 and R1990; the control relay R1980 effects operation of the control relay R1970; the control relay R1990 effects operation of the simplex connect relay R2010; and the control relay R1970 effects operation of the switch relay R2020; all in the manner previously explained. Upon operating the simplex connect relay R2010 effects restoration of the supervisory relay R1920; the supervisory relay R1920 effects restoration of the supervisory slave relay R1840; upon operating the switch relay R2020 effects restoration of the control relays R1980 and R1990; the control relay R1980 effects restoration of the control relay R1970; and the control relay R1970 effects restoration of the supervisory relay R1875; all in the manner previously explained. At this time either the 120 ground impulses per minute or the 120 ground impulses per minute and the 120 battery impulses per minute, interspersed, applied to the control conductor C1703 of the trunk 1700 completes the previously traced circuit for intermittently energizing the upper winding of the supervisory relay R1875; whereby the latter relay follows. The intermittent operation of the supervisory relay R1875 effects intermittent application of ground and battery potentials to the signal conductor C2001; whereby the signal relay R2040 in the toll line circuit 170 is held in its operated position and the signal relay R2070 in the toll line circuit 2065 follows. The intermittent operation of the signal relay R2070 effects corresponding flashing of the lamp L2075 associated with the calling operator position at the toll switchboard in the distant office A, thereby to indicate the condition noted to the operator mentioned.

Also, it is pointed out in conjunction with the extension of the above described call from the calling operator position at the toll switchboard in the distant office A through the central office B to the called subscriber substation in the near exchange C that any switching stage of the switching apparatus in the near exchange C may encounter all-trunks-busy or line-busy conditions. The switch encountering the busy condition operates in order to open the loop circuit including the trunk line 500 extending back to the trunk circuit 50 and to cause busy tone current to be applied to the trunk line 500. When the loop circuit including the trunk line 500 is thus opened, the answer relay R740 restores in order to effect operation of the supervisory relay R610; upon operating the supervisory relay R610 completes, at the contacts 613, the previously traced path for applying ground potential to the control conductor C884 of the trunk 880A, and consequently to the control conductor C1703 of the trunk 1700, thereby to effect operation of the supervisory relay R1875 in the toll line circuit 170; in the manner previously described. Upon operating the supervisory relay R1875 reverses ground potential to battery potential upon the signal conductor C2001, thereby to maintain operated the signal relay R2040 in the toll line circuit 170 and to effect operation of the signal relay R2070 in the toll line circuit 2065. Upon operating the signal relay R2070 illuminates the lamp L2075, thereby to give the operator at the calling operator position at the toll switchboard in the distant office A answer supervision; however, busy tone current from the near exchange C is returned over the trunk line 500 by way of the trunk circuit 50, the interposed switch train, the toll line circuit 170 and the toll line 2060 to the toll line circuit 2065, thereby to give the operator mentioned the busy indication noted.

*Routing the call to a subscriber substation in the remote exchange D*

Now, assuming that the call extended from the calling operator position at the toll switchboard in the distant office A via the toll line 2060, the toll line circuit 170 and the finder 1402 to the incoming selector 1403, is to be extended to a subscriber substation in the remote exchange D, the first digit received by the incoming selector 1403 effected operation thereof to seize a toll second selector in the group, including the toll second selector 1404. Assuming that the incoming selector 1403 seizes the particular toll second selector 1404, the second digit received by the toll line circuit 170 is repeated thereby over the loop circuit including the trunk 1700 to the toll second selector 1404 in the manner previously explained; thereby to cause the toll second selector 1404 to operate and select the group of toll third selectors, including the toll third selector 1406, and then to select an idle toll third selector in this group. Assuming that the toll second selector 1404 seizes the particular toll third selector 1406, the third digit received effects operation of the toll third selector 1406 to select the group of trunks extending to the group of trunk circuits including the trunk circuit 90, and then to select an idle trunk in the group mentioned. Assuming that the toll third selector 1406 seizes the particular trunk 1280A extending to the trunk circuit 90, ground potential in the toll third selector 1406 is applied to the control conductor C1283 of the trunk 1280A, thereby to complete a circuit including the contacts 1238, 1135 and 1146 and the busy key K1147 for operating the toll seizure relay R1180. Upon operating the toll seizure relay R1180 interrupts, at the contacts 1181, a normally completed path including the contacts 1141 and 1231 for applying battery potential by way of the winding of the local seizure relay R1130 to the control conductor C1285 of the trunk 1280B; and completes, at the contacts 1182, a path including the contacts 1231 for applying ground potential to the control conductor C1285 of the trunk 1280B; thereby to mark this trunk as busy to the outgoing toll selectors 513X, etc., having access thereto. Also, the toll seizure relay R1180 completes, at the contacts 1184, a circuit including the busy key K1185 for operating the switch relay R1120.

Also, when the toll third selector 1406 seizes the trunk 1280A, battery potential is connected by way of the resistor 1027 and the contacts 1026 and 1062 to the control conductor C1284 of the trunk 1280A, and consequently to the control conductor C1703 of the trunk 1700, in order to complete the previously traced circuit for operating the supervisory relay R1920 in the toll line circuit 170. The supervisory relay R1920 then effects operation of the supervisory slave relay R1840 which, in turn, effects operation of the supervisory relay R1875, all in the manner previously described. Upon operating the supervisory relay R1875 reverses the application of ground and battery potentials to the signal conductor C2001, thereby to retain operated the signal relay R2040 in the toll line circuit 170 and to cause operation of the signal relay R2070 in the toll line circuit 2065. Upon operating the signal relay R2070 illuminates the lamp L2075 associated with the calling operator position at the toll switchboard in the distant office A, thereby to indcate to the operator thereat that further dialing should be delayed, since the switching apparatus in the remote exchange D is not ready at this time.

Upon operating the switch relay R1120 completes, at the contacts 1122, 1124, 1126 and 1122′, a connection between the line relay R1080 and the drying relay R1090 and the line conductors C1281 and C1282 of the trunk 1280A. More particularly, ground potential is connected by way of the upper winding of R1080, the lower winding of R1090, the contacts 1114, 1126, 954, 942 and 1122′ to the line conductor C1282; and battery potential is connected by way of the lower winding of R1080, the contacts 956, the upper winding of R1090, the contacts 1112, 1124, 952, 941 and 1122 to the line conductor C1281. At this time ground potential at the contacts 1823 of the operated repeat relay R1820 in the toll line circuit 170 is connected directly to the line conductor C1702 of the trunk 1700 and by way of the upper winding of the loop seizure relay R1770 to the line conductor C1701 of the trunk 1700, all as previously traced. Finally, the line conductors C1701 and C1702 of the trunk 1700 are connected by way of the interposed switch train to the line conductors C1281 and C1282 of the trunk 1280B; whereby there is completed a series circuit for energizing the upper winding of the loop seizure relay R1770 in the toll line circuit 170, the upper winding of the drying relay R1090 and the lower winding of the line relay R1080 in the trunk circuit 90; and there is completed a path for short-circuiting in series the upper winding of the line relay R1080 and the lower winding of the drying relay R1090. Accordingly, the loop seizure relay R1770 in the toll line circuit 170 is retained in its operated position and the line relay R1080 and the drying relay R1090 in the trunk circuit 90 operate.

It is noted that the drying relay R1090 operates at this time since the circuit condition mentioned are completed, as it is of the differential type. Also, upon operating the switch relay R1120 completes, at the contacts 1123′, a circuit including the contacts 1021 and the strap 928 for operating the delay relay R920. Upon operating, the delay relay R920 completes, at the contacts 922, a circuit for energizing the winding of the supervisory relay R935, thereby to cause the latter relay to operate shortly thereafter, the supervisory relay R935 being of the slow-to-operate type. Also, upon operating the line relay R1080 completes, at the contacts 1081, a circuit for operating the hold relay R1050; and completes, at the contacts 1083, a path including the contacts 1124′ and 1144 for applying battery potential by way of the lower winding of the supervisory relay R1170 to the signal conductor C905 which, in turn, is connected by way of the strap 908 directly to the line conductor C901 and through the windings 911 and 912 of the repeater to the line conductor C902; the line conductors C901 and C902 of the trunk line 900 extending to a trunk circuit in the remote exchange D. When the above traced circuit is completed between the lower winding of the supervisory relay R1170 in the trunk circuit 90 and the trunk circuit in the remote exchange D, the supervisory relay R1170 is not operated, since it is of the marginal type; however, the trunk circuit in the remote exchange D is controlled in order to cause the switching apparatus therein to be associated with the trunk line 900; which operation may consume some time.

When the switching apparatus in the remote exchange D is associated with the trunk line 900 and is in readiness to receive a digit, low resistance ground potential is applied to the trunk 900, and consequently to the simplex conductor C901 and the connected signal conductor C905, thereby to complete a circuit substantially identical to that previously traced for energizing the lower winding of the supervisory relay R1170; whereby the latter relay operates. Upon operating the supervisory relay R1170 completes, at the contacts 1171, an obvious circuit for operating the supervisory slave relay R1150. Upon operating the supervisory slave relay R1150 completes, at the contacts 1151, a circuit including the contacts 1236 for operating the control relay R1020. Upon operating the control relay R1020 completes, at the contacts 1023, a circuit including the contacts 1052 for holding itself operated. Also, the control relay R1020 interrupts, at the contacts 1021, the previously traced circuit for maintaining operated the delay relay R920, thereby to cause the latter relay to restore shortly thereafter, it being of the slow-to-release type. Upon restoring the delay relay R920 interrupts, at the contacts 922, the previously mentioned circuit for retaining operated the supervisory relay R935. Further, the control relay R1020 completes, at the contacts 1024, a circuit including the contacts 1136 and 1091 for operating the control relay R1060. Upon operating the control relay R1060 interrupts, at the contacts 1062, an alternative path including the contacts 1025, 938 and 959 that was completed incident to the operation of the supervisory relay R935, for applying battery potential to the control conductor C1284; further, the control relay R1060 completes, at the contacts 1061, an alternative path for applying battery potential by way of the windings of the toll relay R925 and the intertoll relay R930 to the control conductor C1284. When the above-mentioned path is completed an alternative circuit is completed for retaining operated the supervisory relay R1920 in the toll line circuit 170; and the toll relay R925 and the intertoll relay R930 in the trunk circuit 90 operate. Upon operating the toll relay R925 completes, at the contacts 926, an obvious circuit for operating the toll slave relay R1040; and upon operating the intertoll relay R930 completes, at the contacts 931, an obvious circuit for operating the simplex connect relay R1010. Upon operating the simplex connect relay R1010 completes, at the contacts 1014, a holding circuit including the contacts 1183 and the busy key K1185 for retaining it operated. Upon operating the toll slave relay R1040 completes, at the contacts 1044, a circuit including the contacts 927 for operating the switch relay R950. Upon operating the switch relay R950 completes, at the contacts 957, a holding circuit including the contacts 1183 and the busy key K1185 for retaining it operated. Further, the toll slave relay R1040 completes, at the contacts 1043, a holding circuit including the contacts 1063 for retaining operated the control relay R1060; and completes, at the contacts 1042, a multiple point around the contacts 1083 of the operated line relay R1080 between the lower winding of the supervisory relay R1170 and the signal conductor C905. Also, upon operating the switch relay R950 interrupts, at the contacts 952, 954 and 956 the previously traced connections between the line relay R1080 and the drying relay R1090 and line conductors C1281 and C1282 of the trunk 1280A, thereby to cause the latter relays to restore; and also it causes the loop seizure relay R1770 in the toll line circuit 170 to restore. Further, the switch relay R950 completes, at the contacts 953, a path for connecting battery potential by way of the winding of the simplex pulse relay R1070, the contacts 1128, 1012, 953, 942 and 1122' to the line conductor C1282 of the trunk 1280B; which line conductor is connected to the grounded line conductor C1702 of the trunk 1700 extending to the toll line circuit 170. Accordingly, the simplex pulse relay R1070 is energized and operates at this time completing, at the contacts 1071, a holding circuit including the contacts 1082 for retaining operated the hold relay R1050. Since the hold relay R1050 is of the slow-to-release type, it is retained operated during the transition period while the line relay R1080 is restoring and the simplex pulse relay R1070 is operating. Further, the simplex pulse relay R1070 completes, at the contacts 1073, a further point in multiple to the contacts 1042 of the operated toll slave relay R1040 between the lower winding of the supervisory relay R1170 and the signal conductor C905.

Upon restoring the loop seizure relay R1770 in the toll line circuit 170 effects operation of the control relays R1980 and R1990; which, in turn, effect operation of the control relay R1970 and the simplex connect relay R2010, in the manner previously explained. The control relay R1970 effects operation of the switch relay R2020; and the simplex connect relay R2010 effects restoration of the supervisory relay R1920; and the switch relay R2020 effects restoration of the control relays R1980 and R1990 in the manner previously explained. Upon restoring the supervisory relay R1920 effects the restoration of the supervisory slave relay R1840 shortly thereafter, since it is of the slow-to-release type, as previously noted. Also, the simplex connect relay R2010 interrupts, at the contacts 2015, the previously traced series circuit for retaining operaed the toll relay R925 and the intertoll relay R930 in the trunk circuit 90; whereby the relays mentioned restore. Also, the simplex connect relay R2010 completes, at the contacts 2016, the previously traced connection between the upper winding of the supervisory relay R1875 and the control conductor C1703 of the trunk 1700. Upon restoring the control relay R1980 effects the restoration of the control relay R1970 shortly thereafter; and upon restoring the control relay F1970 effects the restoration of the supervisory relay R1875; all in the manner previously explained. Upon restoring the supervisory relay R1875 effects the reversal of battery to ground potential upon the signal conductor C2001, thereby to maintain operated the signal relay R2040 in the toll line circuit 170 and to bring about restoration of the signal relay R2070 in the toll line circuit 2065, as previously explained. Upon restoring the signal relay R2070 extinguishes the lamp L2075 associated with the calling operator position at the toll switchboard in the distant office A, thereby to indicate to the operator thereat that she may proceed with dialing, since the switching apparatus in the near exchange D is now in readiness to receive the first digit.

Also, upon restoring the control relay R1970 completes, at the contacts 1971, the previously traced simplex circuit including the contacts 2041 for connecting the winding of the simplex relay R1750 to the line conductors C1701 and C1702 of the trunk 1700; whereby the simplex relay R1750 in the toll line circuit 170 is operated in series with the simplex pulse relay R1070 in the trunk circuit 90, since the simplex pulse relay R1070 is connected at this time to the line conductor C1282 of the trunk 1280A, as previously explained. Upon operating the simplex relay R1750 effects operation of the simplex slave relay R1760; that in turn effects restoration of the repeat relay R1820, all in the manner previously explained.

In the trunk circuit 90 upon restoring the toll relay R925 interrupts, at the contacts 926, the previously mentioned circuit for maintaining operated the toll slave relay R1040, thereby to cause the relay to restore shortly thereafter, it being of the slow-to-release type. Upon restoring the toll slave relay R1040 completes, at the contacts 1041, a path including the contacts 1128, 1011, 951, 941 and 1122 for connecting the simplex pulse relay R1070 to the line conductor C1281 of the trunk 1280A. Accordingly, at this time, there is completed a full simplex connection between the simplex pulse relay R1070 in the trunk circuit 90 and the simplex relay R1750 in the toll line circuit 170. Further, the toll slave relay R1040 interrupts, at the contacts 1043, the previously traced circuit for maintaining operated the control relay R1060. Upon restoring the control relay R1060 disconnects, at the contacts 1061, the control conductor C1284 of the trunk 1280A from the toll relay R925 and the intertoll relay R930; and prepares, at the contacts 1062, a path for applying ground potential to the control conductor C1284. Further, the toll slave relay R1040 interrupts, at the contacts 1042, the previously mentioned point in multiple to the contacts 1073 of the operated simplex pulse relay R1070; whereby the simplex circuit extending to the remote exchange D is at this time controllable by the operated simplex pulse relay R1070.

The operator at the calling operator position at the toll switchboard in the distant office A then proceeds to dial the next digit over the toll line 2060 in order to cause the signal relay R2040 in the toll line circuit 170 to follow and to repeat, at the contacts 2041, the impulses of the digit through the simplex relay R1750 in the toll line circuit 170 to the simplex pulse relay R1070 in the trunk circuit 90; whereby the relays mentioned follow. The operation and restoration of the simplex relay R1750 in the toll line circuit 170 is without effect since the associated simplex slave relay R1760 is of the slow-to-release type; however, the first time the simplex pulse relay R1070 in the trunk circuit 90 restores, it completes, at the contacts 1012, a circuit including the contacts 1082 and 1053 for operating the digit relay R1030. Upon operating the digit relay R1030 completes, at the contacts 1031, an additional shunt around the winding 913 of the repeater 910 in order to insure a reduction in the impedance of the above traced circuit including the simplex relay R1070. Also, the digit relay R1030 completes, at the contacts 1033, a path including the contacts 945 for connecting ground potential to the junction between the upper and lower windings of the shunt relay R940; the other terminal of the upper winding of the shunt relay R940 being connected directly to battery potential and the other terminal of the lower winding of the shunt relay R940 being connected by way of the contacts 944 to resistance battery potential. When the upper and lower windings of the shunt relay R940 are thus energized it operates the first step to complete, at the contacts 943, a path including the contacts 1052 for applying ground potential to the other terminal of the lower winding thereof and interrupts, at the contacts 944, the previously traced path for connecting the other terminal of the lower winding thereof to resistance battery potential. Accordingly, the lower winding of the shunt relay R940 is short-circuited at this time, preventing this relay from operating the second step, the shunt relay R940 being of the two-step type.

Each time the simplex pulse relay R1070 restores and then reoperates, it interrupts and then recompletes, at the contacts 1073, the simplex circuit extending by way of the trunk line 900 to the switching apparatus in the remote exchange D; whereby the first switching stage of the switching apparatus mentioned is controlled in accordance with the present digit. Since both the hold relay R1050 and the digit relay R1030 are of the slow-to-release type, they are retained operated during impulsing by the simplex pulse relay R1070. At the conclusion of the digit the signal relay R2040 in the toll line circuit 170 is maintained in its operated position, thereby maintaining operated the simplex relay R1750 in the toll line circuit 170 and the simplex pulse relay R1070 in the trunk circuit 90. The operated simplex pulse relay R1070 retains completed, at the contacts 1073, the simplex circuit extending by way of the trunk 900 to the switching apparatus in the remote exchange D and maintains operated, at the contacts 1071, the hold relay R1050. Further, the simplex pulse relay R1070 interrupts, at the contacts 1072, the previously traced circuit for maintaining operated the digit relay R1030 thereby to cause the latter relay to restore shortly thereafter, since it is of the slow-to-release type. Upon restoring the digit relay R1030 interrupts, at the contacts 1031, the additional shunt around the winding 913 of the repeater 910; and interrupts, at the contacts 1033, the previously traced path for short-circuiting the lower winding of the shunt relay R940; whereby the upper and lower windings of the shunt relay R940 are energized in series circuit relation by way of a circuit including the contacts 1052 and 943. At this time the shunt relay R940 takes its second step, or operates fully, thereby to interrupt, at the contacts 941 and 942, the normally completed shunt around the windings 913 and 914 of the repeater 910 in order to prepare the repeater 910 for telephone conversation between the calling operator position at the toll switchboard in the distant office A and the called subscriber substation in the remote exchange D.

At this time the operator at the calling operator position at the toll switchboard in the distant office A has completed the dialing of the first digit into the remote exchange D; which digit was repeated to the automatic switching apparatus in the remote exchange D over the trunk line 900 by the trunk circuit 90; the digit being repeated to the trunk circuit 90 by the toll line 170. The operator at the calling operator position at the toll switchboard in the distant office A then proceeds to dial the second and remaining digits over the toll line 2060 to the toll line circuit 170; whereby in response to each digit the toll line circuit 170 controls the trunk circuit 90 which, in turn, controls the switching apparatus in the remote exchange D in the manner previously explained. At this time the final stage of the switching apparatus in the remote exchange D has selected the line extending to the called subscriber substation and operates immediately to test the idle or busy condition thereof.

Assuming that the final switching stage of the switching apparatus in the remote exchange D tests the line extending to the called subscriber substation as being idle, ringing current in this final switching stage is projected thereover in a conventional manner; thereafter, when the subscriber at the called subscriber substation answers the call, the final switching stage in the remote exchange D switches through in order to complete a conversation connection between the calling operator position at the toll switchboard in the distant office A and the called subscriber substation in the remote exchange D. Also at this time the final switching stage in the remote exchange D operates in order to increase the resistance in the path for applying ground potential to the trunk line 900 and consequently to the simplex conductor C901 and the signal conductor C905; whereby the supervisory relay R1170 in the trunk circuit 90 restores, since it is of the marginal type. Upon restoring the supervisory relay R1170 interrupts, at the contacts 1171, the previously mentioned circuit for retaining operated the supervisory slave relay R1150. Upon restoring the supervisory slave relay R1150 completes, at the contacts 1152, a circuit including the contacts 1236, 1032 and 1022 for operating the supervisory relay R935. Upon operating the supervisory relay R935 completes, at the contacts 938, a path including the contacts 1015, 958, 1025 and 1062 for applying ground potential to the control conductor C1284 of the trunk 1280A, and consequently to the control conductor C1703 of the trunk 1700; thereby to complete the previously traced circuit for energizing the upper winding of the supervisory relay R1875 in the toll line circuit 170 in order to cause the latter relay to operate. Upon operating the supervisory relay R1875 interrupts the application of ground potential and applies battery potential to the signal conductor C2001, thereby to retain operated the signal relay R2040 in the toll line circuit 170 and to effect operation of the signal relay R2070 in the toll line circuit 2065. Upon operating the signal relay R2070 illuminates the lamp L2075, thereby to indicate to the operator at the calling operator position at the toll switchboard in the distant office A that the call has been answered by the subscriber at the called subscriber substation in the remote exchange D.

The subscriber at the called subscriber substation in the remote exchange D may transmit switchhook and release supervision to the operator at the calling operator position at the toll switchboard in the distant office A by manipulating the switchhook at the called subscriber substation. For example, when the subscriber at the called subscriber substation in the remote exchange D replaces the receiver of the telephone instrument thereat upon its associated switchhook, the final switching stage in the remote exchange D operates in order to reduce the resistance in the path for applying ground potential to the trunk line 900, thereby to effect reoperation of the supervisory relay R1170 in the trunk circuit 90. Upon operating the supervisory relay R1170 effects operation of the supervisory slave relay R1150 that, in turn, effects restoration of the supervisory relay R935, all in the manner previously described. Upon restoring the supervisory relay R935 interrupts, at the contacts 938, the previously traced path for applying ground potential to the control conductor C1284 of the trunk 1280A, and consequently to the control conductor C1703 of the trunk 1700, thereby to effect the restoration of the supervisory relay R1875 in the toll line circuit 170; whereby the latter relay, upon restoring, interrupts the application of battery potential from and completes the application of ground potential to the signal conductor C2001 in order to retain operated the signal relay R2040 in the toll line circuit 170 and to effect restoration of the signal relay R2070 in the toll line circuit 2065. Upon restoring the signal relay R2070 extinguishes the lamp L2075 associated with the calling operator position at the toll switchboard in the distant office A in order to indicate the condition noted to the operator mentioned.

The operator at the calling operator position at the tool switchboard in the distant office A then proceeds with the release of the toll line 2060, thereby to effect release of the toll line circuit 170, all in the manner previously described. When the toll line circuit 170 is released, the finder 1402, the incoming selector 1403, the toll second selector 1404 and the toll third selector 1406 are all released in a conventional manner. When the toll third selector 1406 is thus released, both the toll seizure relay R1180 and the simplex pulse relay R1070 in the trunk circuit 90 restore. Upon restoring the simplex pulse relay R1070 interrupts, at the contacts 1073, the simplex circuit extending between the lower winding of the supervisory relay R1170 and the final switching stage in the remote exchange D; whereby the supervisory relay R1170 restores and all of the switching apparatus in the remote exchange D is released in order to mark as idle the line extending to the called subscriber substation therein.

Also, upon restoring the simplex pulse relay R1070 interrupts at the contacts 1071, the previously traced circuit for retaining operated the hold relay R1050; whereby the latter relay restores shortly thereafter, since it is of the slow-to-release type. Upon restoring the hold relay R1050 interrupts, at the contacts 1052, the previously traced circuits for retaining operated the control relay R1020, and the shunt relay R940. Also, upon restoring, the toll seizure relay R1180 interrupts, at the contacts 1183, the previously traced circuits for retaining operated the simplex connect relay R1010 and the switch relay R950. Also, the toll seizure relay R1180 interrupts, at the contacts 1184, the previously traced circuit for maintaining operated the switch relay R1120. Upon restoring the switch relay R1120 recompletes, at the contacts 1125', a path including the contacts 1162 and 1144 for reconnecting ground potential by way of the inseizure relay R1240 again to the signal conductor C905, and consequently to the simplex conductor C901 in order again to mark as idle the trunk line 900 in the remote exchange D. Also, upon restoring the supervisory relay R1170 interrupts, at the contacts 1171, the previously mentioned circuit for maintaining operated the supervisory slave relay R1150. Finally, the toll seizure relay R1180 interrupts, at the contacts 1182, the previously traced path for applying ground potential to the control conductor C1285 of the trunk 1280B and recompletes, at the contacts 1181 the normally completed path including the contacts 1231 and 1141 for connecting battery potential by way of the winding of the local seizure relay R1130 to the control conductor C1285, thereby to mark the trunk 1280B, and consequently the trunk circuit 90, as idle to the outgoing toll selectors 513X, etc., having access thereto. At this time the trunk circuit 90 is completely released and the trunk line 900, extending between the central office B and the remote exchange D, is available for further use.

In conjunction with the extension of the above described call from the calling operator position at the toll switchboard in the distant office A by way of the central office B to a called subscriber substation in the remote exchange D, the incoming selector 1403, the toll second selector 1404 or the toll third selector 1406 may encounter an all-trunks-busy condition, whereupon the switch encountering the all-trunks-busy condition operates to open the loop circuit extending back over the trunk 1700 to the toll line circuit 170 and to apply either 120 ground impulses per minute or 120 ground impulses per minute and 120 battery impulses per minute, interpersed, to the control conductor C1703 of the trunk 1700. When the loop circuit including the trunk 1700 is interrupted the loop seizure relay R1770 restores effecting operation of the control relays R1980 and R1990; the control relay R1980 effects operation of the control relay R1970; the control relay R1990 effects operation of the simplex connect relay R2010; and the control relay R1970 effects operation of the switch relay R2020; all in the manner previously explained. Upon operating the simplex connect relay R2010 effects restoration of the supervisory relay R1920; the supervisory relay R1920 effects restoration of the supervisory slave relay R1840; upon operating the switch relay R2020 effects restoration of the control relays R1980 and R1990; the control relay R1980 effects restoration of the control relay R1970; and the control relay R1970 effects restoration of the supervisory relay R1875; all in the manner previously explained. At this time either the 120 ground impulses per minute or the 120 ground impulses per minute and the 120 battery impulses per minute, interspersed, applied to the control conductor C1703 of the trunk 1700 completes the previously traced circuit for intermittently energizing the upper winding of the supervisory relay R1875; whereby the latter relay follows. The intermittent operation of the supervisory relay R1875 effects intermittent application of ground and battery potentials to the signal conductor C2001; whereby the signal relay R2040 in the toll line circuit 170 is held in its operated position and the signal relay R2070 in the toll line circuit 2065 follows. The intermittent operation of the signal relay R2070 effects corresponding flashing of the lamp L2075 associated with the calling operator position at the toll switchboard in the distant office A, thereby to indicate the condition noted to the operator mentioned.

Also, it is pointed out in conjunction with the extension of the above described call from the calling operator position at the toll switchboard in the distant office A through the central office B to the called subscriber substation in the remote exchange D that any switching stage of the switching apparatus in the remote exchange D may encounter all-trunks-busy or line-busy conditions. The switch encountering the busy condition operates in order to open the path for applying ground potential to the trunk line 900, and consequently to the simplex conductor C901 and the signal conductor C905; whereby the supervisory relay R1170 in the trunk circuit 90 restores. Also, the switch mentioned operates to cause busy tone current to be applied to the trunk line 900. Upon restoring the supervisory relay R1170 effects restoration of the supervisory slave relay R1150; upon restoring the supervisory slave relay R1150 effects operation of the supervisory relay R935; upon operating the supervisory relay R935 effects the connection of ground potential to the control conductor C1284 of the trunk 1280A, and consequently to the control conductor C1703 of the trunk 1700 in order to effect operation of the supervisory relay R1875 in the toll line circuit 170; all in the manner previously explained. Upon operating the supervisory relay R1875 reverses ground potential to battery potential upon the signal conductor C2001, thereby to maintain operated the signal relay R2040 in the toll line circuit 170 and to effect operation of the signal relay R2070 in the toll line circuit 2065. Upon operating the signal R2070 illuminates the lamp L2075, thereby to give the operator at the calling operator position at the toll switchboard in the distant office A answer supervision; however, busy tone current from the remote exchange D is returned over the trunk line 900 by way of the trunk circuit 90, the interposed switch train, the toll line circuit 170 and the toll line 2060 to the toll line circuit 2065, thereby to give the operator mentioned the busy indication noted.

*Call from the central office B to the distant office A*

A toll call originating in the central office B, or extended thereto from the near exchange C or the remote exchange D, is ultimately routed to the toll switchboard 11Y therein; and may then be extended to the distant office A. For example, a toll call may be routed to operator position No. 1 at the toll switchboard 11Y via the answer switch 16Y of the link 15Y and connected to the position circuit 18Y; whereupon the operator thereat actuates the key set 22Y, thereby to govern the sender control circuit 20Y and the connected impulse sender 21AY and digit registers 21BY; whereby digits are registered in the digit registers 21BY. The impulse sender 21AY is then governed by the digit registers 21BY in order to transmit the loop impulses of the first digit to the call switch 17Y of the link 15Y. The call switch 17Y of the link 15Y operates to select the group of toll second selectors, including the toll second selector 1412, and then to select an idle toll second selector in this group. Thereafter the impulse sender 21AY transmits the loop impulses of the subsequent digits over the call switch 17Y to the outgoing toll train in a well-known manner. Assuming that the call switch 17Y of the link 15Y seizes the particular toll second selector 1412, the next digit is transmitted to the toll second selector 1412, thereby to cause it to operate and select the group of trunks, including the trunk 1770, extending to the group of toll line circuits, including the toll line circuit 170, and then to select an idle trunk in this group. Assuming that the toll second selector 1412 selects the particular trunk 1770 extending to the particular toll line circuit 170, the toll second selector 1412 operates to apply ground potential to the control conductor C1773 of the trunk 1770, thereby to complete a circuit including the contacts 1712 for operating the seizure relay R1910 in the toll line circuit 170. Upon operating the toll seizure relay R1910 completes, at the contacts 1911, obvious multiple circuits for operating the switch relay R1860 and the control relay R1930. Upon operating the control relay R1930 completes, at the contacts 1931, a circuit including the contacts 1822 and 2027 for operating the control relay R1830. Upon operating the switch relay R1860 completes, at the contacts 1863, 1865, 1867 and 1862′, a path for connecting the loop pulse relay R1880 and the control relay R1870 across the line conductors C1771 and C1772 of the trunk 1770; this path extending from ground by way of the lower winding of R1880, the upper winding of R1870, the contacts 1867, 2023, the winding 2033 of the repeater 2030, and the contacts 1862′ to the line conductor C1772, and from battery by way of the upper winding of R1880, the contacts 1941 and 2025, the lower winding of R1870, the contacts 1865, 2021, 1831 and 1863 to the line conductor C1771. At this time the line conductors C1771 and C1772 of the trunk 1770 are connected by way of the toll second selector 1412, the call switch 17Y of the link 15Y, the position circuit 18Y at operator position No. 1 at the toll switchboard 11Y, and the sender control circuit 20Y to the impulse sender 21AY; whereby a balanced loop in the impulse sender 21AY is connected across the path mentioned, including the line conductors C1771 and C1772 of the trunk 1770, thereby to energize both the upper and lower windings of both the control relay R1870 and the loop pulse relay R1880. Accordingly, the loop pulse relay R1880 operates; however, the control relay R1870 does not operate, since it is of the differential type.

Upon operating the loop pulse relay R1880 completes, at the contacts 1881, an obvious path for short-circuiting the winding of the control relay R1930, thereby to cause the latter relay to restore and interrupt, at the contacts 1931, the previously traced circuit for maintaining operated the control relay R1830; whereby the latter relay restores shortly thereafter, it being of the slow-to-release type. Upon restoring the control relay R1830 interrupts, at the contacts 1831, a path previously completed for short-circuiting the winding 2031 of the repeater 2030; whereby the winding 2031 is introduced in the previously traced loop circuit including the windings of the loop pulse relay R1880 and the control relay R1870, as well as the trunk 1770. Also the loop pulse relay R1880 interrupts, at the contacts 1883, the previously traced normally completed path for applying ground potential to the signal conductor C2001 and completes, at the contacts 1882, a path including the contacts 1893 and 1905 for applying battery potential by way of the ballast lamp L1872 to the signal conductor C2001. When ground potential is removed from and battery potential is substituted upon the signal conductor C2001, and consequently upon the simplex conductor C2063, the signal relay R2040 in the toll line circuit 170 is retained in its restored position whereas the signal relay R2070 in the trunk circuit 2065 is operated. It is contemplated that an incoming toll selector in the switch train in the distant office A is associated with the toll line circuit 2065; and that operation of the signal relay R2070 prepares the incoming toll selector to be responsive to the first digit transmitted over the toll line 2060 extending between the central office B and the distant office A; whereby the preparation of both the toll line circuit 170 following seizure of the trunk 1770 by the toll second selector 1412 and preparation of the toll line circuit 2065 and the connected incoming toll selector in the switch train in the distant office A takes place in a very short interval of time and during the interdigit pause between the second and third digits transmitted by the impulse sender 21AY at this time.

During the continued operation of the impulse sender 21AY to transmit the third digit, the loop circuit previously traced is interrupted and then recompleted intermittently; whereby the loop pulse relay R1880 follows in an obvious manner, repeating, at the contacts 1883 and 1882, ground and battery impulses over the signal conductor C2001 and the connected simplex conductor C2063; whereby the signal relay R2040 in the toll line circuit 170 remains restored during impulsing and the signal relay R2070 in the toll line circuit 2065 follows, repeating the impulses of the digit to the associated incoming toll selector in a conventional manner. Each time the loop pulse relay R1880 restores and then re-operates it interrupts and then recompletes, at the contacts 1881, the previously mentioned path for short-circuiting the winding of the control relay R1930; whereby the latter relay follows the loop pulse relay R1880. As the control relay R1930 operates and then restores, it completes and then interrupts, at the contacts 1931, the previously traced circuit for operating the control relay R1830; the latter relay operates at the beginning of the digit and remains operated until shortly following the conclusion of the digit, since it is of the slow-to-release type. During the digit the control relay R1830 remains in its operated position effecting short-circuiting of the winding 2031 of the repeater 2030, thereby to reduce the impedance of the loop circuit extending between the impulse sender 21AY and the loop pulse relay R1880 in the toll line circuit 170. At the conclusion of the digit the loop pulse relay R1880 reoperates steadily effecting restoration of the control relay R1930 and restoration of the control relay R1830 shortly thereafter in the manner previously explained; and the incoming toll selector in the switch train in the distant office A is controlled by the digit in a conventional manner.

The remaining digits that are to be transmitted by the impulse sender 21AY are transmitted to the toll line circuit 170 and repeated over the toll line 2060 to the subsequent stages of the switching apparatus in the distant office A in a manner identical to that described above. The present call may be routed either to an operator position at the toll switchboard or to a subscriber substation in the distant office A; and in either case, after all of the digits have been transmitted by the impulse sender 21AY operation of the release relay R3610Y in the sender control circuit 20Y is brought about under the control of the impulse sender 21AY. Upon operating the release relay R3610Y interrupts, at the contacts 3613Y, the loop circuit including the trunk 1770 extending to the toll line circuit 170 and completes, at the contacts 3612Y, a path for applying ground potential by way of the winding of the control relay R3600Y to the negative line conductor C2661Y, and consequently to the line conductor C1771 of the trunk 1770; whereby there is completed a circuit substantially identical to that previously traced for energizing in series the upper winding of the loop pulse relay R1880 and the lower winding of the control relay R1870; the circuit including the lower winding of the loop pulse relay R1880 and the upper winding of the control relay R1870 being opened at this time; whereby the loop pulse relay R1880 is retained in its operated position and the control relay R1870 is operated, since it is of the differential type. Also, upon operating the release relay R3610Y in the sender control circuit 20Y interrupts the circuit for maintaining operated the hold relay R3620Y; however, the latter relay is not restored at this time since it is of the slow-to-release type.

Upon operating the control relay R1870 in the toll line circuit 170 completes, at the contacts 1871, an obvious circuit for operating the control relay R1900. Upon operating the control relay R1900 completes, at the contacts 1904, a direct path for applying battery potential by way of the ballast lamp L1872 to the signal conductor C2001 and interrupts, at the contacts 1905, the previously traced original path for applying battery potential to the signal conductor C2001. Further, the control relay R1900 completes, at the contacts 1902, a path including the contacts 1852 for impressing battery potential by way of the windings of the control relays R1980 and R1990 upon the control conductor C1774 of the trunk 1700; at this time ground potential in the sender control circuit 20Y is connected by way of the contacts 3621Y of the operated hold relay R3620Y therein, the winding of the supervisory relay R3630Y and the contacts 3404Y to the control conductor C2663Y; and the control conductor C2663Y is connected by way of the interposed switch train to the control conductor C1774 of the trunk 1770. Accordingly, a series circuit is completed for energizing the winding of the supervisory relay R3530Y in the sender control circuit 20Y and the control relays R1980 and R1990 in the toll line circuit 170. When this series circuit is completed the supervisory relay R3530Y and the control relay R1980 operate; however, the control relay R1990 does not operate, since it is of the marginal type.

Upon operating the supervisory relay R3530Y completes an alternative holding circuit for maintaining operated the hold relay R3620Y; the operated hold relay R3620Y maintaining completed at the contacts 3624 an obvious circuit for retaining operated the hold slave relay R1610. Also, the operated hold relay R3620Y and hold slave relay R1610, respectively, retain completed at the contacts 3622Y and 1611 multiple paths including the contacts 3635Y for maintaining operated the sender disconnect relay R3630Y.

Upon operating the control relay R1980 in the toll line circuit 170 completes at the contacts 1982 an obvious circuit for operating the control relay R1970. Upon operating the control relay R1970 completes, at the contacts 1973, a circuit including the contacts 1981 for operating the switch relay R2020. Upon operating the switch relay R2020 completes, at the contacts 2022, a holding circuit including the contacts 1913 for maintaining it operated; and interrupts, at the contacts 2025 and 2021, the previously traced circuit for energizing in series the winding of the control relay R3600Y in the sender control circuit 20Y, the upper winding of the loop pulse relay R1880 and the lower winding of the control relay R1870 in the toll line circuit 170; whereby the control relays R3600Y and R1870 restore. However, the loop pulse relay R1880 does not restore at this time since there is completed at the contacts 2026, incident to operation of the switch relay R2020, an alternative circuit for energizing the upper winding thereof; which circuit extends from resistance ground potential by way of the contacts 2014, 2026, 1941 and the upper winding of R1880 to battery. Upon restoring the control relay R1870 interrupts, at the contacts 1871, the previously mentioned original circuit for operating the control relay R1900; however, the latter relay is retained in its operated position at this time due to a completed holding circuit therefor including the contacts 1901 and 1974; the circuit being completed at the contacts 1974 incident to operation of the control relay R1970. Upon restoring the control relay R3600Y in the sender control circuit 20Y effects restoration of the hold relay R3620Y shortly thereafter, since the latter relay is of the slow-to-release type. Upon restoring the hold relay R3620Y interrupts, at the contacts 3621Y, the previously traced series circuit for energizing the winding of the supervisory relay R3530Y in the sender control circuit 20Y and the windings of the control relays R1980 and R1990 in the toll line circuit 170; whereby the operated supervisory relay R3530Y and the operated control relay R1980 restore. Also, the hold relay R3620Y completes, at the contacts 3623, a path including the contacts 3616 and 3404Y for applying battery potential by way of the resistor 1612 to the control conductor C2663Y, thereby to short circuit in series relation the control relays R1980 and R1990 in the toll line circuit 170, rendering the control relay R1980 slightly slow-to-release. Further, the hold relay R3620Y interrupts, at the contacts 3624, the previously mentioned circuit for maintaining operated the hold slave relay R1610, thereby to cause the latter relay to restore shortly thereafter, it being of the slow-to-release type. Finally, the hold relay R3620Y interrupts, at the contacts 3622Y, one of the previously mentioned multiple circuits for maintaining operated the sender disconnect relay R3630Y; whereby upon the restoration of the hold slave relay R1610, it interrupts, at the contacts 1611, the other multiple circuit for maintaining operated the sender disconnect relay R3630Y. Thus, the sender disconnect relay R3630Y restores at this time effecting the release of the impulse sender 21AY and the digit registers 21BY and switch-through operation of the call switch 17Y of the link 15Y connected at this time to the position circuit 18Y disposed at operator position No. 1 at the toll switchboard 11Y. Also, the sender disconnect relay R3630Y interrupts, at the contacts 3639Y, the previously completed circuit for maintaining operated the release relay R3610Y; whereby the latter relay restores shortly thereafter, it being of the slow-to-release type. Upon restoring the release relay R3610Y interrupts, at the contacts 3616, the previously traced path for applying battery potential to the control conductor C2663Y, and consequently to the control conductor C1774 of the trunk 1770. Further, the release relay R3610Y causes the connect relay R3400Y to restore, thereby completely releasing the sender control circuit 20Y.

Upon restoring the control relay R1980 in the toll line circuit 170 interrupts, at the contacts 1982, the previously mentioned circuit for maintaining operated the control relay R1970, thereby to cause the latter relay to restore shortly thereafter, it being of the slow-to-release type. Upon restoring the control relay R1970 interrupts, at the contacts 1974, the previously traced circuit for maintaining operated the control relay R1900. Upon restoring the control relay R1900 completes, at the contacts 1903, a path including the contacts 2019, 1914 and 1852 for applying ground potential to the control conductor C1774 of the trunk 1770; interrupts at the contacts 1904, the previously traced direct path for applying battery potential to the signal conductor C2001 and completes, at the contacts 1905, an alternative path including the contacts 1893 and 1882 for applying battery potential to the signal conductor C2001. Application of ground potential to the control conductor C1774 effects illumination of the front supervisory lamp 2516Y in the link 15Y, thereby to indicate to the operator at position No. 1 at the toll switchboard 11Y that the call has been extended in the distant office A to its destination, but has not, as yet, been answered.

When the call is answered in the distant office A, the toll line circuit 2065 operates in order to cause ground potential to be removed from and battery potential to be applied to the signal conductor C2074 and to the connected simplex conductor C2063, thereby to maintain operated the signal relay R2070 in the toll line circuit 2065 and to effect operation of the signal relay R2040 in the toll line circuit 170. Upon operating the signal relay R2040 completes, at the contacts 2041, a circuit including the contacts 1864′ and 1832, for operating the supervisory relay R1850. Upon operating the supervisory relay R1850 interrupts, at the contacts 1852, the previously traced path for applying ground potential to the control conductor C1774 of the trunk 1770 in order to cause the front supervisory lamp L2516Y in the link 15Y to be extinguished; thereby to indicate to the operator at position No. 1 at the toll switchboard 11Y that the call has been answered in the distant office A. At this time the call from operator position No. 1 at the toll switchboard 11Y in the central office B is completed either to the toll switchboard or to the called subscriber substation in the distant office A. In the event the call is completed to the toll switchboard in the distant office A, the operator thereat is advised concerning the extension of the call which is brought about in a conventional manner. After the call has been extended from the toll switchboard in the distant office A and ultimately answered, or after the call has been answered at the called subscriber substation in the distant office A, the operator at position No. 1 at the toll switchboard 11Y in the central office B causes the link 15Y, in use, to be disconnected from her position circuit 18Y.

Subsequently, in the event the operator at the toll switchboard in the distant office A or the subscriber at the called subscriber substation therein requires to signal the operator at position No. 1 at the toll switchboard 11Y in the central office B, the operator at the toll switchboard manipulates her associated position equipment, or the subscriber at the called subscriber substation manipulates his switchhook. In either case the toll line circuit 2065 is controlled in order to reverse the application of battery to ground potential upon the signal conductor C2074, repeatedly; whereby the signal relay R2070 in the toll line circuit 2065 is held in its operated position and the signal relay R2040 in the toll line circuit 170 follows. Each time the signal relay R2040 restores and then reoperates, it interrupts and then recompletes, at the contacts 2041, the previously traced circuit for maintaining operated the supervisory relay R1850; thereby to cause the latter relay to follow. Each time the supervisory relay R1850 restores and then reoperates, it completes, and then interrupts, at the contacts 1852, the path for applying ground potential to the control conductor C1774 of the trunk 1770; thereby to effect flashing of the front supervisory lamp 2516Y in the link 15Y in order to indicate the condition mentioned to the operator at position No. 1 at the toll switchboard 11Y in the central office B. The operator at position No. 1 then proceeds to effect reconnection of the link 15Y to her position circuit 18Y; thereby to establish a communication connection over the toll line 2060 extending to the distant office A.

From the above explanation it will be understood that when the operator at the toll switchboard in the distant office A disconnects at the conclusion of the call or when the subscriber at the called subscriber substation in the distant office A replaces the receiver of the telephone instrument thereat upon its associated switchhook at the conclusion of the call that a steady signal will be transmitted over the toll line 2060 effecting restoration of the signal relay R2040, and consequently of the supervisory relay R1850 in the toll line circuit 170 in the manner described. Upon restoring the supervisory relay R1850 completes, at the contacts 1852, the previously traced path for applying ground potential to the control conductor C1774 of the trunk 1770; thereby to effect steady illumination of the front supervisory lamp 2516Y in the link 15Y in order to indicate to the operator at position No. 1 at the toll switchboard 11Y in the central office B that the connection has been terminated. The operator at position No. 1 at the toll switchboard 11Y then effects the release of both the answer switch 16Y and the call switch 17Y of the link 15Y; the release of the call switch 17Y effecting the release of the toll second selector 1412 and the toll line circuit 170 and the switch train in the distant office A in a manner more fully explained hereinafter.

Assuming that after the above-described call was extended through the toll switchboard in the distant office A and ultimately completed at a more remote point and that the operator at position No. 1 at the toll switchboard 11Y in the central office B wishes to recall the toll switchboard in the distant office A; in order to accomplish this end the link 15Y is then reconnected to the position circuit 18Y at operator position No. 1 at the toll switchboard 11Y. The operator at position No. 1 then actuates the ring front key; thereby to cause ringing current to be transmitted over the negative line conductor of the talking circuit to the line conductor C1771 of the trunk 1770; thereby to complete a circuit including the contacts 1863, the winding 2031 of the repeater 2030, the contacts 2022 and 2011 for operating the rering relay R1960. More particularly, the ring front key mentioned is operated repeatedly; whereby the rering relay R1960 operates and restores repeatedly. Upon operating the rering relay R1960 interrupts, at the contacts 1961, the normally completed circuit for maintaining operated the rering relay R1950; thereby to cause the latter relay to restore shortly thereafter, it being of the slow-to-release type. Upon restoring the rering relay R1950 completes, at the contacts 1951, a point in multiple to the contacts 1941 of the operated rering relay R1940 in the previously traced circuit for energizing the upper winding of the loop pulse relay R1880. Further, the rering relay R1950 completes, at the contacts 1952, an obvious circuit for operating the rering relay R1940; whereby the latter relay interrupts, at the contacts 1941, the previously mentioned point in the circuit for energizing the upper winding of the loop pulse relay R1880. Subsequently, when the rering relay R1960 restores it recompletes, at the contacts 1961, the previously mentioned circuit for operating the rering relay R1950; whereby the latter relay effects the restoration of the rering relay R1940 shortly thereafter, since the latter relay is of the slow-to-release type. Accordingly, for a short time interval both of the rering relays R1950 and R1940 occupy their operated positions; and shortly thereafter the rering relay R1940 restores. During this time interval mentioned the previously traced circuit for energizing the upper winding of the loop pulse relay R1880 is interrupted, at the contacts 1941 and 1951 disposed in multiple relation; and shortly thereafter when the rering relay R1940 restores it recompletes, at the contacts 1941, the circuit for energizing the upper winding of the loop pulse relay R1880. Hence, the loop pulse relay R1880 restores and then reoperates incident to each actuation of the ring front key in the position circuit 18Y, thus the loop pulse relay R1880 restores and then reoperates repeatedly as the ring front key mentioned is operated similarly. Each time the loop pulse relay R1880 restores it effects the reversal of battery to ground potential upon the signal conductor C2001; conversely, each time the loop pulse relay R1880 operates it reverses the application of ground to battery potential upon the signal conductor C2001. Accordingly, the signals transmitted over the signal conductor C2001 retain operated the signal relay R2040 in the toll line circuit 170 and causes the signal relay R2070 in the toll line circuit 2065 to restore and then to reoperate; thereby to flash the lamp L2075 associated with the called operator position at the toll switchboard in the distant office A. The operator at the toll switchboard in the distant office A then reenters the connection and converses with the operator at position No. 1 at the toll switchboard 11Y in the central office B.

As previously noted, when the operator at position No. 1 at the toll switchboard 11Y in the central office B receives disconnect supervision she effects the release of the link 15Y; whereby the toll second selector 1412 is released and ground potential is removed from the control conductor C1773 of the trunk 1770 interrupting the previously traced circuit for maintaining operated the seizure relay R1910. Upon restoring the seizure relay R1910 interrupts, at the contacts 1911, the previously traced circuit for maintaining operated the switch relay R1860 and interrupts, at the contacts 1913, the previously traced holding circuit for maintaining operated the switch relay R2020. Upon restoring the switch relay R2020 interrupts, at the contacts 2026, the previously traced circuit for maintaining operated the loop pulse relay R1880. Upon restoring the loop pulse relay R1880 recompletes, at the contacts 1883, the normal path for applying ground potential to the signal conductor C2001; thereby to maintain the signal relay R2040 in its restored position marking the toll line circuit 170 as idle to the toll line 2060. At this time the signal relay R2070 is restored effecting the release of the automatic switching apparatus in the distant office A, in the event the present call is extended to a called subscriber substation therein. On the other hand, in the event the present call is extended to the toll switchboard in the distant office A, the restored signal relay R2070 gives disconnect supervision thereat; whereby the operator at the toll switchboard mentioned may effect release of the outgoing switch train in the conventional manner. At this time the toll line circuit 170 is completely released, marking the toll line 2060 extending between the central office B and distant office A available for further use.

In extending the above-described call from operator position No. 1 at the toll switchboard 11Y in the central office B into the distant office A, switching apparatus in the latter office was employed; and in the event a switching stage is reached in this switching apparatus which requires a time interval in excess of the normal interdigit pause, as established in the impulse sender 21AY connected at this time to the sender control circuit 20Y and thence to the call switch 17Y, the switching stage mentioned in the switching apparatus in the distant office A operates in order to cause the reversal of ground to battery potential upon the signal conductor C2074, and consequently upon the simplex conductor C2063; whereby the signal relay R2070 in the toll line circuit 2065 is retained operated and the signal relay R2040 in the toll line circuit 170 operates. Upon operating the signal relay R2040 completes, at the contacts 2041, the previously traced circuit for operating the supervisory relay R1850. Upon operating the supervisory relay R1850 interrupts, at the contacts 1852, the path including the contacts 1903, 1914 and 2019, which is completed at this time for applying ground potential to the control conductor C1774 of the trunk 1770; and completes, at the contacts 1851, a path including the contacts 2021', for applying resistance battery potential to the control conductor C1774, since the switch relay R2020 is not at this time operated. When battery potential is thus applied to the control conductor C1774 of the trunk 1770 there is completed a circuit including the control conductor C2663Y, the contacts 3404Y and 3621Y, for operating the supervisory relay R3530Y in the sender control circuit 20Y. Upon operating the supervisory relay R3530Y arrests the sending operation of the impulse sender 21AY.

When the switching stage mentioned in the switching apparatus in the distant office A has completed its operation so that the next digit may be received, potential upon the signal conductor C2074 is reversed from battery to ground; whereby the signal relay R2070 in the trunk circuit 2065 is retained operated and the signal relay R2040 in the toll line circuit 170 is restored. Upon restoring the signal relay R2050 interrupts, at the contacts 2041, the circuit for maintaining operated the supervisory relay R1850; and upon restoring the supervisory relay R1850 interrupts, at the contacts 1851, the above traced path for applying resistance battery potential to the control conductor C1774 of the trunk 1770 and recompletes, at the contacts 1852, the previously traced path for applying ground potential to the control conductor C1774. When battery potential is thus removed from the control conductor C1774 of the trunk 1770, the previously traced path for maintaining operated the supervisory relay R3530Y in the sender control circuit 20Y is interrupted. Upon restoring the supervisory relay R3530Y governs the impulse sender 21AY; whereby the next digit is then transmitted by the impulse sender 21AY in the manner previously explained.

In the event the delay-in-dial signal transmitted from the switching apparatus in the distant office A over the toll line 2060 to the toll line circuit 170 persists for an abnormal time interval, the supervisory relay R3530Y in the sender control circuit 20Y is maintained operated for this abnormal time interval in an obvious manner. The condition above-mentioned is encountered when any switching stage in the automatic switching apparatus in the distant office A encounters an all-trunks-busy condition. Accordingly, in this event, the supervisory relay R3530Y in the sender control circuit 20Y is maintained operated an abnormal time interval; which relay effects operation of timing apparatus disposed in the sender control circuit 20Y; whereby 120 ground impulses per minute are connected to the busy lamp 2604Y in the link 15Y. The flashing of the busy lamp 2604Y at a frequency of 120 per minute indicates to the operator at position No. 1 at the toll switchboard 11Y that the present call being extended via the link 15Y has reached a blocked switching stage in the distant office A. The operator at position No. 1 at the toll switchboard 11Y then depresses the error key of the key set 22Y to effect the release of the sender control circuit 20Y and the connected impulse sender 21AY and digit registers 21BY. When the sender control circuit 20Y is thus released a relay change in the link 15Y is brought about; whereby the busy lamp 2604Y is flashed at a frequency of 60 per minute, thereby to indicate to the operator at position No. 1 at the toll switchboard 11Y that the sender control circuit 20Y and connected register sender 21Y have been disconnected at this time from the link 15Y. The operator mentioned then proceeds to release the call switch 17Y of the link 15Y thereby to effect the release of the toll second selector 1412 and the toll line circuit 170 and the switching apparatus in the distant office A in the manner previously explained.

In the foregoing description of the operation of the switching apparatus in the distant office A in response to any switching stage thereof encountering an all-trunks-busy condition, it was assumed that a steady delay-in-dial supervision was returned over the signal conductor C2074 for an abnormal time in interval; however, the switching apparatus in the distant office A may be arranged to return 120 alternate battery and ground impulses per minute over the signal conductor C2074 in response to any stage encountering an all-trunks-busy condition. When this arrangement is provided, the 120 alternate battery and ground impulses transmitted over the signal conductor 2074 maintain operated the signal relay R2070 in the toll line circuit 2065 and effect corresponding operation and restoration repeatedly of the signal relay R2040 in the toll line circuit 170. At this time, the signal relay R2040 operates and restores causing the supervisory relay R1850 to follow, transmitting alternate battery and ground impulses over the control conductor C1774 of the trunk 1770 to the supervisory relay R3530Y in the sender control circuit 20Y. When the supervisory relay R3530Y in the sender control circuit 20Y operates and then restores twice in rapid order, following the 120 impulses per minute mentioned, it automatically effects the release of the sender control circuit 20Y and the connected sender 21Y substantially identical to that following normal release of these elements at the conclusion of the transmission of all of the digits registered in the digit registers 21BY described generally above and described in detail in the Balzer patent mentioned. Accordingly, the sender control circuit 20Y brings about the operation of the control relay R1980 in the toll line circuit 170, effecting operation of the switch relay R2020 and the control relay R1970, all in the manner previously explained, thus continued operation and restoration at this time of the signal relay R2040 causes the supervisory relay R1850 to follow; whereby ground potential, at the contacts 1852, is alternately connected and disconnected from the control conductor C1774 of the trunk 1770 which, at this time, is cut through to the call switch 17Y as a consequence of the release of the sender control circuit 20Y. These ground impulses, at 120 per minute, applied to the control conductor C1774 of the trunk 1770 effect corresponding flashing of the front supervisory lamp 2516Y in the link 15Y; thereby to indicate to the operator at position No. 1 at the toll switchboard 11Y that a blocked switching stage has been encountered in the automatic switching apparatus in the distant office A. The operator mentioned then proceeds to release the call switch 17Y; thereby to effect the release of the toll second selector 1412 and the toll line circuit 170 and the automatic switching apparatus in the distant office A; in the manner previously described.

In conjunction with the routing of the above-described call from operator position No. 1 at the toll switchboard 11Y in the central office B to the distant office A, it was explained that the call switch 17Y of the link 15Y and the toll second selector 1412 were operated sequentially to make trunk group and then idle trunk selections in the group, all before the trunk 1770 extending to the toll line circuit 170 is seized by the toll second selector 1412. Accordingly, either the call switch 17Y of the link 15Y or the toll second selector 1412 may encounter an all-trunks-busy condition; in which case, the particular one of the switches mentioned that encounters the all-trunks-busy condition, operates to cause either 120 ground impulses per minute or 120 ground impulses in conjuction with interspersed battery impulses to be returned over the associated control conductor extending back to the control conductor C2663Y extending into the sender control circuit 20Y, depending upon the wiring utilized in the particular switch as explained in detail in the Balzer patent mentioned. In the event 120 ground impulses per minute are returned over the control conductor C2663Y, the supervisory relay R3530Y is not operated and the sender control circuit 20Y governs the register sender 21Y; whereby the remaining digits registered are transmitted notwithstanding the all-trunks-busy condition mentioned. After all of the digits registered in the register sender 21Y have been transmitted the sender control circuit 20Y operates in the manner previously explained in order to cause the call switch 17Y to cut through; whereby the front supervisory lamp 2516Y is flashed as a result of the 120 ground impulses per minute returned over the control conductor of the switch encountering the all-trunks-busy condition; thereby to indicate to the operator at position No. 1 the condition mentioned.

On the other hand, in the event the switch encountering the all-trunks-busy condition returns alternate ground and battery impulses at the rate of 120 per minute over the control conductor C2663Y, the supervisory relay R3530Y in the sender control circuit 20Y is operated and restored intermittently, as previously explained. When the supervisory relay R3530Y operates and restores twice in succession the register sender 21Y is automatically released together with the sender control circuit 20Y in order to effect cut-through of the call switch 17Y; all in the manner previously explained. After the call switch 17Y of the link 15Y is cut through, the alternate ground and battery impulses returned over the control conductor of the switch encountering the all-trunks-busy condition effects flashing of the front supervisory lamp 2516Y in the link 15Y, thereby to indicate the condition mentioned to the operator at position No. 1 at the toll switchboard 11Y.

The operator at position No. 1 at the toll switchboard observing the all-trunks-busy condition upon the link 15Y effects the release of the call switch 17Y, and consequently to the toll second selector 1412 in the event the last-mentioned switch is connected thereto; all in the manner previously described.

*Call from the toll switchboard in the central office B to a subscriber substation in the near exchange C*

A toll call originating in the central office B or extended thereto from the remote exchange D is ultimately routed to the toll switchboard 11Y therein and may then be extended to the near exchange C. For example, a toll call may be routed to operator position No. 1 at the toll switchboard 11Y via the answer switch 16Y of the link 15Y and connected to the position circuit 18Y; whereupon the operator thereat actuates the key set 22Y, thereby to govern the sender control circuit 20Y and the connected impulse sender 21AY and digit registers 21BY; whereby digits are registered in the digit registers 21BY. The impulse sender 21AY is then governed by the digit registers 21BY in order to transmit the loop impulses of the first digit to the call switch 17Y of the link 15Y. The call switch 17Y of the link 15Y operates to select the group of toll second selectors, including the toll second selector 1412, and then to select an idle toll second selector in this group. Thereafter the impulse sender 21AY transmits the loop impulses of the subsequent digits over the call switch 17Y to the outgoing toll train in a well-known manner. Assuming that the call switch 17Y of the link 15Y seizes the particular second selector 1412 the next digit is transmitted to the toll second selector 1412, thereby to cause it to operate and select the group of toll third selectors, including the toll third selector 1406, and then to select an idle toll third selector in this group. Assuming that the toll second selector 1412 seizes the particular toll third selector 1406, the next digit is transmitted to the toll third selector 1406, thereby to cause it to operate and select a group of trunks, including the trunk 880A, extending to the group of trunk circuits, including the trunk circuit 50, and then to select an idle trunk in this group. Assuming that the toll third selector 1406 selects the particular trunk 880A extending to the particular trunk circuit 50, the toll third selector 1406 operates to apply ground potential to the control conductor C883 of the trunk 880A; thereby to complete the previously traced circuit for operating the toll seizure relay R850. Upon operating the toll relay R850 marks the trunk 880B as busy to the outgoing toll selectors 513X, etc., and the outgoing toll selectors 511X, etc., in two groups having access thereto; and operates the switch relay R720; all in the manner previously explained. Also when the toll third selector 1406 seizes the trunk 880A battery potential is applied by way of the resistor 526 and the contacts 525 and 683 in the trunk circuit 50 to the control conductor C884 thereof, which battery potential is returned to the control conductor C2663Y extending into the sender control circuit 20Y; thereby to effect operation of the supervisory relay R3530Y in order to bring about a delay in operation of the impulse sender 21AY at this time; all in the manner previously explained. Accordingly, the trunk circuit 50 returns a delay-in-send signal to the sender control circuit 20Y at this time, since the switching apparatus in the near exchange C is not in readiness to receive a digit.

Returning now to the trunk circuit 50, upon operating the switch relay R720 completes, at the contacts 723, 727, 722′ and 723′, a connection between the line relay R760 and the drying relay R750 and the line conductors C881 and C882 of the trunk 880A, which connection is extended back through the switch train and the sender control circuit 20Y to a closed loop in the impulse sender 21AY; however, this closed loop is balanced in the impulse sender 21AY effecting operation of the line relay R760, but preventing operation of the drying relay R750, since the latter relay is of the differential type. Upon operating the switch relay R720 effects operation of the control relay R510; the latter relay effects operation of the supervisory relay R610; and the latter relay effects operation of the reverse battery relay R730; all in the manner previously described. Upon operating the reverse battery relay R730 reverses the polarity of the drying relay R750 and the line relay R760 with respect to the line conductors C881 and C882 of the trunk 880A; however, this is without effect, since a simple loop is completed in the impulse sender 21AY between the line conductors of the trunk 880A at this time.

Upon operating the line relay R760 completes, at the contacts 761, the previously traced loop circuit including the trunk line 500 extending to the near exchange C; whereby the trunk circuit in the near exchange C operates to cause the automatic switching apparatus to be associated therewith; which operation consumes some time. Also, the line relay R760 effects operation of the hold relay R770; and the latter relay completes the previously traced circuit for energizing the right-hand winding of the answer relay R740. At this time the left-hand winding of the answer relay R740 is energized in the loop circuit extending by way of the trunk line 500 to the near exchange C, but the polarity of the trunk line 500 is such that the latter relay is not operated. When the switching apparatus in the near exchange C is associated with the trunk line 500 and is in readiness to receive a digit, battery and ground potentials in the near exchange C are reversed over the line conductors of the trunk line 500; whereby the left-hand winding of the answer relay R740 in the trunk circuit 50 is poled to operate. Upon operating the answer relay R740 effects operation of the supervisory relay R520; the supervisory relay R520 effects restoration of the control relay R510 shortly thereafter; the control relay R510 effects restoration of the supervisory relay R610; and the supervisory relay R610 effects restoration of the reverse battery relay R730; all in the manner previously explained. Upon restoring the reverse battery relay R730 again reverses the polarity of the drying relay R750 and the line relay R760 with respect to the line conductors C881 and C882 of the trunk line 880A, without effect; and upon operating the supervisory relay R520 interrupts, at the contacts 525, the previously traced path for applying battery potential to the control conductor C884 of the trunk 880A and completes, at the contacts 524, a path including the contacts 665, 614 and 683, for applying ground potential to the control conductor C884. When battery potential is removed from and ground potential is applied to the control conductor C884 of the trunk 880A and consequently to the control conductor C2663Y extending into the sender control circuit 20Y, the circuit for maintaining operated the supervisory relay R3530Y is interrupted. Upon restoring the supervisory relay R3530Y initiates further operation of the impulse sender 21AY; whereby the next digit is transmitted therefrom over the loop including the line conductors C881 and C882 of the trunk 880A, causing the line relay R760 to follow. The line relay R760 brings about operation of the digit relay R810 and repeats, at the contacts 761, the impulses of the digit received over the loop circuit, including the trunk line 500, extending to the switching apparatus in the near exchange C; the digit relay R810 effects operation of the digit slave relay R620; and the digit slave relay R620 effects operation, through the first step, of the shunt relay R640; all in the manner previously explained. The hold relay R770 and the digit relay R810 are maintained operated durinjg the digit; and the operated digit relay R810 effects short-circuiting of the left-hand winding of the answer relay R740 and the consequent restoration of the latter relay; all in the manner previously described. Shortly following the conclusion of the present digit the line relay R760 remains operated effecting the restoration of the digit relay R810 shortly thereafter; upon restoring the digit relay R810 effects reoperation of the answer relay R740 and restoration of the digit slave relay R620 shortly thereafter; and upon restoring the digit slave relay R620 effects complete operation, through its second step, of the shunt relay R640; all in the manner previously described. In a similar manner, the next and remaining digits are transmitted from the impulse sender 21AY to the trunk circuit 50 and repeated by the line relay R760 over the trunk line 500 to the automatic switching apparatus in the next exchange C; whereby the final stage of the switching apparatus mentioned seizes the line extending to the called subscriber substation and tests the idle or busy condition thereof in a conventional manner.

Following the transmission of the last digit registered in the digit registers 21BY the impulse sender 21AY effects operation of the release relay R3610Y in the sender control circuit 20Y; whereby the loop circuit extending between the impulse sender 21AY and the drying relay R750 and the line relay R760 in the trunk circuit 50 is interrupted, at the contacts 3613Y. Also, upon operating, the release relay R3610Y completes, at the contacts 3612Y, a path for applying ground potential by way of the winding of the control relay R3600Y to the negative line conductor C2661Y, and consequently to the negative line conductor C881 of the trunk 880A; battery potential is connected by way of the lower winding of the line relay R760, the contacts 656, the lower winding of the drying relay R750, the contacts 727 and 652, the winding 631 of the repeater 630, the contacts 723 and 731 to the line conductor C881 of the trunk 880A in the trunk circuit 50. Accordingly, at this time, a series circuit is completed for operating the control relay R3600Y in the sender control circuit 20Y and the drying relay R750 in the trunk circuit 50 and for maintaining operated the line relay R760 in the trunk circuit 50. Upon operating the drying relay R750 completes, at the contacts 751, the previously traced circuit for operating the control relay R680. Upon operating the control relay R680 interrupts, at the contacts 683, the previously traced path for applying ground potential, at the contacts 665, to the control conductor C884 and completes, at the contacts 682, a path for applying battery potential by way of the windings of the intertoll relay R530 and the toll relay R540 to the control conductor C884. At this time, ground potential is applied by way of the contacts 3621Y of the operated hold relay R3620Y in the sender control circuit 20Y by way of the winding of the supervisory relay R3530Y and the contacts 3404Y to the control conductor C2663Y; whereby a series circuit is completed for energizing the winding of the supervisory relay R3530Y in the sender control circuit 20Y and the windings of the intertoll relay R530 and the toll relay R540 in the trunk circuit 50. When this series circuit is completed, the supervisory relay R3530 and the toll relay R540 operate; however, the intertoll relay R530 does not operate since it is of the marginal type. Upon operating the toll relay R540 effects operation of the toll slave relay R670; and the toll slave relay R670 effects operation of the switch relay R650; all in the manner previously explained. Also, the toll slave relay R670 completes, at the contacts 673, the previously traced circuit for maintaining operated the control relay R680; and upon operating the switch relay R650 completes, at the contacts 657, the previously traced holding circuit for maintaining itself operated. Further, the switch relay R650 completes, at the contacts 655, a circuit including the contacts 663, the resistor 685 and the contacts 727' for energizing the lower winding of the line relay R760, thereby to maintain the latter relay in its operated position after the previously traced series circuit for energizing the lower winding of the line relay R760, the lower winding of the drying relay R750 and the winding of the control relay R3600Y is interrupted. More particularly, the switch relay R650 interrupts, at the contacts 652 and 656, the series circuit mentioned; whereby the drying relay R750 in the trunk circuit 50 and the control relay R3600Y in the sender control circuit 20Y restore.

Shortly thereafter, the hold relay R3620Y in the sender control circuit 20Y restores to interrupt, at the contacts 3621Y, the previously traced series circuit for maintaining operated the supervisory relay R3530Y in the sender control circuit 20Y and the toll relay R540 in the trunk circuit 50. Upon restoring the toll relay R540 effects restoration of the toll slave relay R670 shortly thereafter, since it is of the slow-to-release type; and the toll slave relay R670 effects restoration of the control relay R680; all in the manner previously explained. Upon restoring the control relay R680 recompletes, at the contacts 683, the previously traced path including the contacts 665 for applying ground potential to the control conductor C884 of the trunk 880A; and by this time the hold slave relay R1610 has restored in the sender control circuit 20Y effecting restoration of the sender disconnect relay R3630Y; whereby the release relay R3610Y restores shortly thereafter bringing about the complete release of the sender control circuit 20Y and the associated register sender 21Y; whereupon the call switch 17Y of the link 15Y cuts through and is operatively connected to the position circuit 18Y in operator position No. 1 at the toll switchboard 11Y; all in the manner previously described. The application of ground potential in the trunk circuit 50 upon the control conductor C884 of the trunk 880A completes a circuit for effecting illumination of the front supervisory lamp 2516Y in order to indicate to the operator at operator position No. 1 at the toll switchboard 11Y that the call has been extended to the called subscriber substation in the near exchange C, but that the subscriber at the called subscriber substation has not, as yet, answered the call.

As previously noted, the final switching stage of the switching apparatus in the near exchange C tests the line extending to the called subscriber substation therein at this time; and assuming that the line mentioned is tested as being idle, ring current in the final switching stage is projected thereover in a conventional manner; and thereafter, when the subscriber at the called subscriber substation answers the call, the final switching stage in the near exchange C switches through in order to complete a conversation connection between operator position No. 1 at the toll switchboard 11Y in the central office B and the called subscriber substation in the near exchange C. Also, at this time, the final switching stage in the near exchange C operates in order to reverse battery and ground potentials over the trunk line 500; whereby the left-hand winding of the answer relay R740 in the trunk circuit 50 is poled in such a manner that it restores. Upon restoring the answer relay R740 effects operation of the supervisory relay R610; and upon operating the supervisory relay R610 interrupts, at the contacts 614, the previously traced path for applying ground potential to the control conductor C884 of the trunk 880A, thereby to effect extinguishing of the front supervisory lamp 2516Y in the link 15Y. When the front supervisory lamp 2516Y is extinguished, it indicates to the operator at position No. 1 at the toll switchboard 11Y that the call extended by way of the link 15Y has been answered at the called subscriber substation in the near exchange C. The operator mentioned then disconnects the link 15Y from her associated position circuit 18Y.

The subscriber at the called subscriber substation in the near exchange C may transmit switchhook and release supervisions to the operator at position No. 1 at the toll switchboard 11Y in the central office B by manipulating the switchhook at the called subscriber substation. For example, when the subscriber at the called subscriber substation in the near exchange C replaces the receiver of the telephone instrument thereat upon its associated switchhook, the final switching stage in the near exchange C operates in order to reverse the application of ground and battery potentials upon the trunk line 500, thereby to pole the left-hand winding of the answer relay R740 in the trunk circuit 50 in such a manner that the latter relay operates. Upon operating the answer relay R740 effects restoration of the supervisory relay R610; and upon restoring the supervisory relay R610 completes, at the contacts 614, the previously traced path including the contacts 665, for applying ground potential to the control conductor C884 of the trunk 880A; thereby to effect illumination of the front supervisory lamp 2516Y in the link 15Y; all in the manner previously explained. The illumination of the front supervisory lamp 2516Y indicates to the operator at position No. 1 at the toll switchboard 11Y that the call extended by way of the link 15Y has been released by the subscriber at the called subscriber substation in the near exchange C.

The operator mentioned then effects release of the call switch 17Y of the link 15Y; whereby the toll second selector 1412 and the toll third selector 1406 are released in a conventional manner in order to cause ground potential to be removed from the control conductor C883 of the trunk 880A. When ground potential is removed from the control conductor C883 the toll seizure relay R850 in the trunk circuit 50 restores, effecting the restoration of the switch relay R720; upon restoring the switch relay R720 interrupts, at the contacts 727', the previously traced holding circuit for energizing the lower winding of the line relay R760 in order to cause the latter relay to restore; all in the manner previously explained. Upon restoring the line relay R760 interrupts, at the contacts 761, the loop circuit extending by way of the trunk line 500 to the automatic switching apparatus in the near exchange C; whereby this switching apparatus is released marking the line extending to the called subscriber substation in the near exchange C as idle. Further, the line relay R760 effects the restoration of the hold relay R770 shortly thereafter; and the hold relay R770 effects the restoration of the shunt relay R640, the switch relay R650 and the supervisory relay R520; all in the manner previously explained. Further, the line relay R760 upon interrupting the loop extending by way of the trunk line 500 to the near exchange C, effects the restoration of the answer relay R740; and the supervisory relay R520 upon restoring recompletes, at the contacts 525, the previously traced original path for applying battery potential to the control conductor C884 of the trunk 880A; all in the manner previously explained. Finally, at this time, battery potential, by way of the winding of the local seizure relay R860, is applied to the control conductor C885 of the trunk 880B; thereby to mark this trunk as idle to the outgoing toll selectors 513X, etc., and 511X, etc., in the two groups having access thereto; and battery potential is applied by way of the winding of the toll seizure relay R850 to the control conductor C883 of the trunk 880A, thereby to mark this trunk as idle to the toll third selectors 1406, etc., having access thereto. At this time the trunk circuit 50 is completely released and the trunk line 500, extending between the central office B and the near exchange C, is available for further use.

In conjunction with the extension of the above described call from operator position No. 1 at the toll switchboard 11Y in the central office B to the called subscriber substation in the near automatic exchange C, it is noted that the final switching stage of the switching apparatus in the near exchange C might test the line extending to the called subscriber substation therein as being busy; whereupon the final switching stage operates to open the loop circuit including the trunk line 500, thereby to effect the restoration of the answer relay R740 in the trunk circuit 50. Also, the final switching stage of the switching apparatus in the near exchange C operates in order to return busy tone current over the trunk line 500. Upon restoring the answer relay R740 effects operation of the supervisory relay R610 and upon operating the supervisory relay R610 interrupts, at the contacts 614, the previously traced path for applying ground potential to the control conductor C884 of the trunk 880A; thereby to effect extinguishing of the front supervisory lamp 2516Y in the link 15Y in order to give the operator at position No. 1 at the toll switchboard 11Y answer supervision; however, at this time the busy tone current returned over the trunk line 500 is repeated by the trunk circuit 50 over the trunk 880A and the interposed switch train to the position circuit 18Y at operator position No. 1 at the toll switchboard 11Y in order to indicate the condition noted to the operator thereat.

Also, in conjunction with the extension of the above described call from operator position No. 1 at the toll switchboard 11Y in the central office B to the called subscriber substation in the near automatic exchange C, it is noted that the call switch 17Y of the link 15Y, the toll second selector 1412 or the toll third selector 1406, included in the switch train in the central office B, might have encountered an all-trunks-busy condition. In this event, the switch encountering the all-trunks-busy condition operates to open the loop circuit extending back into the sender control circuit 20Y at this time and to cause either 120 ground impulses per minute or 120 ground impulses per minute and 120 battery impulses per minute, interspersed, to be applied to the control conductor C2663Y extending into the sender control circuit 20Y depending upon the wiring employed in the switch. The application of 120 ground impulses per minute upon the control conductor C2663Y is without effect; whereby the register sender 21Y proceeds to transmit the remainder of the digits effecting release thereof and of the sender control circuit 20Y, and the ultimate cut through of the answer switch 17Y of the link 15Y in the manner previously explained. Accordingly, at this time, the 120 ground impulses per minute applied to the control conductor of the switch encountering the all-trunks-busy condition then effects intermittent flashing of the front supervisory lamp 2516Y in the link 15Y in order to indicate the condition mentioned to the operator at position No. 1 at the toll switchboard 11Y.

On the other hand, the application of 120 ground impulses per minute and 120 battery impulses per minute, interspersed, to the control conductor C2663Y extending into the sender control circuit 20Y brings about the premature and immediate release of the sender control circuit 20Y and the connected register sender 21Y; whereby the call switch 17Y of the link 15Y is cut through; all in the manner previously explained. At this time the application of 120 ground impulses per minute and 120 battery impulses per minute, interspersed, in the switch encountering the all-trunks-busy condition effects intermittent flashing of the front supervisory lamp 2516Y in the link 15Y in order to indicate the condition mentioned to the operator at position No. 1 at the toll switchboard 11Y.

Further, in conjunction with the extension of the above-described call from operator position No. 1 at the toll switchboard 11Y in the central office B to the called subscriber substation in the near exchange C, any one of the switching stages, preceding the final switching stage, in the automatic switching apparatus in the near exchange C may encounter an all-trunks-busy condition; whereupon the switching stage mentioned operates to open the loop circuit including the trunk line 500 extending back to the trunk circuit 50 and to cause busy tone current to be applied thereto. When the loop circuit including the trunk line 500 is thus opened, the answer relay R740 restores in order to effect operation of the supervisory relay R610 in the manner previously explained. When the supervisory relay R610 operates, at this time, it interrupts, at the contacts 614, the previously traced path including the contacts 665 for applying ground potential to the control conductor C884 of the trunk 880A and completes, at the contacts 613, an alternative path including the contacts 524 and 659, for applying battery potential by way of the resistor 526 to the control conductor C884. This application of battery potential to the control conductor C884 constitutes a delay-in-send signal transmitted back to the sender toll circuit 20Y bringing about operation of the supervisory relay R3530Y therein. At this time the supervisory relay R3530Y remains operated an abnormal time interval effecting operation of the timing apparatus disposed in the sender control circuit 20Y; whereby 120 ground impulses per minute are connected to the busy lamp 2604Y in the link 15Y. The flashing of the busy lamp 2604Y at a frequency of 120 per minute indicates to the operator at position No. 1 at the toll switchboard 11Y that the present call being extended via the link 15Y has reached a block switching stage in the near exchange C. The operator at position No. 1 at the toll switchboard 11Y then depresses the error key of the key set 22Y to effect the release of the sender control circuit 20Y and the connected impulse sender 21AY and digit registers 21BY. When the sender control circuit 20Y is thus released a relay change in the link 15Y is brought about, whereby the busy lamp 2604Y is flashed at a frequency of 60 per minute, thereby to indicate to the operator at position No. 1 at the toll switchboard 11Y that the sender control circuit 20Y and the connected register sender 21Y have been disconnected at this time from the link 15Y. The operator mentioned then proceeds to release the call switch 17Y of the link 15Y thereby to effect the release of the toll second selector 1412, the toll third selector 1406 and the trunk circuit 50 and the switching apparatus in the near exchange C in the manner previously explained.

*Call from the toll switchboard in the central office B to a subscriber substation in the remote exchange D*

A call originating in the central office B or extended thereto from the near exchange C is ultimately routed to the toll switchboard 11Y therein and may then be extended to the remote exchange D. For example, a toll call may be routed to operator position No. 1 at the toll switchboard 11Y via the answer switch 16Y of the link 15Y and connected to the position circuit 18Y, whereupon the operator thereat actuates the key set 22Y thereby to govern the sender control circuit 20Y and the connected impulse sender 21AY and digit registers 21BY; whereby digits are registered in the digit registers 21BY. The impulse sender 21AY is then governed by the digit registers 21BY in order to transmit the loop impulses of the first digit to the call switch 17Y of the link 15Y. The call switch 17Y of the link 15Y operates to select the group of toll second selectors, including the toll second selector 1412, and then to select an idle toll second selector in this group. Thereafter, the impulse sender 21AY transmits the loop impulses of the subsequent digits over the call switch 17Y to the outgoing toll train in a well-known manner. Assuming that the call switch 17Y of the link 15Y seizes the particular toll second selector 1412, the next digit is transmitted to the toll second selector 1412, thereby to cause it to operate and select the group of toll third selectors, including the toll third selector 1406, and then to select an idle toll third selector in this group. Assuming that the toll second selector 1412 selects the particular toll third selector 1406, the next digit is transmitted to the toll third selector 1406, thereby to cause it to operate and select the group of trunks including the trunk 1280A, extending to the group of trunk circuits, including the trunk circuit 90, and then to select an idle trunk in this group. Assuming that the toll third selector 1406 selects the particular trunk 1280A extending to the particular trunk circuit 90, the toll third selector 1406 operates to apply ground potential to the control conductor C1283 of the trunk 1280A, thereby to complete the previously traced circuit for operating the toll seizure relay R1180. Upon operating the toll seizure relay R1180 effects operation of the switch relay R1120; the switch relay R1120 effects operation of the delay relay R920; the delay relay R920 effects operation of the supervisory relay R935 shortly thereafter; and the switch relay R1120 connects the upper and lower windings of the line relay R1080 and the drying relay R1090 to the line conductors C1281 and C1282 of the trunk 1280A; all in the manner previously described. When the upper and lower windings of the line relay R1080 and the drying relay R1090 are connected to the line conductors C1281 and C1282 of the trunk 1280A, there is completed a circuit for energizing the windings of these two relays in series, since a simple loop circuit is completed across the line conductors of the trunk 1280A in the impulse sender 21AY by way of the interposed switch train. When the circuit mentioned is completed, the line relay R1080 operates; however, the drying relay R1090 does not operates as the loop circuit mentioned is balanced. Upon operating the line relay R1080 effects operation of the hold relay R1050 and completes, at the contacts 1083, the previously traced connection between the lower winding of the supervisory relay R1170 and the signal conductor C905; whereby battery potential is applied by way of the lower winding of the supervisory relay R1170 to the signal conductor C905 and to the connected simplex conductor C901, and consequently to the line conductors of the trunk line 900 extending to the remote exchange D. This application of battery potential by way of the lower winding of the supervisory relay R1170 to the simplex conductor C901 does not effect operation of the supervisory relay R1170, since it is of the marginal type; however, it does effect operation of the trunk circuit in the remote exchange D in order to cause the automatic switching apparatus therein to be associated with the trunk line 900; which operation may consume some time. Further, the toll seizure relay R1180 busies the trunk 1280B accessible to the outgoing toll selectors 513X, etc., as previously explained.

Also, when the toll third selector 1406 seizes the trunk 1280A, battery potential in the trunk circuit 90 is applied by way of the resistor 1027 and the contacts 1026 and 1062 to the control conductor C1284 of the trunk 1280A, and consequently by way of the interposed switch train to the control conductor C2663Y extending into the sender control circuit 20Y; whereupon the previously traced circuit for effecting operation of the supervisory relay R3530Y in the sender control circuit 20Y is completed. Upon operating the supervisory relay R3530Y arrests further operation of the impulse sender 21AY; all in the manner previously explained.

When the switching apparatus in the remote exchange D is associated with the trunk line 900 and is in readiness to receive a digit, low resistance ground potential therein is applied to the trunk line 900, and consequently to the simplex conductor C901 and the connected signal conductor C905; thereby to effect operation of the supervisory relay R1170 in the trunk circuit 90. Upon operating the supervisory relay R1170 effects operation of the supervisory slave relay R1150; and upon operating the supervisory slave relay R1150 effects operation of the control relay R1020; all in the manner previously described. Upon operating the control relay R1020 effects restoration of the delay relay R920 shortly thereafter; and upon restoring the delay relay R920 effects restoration of the supervisory relay R935. Upon operating the control relay R1020 interrupts, at the contacts 1026, the previously traced direct path for applying battery potential to the control conductor C1284 of the trunk 1280A; and upon restoring the supervisory relay R935 completes a path, including the contacts 1016, and 1025, for applying ground potential to the control conductor C1284. When battery potential is removed from and ground potential is applied to the control conductor C1284 of the trunk 1280A, and consequently with respect to the control conductor C2663Y extending into the sender control circuit 20Y, the previously traced circuit for maintaining operated the supervisory relay R3530Y in the sender control circuit 20Y is interrupted. Upon restoring the supervisory relay R3530Y effects further operation of the impulse sender 21AY; whereby an additional digit or digits are transmitted over the interposed switch-train to the trunk circuit 90.

The next digit received over the trunk 1280A from the impulse sender 21AY causes the line relay R1080 in the trunk circuit 90 to follow; whereby the digit relay R1030 is operated; and upon operating the digit relay R1030 effects operation through the first step of the shunt relay R940; all in the manner previously described. The hold relay R1050 and the digit relay R1030 remain operated during the digit; and the line relay R1080 repeats the impulses of the digit, at the contacts 1083, over the signal conductor C905 and the connected simplex conductor C901 and trunk line 900 to the first stage of the switching apparatus in the remote exchange D. The supervisory relay R1170 and the supervisory slave relay R1150 also follow the impulses of the digit without effect at this time. At the conclusion of the digit the line relay R1080 is retained in its operated position causing the supervisory relay R1170 and the supervisory slave relay R1150 to remain operated and causing the digit relay R1030 to restore shortly thereafter; and upon restoring the digit relay R1030 effects operation of the shunt relay R940 through its second step; all in the manner previously explained. At this time the trunk circuit 90 has received the first digit and repeated it over the trunk line 900 into the remote exchange D in order to effect corresponding operation of the first switching stage of the switching apparatus therein. The second and remaining digits are transmitted by the impulse sender 21AY to the trunk circuit 90 and repeated over the trunk line 900 to the automatic switching apparatus in the remote exchange D, in an identical manner; and, at this time, the final stage of the switching apparatus in the remote exchange D has selected the line extending to the called subscriber substation and operates to test the idle or busy condition thereof.

After the last digit has been transmitted by the impulse sender 21AY and release relay R3610Y in the sender control circuit 20Y is operated in order to interrupt, at the contacts 3613Y, the loop circuit extending to the trunk circuit 90 and to complete, at the contacts 3612Y, the previously traced path for applying ground potential by way of the winding of the control relay R3600Y to the negative line conductor C2661Y, and consequently to the negative line conductor C1281 of the trunk 1280A. At this time, battery potential is connected by way of the lower winding of the line relay R1080 in the trunk circuit 90, the contacts 956, the upper winding of the drying relay R1090, the contacts 1112, 1124 and 952, the winding 913 of the repeater 910, and the contacts 1122 to the negative line conductor C1281 of the trunk 1280A. Accordingly, at this time, a series circuit is completed for maintaining operated the line relay R1080 and for operating the drying relay R1090 in the trunk circuit 90 and for operating the control relay R3600Y in the sender control circuit 20Y. Upon operating the drying relay R1090 completes, at the contacts 1091, the previously traced circuit for operating the control relay R1060; and upon operating the control relay R1060 interrupts, at the contacts 1062, the previously traced path for applying ground potential to the control conductor C1284 of the trunk 1280A, and completes, at the contacts 1061, the previously traced path for connecting battery potential by way of the windings of the toll relay R925 and the intertoll relay R930 to the control conductor C1284. At this time a series circuit is completed for energizing the windings of the toll relay R925 and the intertoll relay R930 in the trunk circuit 90 and the winding of the supervisory relay R3530Y in the sender control circuit 20Y; whereby the supervisory relay R3530Y and the toll relay R925 operate; however, the intertoll relay R930 does not operate, since it is of the marginal type. Upon operating the toll relay R925 effects operation of the toll slave relay R1040; and upon operating the toll slave relay R1040 effects operation of the switch relay R950; all in the manner previously explained. Upon operating the switch relay R950 completes, at the contacts 955, a circuit including the contacts 1013 and the associated resistor for energizing the lower winding of the line relay R1080; thereby to retain the latter relay operated at this time. Further, the switch relay R950 interrupts, at the contacts 956 and 952, the previously traced series circuit for energizing the lower winding of the line relay R1080 and the upper winding of the drying relay R1090 in the trunk circuit 90 and the winding of the control relay R3600Y in the sender control circuit 20Y; whereby the drying relay R1090 and the control relay R3600Y restore.

Shortly thereafter, the hold relay R3620Y in the sender control circuit 20Y restores in order to interrupt, at the contacts 3621Y, the previously traced series circuit for maintaining operated the supervisory relay R3530Y in the sender control circuit 20Y and the toll relay R925 in the trunk circuit 90, as previously explained. Upon restoring the toll relay R925 effects the restoration of the toll slave relay R1040 shortly thereafter; and upon restoring the toll slave relay R1040 effects the restoration of the control relay R1060. Upon restoring the control relay R1060 completes, at the contacts 1062, a path including the contacts 1025, 939 and 1016 for applying ground potential to the control conductor C1284 of the trunk 1280A. By this time, the sender control circuit 20Y and the register sender 21Y have been completely released effecting cut through of the call switch 17Y of the link 15Y. Thus, the trunk 1280A is connected directly into the call switch 17Y at this time; whereby the application of ground potential upon the control conductor C1284 thereof is effective to illuminate the front supervisory lamp 2516Y in order to indicate to the operator at position No. 1 at the toll switchboard 11Y that the call has been extended to the called subscriber substation in the remote exchange D, but has not, as yet, been answered.

Assuming that the final switching stage of the switching apparatus in the remote exchange D tests the line extending to the called subscriber substation as being idle, ringing current in this final switching stage is projected thereover in a conventional manner; thereafter, when the subscriber at the called subscriber substation answers the call, the final switching stage in the remote exchange D switches through in order to complete a conversation conection between operator position No. 1 at the toll switchboard 11Y in the central office B and the called subscriber substation in the remote exchange D. Also, at this time the final switching stage in the remote exchange D operates in order to increase the resistance in the path for applying ground potential to the trunk line 900, and consequently to the simplex conductor C901 and the signal conductor C905; whereby the supervisory relay R1170 in the trunk circuit 90 restores, since it is of the marginal type. Upon restoring the supervisory relay R1170 effects restoration of the supervisory slave relay R1150; and upon restoring the supervisory slave relay R1150 effects operation of the supervisory relay R935; all in the manner previously explained. Upon operating the supervisory relay R935 interrupts, at the contacts 939, the previously traced path for applying ground potential to the control conductor C1284 of the trunk 1280A; thereby to cause the front supervisory lamp 2516Y in the link 15Y to be extinguished in order to indicate to the operator at position No. 1 at the toll switchboard 11Y in the central office B that the call has been answered by the subscriber at the called subscriber substation in the remote exchange D. The operator mentioned then effects the disconnection of the link 15Y from her position circuit 18Y.

The subscriber at the called subscriber substation in the remote exchange D may transmit switchhook and release supervision to the operator at position No. 1 at the toll switchboard 11Y in the central office B by manipulating the switchhook at the called subscriber substation. For example, when the subscriber at the called subscriber substation in the remote exchange D replaces the receiver of the telephone instrument thereat upon its associated switchhook, the final switching stage in the remote exchange D operates in order to reduce the resistance in the path for applying ground potential to the trunk line 900; thereby to effect reoperation of the supervisory relay R1170 in the trunk circuit 90. Upon operating the supervisory relay R1170 effects operation of the supervisory slave relay R1150 that, in turn, effects restoration of the supervisory relay R935; all in the manner previously described. Upon restoring the supervisory relay R935 completes, at the contacts 939, the previously traced path including the contacts 1016 for applying ground potential to the control conductor C1284 of the trunk 1280A; thereby to illuminate the front supervisory lamp 2516Y in the link 15Y in order to indicate the condition noted to the operator at position No. 1 at the toll switchboard in the central office B.

The operator at position No. 1 at the toll switchboard 11Y then proceeds to release the call switch 17Y of the link 15Y in order to effect the release of the toll second selector 1412 and the toll third selector 1406 in a conventional manner; whereby ground potential is removed from the control conductor C1283 of the trunk 1280A causing the toll seizure relay R1180 in the trunk circuit 90 to restore. Upon restoring the toll seizure relay R1180 effects the release of the switch relay R1120 and marks the trunk 1280B as idle to the outgoing toll selectors 513X, etc., having access thereto, all in the manner previously explained. Also, the toll seizure relay R1180 effects the release of the switch relay R950; upon restoring the switch relay R950 interrupts, at the contacts 955, the previously traced circuit for energizing the lower winding of the line relay R1080; thereby to cause the latter relay to restore; upon restoring the line relay R1080 effects the release of the hold relay R1050 shortly thereafter; and upon restoring the hold relay R1050 effects the restoration of the control relay R1020 and the shunt relay R940; all in the manner previously described. Upon restoring the switch relay R1120 interrupts, at the contacts 1124', the previously traced connection between the lower winding of the supervisory relay R1170 and the signal conductor C905; thereby to cause the latter relay to restore, effecting restoration of the supervisory slave relay R1150. Further the switch relay R1120 recompletes, at the contacts 1125', the previously traced normal connection between the inseizure relay R1240 and the signal conductor C905. Accordingly, at this time, the trunk circuit 90 is completely released, the trunk 1280A is marked as idle to the toll third selectors 1406, etc. having access thereto; and the trunk line 900 extending between the central office B and the remote exchange D is available for further use. Of course, it will be understood that when the lower winding of the supervisory relay R1170 is disconnected from the signal conductor C905 the switching apparatus in the remote exchange D is released in order to mark the line extending to the called subscriber substation therein as idle.

In conjunction with the extension of the above described call from operator position No. 1 at the toll switchboard 11Y in the central office B to the called subscriber substation in the remote exchange D, it is noted that the final switching stage of the switching apparatus in the remote exchange D might test the line extending to the called subscriber substation therein as being busy; whereupon the final switching stage operates to open the simplex circuit including the trunk line 900; whereby ground potential is removed from the simplex conductor C901 and the connected signal conductor C905 in order to effect the restoration of the supervisory relay R1170 in the trunk circuit 90. Also, the final switching stage of the switching apparatus in the remote exchange D operates in order to return busy tone current over the trunk line 900. Upon restoring the supervisory relay R1170 effects restoration of the supervisory slave relay R1150; upon restoring the supervisory slave relay R1150 effects operation of the supervisory relay R935; and upon operating the supervisory relay R935 interrupts, at the contacts 939, the previously traced path for applying ground potential to the control conductor C1284 of the trunk 1280A, thereby to effect extinguishing of the front supervisory lamp 2516Y in the link 15Y in order to give the operator at position No. 1 at the toll switchboard 11Y answer supervision; however, at this time, the busy tone current returned over the trunk line 900 is repeated by the trunk circuit 90 over the trunk 1280A and the interposed switch train to the position circuit 18Y at operator position No. 1 at the toll switchboard 11Y in order to indicate the condition noted to the operator thereat.

Also, in conjunction with the extension of the above described call from operator position No. 1 at the toll switchboard 11Y in the central office B to the called subscribed substation in the remote exchange D, the call switch 17Y of the link 15Y, the toll second selector 1412 or the toll third selector 1406 may encounter an all-trunks-busy condition; whereon the switch encountering the all-trunks-busy condition operates to open the loop circuit extending back into the impulse sender 21AY and to apply either 120 ground impulses per minute or 120 ground impulses per minute and 120 battery impulses per minute, interspersed, to the control conductor C2163Y extending into the sender control circuit 20Y. The application of 120 ground impulses per minute to the control conductor C2363Y is without effect; whereby the impulse sender 21AY operates to transmit the remainder of the digits registered in the digit registers 21BY, all without effect as previously explained. At this time the sender control circuit 20Y and the connected register sender 21Y are released and the call switch 17Y of the link 15Y is cut through; whereby the 120 ground impulses per minute applied in the switch encountering the all-trunks-busy condition effect corresponding flashing of the front supervisory lamp 2516Y in the link 15Y in order to indicate the conditions noted to the operator at position No. 1 at the toll switchboard 11Y. The operator at position No. 1 at the toll switchboard 11Y effects release of the call switch 17Y of the link 15Y, and consequently the operated portion of the outgoing toll switch train.

On the other hand, the application of 120 ground impulses per minute and 120 battery impulses per minute, interspersed, to the control conductor C2663Y extending to the sender control circuit 20Y brings about intermittent operation of the supervisory relay R3530Y, which is effective to cause premature release of the sender control circuit 20Y and the connected register sender 21Y; all in the manner previously explained. Accordingly, the call switch 17Y of the link 15Y is again switched through effecting corresponding flashing of the front supervisory lamp 2516Y in the link 15Y in order to indicate the condition noted to the operator at position No. 1 at the toll switchboard 11Y.

Further, it is pointed out in conjunction with the extension of the above-described call from operator position No. 1 at the toll switchboard 11Y in the central office B to the called subscriber substation in the remote exchange D that any switching stage, preceding the final switching stage, in the switching apparatus in the remote exchange D may encounter an all-trunks-busy condition; whereupon the switching stage mentioned operates in order to open the path for applying ground potential to the trunk line 900, and consequently to the simplex conductor C901 and the signal conductor C905; whereby the supervisory relay R1170 in the trunk circuit 90 restores. Also, the switching stage mentioned operates to apply busy tone current to the trunk line 900. Upon restoring the supervisory relay R1170 effects restoration of the supervisory slave relay R1150; upon restoring the supervisory slave relay R1150 effects operation of the supervisory relay R935; and upon operating the supervisory relay R935 interrupts, at the contacts 939, the previously traced path including the contacts 1016 for applying ground potential to the control conductor C1284 of the trunk 1280A and completes, at the contacts 938, a path including the contacts 959, 1025 and 1062 for applying battery potential by way of the resistor 1027 to the control conductor C1284. This application of battery potential to the control conductor C1284 of the trunk 1280A, and consequently to the control conductor C2663Y extending into the sender control circuit 20Y completes the previously traced circuit for effecting operation of the supervisory relay R3530Y in the sender control circuit 20Y. At this time supervisory relay R3530Y remains operated an abnormal time interval effecting operation of timing apparatus disposed in the sender control circuit 20Y; whereby 120 ground impulses per minute are connected to the busy lamp 2604Y in the link 15Y. The flashing of the busy lamp 2604Y at a frequency of 120 per minute indicates to the operator at position No. 1 at the toll switchboard 11Y that the present call being extended via the link 15Y has reached a block switching stage in the remote exchange D. The operator at position No. 1 at the toll switchboard 11Y then depresses the error key of the key set 22Y to effect the release of the sender control circuit 20Y and the connected impulse sender 21AY and digit registers 21BY. When the sender control circuit 20Y is thus released a relay change in the link 15Y is brought about, whereby the busy lamp 2604Y is flashed at a frequency of 60 per minute; thereby to indicate to the operator at position No. 1 at the toll switchboard 11Y that the sender control circuit 20Y and connected register sender 21Y have been disconnected at this time from the link 15Y. The operator mentioned then proceeds to release the call switch 17Y of the link 15Y, thereby to effect the release of the toll second selector 1412, the toll third selector 1406 and the trunk circuit 90 and the switching apparatus in the remote exchange D in the manner previously explained.

*Call from the toll switchboard to a subscriber substation in the central office B*

A toll call originating at the toll switchboard 11Y in the central office B, or extended thereto from a remote point, may be completed to a local subscriber substation therein. For example, a toll call may be routed to operator position No. 1 at the toll switchboard 11Y by way of the answer switch 16Y of the link 15Y and connected to the position circuit 18Y; whereupon the operator thereat actuates the key set 22Y thereby to govern the sender control circuit 20Y and the connected impulse sender 21AY and digit registers 21BY, whereby digits are registered in the digit registers 21BY. The impulse sender 21AY is then governed by the digit registers 21BY in order to transmit the loop impulses of the first digit to the call switch 17Y of the link 15Y. The call switch 17Y of the link 15Y operates to select the group of trunks, including the trunk 2100, extending to the group of local trunk circuits, including the local trunk circuit 210, and then to select an idle trunk in this group. Assuming that the call switch 17Y of the link 15Y seizes the particular trunk 2100 extending to the particular local trunk circuit 210, the call switch 17Y operates to apply ground potential to the control conductor C2103 of the trunk 2100, thereby to complete a circuit including the contacts 2111 for operating the seizure relay R2115 in the local trunk circuit 210. The trunk 2100 extending to the local trunk circuit 210 is marked as idle at this time by the presence of battery potential by way of the winding of the seizure relay R2115 and the contacts 2111 to the control conductor C2103 thereof, as a consequence of the toll second selector 1411 being idle at this time. More particularly, the toll second selector 1411 is individual to the local trunk 210 and is idle at this time, since the busy cut-off relay R2110 in the local trunk circuit 210 occupies its restored position. When the toll second selector 1411 is seized by one of the incoming selectors in the group, including the incoming selector 1403, it operates to cause ground potential to be applied to the control conductor C2198 of the trunk 2195 extending between the toll second selector 1411 and the local trunk circuit 210; which application of ground potential to the control conductor C2198 of the trunk 2195 completes a circuit including the contacts 2118 for operating the busy cut-off relay R2110 in the local circuit 210. Upon operating the busy cut-off relay R2110 interrupts, at the contacts 2111, the previously traced path for applying battery potential by way of the winding of the seizure relay R2115 to the control conductor C2103 of the trunk 2100 and completes, at the contacts 2112, an obvious path for applying ground potential to the control conductor C2103, thereby to mark the trunk 2100 as busy to the call switches 17Y, etc., of the links 15Y, etc., having access thereto.

Continuing now with the operation of the local trunk circuit 210 following seizure of the trunk 2100 by the call switch 17Y of the link 15Y, upon operating the seizure relay R2115 completes, at the contacts 2117, a path for applying ground potential to the control conductor C2198 of the trunk 2195 and completes, at the contacts 2119, a path including the contacts 2166, for applying ground potential to the control conductor C2199 of the trunk 2195. The application of ground potential to the control conductors C2198 and C2199 of the trunk 2195 extending to the toll second selector 1411 marks the toll second selector 1411 as busy to the incoming selectors 1403, etc., having access thereto.

Also, at this time the loop completed in the impulse sender 21AY is extended through the sender control circuit 20Y by way of the line conductors 2661Y and 2662Y and the call switch 17Y of the link 15Y to the line conductors C2101 and C2102 of the trunk 2100; the line conductor C2101 is connected by way of the contacts 2123, 2141 and 2161 to the line conductor C2196 of the trunk 2195; and the line conductor C2102 is connected by way of the contacts 2125, 2146 and 2165 to the line conductor C2197 of the trunk 2195. The line conductors C2196 and C2197 of the trunk 2195 extend to the line relay in the toll second selector 1411, thereby to complete a loop circuit for operating the latter relay in order to condition the toll second selector 1411 to respond to the next digit transmitted from the impulse sender 21AY.

The next digit transmitted from the impulse sender 21AY effects operation of the toll second selector 1411 in an obvious manner to select the group of toll third selectors including the toll third selector 1413, and then to select an idle toll third selector in this group. Assuming that the toll second selector 1411 selects the particular toll third selector 1413, the toll third selector 1413 responds to the next digit transmitted from the impulse sender 21AY and operates to select one of the groups of toll connectors and then an idle toll connector in the selected group. Assuming that the present call is to be extended to the ordinary subscriber substation TP in the central office B, the toll connector selected by the toll third selector 1413 has access to the subscriber line 407X extending to the called ordinary subscriber substation TP; then the toll connector in the group 1414 responds to the next two digits transmitted from the impulse sender 21AY to select the line 407X extending to the called ordinary subscriber substation TP; whereupon the toll connector in the group 1414 operates immediately to test the idle or busy condition thereof.

After all of the digits registered in the digit registers 21BY have been transmitted by the impulse sender 21AY the sender control circuit 20Y and the digit register sender 21Y are released as previously explained. More particularly, incident to the restoration of the hold relay R3620Y in the sender control circuit 20Y prior to the restoration of the release relay R3601Y, battery potential by way of the resistor 1612 and the contacts 3623, 3616 and 3404Y, is momentarily connected to the control conductor C2663Y, and consequently to the control conductor C2104 of the trunk 2100; thereby to complete a circuit including the contacts 2127 for energizing the upper winding of the switch relay R2120 in the local trunk circuit 210; whereby the latter relay operates. Upon operating the switch relay R2120 completes, at the contacts 2129, a holding circuit including the contacts 2116 for energizing the lower winding thereof and a multiple circuit including the contacts 2176 for energizing the winding of the control relay R2180; however, the latter relay does not operate immediately, as it is of the slow-to-operate type. Also, upon operating the switch relay R2120 interrupts, at the contacts 2123 and 2125, the previously traced connection between the line conductors C2101 and C2102 of the trunk 2100 and the line conductors C2196 and C2197 of the trunk 2195 and completes, at the contacts 2122 and 2124, a repeater bridge across the line conductors C2101 and C2102 of the trunk 2100. The bridge mentioned extends from the line conductor 2101 by way of the contacts 2122, the winding 2171 of the repeater 2170, the winding of the coin relay R2140, the resistor 2147 and the contacts 2163 to ground; and from the line conductor C2102 by way of the contacts 2124, the winding 2173 of the repeater 2170, the winding of the ring-up relay R2150 and the condenser 2149 to ground. Also, the switch relay R2120 completes, at the contacts 2121 and 2126 a repeater bridge across the line conductors C2196 and C2197 of the trunk 2195. This bridge extends from the line conductor C2196 by way of the contacts 2161, 2141, 2121, 2181, the winding 2172 of the repeater 2170, the winding of the test relay R2175, the contacts 2183, the winding 2174 of the repeater 2170 and the contacts 2126, 2146 and 2165 to the line conductor C2197.

In the event the toll connector in the group 1414 has not operated to dry the loop circuit extending back over the trunk 2195, the winding of the test relay R2175 is energized; whereby the latter relay operates to interrupt, at the contacts 2176, the previously traced circuit for energizing the winding of the control relay R2180 in order to prevent operation of the latter relay at this time. When the toll connector in the group 1414 operates to dry the loop circuit extending back over the trunk 2195 the circuit for maintaining operated the test relay R2175 is interrupted, causing the latter relay to restore in order to recomplete at the contacts 2176 the previously traced circuit for energizing the winding of the control relay R2180; whereby the latter relay operates shortly thereafter.

Upon operating the control relay R2180 interrupts, at the contacts 2183, the previously traced repeater bridge including the winding of the test relay R2175; interrupts, at the contacts 2181, an obvious normally completed path for short circuiting the lower winding of the tone relay R2130; and completes, at the contacts 2182 and 2184, a path for bridging the upper and lower windings of the supervisory relay R2190 in series with the lower winding of the tone relay R2130 across the line conductors C2196 and C2197 of the trunk 2195 extending to the toll connector in the group 1414. The bridge mentioned extends from ground by way of the lower winding of R2190, the contacts 2184, the winding 2174 of the repeater 2170, the contacts 2126, 2146 and 2165 to the line conductor C2197; and from battery by way of the upper winding of R2190, the contacts 2182, the winding 2172 of the repeater 2170, the lower winding of R2130, the contacts 2121, 2141 and 2161 to the line conductor C2196. When this bridge is completed neither the supervisory relay R2190 nor the tone relay R2130 operates, due to the high impedance included in the bridge circuit in the toll connector in the group 1414. Moreover, at this time the application of ground potential in the local trunk circuit 210 to the control conductor C2199 prevents operation of the toll connector in the group 1414 to project ringing current over the line 407X, extending to the called ordinary subscriber substation TP even though the latter subscriber substation is tested as being idle at this time. Further, upon operating the control relay R2180 completes, at the contacts 2185, a path including the contacts 2193 and 2128 for applying ground potential to the control conductor C2104 of the trunk 2100; thereby to effect illumination of the front supervisory lamp 2516Y in the link 15Y; thereby to indicate to the operator at position No. 1 at the toll switchboard 11Y that the call has been extended to the called subscriber substation in the central office B.

At this time, in the event the toll connector in the group 1414 tests the line 407X extending to the called ordinary subscriber substation as busy, it operates in order to return busy tone current over the previously traced bridge connection including the line conductors of the trunk 2195; whereby the busy tone current is repeated over the line conductors of the trunk 2100 extending back to the position circuit 18Y at operator position No. 1 at the toll switchboard 11Y; thereby to indicate the condition noted to the operator position mentioned. On the other hand, in the event the toll connector in the group 1414 tests the line 407X extending to the called ordinary subscriber substation TP as idle no further operation takes place at this time. When the operator at position No. 1 at the toll switchboard 11Y desires to signal the subscriber at the called ordinary subscriber substation TP, she momentarily operates her ring front key, thereby to cause ringing current to be applied to the line conductor C2102 of the trunk 2100 completing an obvious circuit substantially identical to that previously traced for operating the ring-up relay R2150. Upon operating the ring-up relay R2150 completes, at the contacts 2151, a circuit including the contacts 2144 and 2185, for energizing the winding of the ring relay R2160, thereby to cause the latter relay to operate shortly thereafter, since it is of the combination slow-to-operate and slow-to-release type. When the operator at position No. 1 at the toll switchboard 11Y returns the ring front key in her position circuit 18Y to its normal position, the circuit for operating the ring-up relay R2150 is interrupted and the latter relay restores interrupting, at the contacts 2151, the above traced circuit for maintaining operated the ring relay R2160; whereby the latter relay restores shortly thereafter. Upon operating the ring relay R2160 interrupts, at the contacts 2161 and 2165, the connection between the line conductors C2196 and C2197 of the trunk 2195 and the upper and lower windings of the supervisory relay R2190 and completes, at the contacts 2162 and 2164, an obvious path including the generator conductor C2148 for projecting ringing current over the line conductors C2196 and C2197; which is without particular effect at this time. Also, upon operating the ring relay R2160 interrupts, at the contacts 2166, the previously traced path for applying ground potential to the control conductor C2199 of the trunk 2195, thereby to cause the ring cut off relay in the toll connector in the group 1414 to restore and institute automatic ringing over the line 407X extending to the called ordinary subscriber substation TP. When the ring relay R2160 again restores it returns the local trunk circuit 210 to the prior condition wherein the upper and lower windings of the supervisory relay R2190 and the lower winding of the tone relay R2130 are bridged across the line conductors C2196 and C2197 of the trunk 2195.

When the ring cut off relay in the toll connector in the group 1414 restores in order to initiate automatic ringing over the line 407X, as previously noted, the impedance in the above traced circuit including the upper and lower windings of the supervisory relay R2190 and the lower winding of the tone relay R2130 is reduced somewhat, thereby to effect partial operation of the tone relay R2130 without effecting operation of the supervisory relay R2190. More particularly, the tone relay R2130 operates partially to close, at the contacts 2131, a circuit including the contacts 2192, the condenser 2178 and the tone connector 2177 for energizing the upper winding thereof. The tone current traversing the circuit traced including the upper winding of the tone relay R2130 induces a corresponding tone voltage in the lower winding of the tone relay R2130 which is impressed across the windings 2172 and 2174 of the repeater 2170; whereby a similar tone voltage is induced in the windings 2171 and 2173 of the repeater 2170 causing a corresponding tone current to be returned to the position circuit 18Y at operator position No. 1 at the toll switchboard 11Y, thereby to indicate to the operator thereat that the called ordinary subscriber substation TP is being rung.

When the subscriber at the called ordinary subscriber substation TP answers the call the toll connector in the group 1414 operates to cut off the projection of ringing current over the line 407X and switches through further reducing the impedance of the previously traced circuit including the line conductors C2196 and C2197 of the trunk 2195; whereby the tone relay R2130 operates fully. When the tone relay R2130 operates fully it interrupts, at the contacts 2133 an end termination circuit including the resistor 2134 and the condenser 2135 bridged across the windings 2172 and 2174 of the repeater 2170 and completes, at the contacts 2132, an obvious path for short circuiting the lower winding thereof. When the lower winding of the tone relay R2130 is thus short circuited the impedance of the previously traced circuit including the upper and lower windings of the supervisory relay R2190 and the line conductors C2196 and C2197 of the trunk 2195 is further reduced; whereby the supervisory relay R2190 operates. Upon operating the supervisory relay R2190 completes, at the contacts 2191, a holding circuit including the contacts 2131 for energizing the upper winding of the tone relay R2130 thereby to retain the latter relay in its operated position; and interrupts, at the contacts 2192, the previously traced circuit including the tone conductor C2177 for energizing the upper winding of the tone relay R2130. Also, the supervisory relay R2190 interrupts, at the contacts 2193, the previously traced path for applying ground potential to the control conductor C2104 of the trunk 2100 thereby to extinguish the front supervisory lamp 2516Y in the link 15Y in order to give the operator at position No. 1 at the toll switchboard 11Y answer supervision. At this time a telephone connection is completed between the calling operator position No. 1 at the toll switchboard 11Y and the called ordinary subscriber substation TP in the central office B.

The subscriber at the called ordinary subscriber substation TP may transmit switchhook and release supervisions to the operator at position No. 1 at the toll switchboard 11Y by manipulating the switchhook at the called ordinary subscriber substation TP. For example, when the subscriber at the called ordinary subscriber substation TP replaces the receiver of the telephone instrument thereat upon its associated switchhook the toll connector in the group 1414 operates in order to increase the impedance in the previously traced circuit including the line conductors C2196 and C2197 of the trunk 2195, thereby to effect restoration of the supervisory relay R2190 in the local trunk circuit 210. Upon restoring the supervisory relay R2190 recompletes, at the contacts 2193, the previously traced path for applying ground potential to the control conductor C2104 of the trunk 2100 in order, again, to illuminate the front supervisory lamp 2516Y in the link 15Y; thereby to give the operator at position No. 1 at the toll switchboard 11Y disconnect supervision. The operator at position No. 1 at the toll switchboard 11Y then proceeds with the release of the call switch 17Y of the line 15Y; whereby ground potential is removed from the control conductor C2103 of the trunk 2100 in order to effect the restoration of the seizure relay R2115 in the local trunk circuit 210. Upon restoring the seizure relay R2115 interrupts, at the contacts 2116, the previously traced holding circuit for energizing the lower winding of the switch relay R2120 and the winding of the control relay R2180 in multiple; whereby the relays mentioned restore. Also, the seizure relay R2115 interrupts, at the contacts 2117, the previously mentioned path for applying ground potential to the control conductor C2198 of the trunk 2195 thereby to effect release of the toll second selector 1411, the toll third selector 1413 and the toll connector in the group 1414 in a conventional manner; whereby the line 407X extended to the called ordinary subscriber substation TP is marked as idle to the switching apparatus having access thereto. Upon restoring the switch relay R2120, interrupts, at the contacts 2121 and 2126, the previously traced bridge connection between the upper and lower windings of the supervisory relay R2190 and the line conductors C2196 and C2197 of the trunk 2195 and recompletes, at the contacts 2123 and 2125, the previously traced original connection between the line conductors C2101 and C2102 of the trunk 2100 and the line conductors C2196 and C2197 of the trunk 2195. Also, upon restoring the supervisory relay R2190 interrupts, at the contacts 2191, the previously traced holding circuit for energizing the upper winding of the tone relay R2130 thereby to cause the latter relay to restore. At this time the local trunk circuit 210 is completely released; the trunk 2100 extending thereto is marked as idle to the answer switches 17Y, etc., of the links 15Y, etc., having access thereto by the application of battery potential by way of the winding of the seizure relay R2115 to the control conductor 2103 of the trunk 2100. Also, the toll second selector 1411 is marked as idle to the incoming selectors 1403, etc., having access thereto by the application of battery potential by way of the winding of the busy cut off relay R2110 to the control conductor C2198 of the trunk 2195.

In conjunction with the extension of the above-described connection between operator position No. 1 at the toll switchboard 11Y and the called ordinary subscriber substation TP, it is noted that after the subscriber at the called ordinary subscriber substation TP renders disconnect supervision in the manner explained above, the operator at position No. 1 at the toll switchboard 11Y may desire again to communicate with him. In order to accomplish this end the operator at position No. 1 at the toll switchboard 11Y operates the ring front key in the position circuit 18Y, thereby to effect operation of the ring-up relay R2150 in the manner previously explained, whereby the ring relay R2160 is operated. Upon operating the ring relay R2160 completes, at the contacts 2162 and 2164, the previously traced circuit for projecting ringing current from the local trunk circuit 210 over the trunk 2195 and the interposed switch train and over the line 407X extending to the called ordinary subscriber substation TP. Subsequently, when the operator returns the ring front key in the position circuit 18Y the ring-up relay R2150 restores effecting the restoration of the ring relay R2160. When the subscriber at the called ordinary subscriber substation TP again answers the call, the previously traced circuit for operating the supervisory relay R2190 in the local trunk circuit 210 is again completed in order to cause the latter relay to reoperate. Upon operating the supervisory relay R2190 interrupts, at the contacts 2193, the previously traced path for applying ground potential to the control conductor C2104 of the trunk 2100 in order again to extinguish the front supervisory lamp 2516Y in the link 15Y in order to indicate to the operator at position No. 1 at the toll switchboard 11Y the condition noted.

Also, in conjunction with the extension of the above-described call from operator position No. 1 at the toll switchboard 11Y to the called ordinary subscriber substation TP, the call switch 16Y of the link 15Y, the toll second selector 1411 or the toll third selector 1413 may encounter an all-trunks-busy condition; whereupon the switch encountering the all-trunks-busy condition operates to open the loop circuit extending back over the trunk 2195 to the local trunk 210 and to apply either 120 ground impulses per minute or 120 ground impulses per minute and 120 battery impulses per minute, interspersed, to the control conductor C2199 of the trunk 2195. However, the impulse sender 21AY continues to transmit the remainder of the digits registered in the digit registers 21BY, whereupon the sender control circuit 20Y and the connected register sender 21Y are released effecting cut-through of the call switch 17Y of the link 15Y; all in the manner previously explained. In this case, after all of the digits have been received by the local trunk circuit 210 the switch relay R2120 and the control relay R2180 are operated as previously explained; whereby ground potential is applied to the control conductor C2104 of the trunk 2100 effecting illumination of the front supervisory lamp 2516Y in the link 15Y. The operator at position No. 1 at the toll switchboard 11Y then proceeds to project ringing current over the trunk 2100 in order to effect operation of the ring-up relay R2150 and the ring relay R2160 as previously explained. However, upon operating the ring relay R2160 produces no results when it interrupts, at the contacts 2166, the application of ground potential upon the control conductor C2199. Accordingly, no high impedance circuit is completed subsequent to the restoration of the relays R2150 and R2160 for energizing the lower winding of the tone relay R2130, thus the tone relay R2130 fails to operate partially; whereby no ring back tone is conducted over the trunk 2100 to the position circuit 18Y at operator position No. 1 at the toll switchboard 11Y; and the operator thereat immediately perceives that one of the selectors in the toll switch train has encountered an all-trunks-busy condition. The application of 120 ground impulses per minute or 120 ground impulses per minute and 120 battery impulses per minute, interspersed, to the control conductor C2199 of the trunk 2195 in the switch encountering the all-trunks-busy condition is without effect in the local trunk circuit 210.

*Call from the near exchange C to the central office B*

A trunk call originating at a calling subscriber substation in the near exchange C is first extended by the automatic switching apparatus therein to one of the trunk lines in the group including the trunk line 500 extending from the near exchange C to the central office B. Assuming that the switching apparatus mentioned seizes the particular trunk line 500, a loop circuit is completed therein between the line conductors C501 and C502 of the trunk line 500. At this time, in the trunk circuit 50, ground is connected by way of the upper winding of the line relay R830, the contacts 724, the winding 636 of the repeater 630 and the contacts 508 to the line conductor C502 of the trunk line 500; and battery is connected by way of the lower winding of the relay R830, the contacts 728, the winding 634 of the repeater 630 and the contacts 721 and 506 to the line conductor C501 of the trunk line 500. Accordingly, the upper and lower windings of the line relay R830 are energized causing the latter relay to operate and completes, at the contacts 832, an obvious circuit for operating the hold relay R820. Upon operating the hold relay R820 completes, at the contacts 821, an obvious circuit for operating the busy relay R840. Upon operating the busy relay R840 completes, at the contacts 841, an obvious path for applying ground potential to the control conductor C873 of the trunk 870 extending to the incoming selector 1422, the incoming selector mentioned being individual to the trunk circuit 50; whereby the incoming selector 1422 is seized for use. Also, the busy relay R840 completes, at the contacts 842, a path including the contacts 861 for applying ground potential to the control conductor C883 of the trunk 880A thereby to mark the trunk 880A, and consequently the toll line circuit 50, as busy to the toll third selectors 1406, etc., having access thereto. Further, the busy relay R840 completes, at the contacts 845, an obvious path for applying ground potential to the control conductor C885 of the trunk 880B, thereby to mark the trunk 880B, and consequently the trunk circuit 50, as busy to the outgoing toll selectors 513X, etc., and 511X, etc., in the two groups having access thereto. Also, the busy relay R840 completes, at the contacts 844, an obvious circuit for energizing the right hand winding of the answer relay R740, thereby to render the latter relay fast-to-operate when the left hand winding thereof is subsequently energized and properly poled; and completes, at the contacts 847, an obvious circuit for energizing in series the upper and lower windings of the shunt relay R640, thereby to cause the latter relay to operate completely. Upon operating the shunt relay R640 completes, at the contacts 643, a holding circuit including the contacts 844 for energizing in series the upper and lower windings thereof. Also, the shunt relay R640 interrupts, at the contacts 641 and 642, the previously mentioned paths for respectively short circuiting the windings 631 and 633 of the repeater 630. Also upon operating the hold relay R820 completes, at the contacts 822, a loop circuit extending between the trunk circuit 50 and the incoming selector 1422 and including the trunk 870. The loop circuit mentioned extends from the line conductor C871 of the trunk 870 by way of the contacts 831, the winding 631 of the repeater 630, the contacts 652 and 726, the left hand winding of the answer relay R740, the contacts 721′ and 654, the winding 633 of the repeater 630 and the contacts 822 to the line conductor C872 of the trunk 870; battery and ground potentials being applied to the line conductors C871 and C872 in the incoming selector 1422. When the above traced loop circuit is completed, the answer relay R740 does not operate, since the left hand winding thereof, although energized, is not properly poled; however, the incoming selector 1422 is prepared to operate in response to a digit transmitted over the trunk 870 from the trunk circuit 50.

The subscriber at the calling subscriber substation in the near exchange C then proceeds to dial the first digit over the trunk line 500; whereby the line relay R830 follows the impulses of the digit mentioned. The first time the line relay R830 restores it completes, at the contacts 833, a circuit including the contacts 824 for operating the digit relay R810. Upon operating the digit relay R810 completes, at the contacts 811, the previously traced path including the resistor 780 for short circuiting the left hand winding of the answer relay R740, thereby to reduce the impedance of the loop circuit extending by way of the trunk 870 to the incoming selector 1422. Also, upon operating the digit relay R810 completes, at the contacts 812, an obvious circuit for operating the digit slave relay R620. Upon operating the digit slave relay R620 completes, at the contacts 621 and 622, obvious paths for short circuiting the windings 636 and 633 of the repeater 630, thereby further to reduce the impedance of the incoming and outgoing loop circuits. Both the hold relay R820 and the digit relay R810 being of the slow-to-release type remain operated during the digit, the digit relay R810 maintaining operated the digit slave relay R620. Each time the line relay R830 restores and then reoperates it interrupts and then recompletes, at the contacts 831, the previously traced loop circuit extending by way of the trunk 870 to the incoming selector 1422; whereby the impulses of the digit received by the line relay R830 over the incoming loop circuit including the trunk line 500 are repeated over the outgoing loop circuit including the trunk 870 to the incoming selector 1422, thereby to effect corresponding operation thereof.

At the conclusion of the digit the line relay R830 is retained operated in order to retain operated the hold relay R820; and shortly thereafter the digit relay R810 restores in order to interrupt, at the contacts 811, the previously traced path for short circuiting the left hand winding of the answer relay R740; and to interrupt, at the contacts 812, the circuit for maintaining operated the digit slave relay R620. Shortly thereafter, the digit slave relay R620 restores, it being of the slow-to-release type, to interrupt at the contacts 621 and 622, the paths for short circuiting the windings 636 and 633 of the repeater 630. It will be understood that the incoming selector 1422 responds to the first digit repeated thereto from the trunk circuit 50 in a conventional manner.

The present call may be extended either to the toll switchboard 11Y or to a called subscriber substation in the central office B. Assuming that it is to be extended to a called subscriber substation, such, for example as the ordinary subscriber substation TP, the incoming selector 1422 operated to select the group of first selectors, including the first selector 501X, and then to select an idle first selector in this group. Assuming that the incoming selector 1422 seized the particular first selector 501X, the next digit repeated by the trunk circuit 50 effects operation thereof to select the group of second selectors, including the second selector 502X, and then to select an idle second selector in this group. Assuming that the first selector 501X seizes the particular second selector 502X, the next digit repeated by the circuit 50 effects operation thereof to select the group of individual connectors, including the individual connectors 525'X, and then to select an idle individual connector in this group. Assuming that the second selector 502X seizes the particular individual connectors 525'X, the next two digits repeated by the trunk circuit 50 effect operation thereof to select the line 407X extending to the called ordinary subscriber substation TP. The individual connector 525'X then proceeds with the testing of the idle or busy condition of the line 407X extending to the called ordinary subscriber substation TP in a conventional manner.

Assuming that the called ordinary subscriber substation TP is tested as busy at this time, the individual connector 525'X operates to return busy tone current over the interposed switch train to the trunk circuit 50; which busy tone current is repeated over the trunk line 500 and the switching apparatus in the near exchange C to the calling subscriber substation therein. The subscriber at the calling subscriber substation in the near exchange C initiates the release of the associated switching apparatus; whereby the trunk circuit 50 and the switching apparatus in the central office B are released in a manner more fully explained hereinafter.

On the other hand, assuming that the individual connector 525'X tests the line 407X extending to the called ordinary subscriber substation TP as being idle, it operates to project ringing current thereover and to return ring back tone current over the interposed switch train to the trunk circuit 50, and consequently over the trunk line 500 and the switching apparatus in the near exchange C to the calling subscriber substation therein. When the subscriber at the called ordinary subscriber substation TP in the central office B answers the call the individual connector 525'X switches through thereby to complete a conversation connection between the calling subscriber substation in the near exchange C and the called ordinary subscriber substation TP in the central office B and to reverse the polarity over the trunk 870; whereby the left hand winding of the answer relay R740 in the trunk circuit 50 is poled to operate. Upon operating the answer relay R470 completes, at the contacts 741, a circuit including the contacts 724' for operating the reverse battery relay R505. Upon operating the reverse battery relay R505 reverses, at the contacts 506, 507, 508 and 509, the polarity of the line conductors C501 and C502 of the trunk line 500 with respect to the line relay R830 in the trunk circuit 50. This reversal of ground and battery potentials over the line conductors of the trunk 500 is employed to give answer supervision to the switching apparatus in the near exchange C.

At the conclusion of the connection when the subscriber at the called ordinary subscriber substation TP replaces the receiver of the telephone instrument thereat upon its associated switchhook, the individual connector 525'X again operates to reverse the polarity over the trunk 870; whereby the left hand winding of the answer relay R740 is poled to cause the latter relay to restore. Upon restoring the answer relay R740 interrupts, at the contacts 741, the previously traced circuit for maintaining operated the reverse battery relay R505. Upon restoring the reverse battery relay R505, at the contacts 506, 507, 508 and 509, reverses the polarity of the line conductor of the trunk line 500 with respect to the line relay R830 in the trunk circuit 50. This reversal of ground and battery potentials over the line conductors of the trunk line 500 is employed to give release supervision to the switching apparatus in the near exchange C. When the subscriber at the calling subscriber substation in the near exchange C then replaces the receiver of the telephone instrument thereat upon its associated switchhook the automatic switching apparatus in the near exchange C is released in a conventional manner opening the loop circuit extending by way of the trunk line 500 to the line relay R830 in the trunk circuit 50. The line relay R830 then restores to interrupt, at the contacts 832, the previously mentioned circuit for maintaining operated the hold relay R820, thereby to cause the latter relay to restore shortly thereafter, it being of the slow-to-release type. Upon restoring, the hold relay R820 interrupts, at the contacts 821, the previously traced circuit for maintaining operated the busy relay R840. Upon restoring the busy relay R840 interrupts, at the contacts 841, the previously traced path for applying ground potential to the control conductor C873 of the trunk 870 extending to the incoming selector 1422; whereby the incoming selector 1422, the first selector 501X, the second selector 502X and the individual connector 525'X are all released in a conventional manner; the individual connector 525'X marking the line 407X extending to the called ordinary subscriber substation TP in the central office B as idle. Also the busy relay R840 interrupts, at the contacts 842, the previously traced path for applying ground potential to the control conductor C883 of the trunk 880A and recompletes, at the contacts 843, the previously traced circuit for applying battery potential by way of the winding of the toll seizure relay R850 to the control conductor C883, thereby to mark the trunk 880A as idle to the toll third selectors 1406, etc., having access thereto. Also, the busy relay R840 interrupts, at the contacts 845, the previously traced path for applying ground potential to the control conductor C885 of the trunk 880B and recompletes at the contacts 846, the previously traced path for applying battery potential by way of the winding of the local seizure relay R860 to the control conductor C885, thereby to mark the trunk 880B as idle to the outgoing toll selectors 513X, etc., and 511X, etc., in the two groups having access thereto. Further, the busy relay R840 interrupts, at the contacts 844, the previously traced circuit for energizing the right hand winding of the answer relay R740 and the multiple circuit for maintaining operated the shunt relay R640. At this time the trunk circuit 50 is completely released and the trunk line 500 extending between the central office B and the near exchange C is available for further use.

In conjunction with the extension of the above described call from the calling subscriber substation in the near exchange C to the called ordinary subscriber substation TP in the central office B, the incoming selector 1422, the first selector 501X or the second selector 502X may encounter an all-trunks-busy condition; whereupon the switch encountering the all-trunks-busy condition operates to open the loop circuit extending back into the trunk circuit 50 by way of the trunk 870 and to apply busy tone current to the trunk 870. The busy tone current applied to the trunk 870 is repeated by the trunk circuit 50 over the trunk line 500 to the calling subscriber substation in the near exchange C, thereby to indicate the condition noted to the calling subscriber substation therein. The subscriber at the calling subscriber substation in the near exchange C then proceeds with the release of the connection in the manner previously explained.

As previously noted, after the above-described call is initiated at the calling subscriber substation in the near exchange C and extended via the trunk line 500, the trunk circuit 50 and the trunk 870 to the incoming selector 1422, it may be further extended to the toll switchboard 11Y in the central office B. In order to accomplish this end the digit transmitted to the incoming selector 1422 is effective to cause it to operate and select the group of C. L. R. trunk circuits, including the C. L. R. trunk circuit 23Y, and then to select an idle C. L. R. circuit in this group. Assuming that the incoming selector 1422 seizes the particular C. L. R. trunk circuit 23Y, the C. L. R. trunk circuit 23Y controls the common start circuit 12Y which, in turn, controls the position distributor 13Y. More particularly, the position distributor 13Y assigns this outward call to be answered at one of the operator positions at the toll switchboard 11Y, such, for example, as operator position No. 1 illustrated. Accordingly, at this time both the common start circuit 12Y and the position distributor 13Y forward controls to the position circuit 18Y at operator position No. 1, whereby operation of the answer switch of one of the associated links is initiated, the particular link having been previously assigned by the associated link distributor 19Y. Assuming that the link distributor 19Y has previously assigned the link 15Y at this time, the answer switch 16Y of the link 15Y operates to find the C. L. R. trunk circuit 23Y; the position of the C. L. R. trunk circuit 23Y before the answer switch 16Y being marked thereto by the common start circuit 12Y and by the C. L. R. trunk circuit 23Y; as described in detail in the Balzer patent. Accordingly, at this time, the C. L. R. trunk circuit 23Y is connected via the answer switch 16Y of the link 15Y to the position circuit 18Y at operator position No. 1 at the toll switchboard 11Y.

When the call is thus routed to operator position No. 1 at the toll switchboard 11Y, the C. L. R. trunk circuit 23Y is controlled in order to effect the reversal of polarity over the interposed switch train and the trunk 870, thereby to effect operation of the answer relay R740 in trunk circuit 50. Upon operating the answer relay R740 effects operation of the reverse battery relay R505; whereby the polarity of the trunk line 500 is reversed with respect to the line relay R830; in order to transmit answer supervision to the automatic switching apparatus in the near exchange C. At this time a connection is completed between the calling subscriber substation in the near exchange C and operator position No. 1 at the toll switchboard 11Y. Upon learning the destination of the call the operator at position No. 1 at the toll switchboard 11Y actuates the key set 22Y, thereby to govern the sender control circuit 20Y and the connected impulse sender 21AY and digit registers 21BY; whereby digits are registered in the digit registers 21BY. The impulse sender 21AY then governs operation of the call switch 17Y of the link 15Y and the subsequent switches in the outgoing toll switch train thereby to extend the call; all in the manner previously described. After the call is thus extended by the operator at operator position No. 1 at the toll switchboard 11Y the sender control circuit 20Y and the register sender 21Y are automatically released; and thereafter the link 15Y is disconnected from the position circuit 18Y.

The subscriber at the calling subscriber substation in the near exchange C may transmit switchhook and release supervision to the operator at position No. 1 at the toll switchboard 11Y in the central office B by manipulating the switchhook at the calling subscriber substation. For example, when the subscriber at the calling subscriber substation in the near exchange C replaces the receiver of the telephone instrument thereat upon its associated switchhook the switching apparatus in the near exchange C is released in a conventional manner, effecting the release of the trunk circuit 50 and the incoming selector 1422; all in the manner previously explained. When the incoming selector 1422 is thus released the C. L. R. trunk circuit 23Y operates in order to bring about illumination of the rear supervisory lamp 2603Y in the link 15Y, thereby to indicate the condition noted to the operator at position No. 1 at the toll switchboard 11Y. The operator at position No. 1 then proceeds to release the answer switch 16Y of the link 15Y, whereby the C. L. R. trunk circuit 23Y is marked as idle to the switching apparatus in the central office B having access thereto.

*Call from the remote exchange D to the central office B*

A trunk call originating at a calling subscriber substation in the remote exchange D is first extended by the automatic switching apparatus therein to one of the trunk lines in the group including the trunk line 900 extending from the remote exchange D to the central office B. Assuming that the switching apparatus mentioned seizes the particular trunk line 900, ground potential in this automatic switching apparatus is removed from the trunk line 900 and battery potential therein is applied thereto. When ground potential is removed from the trunk line 900 and battery potential is applied thereto, and consequently to the connected simplex conductor C901 and the signal conductor C905, a circuit including the contacts 1144, 1125′ and 1162, is completed for operating the inseizure relay R1240 in the trunk circuit 90. Upon operating the inseizure relay R1240 completes, at the contacts 1241, an obvious circuit for operating the hold relay R1250; upon operating the hold relay R1250 completes, at the contacts 1251, an obvious circuit for operating the busy relay R1230; upon operating the busy relay R1230 interrupts, at the contacts 1231, the previously traced path for applying battery potential by way of the winding of the local seizure relay R1130 to the control conductor C1285 of the trunk 1280B and completes, at the contacts 1232 an obvious path for applying ground potential to the control conductor C1285, thereby to mark the trunk 1280B as busy to the outgoing toll selectors 513X, etc., having access thereto. Also, the busy relay R1230 interrupts, at the contacts 1234, a normally completed path including the contacts 1051 for applying battery potential by way of the winding of the busy relay R1140 to the control conductor C1273 of the trunk 1270 extending to the incoming selector 1421 and completes, at the contacts 1235, an obvious path for applying ground potential to the control conductor C1273; whereby the incoming selector 1421 is seized; the incoming selector 1421 being individual to the trunk circuit 90. Further, the busy relay R1230 interrupts, at the contacts 1238, the previously traced path for applying battery potential by way of the winding of the toll seizure relay R1180 to the control conductor C1283 of the trunk 1280A and completes, at the contacts 1237, an obvious path for applying ground potential to the control conductor C1283, thereby to mark the trunk 1280A as busy to the toll third selectors 1406, etc., having access thereto.

Further, the hold relay R1250 completes, at the contacts 1252 and 1253, paths for applying ground potential by way of the 400 ohm resistor 1256 and battery potential by way of the 3,000 ohm resistor 1257 to one terminal of the lower winding of the inimpulse relay R1260; and completes, at the contacts 1255, a path including the contacts 1162, 1125′ and 1144 for connecting the other terminal of the lower winding of the inimpulse relay R1260 to the signal conductor C905. Further, the hold relay R1250 completes, at the contacts 1254, a circuit including the 27,000 ohm resistor 1258 and the contacts 1224 for energizing the upper winding of the inimpulse relay R1260. At this time, the upper winding of the inimpulse relay R1260 is energized and poled to operate and the lower winding of the inimpulse relay R1260 is energized and poled to operate; the inimpulse relay R1260 being of the polarized type. Accordingly, the inimpulse relay R1260 operates, completing, at the contacts 1261, a circuit including the contacts 1233 for operating the repeat relay R1220. Upon operating the repeat relay R1220 completes, at the contacts 1221, a loop circuit extending by way of the trunk 1270 between the trunk circuit 90 and the incoming selector 1421; this loop circuit extending from the line conductor C1271 of the trunk 1270 by way of the contacts 1221, 1121, 941, 952 and 1123, the left hand winding of the answer relay R1160, the contacts 1125, 954, 942 and 1121′ to the line conductor C1272 of the trunk 1270. When this loop circuit is completed the left hand winding of the answer relay R1160 is energized but it is not poled to operate; moreover, the right hand winding of the answer relay R1160 is energized by way of a circuit completed at the contacts 1233 of the operated busy relay R1230. At this time, the answer relay R1160 is rendered fast-to-operate when the left hand winding thereof is ultimately poled to operate, since it is of the shunt field type. Also, the repeat relay R1220 completes, at the contacts 1222, an obvious circuit for operating the hold relay R1210 and interrupts, at the contacts 1224, the previously traced circuit for energizing the upper winding of the inimpulse relay R1260; however, the inimpulse relay R1260 does not restore at this time, but is rendered exceedingly fast to restore when battery potential is later removed from the signal conductor C905. Upon operating the hold relay R1210 completes, at the contacts 1212, an obvious multiple holding circuit for maintaining operated the hold relay R1250 and interrupts, at the contacts 1213, an end termination circuit including the contacts 937, the resistor 907 and the condensor 906 across the windings 911 and 912 of the repeater 910; and completes, at the contacts 1214, an obvious circuit for energizing in series the upper and lower windings of the shunt relay R940. When the upper and lower windings of the shunt relay R940 are thus energized it operates completely to interrupt, at the contacts 941 and 942, the previously mentioned paths for respectively short circuiting the windings 913 and 914 of the repeater 910, thereby to prepare the repeater 910 for conversation. When the above traced loop circuit was completed between the trunk circuit 90 and the incoming selector 1421 by way of the trunk 1270, the incoming selector 1421 was conditioned to be operated in response to a digit repeated thereto over the trunk 1270 from the trunk circuit 90.

The subscriber at the calling subscriber substation in the remote exchange D then proceeds to dial the first digit over the trunk line 900; whereby the switching apparatus therein operates in order to remove battery potential from and to connect ground potential to the trunk line 900; and conversely; a plurality of times corresponding to the impulses of the digit. Each time battery potential is removed from and ground potential is applied to the trunk line 900, and consequently with respect to the simplex conductor C901 and the signal conductor C905, the circuit for energizing in multiple the winding of the inseizure relay R1240 and the lower winding of the inimpulse relay R1260 is interrupted; and the application of ground potential to the signal conductor C905 completes a path for short circuiting the winding of the inseizure relay R1240 and a circuit for energizing the lower winding of the inimpulse relay R1260 in the opposite direction; whereby the inimpulse relay R1260 is rendered fast to restore. The inseizure relay R1240 is rendered slightly slow-to-release; and upon restoring interrupts, at the contacts 1241, one of the multiple circuits for maintaining operated the hold relay R1250; however, the latter relay is maintained operated by the other completed holding circuit therefor; moreover, it is of the slow-to-release type. Upon restoring the inimpulse relay R1260 interrupts, at the contacts 1261, the previously traced circuit for maintaining operated the repeat relay R1220; and upon restoring the repeat relay R1220 interrupts at the contacts 1222, the previously mentioned circuit for maintaining operated the hold relay R1210; however, the latter relay does not restore immediately, since it is of the slow-to-release type. Also, the repeat relay R1220 recompletes, at the contacts 1224, the previously traced circuit for energizing the upper winding of the inimpulse relay R1260, thereby to pole the latter relay to be exceedingly fast to operate when battery potential is ultimately returned upon the signal conductor C905. Further, the repeat relay R1220 completes, at the contacts 1223, a circuit including the contacts 1211 for operating the digit relay R1190; and upon operating the digit relay R1190 completes, at the contacts 1191, a bridge path including the resistor 1192 across the line conductors C1271 and C1272 of the trunk 1270, thereby to improve impulsing between the trunk circuit 90 and the incoming selector 1421 over the trunk 1270. Finally, the repeat relay R1220 interrupts, at the contacts 1221, the loop circuit mentioned extending between the trunk circuit 90 and the incoming selector 1421.

Subsequently, when battery potential is returned upon the signal conductor C905 the previously traced multiple circuits for energizing the winding of the inseizure relay R1240 and the lower winding of the inimpulse relay R1260 are recompleted; whereby the inseizure relay R1240 operates in order to recomplete, at the contacts 1241, the previously mentioned circuit for maintaining operated the hold relay R1250. Also, at this time, the lower winding of the inimpulse relay R1260 is energized; whereby the latter relay operates exceedingly fast to recomplete, at the contacts 1261, the previously traced circuit for operating the repeat relay R1220. Upon reoperating the repeat relay R1220 again completes, at the contacts 1222, the previously mentioned circuit for maintaining operated the hold relay R1210 and interrupts, at the contacts 1223, the previously traced circuit for maintaining operated the digit relay R1190; however, the latter relay does not immediately restore as it is of the slow-to-release type. Also the repeat relay R1220 again interrupts, at the contacts 1224, the previously traced circuit for energizing the upper winding of the inimpulse relay R1260, thereby to render the latter relay exceedingly fast to restore when ground potential is returned upon the signal conductor C905. Finally, the repeat relay R1220 recompletes, at the contacts 1221, the loop circuit mentioned extending between the trunk circuit 90 and the incoming selector 1421. In view of the foregoing description, it will be understood that the inimpulse relay R1260 follows the impulses of the present digit causing the repeat relay R1220 to repeat the impulses of the digit over the loop circuit extending between the trunk circuit 90 and the incoming selector 1421. Moreover, since the hold relays R1210 and R1250 and the digit relay R1190 are of the slow-to-release type, these relays remain operated during the digit. At the conclusion of the digit battery potential is returned upon the signal conductor C905 thereby to maintain operated the inseizure relay R1240 and the inimpulse relay R1260, and consequently the repeat relay R1220 and the hold relays R1210 and R1250; whereby the loop circuit extending between the trunk circuit 90 and the incoming selector 1421 is maintained completed. Also, shortly following the conclusion of the digit the operated repeat relay R1220 causes the digit relay R1190 to restore, since the latter relay is of the slow-to-release type. Upon restoring the digit relay R1190 interrupts, at the contacts 1191, the previously traced bridge path including the resistor 1192 across the line conductors of the trunk 1270, whereby the left hand winding of the answer relay R1160 is included in the loop circuit previously traced. Thus the impulses of the digit received by the inimpulse relay R1260 in the trunk circuit 90 are repeated by the repeat relay R1220 over the loop circuit extending to the incoming selector 1421 in order to cause corresponding operation thereof.

The present call may be extended either to the toll switchboard 11Y or to a called subscriber substation in the central office B. Assuming that it is to be extended to a called subscriber substation, such, for example, as the ordinary subscriber substation TP, the incoming selector 1421 operated to select the group of first selectors, including the first selector 501X, and then to select an idle first selector in this group. Assuming that the incoming selector 1421 seized the particular first selector 501X, the next digit repeated by the trunk circuit 90 effects operation thereof to select the group of second selectors, including the second selector 502X, and then to select an idle second selector in this group. Assuming that the first selector 501X seizes the particular second selector 502X, the next digit repeated by the circuit 90 effects operation thereof to select the group of individual connectors, including the individual connectors 525′X, and then to select an idle individual connector in this group. Assuming that the second selector 502X seizes the particular individual connector 525′X, the next two digits repeated by the trunk circuit 90 effect operation thereof to select the line 407X extending to the called ordinary subscriber substation TP. The individual connector 525′X then proceeds with the testing of the idle or busy condition of the line 407X extending to the called ordinary subscriber substation TP in a conventional manner.

Assuming that the called ordinary subscriber substation TP is tested as busy at this time, the individual connector 525′X operates to return busy tone current over the interposed switch train to the trunk circuit 90; which busy tone current is repeated over the trunk line 900 and the switching apparatus in the remote exchange D to the called subscriber substation therein. The subscriber at the calling subscriber substation in the remote exchange D initiates the release of the associated switching apparatus, whereby the trunk circuit 90 and the switching apparatus in the central office B are released in a manner more fully explained hereinafter.

On the other hand, assuming that the individual connector 525′X tests the line 407X extending to the called ordinary subscriber substation TP as being idle, it operates to project ringing current thereover and to return ring back tone current over the interposed switch train to the trunk circuit 90, and consequently over the trunk line 900 and the switching apparatus in the remote exchange D to the calling subscriber substation therein. When the subscriber at the called ordinary subscriber substation TP in the central office B answers the call the individual connector 525′X switches through, thereby to complete a conversation connection between the calling subscriber substation in the remote exchange D and the called ordinary subscriber substation TP in the central office B and to reverse the polarity of the trunk 1270; whereby the left hand winding of the answer relay R1160 in the trunk circuit 90 is poled to operate. Upon operating the answer relay R1160 completes, at the contacts 1163, a holding circuit including the resistor 1164 and the contacts 1153 for maintaining operated the inseizure relay R1240, and a multiple circuit including the contacts 1255 and 1252 and the resistor 1256 for energizing the lower winding of the inimpulse relay R1260, thereby to retain the latter relay in its operated position. Also, the answer relay R1160 interrupts, at the contacts 1162, the connection between the winding of the inseizure relay R1240 and the signal conductor C905 in order to interrupt in the trunk circuit 90 the application of resistance ground potential thereto. Further, the answer relay R1160 completes, at the contacts 1161, a path including the contacts 1125' and 1144 for connecting battery potential by way of the upper winding of the supervisory relay R1170 to the signal conductor C905. The removal of ground potential and the application of battery potential to the signal conductor C905 and the trunk line 900 give the automatic switching apparatus in the remote exchange D answer supervision.

At the conclusion of the connection when the subscriber at the called ordinary subscriber substation TP replaced the receiver of the telephone instrument thereat upon its associated switchhook, the individual connector 525'X again operates to reverse the polarity of the trunk 1270, whereby the left hand winding of the answer relay R1160 is poled to cause the latter relay to restore. Upon restoring the answer relay R1160 interrupts, at the contacts 1163, the previously traced holding circuit for maintaining operated the inseizure relay R1240 and the inimpulse relay R1260; and recompletes, at the contacts 1162, the previously traced connection between the inseizure relay R1240 and the lower winding of the inimpulse relay R1260 and the signal conductor C905; thereby to maintain operated the relays mentioned. Further, the answer relay R1160 interrupts, at the contacts 1161, the previously traced path for applying battery potential by way of the upper winding of the supervisory relay R1170 to the signal conductor C905. Accordingly, at this time, in the trunk circuit 90 battery potential is removed from and ground potential is applied to the signal conductor C905, and consequently with respect to the simplex conductor C901 and the trunk line 900, thereby to give the automatic switching apparatus in the remote exchange D release supervision. When the subscriber at the calling subscriber substation in the remote exchange D then replaces the receiver of the telephone instrument thereat upon its associated switchhook the automatic switching apparatus in the remote exchange D is released in a conventional manner removing battery potential from and replacing ground potential upon the trunk line 900, and consequently upon the simplex conductor C901 and the signal conductor C905 in order to effect restoration of both the inseizure relay R1240 and the inimpulse relay R1260 in the trunk circuit 90. Upon restoring the inimpulse relay R1260 interrupts, at the contacts 1261, the previously traced circuit for maintaining operated the repeat relay R1220; upon restoring the repeat relay R1220 interrupts, at the contacts 1222, the previously mentioned circuit for maintaining operated the hold relay R1210, thereby to cause the latter relay to restore shortly thereafter, it being of the slow-to-release type. Upon restoring the hold relay R1210 interrupts, at the contacts 1214, the previously traced circuit for maintaining operated the shunt relay R940; and interrupts, at the contacts 1212, the previously traced multiple circuit for maintaining operated the hold relay R1250; whereby the latter relay restores shortly thereafter, since it is of the slow-to-release type. Upon restoring the hold relay R1250 interrupts, at the contacts 1251, the previously mentioned circuit for maintaining operated the busy relay R1230; and interrupts, at the contacts 1252, 1253, 1254 and 1255 the connections between the upper and lower windings of the inimpulse relay R1260 and the signal conductor C905; upon restoring the busy relay R1230 interrupts, at the contacts 1232, the previously mentioned path for applying ground potential to the control conductor C1285 of the trunk 1280B; and recompletes, at the contacts 1231, the previously traced path for applying battery potential by way of the winding of the local seizure relay R1130 to the control conductor C1285, thereby to mark the trunk 1280B as idle to the outgoing toll selectors 513X, etc., having access thereto. Also, the busy relay R1230 interrupts, at the contacts 1235, the previously mentioned path for applying ground potential to the control conductor C1273 of the trunk 1270 extending to the incoming selector 1421; whereby the incoming selector 1421, the first selector 501X, the second selector 502X and the individual connector 525'X are all released in a conventional manner; the individual connector 525'X marking the line 407X extending to the called ordinary subscriber substation TP in the central office B as idle. Further, the busy relay R1230 interrupts, at the contacts 1233, the previously mentioned circuit for energizing the right hand winding of the answer relay R1160; and recompletes, at the contacts 1234, the previously traced path for applying battery potential by way of the winding of the busy relay R1140 to the control conductor C1273 of the trunk 1270, thereby to mark the associated incoming selector 1421 as idle. Further, the busy relay R1230 interrupts, at the contacts 1237, the previously mentioned path for applying ground potential to the control conductor C1283 of the trunk 1280A; and recompletes, at the contacts 1238, the previously traced path for applying battery potential by way of the winding of the toll seizure relay R1180 to the control conductor C1283, thereby to mark the trunk 1280A as idle to the toll third selectors 1406, etc., having access thereto. At this time, the trunk circuit 90 is completely released and the trunk line 900 extending between the central office B and the remote exchange D is available for further use.

In conjunction with the extension of the above described call from the calling subscriber substation in the remote exchange D to the called ordinary subscriber substation TP in the central office B, the incoming selector 1421, the first selector 501X or the second selector 502X may encounter an all-trunks-busy condition; whereupon the swtich encountering the all-trunks-busy condition operates to open the loop circuit extending back into the trunk circuit 90 by way of the trunk 1270 and to apply busy tone current to the trunk 1270. The busy tone current applied to the trunk 1270 is repeated by the trunk circuit 90 over the trunk line 900 to the calling subscriber substation in the remote exchange D, thereby to indicate the condition noted to the calling subscriber substation therein. The subscriber at the calling subscriber substation in the remote exchange D then proceeds with the release of the connection in the manner previously explained.

As previously noted, after the above described call is initiated at the calling subscriber substation in the remote exchange D and extended via the trunk line 900, the trunk circuit 90 and the trunk 1270 to the incoming selector 1421 it may be further extended to the toll switchboard 11Y in the central office B. In order to accomplish this end the digit transmitted to the incoming selector 1421 is effective to cause it to operate and select the group of C.L.R. trunk circuits, including the C.L.R. trunk circuit 23Y, and then to select an idle C.L.R. circuit in this group. Assuming that the incoming selector 1421 seizes the 23Y, the C.L.R. trunk circuit 23Y controls the common start circuit 12Y which, in turn, controls the position distributor 13Y. More particularly, the position distributor 13Y assigns this outward call to be answered at one of the operator positions at the toll switchboard 11Y, such, for example, as operator position No. 1 illustrated. Accordingly, at this time, both the common start circuit 12Y and the position distributor 13Y forward controls to the position circuit 18Y at operator position No. 1; whereby operation of the answer switch of one of the associated links is initiated, the particular link having been previously assigned by the associated link distributor 19Y. Assuming that the link distributor 19Y has previously assigned the link 15Y at this time, the answer switch 16Y of the link 15Y operates to find the C.L.R. trunk circuit 23Y; the position of the C.L.R. circuit 23Y before the answer switch 16Y being marked thereto by the common start circuit 12Y and by the C.L.R. trunk circuit 23Y; as described in detail in the Balzer patent. Accordingly, at this time, the C.L.R. circuit 23Y is connected via the answer switch 16Y of the link 15Y to the position circuit 18Y at operator position No. 1 at the toll switchboard 11Y.

When the call is thus routed to operator position No. 1 at the toll switchboard 11Y, the C.L.R. trunk circuit 23Y is controlled in order to effect the reversal of polarity over the interposed switch train and the trunk 1270, thereby to effect operation of the answer relay R1160 in the trunk circuit 90. Upon operating the answer relay R1160 effects the connection previously traced of the upper winding of the supervisory relay R1170 to the signal conductor C905; whereby battery potential in the trunk circuit 90 is applied to the signal conductor C905 and the connected simplex conductor C901 and trunk line 900 in order to transmit answer supervision to the automatic switching apparatus in the remote exchange D. At this time a connection is completed between a calling subscriber substation in the remote exchange D and operator position No. 1 at the toll switchboard 11Y. Upon learning the destination of the call the operator at position No. 1 at the toll switchboard 11Y actuates the key set 22Y, thereby to cause the sender control circuit 20Y and the connected impulse sender 21AY and digit registers 21BY to operate; whereby digits are registered in the digit registers 21BY. The impulse sender 21AY then governs operation of the call switch 17Y of the link 15Y and the subsequent switches in the outgoing toll switch train, thereby to extend the call; all in the manner previously described. After the call is thus extended by the operator position No. 1 at the toll switchboard 11Y, the sender control circuit 20Y and the register sender 21Y are automatically released; and thereafter the link 15Y is disconnected from the position circuit 18Y.

The subscriber at the calling subscriber substation in the remote exchange D may transmit switchhook and release supervision to the operator at position No. 1 at the toll switchboard 11Y in the central office B by manipulating the switchhook at the calling subscriber substation. For example, when the subscriber at the calling subscriber substation in the remote exchange D replaces the receiver of the telephone instrument thereat upon its associated switchhook the switching apparatus in the remote exchange D is released in a conventional manner effecting release of the trunk circuit 90 and the incoming selector 1421; all in the manner previously described. When the incoming selector 1421 is thus released the C. L. R. trunk circuit 23Y operates in order to bring about illumination of the rear supervisory lamp 2603Y in the link 15Y, thereby to indicate the condition noted to the operator at position No. 1 at the toll switchboard 11Y. The operator at position No. 1 then proceeds to release the answer switch 16Y of the link 15Y; whereby the C. L. R. trunk circuit 23Y is marked as idle to the switching apparatus in the central office B having access thereto.

*Call from a subscriber substation to the toll switchboard in the central office B*

When a call is initiated at a subscriber substation in the central office B, an idle primary selector is automatically associated with the line extending to the calling subscriber substation. For example, when a call is initiated at the ordinary subscriber substation TP by removing the receiver of the telephone instrument thereat from its associated switchhook, a bridge is completed between the line conductors of the line 407X extending thereto, bringing about operation of the individually associated line switch 423X. The line switch 423X operates to find a trunk extending to an idle primary selector in the associated group, including the primary selector 600X. Assuming that the line switch 423X seizes the particular trunk 462X extending to the particular primary selector 600X, the associated finder F610X operates to find an idle primary register, such, for example, as the primary register 1200X. When the primary register 1200X is connected by the finder F610X to the primary selector 600X, there is completed a loop circuit including the trunk 462X, the line switch 423X and the line 407X extending to the calling ordinary subscriber substation TP; and the primary register 1200X operates in order to return dial tone current over this loop circuit, thereby to indicate to the subscriber at the calling ordinary subscriber substation TP that he may proceed with dialing.

In order to extend the connection from the calling ordinary subscriber substation TP to the toll switchboard 11Y, the subscriber mentioned dials the single digit 0; whereby the primary selector 600X is operated in accordance with the digit 0 to select the group of C. L. R. circuits, including the C. L. R. trunk circuit 23Y; and the digit 0 is registered in the first code switch in the primary register 1200X. At the conclusion of the first digit 0 the primary register 1200X operates to interrupt the application of dial tone current to the loop circuit extending to the calling ordinary subscriber substation TP. The registration of the digit 0 in the first code switch in the primary register 1200X also indicates that a register translator will not be required in conjunction with the present call and, further, that the primary register 1200X may be released, since the call is to be routed to the toll switchboard 11Y. Accordingly, the primary register 1200X is released and the primary selector 600X operates automatically to find an idle C. L. R. trunk circuit in the group, including the C. L. R. trunk circuit 23Y. Assuming that the primary selector 600X seizes the particular C. L. R. trunk circuit 23Y, the C. L. R. trunk circuit 23Y controls the common start circuit 12Y, which, in turn, controls the position distributor 13Y. More particularly, the position distributor 13Y assigns this outward call to be answered at one of the operator positions at the toll switchboard 11Y, such, for example, as operator position No. 1 illustrated. Accordingly, at this time, both the common start circuit 12Y and the position distributor 13Y forward controls to the position circuit 18Y at operator position No. 1, whereby operation of the answer switch of one of the associated links is initiated, the particular link having been previously assigned by the associated link distributor 19Y. Assuming that the link distributor 19Y has previously assigned the link 15Y at this time, the answer switch 16Y of the link 15Y operates to find the C. L. R. trunk circuit 23Y; the position of the C. L. R. trunk circuit 23Y before the answer switch 16Y being marked thereto by the common start circuit 12Y and by the C. L. R. trunk circuit 23Y; as described in detail in the Balzer patent. Accordingly, at this time, the C. L. R. circuit 23Y is connected via the answer switch 16Y of the link 15Y to the position circuit 18Y at operator position No. 1 at the toll switchboard 11Y.

When the call is thus routed to operator position No. 1 at the toll switchboard 11Y, a telephone connection is established between the calling ordinary subscriber substation TP and operator position No. 1 at the toll switchboard 11Y. Upon learning the destination of the call the operator at position No. 1 at the toll switchboard 11Y actuates the key set 22Y, thereby to govern the sender control circuit 20Y and the connected impulse sender 21AY and digit registers 21BY; whereby the digits are registered in the digit registers 21BY. The impulse sender 21AY then governs operation of the call switch 17Y of the link 15Y and subsequently the switches in the outgoing switch train thereby to extend the call; all in the manner previously described. After the call is thus extended by the operator at position No. 1 at the toll switchboard 11Y, the sender control circuit 20Y and the register sender 21AY are automatically released; and thereafter the link 15Y is disconnected from the position circuit 18Y.

The subscriber at the calling ordinary subscriber substation TP may transmit switchhook and release supervisions to the operator at position No. 1 at the toll switchboard 11Y by manipulating the switchhook at the calling ordinary subscriber substation TP. For example, when the subscriber at the calling ordinary subscriber substation TP replaces the receiver of the telephone instrument thereat upon its associated switchhook, the primary selector 600X is released, effecting operation of the C. L. R. trunk circuit 23Y, in order to bring about illumination of the rear supervisory lamp 2603Y in the link 15Y, thereby to indicate the condition noted to the operator at position No. 1 at the toll switchboard 11Y. The operator at position No. 1 then proceeds to release the answer switch 16Y of the link 15Y; whereby the C. L. R. trunk circuit 23Y is marked as idle to the switching apparatus having access thereto.

In conjunction with the extension of the above described call from the calling ordinary subscriber substation TP to the toll switchboard 11Y, the primary selector 600X may encounter an all-trunks-busy condition; whereupon it operates in order to return busy tone current over the loop circuit extending back to the calling ordinary subscriber substation TP; thereby to indicate the condition noted to the subscriber at the calling ordinary subscriber substation TP. The subscriber at the calling ordinary subscriber substation TP then effects the release of the primary selector 600X by replacing the receiver of the telephone instrument thereat upon its associated switchhook, as previously explained.

In view of the foregoing explanation of the mode of operation of the primary selector 600X and the primary register 1200X to effect extension of a call from the calling ordinary subscriber substation TP to the toll switchboard 11Y it will be understood that this equipment is operated in a substantially identical manner to effect the extension of a call from any one of the calling party subscriber substations TS1, TS2, TS3 and TS4 to the toll switchboard 11Y. Also the primary selector 441X and the primary register 1200X are operated in a substantially identical manner to effect the extension of a call from the calling extended trunk service subscriber substation TX, or from the calling denied trunk service subscriber substation TD to the toll switchboard 11Y.

*Local call from one subscriber substation to another in the central office B*

Now, assuming that the call extending from the calling ordinary subscriber substation TP to the primary selector 600X and to the primary register 1200X is to be extended to the called extended trunk service subscriber substation TX in the central office B, the subscriber at the calling ordinary subscriber substation TP proceeds to dial the directory number of the called extended trunk service subscriber substation TX. The directory number of the called extended trunk service subscriber substation TX comprises a code portion including the digits 8, 4 and 4, identifying the called central office B, and a numerical portion including the digits 0, 9, 0 and 1, identifying the terminal of the line 401X extending thereto. Thus, the directory number of the called extended trunk service subscriber substation TX is 844–0901.

Accordingly, the subscriber at the calling ordinary subscriber substation dials the first code digit 8, the second code digit 4 and the third code digit 4. The first code digit 8 effects corresponding operation of the primary selector 600X to select a corresponding group of trunks; and the first code digit 8 is also registered in the first code switch in the primary register 1200X, whereupon the primary register 1200X operates in order to interrupt the return of dial tone current over the loop circuit extending back to the calling ordinary subscriber substation TP. The registration of the first digit 8 in the first code switch in the primary register 1200X does not indicate that a register translator 1700X, etc., is necessary, so that no selection of an idle register translator 1700X, etc., is made at this time; nor does this registration in the primary register 1200X indicate that the primary register 1200X is not needed further so that the primary register 1200X is retained connected to the primary selector 600X; however, the registration of the first code digit 8 in the primary register 1200X indicates that the group of trunks selected by the primary selector 600X is an improper one; and accordingly, the primary register 1200X effects the release of the primary selector 600X at this time. Also, the primary register 1200X conditions itself to test the impulses of the second code digit 4 in order to determine whether the present calling subscriber substation is on a party line and, if so, to determine its position on the party line.

The second code digit 4 is registered in the second code switch in the primary register 1200X; and during reception of the second code digit 4 the primary register 1200X prevents operation of the primary selector 600X. Also, during the reception of the second code digit 4 the primary register 1200X determines whether the calling subscriber substation is connected to a line of the party type; which, of course, is not the case of the line 407X extending to the calling ordinary subscriber substation TP. The registration of the second code digit 4 in the second code switch, in conjunction with the registration of the first code digit 8 in the first code switch, in the primary selector 1200X do not indicate that a register translator 1700X, etc., is necessary so that no selection of an idle register translator 1700X, etc., is made at this time; nor do these registrations in the primary register 1200X indicate that the primary register 1200X is not needed further; so that the primary register 1200X is retained connected to the primary selector 600X.

The third code digit 4 is registered in the third code switch in the primary register 1200X and effects corresponding operation of the primary selector 600X to select the group of first selectors, including the first selector 501X. The registrations of the first code digit 8, the second code digit 4 and the third code digit 4 in the respective code switches in the primary register 1200X indicate that no register translator 1700X, etc., will be necessary in conjunction with the extension of the present call and that the primary register 1200X is no longer required so that the primary register 1200X is released; and the primary selector 600X operates to select an idle first selector in the previously selected group.

Assuming that the primary selector 600X selects the particular first selector 501X, when the subscriber at the calling ordinary subscriber substation dials the first numerical digit 0, the first selector 501X operates to select the group of second selectors, including the second selector 502X, and then to select an idle second selector in this group. Assuming that the first selector 501X selects the particular second selector 502X, when the subscriber at the calling ordinary subscriber substation TP dials the second numerical digit 9, the second selector 502X operates to select the group of individual connectors, including the individual connector 525X, and then to select an idle individual connector in this group. Assuming that the second selector 502X selects the particular individual connector 525X, when the subscriber at the calling ordinary subscriber TP dials the third and fourth numerical digits 0 and 1, respectively, the individual connector 525X operates to select the line 401X extending to the called extended trunk service subscriber substation TX and operates immediately to test the idle or busy condition thereof. Assuming that the line 401X is tested by the individual connector 525X as being idle, the individual connector 525X operates in order to project ringing current thereover. When the call is answered at the called extended trunk service subscriber substation TX, the individual connector 525X operates to arrest the projection of ringing current over the line 401X extending thereto and to complete an obvious telephone connection between the calling ordinary subscriber substation TP and the called extended trunk service subscriber substation TX.

When the subscriber at the calling ordinary subscriber substation TP initiates the release of the connection by replacing the receiver of the telephone instrument thereto upon its associated switchhook, the primary selector 600X, the first selector 501X, the second selector 502X and the individual connector 525X are released in a conventional manner. When the individual connector 525X is released, the line 501X extending to the called extended trunk service subscriber substation TX is marked as idle to the switching apparatus having access thereto, assuming that the subscriber thereat has replaced the receiver of the telephone instrument upon its associated switchhook.

In conjunction with the extension of the above described call from the calling ordinary subscriber substation TP to the called extended trunk service subscriber substation TX, it is noted that the primary selector 600X, the first selector 501X or the second selector 502X may encounter an all-trunks-busy condition and that the individual connector 525X may test the line 401X extending to the called extended trunk service subscriber substation TX as being busy, whereupon the switch encountering the all-trunks-busy condition or the line-busy condition operates in order to cause busy tone current to be returned back over the connection to the calling ordinary subscriber substation TP. The subscriber at the calling ordinary subscriber substation TP then proceeds to release the operated apparatus in the manner previously explained.

In view of the foregoing explanation of the mode of operation of the primary selector 600X and the primary register 1200X to effect the extension of a call from the calling ordinary subscriber substation TP to the called extended trunk service subscriber substation TX, it will be understood that this equipment is operated in a substantially identical manner to effect the extension of a call from the calling ordinary subscriber substation TP to the denied trunk service subscriber substation TD or to any one of the called party subscriber substations TS1, TS2, TS3 and TS4; or from any one of the calling party subscriber substations TS1, TS2, TS3 and TS4 to the called ordinary subscriber substation TP, to the called extended trunk service subscriber substation TX or to the called denied trunk service subscriber substation TD. Further, it will be understood that the primary selector 441X and the primary register 1200X are operated in a substantially identical manner to effect the extension of a call from the calling extended trunk service subscriber substation TX to the called ordinary subscriber substation TP, to the denied trunk service subscriber substation TD or to any one of the called party subscriber substations TS1, TS2, TS3 and TS4; or from the calling denied trunk service subscriber substation TD to the called ordinary subscriber substation TP, to the called extended trunk service subscriber substation TX or to any one of the called party subscriber substations TS1, TS2, TS3 and TS4.

*Call from an ordinary subscriber substation in the central office B to a subscriber substation in the remote exchange D*

Assuming that the call extending from the calling ordinary subscriber substation TP in the central office B to the primary selector 600X and to the primary register 1200X is to be extended to a called subscriber substation in the remote exchange D, the subscriber at the calling ordinary subscriber substation TP proceeds to dial the directory number of the called subscriber substation. The directory number of the called subscriber substation comprises a code portion, including the digits 2, 7 and 9, identifying the called remote exchange D, and a numerical portion, including four digits, such, for example, as the digits 1, 2, 3 and 4, identifying the terminal of the line extending to the called subscriber substation.

Accordingly, the subscriber at the calling ordinary subscriber substation dials the first code digit 2, the second code digit 7 and the third code digit 9; whereby the first code digit 2 is registered in the first code switch in the primary register 1200X and the primary selector 600X is operated in accordance with the first digit 2. The registration of the first digit 2 in the first code switch in the primary register 1200X indicates that the code portion of the directory number must be translated; accordingly, the primary register 1200X is conditioned to initiate operation of the register translator allotter 1600X; and the primary selector 600X is released. The second code digit 7 is registered in the second code switch in the primary register 1200X; and the primary selector 600X is not operated in accordance with the second code digit 7. At the conclusion of the second code digit 7 the primary register 1200X initiates operation of the register translator allotter 1600X; whereby an idle register translator in the group, including the register translator 1700X, is selected by the finder F1610X associated with the register translator allotter 1600X. Assuming that the finder F1610X associated with the register translator allotter 1600X selects the particular register translator 1700X, the finder F2290X associated with the register translator 1700X operates to find the primary register 1200X; whereby the register translator 1700X is connected to the primary register 1200X; and when the subscriber at the calling ordinary subscriber substation TP dials the first numerical digit 1, it is registered in the first numerical switch in the primary register 1200X. Subsequently, when the subscriber at the calling ordinary subscriber substation TP dials the second numerical digit 2, the third numerical digit 3 and the fourth numerical digit 4, these digits are received by the primary register 1200X and repeated directly therefrom to the connected register translator 1700X. Also the primary register 1200X operates to transmit the complements of the first code digit 2, the second code digit 7, the third code digit 9 and the first numerical digit 1 registered therein to the register translator 1700X; whereby the seven digits mentioned are registered in the register translator 1700X. More particularly, at this time, the complements of the first code digit 2, the second code digit 7, the third code digit 9 and the first numerical digit 1; and the second numerical digit 2, the third numerical digit 3 and the fourth numerical digit 4, as received, are respectively registered in the first, second and third code switches and in the first, second, third and fourth numerical switches in the register translator 1700X. Also the composite code switch in the register translator 1700X is operated in accordance with the complements of the first code digit 2, the second code digit 7 and the third code digit 9. In the register translator 1700X the setting of the composite code switch effects the related setting of the rate and route switch; whereby there is established in the rate and route switch a series of routing digits to be transmitted; and for the purposes of illustration it may be assumed that the established series of routing digits comprises the digits 3, 2 and 2.

At this time the register translator 1700X operates to transmit over the finder F2290X, the primary register 1200X, and the finder F610X to the primary selector 600X the first routing digit 3 in the series mentioned. More specifically, the digit pulse start relay R1710X is operated to initiate operation of the digit pulse relay R1840X; and to complete, at the contacts 1718X, a connection including the winding of the stop send relay R1510, and the contacts 1843X to the line conductor C1283X. When this connection is completed the stop send relay R1510 operates to interrupt, at the contacts 1511, an obvious connection between the home contact and the remainder of the contacts in the contact bank associated with the wiper 2831X of the sender switch S2830X. At this time the digit pulse relay R1840X operates and restores intermittently, interrupting at the contacts 1843X, the connection to the line conductor C1283X; whereby the stop send relay R1510, as well as the line relay in the primary selector 600X follow the impulses of the present digit. Also the wipers of the send switch S2830X are stepped in the counterclockwise direction away from their home positions in accordance with the impulses of the present digit. In the present example, after three impulses have been transmitted, constituting the first routing digit 3 in the present series, the wiper 2834X of the sender switch S2830X encounters a marking in the associated contact bank of ground potential derived from the rate and route switch, whereby a circuit is completed for operating the digit stop relay R1910X. Upon operating the digit stop relay R1910X completes, at the contacts 1912X, a holding circuit for maintaining itself operated including the contacts 1717X, the conductor C2369X, the wiper 2831X of the sender switch S2830X and the engaged contact in the associated contact bank. Also the digit stop relay R1910X completes, at the contacts 1913X, a point in multiple to the contacts 1843X of the digit pulse relay R1840X in the previously traced connection to the line conductor C1283X; whereby the stop send relay R1510 in the register translator 1700X, as well as the line relay in the primary selector 600X, are maintained operated; notwithstanding further operation of the digit pulse relay R1840X. Continued operation of the digit pulse relay R1840X effects further stepping of the wipers of the sender switch S2830X back into their home positions; whereby the wiper 2831X of the sender switch S2830X reengages the home contact in the associated contact bank, interrupting the previously traced holding circuit for maintaining the digit stop relay R1910X operated, assuming that the stop send relay R1510 occupies its operated position at this time; thereby to complete the cycle of operation of the sender switch S2830X and operation of the register translator 1700X to transmit the first routing digit 3 in the series mentioned to the primary selector 600X. In conjunction with the operation of the sender switch S2830X it is pointed out that the wipers thereof are first driven step by step in the counterclockwise direction away from their home positions at a relatively low speed, thereby to insure that the impulses of the present digit transmitted to the line relay in the primary selector 600X are at a proper impulsing rate. Upon operation of the digit stop relay R1910X the wipers noted of the sender switch S2830X are driven at a relatively high speed into engagement with the thirteen contacts in the associated contact banks; and thereafter the wipers noted of the sender switch S2830X are driven at a relatively low speed until they engaged the eighteen contacts in the associated contact banks, thereby to insure the proper time interval or space between successive digits transmitted by the register translator 1700X. Finally, the wipers noted of the sender switch S2830X are driven at a relatively high speed after they engaged the 18 contacts in the associated contact banks back into their home positions. At this time the register translator 1700X is conditioned to transmit the second routing digit 2 in the series mentioned over the primary selector 600X.

The primary selector 600X responds to the first routing digit 3 in the series mentioned to select the group of trunks, including the trunk 780X, extending to the group of ticket repeaters, including the ticket repeater 800X, and then to select and idle trunk in this group. Assuming that the primary selector 600X seizes the particular trunk 780X extending to the particular ticket repeater 800X, a series circuit is completed for energizing the winding of the stop send relay R1510 in the register translator 1700X and the lower winding of the impulse relay R960X in the ticket repeater 800X. This series circuit extends from ground by way of the winding of R1510, the contacts 1718X and 1843X to the line conductor C1283X; and from battery by way of the lower winding of R960X, the contacts 1321 and a winding of the repeater 900 to the line conductor 782X; the line conductor C1283X and the line conductor C782X being connected together by way of the interposed equipment. When this series circuit is completed the stop send relay R1510 in the register translator 1700X and the impulse relay R960X in the ticket repeater 800X operate. Upon operating the impulse relay R960X effects operation of the hold relay R840X; whereby the latter relay effects the application of ground potential to the control conductor C783X in order to cause the primary selector 600X to switch through. Also the hold relay R840X completes, at the contacts 846, an obvious path for applying ground potential to the control conductor of the trunk 907X extending to the outgoing toll selector 513X; thereby to seize the outgoing toll selector 513X, which is individual to the ticket repeater 800X. Further, the impulse relay R960X completes, at the contacts 961X, an impulsing bridge including the contacts 959 and the left hand winding of the arrest dial relay R1320 between the line conductors of the trunk 907X; whereby the outgoing toll selector 513X is rendered responsive to a digit repeated thereto by the ticket repeater 800X over the trunk 907X.

At this time the register translator 1700X operates to transmit the second routing digit 2 in the present series; whereby the stop send relay R1510 in the register translator 1700X and the impulse relay R960X in the ticket repeater 800X follow the impulses of the second routing digit 2 in the present series. Upon the first restoration of the impulse relay R960X it completes, at the contacts 963X, a circuit including the contacts 845 of the operated hold relay R840X for operating the control relay R1310. Each time the impulse relay R960X restores and then reoperates it completes, and then interrupts, at the contacts 963X, the above traced circuit for maintaining operated the control relay R1310; whereby the latter relay is retained operated during the digit since it is of the slow-to-release type. Upon operating the control relay R1310 completes, at the contacts 1311, an obvious path for short circuiting the left hand winding of the answer relay R1320, thereby to reduce the impedance of the impulsing bridge extending over the trunk 907X to the outgoing toll selector 513X. Also, each time the impulse relay R960X restores and then reoperates it interrupts, and then recompletes, at the contacts 961X, the impulsing bridge extending by way of the trunk 907X to the outgoing selector 513X; whereby the impulses of the present digit are repeated by the impulse relay R960X in the ticket repeater 800X to the outgoing toll selector 513X. Accordingly, the outgoing toll selector 513X responds to the second routing digit 2 in the present series to select the group of trunks, including the trunk 1280B, extending to the group of trunk circuits, including the trunk circuit 90, and then to select an idle trunk in this group. At the conclusion of the second routing digit 2 in the present series, the impulse relay R960X in the ticket repeater 800 and the stop send relay R1510 in the register translator 1700X are maintained operated; and shortly thereafter the control relay R1310 restores, as it is of the slow-to-release type, interrupting, at the contacts 1311, the previously mentioned path for short circuiting the left hand winding of the arrest dial relay R1320.

Assuming that the outgoing toll selector 513X operates to seize the particular trunk 1280B extending to the particular trunk circuit 90, the outgoing selector 513X operates to apply ground potential to the control conductor C1285 of the trunk 1280B; thereby to complete a circuit including the contacts 1231, 1181 and 1141 for operating the local seizure relay R1130 in the trunk circuit 90. Upon operating the local seizure relay R1130 interrupts, at the contacts 1135, the previously traced path for applying battery potential by way of the winding of the toll seizure relay R1180 to the control conductor C1283 of the trunk 1280A; and completes, at the contacts 1134, a path including the contacts 1238 for applying ground potential to the control conductor C1283, thereby to mark the trunk 1280A as busy to the toll third selectors 1406, etc., having access thereto. Also, the local seizure relay R1130 completes, at the contacts 1133, an obvious circuit for energizing in series the upper and lower windings of the shunt relay R940, thereby to cause the latter relay to operate completely in order to interrupt, at the contacts 941 and 942, the previously mentioned paths for short circuiting the windings 913 and 914 of the repeater 910. Further, the local seizure relay R1130 completes, at the contacts 1132, an obvious circuit for operating the switch relay R1120. Upon operating the switch relay R1120 completes, at the contacts 1123′, the previously traced circuit for operating the delay relay R920, thereby to cause the latter relay to effect operation of the supervisory relay R935; all in the manner previously explained. Further, the switch relay R1120 completes, at the contacts 1122, 1124, 1126 and 1122′ a loop circuit extending between the line relay R1080 and the drying relay R1090 in the trunk circuit 90 and the arrest dial relay R1320 in the ticket repeater 880X. This loop circuit extends from ground by way of the upper winding of R1080, the lower winding of R1090, the contacts 1114, 1126 and 954, the winding 914 of the repeater 910 and the contacts 1122′ to the line conductor C1282 of the trunk 1280B; and from battery by way of the lower winding of R1080, the contacts 956, the upper winding of R1090, the contacts 1112, 1124 and 952, the winding 913 of the repeater 910 and the contacts 1122 to the line conductor C1281 of the trunk line 1280B; the line conductors C1281 and C1282 of the trunk 1280B are connected by way of the interposed switch train to the line conductors of the trunk 907X across which the left hand winding of the arrest dial relay R1320 in the ticket repeater 800X is connected. When this series loop circuit is completed the line relay R1080 operates; however, the drying relay R1090 does not operate as it is of the differential type. Moreover, the arrest dial relay R1320 is poled not to operate, since it is of the shunt field type. Upon operating the line relay R1080 effects operation of the hold relay R1050; and completes, at the contacts 1083, the previously traced connection between the lower winding of the supervisory relay R1170 and the signal conductor C905; whereby battery potential is applied by way of the lower winding of the supervisory relay R1170 to the signal conductor C905 and consequently to the simplex conductor C901 and the trunk line 900 extending to the remote exchange D. This application of battery potential by way of the lower winding of the supervisory relay R1170 to the signal conductor C905 does not effect operation of the supervisory relay R1170, since it is of the marginal type; however, it does effect operation of the trunk circuit in the remote exchange D in order to cause the automatic switching apparatus therein to be associated with the trunk line 900; which operation may consume some time.

Shortly following the operation of the switch relay R1120, and consequently the line relay R1080 and the delay relay R920, the supervisory relay R935 operates, since it is of the slow-to-operate type. Upon operating the supervisory relay R935 completes, at the contacts 936, a circuit including the contacts 1131, for operating the reverse battery relay R1110. Upon operating the reverse battery relay R1110 reverses, at the contacts 1111, 1112, 1113 and 1114, the polarity of the trunk 1280B with respect to the upper and lower windings of the line relay R1080; whereby the line relay R1080 is retained in its operated position. The drying relay R1090 is prevented from operating; and the arrest dial relay R1320 in the ticket repeater 800X is poled to operate. Upon operating the arrest dial relay R1320 interrupts, at the contacts 1321, a normally completed path for short circuiting the resistor 1322; whereby the resistor 1322 is inserted in the previously traced series circuit extending between the lower winding of the impulse relay R960X in the ticket repeater 800X and the winding of the stop send relay R1510 in the register translator 1700X. When the resistor 1322 is inserted into the series circuit mentioned, the impulse relay R960X in the ticket repeater 800X is retained in its operated position in order to retain operated the line relay R1080 in the trunk circuit 90; however, the stop send relay R1510 in the register translator 1700X restores, since it is of the marginal type. Upon restoring the stop send relay R1510 completes, at the contacts 1511, the previously mentioned path between the home contact and the remaining contacts in the contact bank associated with the wiper 2831X of the sender switch S2830X, thereby to complete a continuous holding circuit for the digit stop relay R1910X, retaining the latter relay in its operated position. Accordingly, at this time, at the conclusion of the transmission by the register translator 1700X of the second routing digit 2 in the present series, the digit stop relay R1910X in the register translator 1700X occupies its operated position and is retained in this position, notwithstanding continued operation of wipers noted of the sender switch S2830X through their home positions. Moreover, the operated digit stop relay R1910X retains completed, at the contacts 1913X, the previously mentioned path in multiple to the contacts 1843X of the digit pulse relay R1840X in the connection between the winding of the stop send relay R1510 and the line conductor C1283X extending to the lower winding of the impulse relay R960X in the ticket repeater 800X; whereby no further digit may be transmitted from the register translator 1700X to the ticket repeater 800X at this time. Thus, it will be understood that the trunk circuit 90 has operated to return the delay in send signal to the ticket repeater 800X and that this signal has been repeated by the ticket repeater 800X to the register translator 1700X at this time.

When the switching apparatus in the remote exchange D is associated with the trunk line 900 and is in readiness to receive a digit, low resistance ground potential therein is applied to the trunk line 900, and consequently to the simplex conductor C901 and the connected signal conductor C905, thereby to effect operation of the supervisory relay R1170 in the trunk circuit 90. Upon operating the supervisory relay R1170 effects operation of the supervisory slave relay R1150; upon operating the supervisory slave relay R1150 effects operation of the control relay R1020; upon operating the control relay R1020 effects restoration of the delay relay R920 shortly thereafter; and upon restoring the delay relay R920 effects restoration of the supervisory relay R935; all in the manner previously described. Upon restoring the supervisory relay R935 interrupts, at the contacts 936, the previously traced circuit for maintaining operated the reverse battery relay R1110; and upon restoring the reverse battery relay R1110 reverses, at the contacts 1111, 1112, 1113 and 1114, the polarity of the trunk 1280B with respect to the upper and lower windings of the line relay R1080 in the trunk circuit 90; whereby the line relay R1080 is retained operated and the drying relay R1090 is prevented from operating since it is of the differential type; and the arrest dial relay R1320 in the ticket repeater 800X is poled to restore, since it is of the shunt field type. Upon restoring the arrest dial relay R1320 recompletes, at the contacts 1321, the previously mentioned path for short circuiting the resistor 1322; whereby the lower winding of the impulse relay R960X in the ticket repeater 800X is energized directly in series with the winding of the stop send relay R1510 in the register translator 1700X; whereby the impulse relay R960X is retained in its operated position and the stop send relay R1510 operates. Upon operating the stop send relay R1510 in the register translator 1700X interrupts, at the contacts 1511, the previously mentioned connection between the home contact and the remainder of the contacts in the contact bank associated with the wiper 2831X of the sender switch S2830X. Accordingly, when the wipers noted of the sender switch S2830X reengage the home contacts in the associated contact bank, the previously traced holding circuit for maintaining operated the digit stop relay R1910X is interrupted, causing the latter relay to restore. Upon restoring the digit stop relay R1910 interrupts, at the contacts 1913X, the previously mentioned path in multiple to the contacts 1843X of the digit pulse relay R1840X; whereby the digit pulse relay R1840X again assumes control of the impulsing circuit between the stop send relay R1510 in the register translator 1700X and the lower winding of the impulse relay R960X in the ticket repeater 800X. Thus, at this time, the register translator 1700X operates to transmit the third routing digit 2 in the present series to the ticket repeater 800X; and the impulse relay R960X in the ticket repeater 800X repeats the digit to the line relay R1080 in the trunk circuit 90. The line relay R1080 follows the impulses of the third routing digit 2 repeating the impulses thereof, at the contacts 1083, over the signal conductor C905, and consequently over the simplex conductor C901 and the trunk line 900 to the switching apparatus in the remote exchange D. During the present digit the digit relay R1030 and the hold relay R1050 are maintained operated, as previously explained, since they are of the slow-to-release type. At the conclusion of the third routing digit 2 in the present series the digit stop relay R1910X in the register translator 1700X is reoperated in order to maintain operated the stop send relay R1510 in the register translator 1700X and the impulse relay R960X in the ticket repeater 800X; and the operated impulse relay R960X retains operated the line relay R1080 in the trunk circuit 90. Shortly thereafter the digit relay R1030 restores; whereby the trunk circuit 90 is in readiness to receive the next digit.

The register translator 1700X operates in a similar manner to transmit to the ticket repeater 800X the first, second, third and fourth numerical digits 1, 2, 3 and 4, respectively; which numerical digits are repeated by the ticket repeater 800X to the trunk circuit 90 and repeated thereby over the trunk line 900 to the switching apparatus in the remote exchange D in a manner substantially identical to that described above; whereby the final switching stage of the switching apparatus in the remote exchange D operates to select the line extending to the called subscriber substation therein and operates immediately to test the idle or busy condition thereof.

Reconsidering the operation of the register translator 1700X in the extension of the present call from the calling ordinary subscriber substation TP in the central office B to the called subscriber substation in the remote exchange D, it is noted that after the register translator 1700X operates to transmit the first routing digit 3 in the present series to the primary selector 600X, it initiates operation of the detector 2900X; whereby the detector 2900X operates to detect the directory number of the line 407X extending to the calling ordinary subscriber substation TP and connected, at this time, via the line switch 423X, the primary selector 600X and the primary register 1200X to the register translator 1700X. More specifically, the detector 2900X operates to detect the directory number of the line 407X extending to the calling ordinary subscriber substation TP as 0-0-9-9; then operates to register the detected directory number 0-0-9-9 in the first four code storage devices in the register translator 1700X; and then the detector 2900X is released for further use.

At this time the code pulse relay R1850X and the mark relay R1860X in the register translator 1700X are selectively operated respectively to transmit resistance ground potential and direct ground potential over the line conductor C1394X extending to the line conductor C781X and by way of the associated winding of the repeater 900 and the contacts 954X to the windings of the step relay R920X and the code relay R910X in the ticket repeater 800X. Each time the code pulse relay R1850X in the register translator 1700X operates, without operation of the mark relay R1860, the step relay R920X in the ticket repeater 800X is operated, without operation of the code relay R910X, since the code relay R910X is of the marginal type. Each time the code pulse relay R1850X in the register translator 1700X operates with the mark relay R1860X direct ground potential is applied to the line conductor C1394X effecting operation of both the step relay R920X and the code relay R910X in the ticket repeater 800X. Accordingly, at this time the information pertaining to the present call stored in the register translator 1700X is transferred therefrom to the ticket repeater 800X, in the manner explained above and registered therein. More specifically, the first, second and third digits of the code portion of the directory number of the called subscriber substation identifying the called remote exchange D (the digits 2, 7 and 9) are respectively registered in the first, second and third code switches in the register translator 1700X and are now transferred to three corresponding code storage devices in the ticket repeater 800X; the respective first, second, third and fourth digits of the numerical portion of the directory number of the calling ordinary subscriber substation identifying the line terminal thereof (the digits 0-0-9-9) are registered in the four corresponding code storage devices in the register translator 1700X and are transferred to the four corresponding code storage devices in the ticket repeater 800X; the complementary digit of the rate factor digit applicable to the present call between the calling ordinary subscriber substation TP in the central office B and the called subscriber substation in the remote exchange D (the complementary digit 8 of the rate factor digit 3) is registered in the rate and route switch in the register translator 1700X and is transferred to a corresponding code storage device in the ticket repeater 800X. The digit identifying the particular register translator 1700X utilized (the digit 6) appears upon a terminal block in the register translator 1700X and is transferred to a corresponding code storage device in the ticket repeater 800X. The respective first, second, third and fourth digits of the numerical portion of the directory number of the called subscriber substation in the remote exchange D (the digits 1, 2, 3 and 4), identifying the line terminal thereof, are registered in the first, second, third and fourth numerical switches in the register translator 1700X and are transferred to four corresponding code storage devices in the ticket repeater 800X.

After all of the code information has been transmitted from the register translator 1700X over the line conductor C1394X to the ticket repeater 800X and stored upon the code storage devices therein in the manner explained above, and all of the numerical digits have been transmitted from the register translator 1700X over the line conductor C1283X to the impulse relay R960X in the ticket repeater 800X and repeated thereby over the outgoing selector 513X, the code pulse relay R1850X and the mark relay R1860X operate to transmit an additional direct ground impulse over the line conductor C1394X, thereby to effect operation of the ticket repeater 800X; whereby the switch through relay R950X therein is operated. Upon operating the switch through relay R950X interrupts, at the contacts 954X, the previously traced connection between the windings of the code relay R910X and the step relay R920 and the line conductor C781X of the trunk 780X and completes, at the contacts 955X, a connection between the upper winding of the impulse relay R960X and the line conductor C781X of the trunk 780X. Further, the switch relay R950X completes, at the contacts 956X, a holding circuit for maintaining itself operated; completes, at the contacts 958, a loop circuit between the left hand winding of the answer relay R940X and the trunk 907X; and interrupts, at the contacts 959, the previously traced circuit between the left hand winding of the arrest dial relay R1320 and the line conductors of the trunk 907X. Accordingly, at this time, the left hand winding of the answer relay R940X is bridged by way of the windings of the repeater 900 and the contacts 958 and 961X across the line conductors of the trunk 907X, thereby to maintain operated the line relay R1080 in the trunk circuit 90 and to prevent operation of the drying relay R1090, since the latter relay is of the differential type.

After all of the code information and all of the numerical digits have been transmitted from the register translator 1700X to the ticket repeater 800X in the manner explained above, the primary selector 600X is cut through, thereby to complete a direct loop circuit between the calling ordinary subscriber substation TP in the central office B and the upper and lower windings of the impulse relay R960X in the ticket repeater 800X. Moreover, at this time the primary register 1200X and the register translator 1700X are released for further use. When the above traced loop circuit is completed between the left hand winding of the answer relay R940X in the ticket repeater 800X and the line relay R1080 and the drying relay R1090 in the trunk circuit 90, the answer relay R940 is poled not to operate. Now assuming that the final switching stage of the switching apparatus in the remote exchange D tests the line extending to the called subscriber substation as being idle, ringing current in this final switching stage is projected thereover in a conventional manner; thereafter, when the subscriber at the called subscriber substation answers the call, the final switching stage in the remote exchange D switches through in order to complete a conversation connection between the calling ordinary subscriber substation TP in the central office B and the called subscriber substation in the remote exchange D. Also, at this time, the final switching stage in the remote exchange D operates in order to increase the resistance in the path for applying ground potential to the trunk line 900 and consequently to the simplex conductor C901 and the signal conductor C905; whereby the supervisory relay R1170 in the trunk circuit 90 restores, since it is of the marginal type. Upon restoring the supervisory relay R1170 effects restoration of the supervisory slave relay R1150; upon restoring the supervisory slave relay R1150 effects operation of the supervisory relay R935; and upon operating the supervisory relay R935 effects operation of the reverse battery relay R1110; all in the manner previously explained. Upon operating the reverse battery relay R1110 reverses, at the contacts 1111, 1112, 1113 and 1114, the polarity of the trunk 1280B with respect to the upper and lower windings of the line relay R1080; whereby the line relay R1080 in the trunk circuit 90 is retained operated, the drying relay R1090 is prevented from operating, and the left hand winding of the answer relay R940X in the ticket repeater 800X is poled to operate. Upon operating the answer relay R940X initiates operation of the register and timer switch in the ticket repeater 800X, thereby to time the duration of the present connection and to cause registration of the total time duration of the present connection upon the ten and hundred time switch and upon the unit time switch incorporated in the ticket repeater 800X.

When the subscriber at the called subscriber substation in the remote exchange D replaces the receiver of the telephone instrument thereat upon its associated switchhook, at the conclusion of the conversation, the final switching stage in the remote exchange D operates in order to reduce the resistance in the path for applying ground potential to the trunk line 900, thereby to effect reoperation of the supervisory relay R1170 in the trunk circuit 90. Upon operating the supervisory relay R1170 effects operation of the supervisory slave relay R1150; upon operating the supervisory slave relay R1150 effects restoration of the supervisory relay R935; upon restoring the supervisory relay R935 effects restoration of the reverse battery relay R1110; all in the manner previously explained. Upon restoring the reverse battery relay R1110 reverses at the contacts 1111, 1112, 1113 and 1114, the polarity of the trunk 1280B with respect to the upper and lower windings of the line relay R1080 in the trunk circuit 90, thereby to pole the answer relay R940X in the ticket repeater 800X to restore. Upon restoring the answer relay R940X arrests operation of the timing apparatus in the ticket repeater 800X, since the time duration of the present connection has been established.

Subsequently, when the subscriber at the calling ordinary subscriber substation TP in the central office B replaces the receiver of the telephone instrument thereat upon its associated switchhook there is interrupted the previously traced loop circuit for maintaining operated the impulse relay R960X in the ticket repeater 800X. Upon restoring the impulse relay R960X effects restoration of the hold relay R840X shortly thereafter, since the latter relay is of the slow-to-release type; and upon restoring the hold relay R840X interrupts, at the contacts 846, the previously mentioned path for applying ground potential upon the control conductor of the trunk 907X; whereby the outgoing toll selector 513X is released in a conventional manner. When the outgoing selector 513X is thus released, the loop circuit extending by way of the line conductors of the trunk 1280B into the trunk circuit 90 is interrupted and ground potential is removed from the control conductor C1285 of the trunk 1280B; whereupon both the line relay R1080 and the local seizure relay R1130 restore. Upon restoring the line relay R1080 effects restoration of the hold relay R1050 shortly thereafter; upon restoring the local seizure relay R1130 effects restoration of the switch relay R1120; upon restoring the switch relay R1120 effects restoration of the supervisory relay R1170; upon restoring the supervisory relay R1170 effects restoration of the supervisory slave relay R1150; and upon restoring the hold relay R1050 effects restoration of the shunt relay R940 and the control relay R1020; all in the manner previously explained. Also, upon restoring the switch relay R1120 recompletes, at the contacts 1125' the previously traced path for applying ground potential by way of the winding of the inseizure relay R1240 to the signal conductor C905 and consequently to the simplex conductor C901 and the trunk line 900; whereby the switching apparatus in the remote exchange D is released marking the line extending to the called subscriber substation therein as idle. Further, the local seizure relay R1130 upon restoring recompletes, at the contacts 1135, the previously traced path for applying battery potential by way of the winding of the toll seizure relay R1180 to the control conductor C1283 of the trunk 1280A, thereby to mark the trunk 1280A and the trunk circuit 90 as idle to the toll third selectors 1406, etc., having access thereto. At this time the toll line circuit 90 is completely released and the trunk line 900 extending between the central office B and the remote exchange D is available for further use.

Also, upon restoring the hold relay R840X in the ticket repeater 800X effects the release of the primary selector 600X and the line switch 423X; whereby the line 407X extending to the calling ordinary subscriber substation TP is marked as idle to the switching apparatus having access thereto. Further, upon restoring the hold relay R840X in the ticket repeater 800X continues the marking of the trunk 780X extending thereto as busy to the primary selector 600X, etc., having access thereto, and prevents further release of the ticket repeater 800X at this time; and causes ground potential to be applied to the start conductor C890X extending to the printer controller allotter 4600X. This application of ground potential to the start conductor C890X extending to the printer controller allotter 4600X is effective to cause the finder F4640X, associated with the printer controller allotter 4600X, to find an idle printer controller in the associated group. Assuming that the finder F4640X finds the particular printer controller 4200X as idle and selects it for use at this time; operation of the finder F4210X, individual to the printer controller 4200X, is brought about in order to cause the finder F4210X to find the calling ticket repeater at this time. Assuming that the ticket repeater 800X is the first calling ticket repeater in the associated group, the finder F4210X associated with the printer controller 4200X finds the ticket repeater 800X; whereby the printer controller 4200X is connected to the ticket repeater 800X at this time. When the ticket repeater 800X is connected to the printer controller 4200X ground potential in the ticket repeater 800X is removed from the start conductor C890X extending to the printer controller allotter 4600X, whereby the printer controller allotter 4600X is released. Also, when the printer controller 4200X is connected to the ticket repeater 800X, the printer controller 4200X operates to seize the ticket printer 5230X and the record printer 5240X; and further the storage transfer switch in the ticket repeater 800X and the storage register switch in the printer controller 4200X are operated in synchronism; whereby items of record information stored in the unit time switch, in the ten and hundred times switch, on the terminal blocks, and in the code storage devices all in the ticket repeater 800X, are transferred to the corresponding code storage devices in the printer controller 4200X. When all of the items of record information in the ticket repeater 800X are thus transferred to and registered in the printer controller 4200X, the ticket repeater 800X is released and rendered available for further use.

Further, when all the items of record information have been transferred to the printer controller 4200X from the ticket repeater 800X, as explained above, the calculator selector switch in the printer controller 4200X is governed in accordance with the rate factor item registered, that is applicable to the call between the calling ordinary subscriber substation TP in the central office B and the called subscriber substation in the remote exchange D, to select a corresponding one of the calculators or calculating switches in the printer controller 4200X. The selected calculator or calculating switch is then set in the two coordinate directions in accordance with the 10-minute item and the unit-minute item of the time duration of the present connection; thereby to establish a charge for the present connection. More specifically, the operated calculating switch establishes a first charge for the present connection, calculated on a monetary basis, and a second charge calculated on a unit call basis; and selects one of the calculations depending upon the class of service rendered to the calling subscriber substation. In the present example, the calling ordinary subscriber substation TP is charged for trunk calls on a momentary basis; and accordingly, the monetary calculation in the operated calculating switch is selected. Also, when the printer controller 4200X is taken for use, as explained above, it operates to cause ground potential to be applied to the start conductor C4302X extending to the printer link 5000X; whereby in the event the printer link 5000X is idle, it initiates operation of the individually associated finder F5010X, thereby to cause the finder F5010X to find the calling printer controller. Assuming that the calling printer controller 4200X is the first in the associated group, the finder F5010X finds and connects the printer controller 4200X to the printer link 5000X. At this time the ticket printer control switch and the record storage transfer switch in the printer controller 4200X are operated in synchronism selectively to control respectively the ticket printer 5230X and the record printer 5240X. Also, it is noted that the date and time unit 3900X operates continuously to mark to all of the printer controllers 4200X, etc., the time in terms of the month, the day, the hour and the minute; whereby this time information being marked by the date and time unit 3900X to the printer controller 4200X is available thereto in its present operation to control the ticket printer 5230X and the record printer 5240X. Accordingly, the ticket printer 5230X is governed at this time to produce a ticket individual to the present connection identical to that shown in Fig. 56 in the Ostline application mentioned; and the record printer 5240X is governed at this time to produce a single line entry upon the associated record sheet identical to the first line shown on the record sheet of Fig. 55 of the Ostline application mentioned.

After the printer controller 4200X has governed the ticket printer 5230X and the record printer 5240X to produce respectively a ticket individual to the connection and a line on the record sheet individual to the connection, the printer controller 4200X is released and rendered available for further use; at this time the printer link 5000X assumes control of the ticket printer 5230X and the record printer 5240X in order to cause the ticket printer 5230X to cut off the ticket that has been produced and to reset itself in readiness for the next operation and to cause the record printer 5240X to advance the record sheet and reset itself in readiness for the next operation. At this time the printer link 5000X, the toll ticket printer 5230X and the record printer 5240X are completely released.

In conjunction with the extension of the above described call from the calling ordinary subscriber substation TP in the central office B to the called subscriber substation in the remote exchange D, it will be recalled that when the outgoing toll selector 513X operated to select the trunk 1280B extending to the trunk circuit 90, that the trunk circuit 90 operated to return a delay-in-send signal back to the ticket repeater 800X; which delay-in-send signal persisted until the switching apparatus in the remote exchange D was attached to the trunk line 900 and was in readiness to receive the next digit. During this time interval, the ticket repeater 800X returns the delay-in-send signal over the primary selector 600X to the register translator 1700X; thereby to prevent operation thereof to transmit the next digit until the switching apparatus in the remote exchange D is in readiness to receive the digit; all in the manner previously explained. However, it may occur that the switching apparatus in the remote exchange D is in an all-trunks-busy condition at this time; whereby it is not promptly attached to the trunk line 900 or attached thereto within a reasonable time interval. Accordingly, in this event, the trunk circuit 90 returns a delay-in-send signal to the ticket repeater 800X; and the ticket repeater 800X returns the delay-in-send signal to the register translator 1700X; which condition persists for an abnormal time interval. Further, when the register translator 1700X was connected to the primary register 1200X in conjunction with the extension of the present call, operation of the timer switch in the register translator 1700X was initiated; whereby, in the present example, the register translator 1700X is retained connected to the primary register 1200X for a time interval of thirty seconds, since the register translator 1700X cannot complete its operation to transmit all of the digits as it is assumed that the delay-in-send signal is returned to the register translator 1700X for an abnormal time interval. In this conjunction it will be appreciated that normal operation of the register translator 1700X takes place in only a small fraction of the time interval of thirty seconds mentioned and that even with a reasonable delay-in-send, withholding operation of the register translator 1700X, the time interval of thirty seconds is ample to permit normal operation and release of the register translator 1700X within this time interval.

Accordingly, in the present example, the timer switch in the register translator 1700X times out after thirty seconds and at a time when the register translator 1700X is still connected to the primary register 1200X due to the reception for the abnormal time of the delay-in-send signal thereby. When the timer switch in the register translator 1700X is thus timed out, the rate and route switch therein is released and the primary selector 600X is released in order to effect the release of the ticket repeater 800X, the outgoing toll selector 513X and the trunk circuit 90; all in the manner previously explained. Further, the rate and route switch in the register translator 1700X is reset arbitrarily due to the jumper connections therein to transmit the routing digits 1, 1 and 4, and without regard to the setting of the composite code switch in the register translator 1700X. The register translator 1700X then proceeds to transmit the three routing digits 1, 1 and 4 in succession. The primary selector 600X responds to the first routing digit 1, thereby to select the group of special service selectors, including the special service selector 503X, and then to select an idle special service selector in this group. Assuming that the primary selector 600X selects the particular special service selector 503X, the second routing digit 1 transmitted by the register translator 1700X effects operation and then drop-back of the special service selector 503X, since the special service selector 503X is of the drop-back type in response to a first received digit of 1. Subsequently, when the register translator 1700X transmits the third routing digit 4 to the special service selector 503X, the special service selector 503X operates to select the corresponding group of trunks extending to the interceptor operator position 114X—117X and then to select an idle trunk in the group mentioned; whereby the call is extended to the interceptor operator position 114X—117X over the trunk in the particular group mentioned in order to indicate to the operator at interceptor operator position 114X—117X that the present call was intercepted as a consequence of the subscriber at the calling ordinary subscriber substation TP either failing to dial a full complement of digits into the associated register translator, as will be explained more fully hereinafter, or as a consequence of the outgoing switch train encountering a blocked switching stage in conjunction with the extension of a trunk call from the central office B. At this time the register translator 1700X and the primary register 1200X are released and the primary selector 600X is switched through; whereby, when the operator at the interceptor operator position 114X—117X answers the call, the telephone connection is completed between the calling ordinary subscriber substation TP and the interceptor operator position 114X—117X. At this time the operator at the interceptor position 114X—117X may advise the subscriber at the calling ordinary subscriber substation TP with reference to the circumstances that brought about interception of the present call; whereby the subscriber at the calling ordinary subscriber substation TP may proceed to release the connection to the interceptor operator position 114X—117X in a conventional manner.

Further, in conjunction with the extension of the above described call from the calling ordinary subscriber substation TP in the central office B to the called subscriber substation in the remote exchange D it may happen that the switching apparatus in the remote exchange D encounters either an all-trunks-busy condition or a line-busy condition. In the event the final switching stage of the switching apparatus in the remote exchange D tests the line extending to the called subscriber substation as being busy, busy tone current is returned over the trunk line 900 and the connection to the calling ordinary subscriber substation TP, subsequent to the release of the register translator 1700X and the primary register 1200X, in the manner described above; whereby the subscriber at the calling ordinary subscriber substation TP may release the connection in the manner previously explained.

On the other hand, in the event one of the intermediate switching stages of the switching apparatus in the remote exchange D encounters an all-trunks-busy condition, the switching stage encountering the all-trunks-busy condition operates to open the simplex connection to the trunk line 900 and to cause busy tone current to be returned thereover. The busy tone current is repeated over the connection to the subscriber at the calling ordinary subscriber substation TP in the central office B, whereby the subscriber at the calling ordinary subscriber substation TP initiates the release of the connection in the manner previously explained. However, in the event the subscriber at the calling ordinary subscriber substation TP fails to initiate the release of the connection within a reasonable time interval, the call from the calling ordinary subscriber substation TP is routed to the interceptor operator position 114X—117X by the register translator 1700X. More specifically, when the simplex connection to the trunk line 900 is opened the supervisory relay R1170 restores, effecting restoration of the supervisory slave relay R1150 and the consequent operation of the supervisory relay R935 and the reverse battery relay R1110 in the trunk circuit 90; all in the manner previously explained. Upon operating the reverse battery relay R1110 reverses the polarity of the trunk 1280B, effecting operation of the arrest dial relay R1320 in the ticket repeater 800X and the consequent operation of the stop send relay R1510 in the register translator 1700X. In other words, the delay-in-send signal is transmitted from the trunk circuit 90 to the ticket repeater 800X and repeated thereby to the register translator 1700X; all in the manner previously explained. In the present example further operation of the register translator 1700X is prevented, whereby the timer switch therein causes the call to be routed, as a consequence of the transmission of the routing digits 1, 1 and 4, to the interceptor operator position 114X—117X; all in the manner previously explained. The subsequent answering of the call at the interceptor operator position 114X—117X and the subsequent release of the connection are the same as previously described.

*Call from a party subscriber substation in the central office B to a subscriber substation in the remote exchange D*

The extension of a call from a party subscriber substation, such, for example, as one of the party subscriber substations TS1, TS2, TS3 or TS4, connected to the party line 410X, in the central office B to a called subscriber substation in the remote exchange D is substantially the same as that described above; however, the apparatus in the primary register and in the register translator operate in a slightly different manner, as explained more fully below. Assume that a call has been initiated at one of the party subscriber substations, TS1, TS2, TS3 or TS4 connected to the party line 410X; that the individually associated line switch 424X has operated to seize the trunk 462X extending to the primary selector 600X; and that the finder F610X individual to the primary selector 600X has seized the primary register 1200X; all in the manner previously explained.

In the present example, in the event the call is initiated at the first party subscriber substation TS1, no ground impulses are transmitted from the calling device thereat over the line conductors of the party line 410X incident to the dialing of each digit; in the event the call is initiated at the second party subscriber substation TS2, one ground impulse is transmitted from the cam springs 1306 in the calling device thereat over the line conductors of the party line 410X incident to the dialing of each digit; in the event the call is initiated at the third party subscriber substation TS3, two ground impulses are transmitted from the cam springs 1304 in the calling device thereat over the line conductors of the party line 410X incident to the dialing of each digit; and, finally, in the event the call is initiated at the fourth party subscriber substation TS4, three ground impulses are transmitted from the cam springs 1302 in the calling device thereat over the line conductors of the party line 410X incident to the dialing of each digit.

More specifically, it is noted in conjunction with the calling device at the fourth party subscriber substation TS4 that the first ground impulse is transmitted by the set of cam springs 1302 over the line conductors of the party line 410X, while the set of impulse springs 1301 is closed; then the set of impulse springs 1301 transmits the first impulse of the digit over the line conductors of the party line 410X, while the set of cam springs 1302 is open; then the second ground impulse is transmitted by the set of cam springs 1302 over the line conductors of the party line 410X while the set of impulse springs 1301 is closed; etc. The calling device at the second party subscriber substation TS2 and at the third party subscriber substation TS3 are operated in a similar manner.

The subscriber at the calling party subscriber substation TS1, TS2, TS3 or TS4 then dials the directory number of the called subscriber substation in the remote exchange D, as previously explained, which number may be 279—1234. The first code digit 2 is registered in the first code switch in the primary register 1200X and the primary selector 600X is operated in accordance with the first code digit 2 and then released; all in the manner previously explained. At the conclusion of the first code digit 2 the party test relay in the primary register 1200X is rendered operative; whereby, when the second code digit 7 is dialed, it is registered in the second code switch in the primary register 1200X, and the party test relay in the primary register 1200X is selectively controlled in accordance with the number of ground impulses received over the party line 407X from the cam springs in the calling device at the calling party subscriber substation. More specifically, the party test relay is effective selectively to operate three party relays provided in the primary register 1200X. None, one, two or three of the party relays in the primary register 1200X are respectively operated in accordance with the number of ground impulses received over the party line 407X during the reception of the second code digit 7; which circumstance respectively corresponds to the party subscriber substations, TS1, TS2, TS3 and TS4.

At the conclusion of the second code digit 7 operation of the register translator allotter 1600X is initiated; whereby the finder F1610X may assign the particular register translator 1700X causing the finder F2290X to find the primary register 1200X; all in the manner previously explained. At this time the complements of the first code digit 2 and the second code digit 7 are transferred to and registered in the first and second code switches in the register translator 1700X; and also the party switch in the register translator 1700X is operated in accordance with the operation of the party relays in the primary register 1200X; whereby the particular calling party subscriber substation TS1, TS2, TS3 or TS4 is identified in the operated party switch in the register translator 1700X.

The subscriber at the calling party subscriber substation then proceeds to dial the third code digit 9 and the first numerical 1 into the primary register 1200X; whereby the digits mentioned are registered therein and the complements thereof are transmitted to and registered in the register translator 1700X. Subsequently, the second numerical digit 2, the third numerical digit 3 and the fourth numerical digit 4 are dialed into the primary register 1200X and are repeated directly to and registered in the register translator 1700X; all in the manner previously described. The operation of the register translator to register the seven digits mentioned, to control the primary selector 600X, to operate the succeeding switch train, to transmit the various items of record information stored therein to the ticket repeater 800X and to initiate operation of the detector 2900X are the same as those previously explained; assuming that the present call is routed via the primary selector 600X, the ticket repeater 800X, the outgoing toll selector 513X, the trunk circuit 90 and the trunk line 900 to the remote exchange D. However, in the present case, the register translator 1700X selectively controls the operation of the detector 2900X to detect the directory number of the party line 410X respectively as 0-1-0-0, 0-2-0-0, 0-3-0-0 or 0-4-0-0 depending upon the operated position of the party switch in the register translator 1700X, which switch was previously set from the primary register 1200X in accordance with the particular calling party subscriber substation TS1, TS2, TS3 or TS4 on the party line 410X. The subsequent release of the detector 2900X, the register translator 1700X and the primary register 1200X following the extension of the connection to the called subscriber substation in the remote exchange D are the same as previously explained. Also, the subsequent release of the primary selector 600X, the line switch 424X, the outgoing toll selector 513X, the trunk circuit 90, as well as the switching apparatus in the remote exchange D are the same as previously described. Further, the ticket repeater 800X controls the printer controller 4200X and is then released; whereupon the printer controller 4200X governs the printer link 5000X and the ticket printer 5230X and the record printer 5240X; all in the manner previously explained. In the present example, the ticket printer 5230X may produce a ticket of the character of that shown in Fig. 59 in the Ostline application mentioned in the event the present call was initiated at the first party subscriber substation TS1 or of the character of that shown in Fig. 60 in the Ostline application mentioned in the event the present call was initiated at the fourth party subscriber substation TS4. In a corresponding manner the record printer 5240X is governed to produce a line of printing on the record sheet of the character of that appearing in line 5 on the record sheet illustrated in Fig. 55 of the Ostline application mentioned in the event the present call was initiated at the first party subscriber substation TS1 or of the character of that appearing in line 6 on the record sheet illustrated in Fig. 55 of the Ostline application mentioned in the event the present call was initiated at the fourth party subscriber substation TS4.

*Call from an extended trunk service subscriber substation in the central office B to a subscriber substation in the remote exchange D*

The extension of a call from an extended trunk service subscriber substation, such, for example, as the extended trunk service subscriber substation TX in the central office B to a called subscriber substation in the remote exchange D is initiated in the manner previously explained; however, the apparatus in the register translator and in the printer controller operate in a slightly different manner, as explained more fully below. Assume that a call has been initiated at the extended trunk service subscriber substation TX; that the line switch 421X has operated to seize the trunk 461X extending to the primary selector 441X in the associated group; that the finder F442X individual to the primary selector 441X has seized the primary register 1200X in the associated group; and that the subscriber at the calling extended trunk service subscriber substation TX dials the directory number of the called subscriber substation in the remote exchange D, the number being 279—1234 as previously noted. The first code digit 2 and the second code digit 7 are registered in the respective code switches in the primary register 1200X; the primary selector 600X operates in response to the first code digit 2 and is then released; and operation of the register translator allotter 1600X is initiated; all in the manner previously explained. Assuming that the register translator 1700X is again connected by the finder F2290X to the primary register 1200X; the complements of the first code digit 2 and the second code digit 7 registered in the primary register 1200X are transferred to the register translator 1700X. Subsequently, the third code digit 9 and the first numerical digit 1 are registered in the primary register 1200X and the complements thereof transferred to the register translator 1700X. Finally, the second numerical digit 2, the third numerical digit 3, and the fourth numerical digit 4 are received by the primary register 1200X and repeated to the register translator 1700X. When the register translator 1700X is connected to the primary register 1200X the special service relay in the register translator 1700X is operated by virtue of the fact that the primary selector in the group, including the primary selector 441X, comprises a strap connected in multiple to the associated resistor in series with the upper winding of the transfer relay in the primary selector 441X. As explained in the Ostline application, this strap is provided in each primary selector in the group including the primary selector 441X; whereas this strap is not provided in each primary selector in the group including the primary selector 600X. Thus, the special service relay in the register translator 1700X is operated in the present example by virtue of the fact that the connected primary register 1200X is connected to the primary selector 441X accessible to the line switch 421X, individual to the line 401X, extending to the calling extended trunk service subscriber substation TX. In the present example the operation of the special service relay in the register translator 1700X does not effect the setting of the rate and route switch therein, since the rate and route switch mentioned is set in accordance with the composite code switch, that is governed in accordance with the first, second and third code switches upon receiving the complements of the first, second and third code digits, 2, 7 and 9, since the present call is to be extended to the remote exchange D and for which a ticket, individual to the call, should be prepared, not withstanding the circumstance that the call was originated at the extended trunk service subscriber substation TX.

The subsequent operations of the register translator 1700X to govern the primary selector 441X, to govern the ticket repeater 800X, to govern the outgoing toll selector 513X, to govern the trunk circuit 90 and to govern the switching apparatus in the remote exchange D are the same as that previously described. The subsequent release of the register translator 1700X and the primary register 1200X are the same as previously described; however, incident to the transfer of the items of record information from the register translator 1700X to the ticket repeater 800X an additional item is transferred corresponding to the circumstance that the special service relay in the register translator 1700X was operated in the present example; and this additional item is registered in the ticket repeater 800X prior to the release of the register translator 1700X. Operation of the remainder of the apparatus to extend the connection to the called subscriber substation in the remote exchange D as well as the subsequent release of all of this apparatus with the exception of the ticket repeater 800X, are the same as previously described. Following the release of the established connection and again assuming that the ticket repeater 800X causes the printer controller allotter 4600X to assign the printer controller 4200X for use, the ticket repeater 800X is connected to the printer controller 4200X and all of the items of record information in the ticket repeater 800X are transferred to the printer controller 4200X in the manner previously explained. At this time the printer controller 4200X operates to select a calculator or calculating switch in accordance with the rate factor item registered therein and then sets the selected calculating switch in the two coordinate directions in accordance with the ten-minute and unit-minute items of the time duration of the established connection; all in the manner previously explained. At this time the operated calculating switch has established two charges for the present connection respectively based on the monetary basis and on the unit call or bulk basis. However, the additional item of record information registered in the printer controller 4200X previously referred to and indicating that the present call originated at a subscriber substation rendered extended trunk service causes the established calculation based on the unit call basis to be selected. Moreover, this registration of this additional item in the printer controller 4200X is utilized to bring about the modified control of the ticket printer control switch and the record storage transfer switch; whereby the ticket printer 5230X and the record printer 5240X are cojointly controlled by the printer controller 4200X and the printer link 5000X respectively to produce a ticket and a line of record information on the record sheet in modified form. More particularly, in the present example, the ticket printer 5230X is governed to produce a ticket of the character of that shown in Fig. 58 of the Ostline application mentioned and the record printer 5240X is controlled to produce a line of record information corresponding to that of line 4 on the record sheet shown in Fig. 55 of the Ostline application mentioned.

Accordingly, when a call is extended from a subscriber substation rendered flat rate service (the ordinary subscriber substation TP and the party subscriber substations TS1, TS2, TS3 and TS4) that is to be ticketed, the ticket printer 5230X is controlled to print the letter (F) in line four on the toll ticket and the letter (C) in line five on the toll ticket, and the cost of the call is calculated and printed in line five on the toll ticket on a monetary basis, as illustrated in Fig. 57 of the Ostline application mentioned; and the record printer 5240X is controlled to print the numeral (1) in the line of printing just preceding the identification of the register translator No., as illustrated in line three of the record sheet shown in Fig. 55 of the Ostline application mentioned.

On the other hand, when a call is extended from a subscriber substation rendered extended trunk service (the extended trunk service subscriber substation TX) that is to be ticketed, the ticket printer 5230X is controlled to print the letter (E) in line four on the toll ticket and the letter (U) in line five on the toll ticket, and the cost of the call is calculated and printed in line five on the toll ticket on a unit call or bulk basis, as illustrated in Fig. 58 of the Ostline application mentioned; and the record printer 5240X is controlled to print the numeral (2) in the line of printing just preceding the identification of the register translator No., as illustrated in line four of the record sheet shown in Fig. 55 of the Ostline application mentioned.

The subsequent operation and release of the printer controller 4200X and the printer link 5000X are the same as previously described.

*Call from an ordinary subscriber substation in the central office B to a subscriber substation in the near exchange C*

Now, assuming that a call initiated at an ordinary subscriber substation such, for example, as the ordinary subscriber substation TP in the central office B is to be extended to the near exchange C; that the line switch 423X, individual to the line 407X, extending to the calling ordinary subscriber substation TP has seized the trunk 462X extending to the primary selector 600X; that the finder F610X, individual to the primary selector 600X, has seized the primary register 1200X; and that the subscriber at the calling ordinary subscriber substation TP dials the directory number of the called subscriber substation in the near exchange C; which directory number includes the three code digits 4, 5 and 6, identifying the near exchange C, and four numerical digits such, for example, as the digits 1, 2, 3 and 4, identifying the line terminal of the called subscriber substation. When the first two code digits 4 and 5 are registered in the primary register 1200X, the register translator allotter 1600X is controlled to assign an idle register translator such, for example, as the register translator 1700X; whereupon the register translator 1700X is connected to the primary register 1200X. The complements of the first two code digits 4 and 5 registered in the primary register 1200X are transferred to the register translator 1700X. Later the third code digit 6 and the first numerical digit 1 are received by the primary register 1200X and registered therein; whereby the complements of the two digits mentioned are transferred from the primary register 1200X to the register translator 1700X; and subsequently the second numerical digit 2, the third numerical digit 3 and the four numerical digit 4 are received by the primary register 1200X and repeated directly to the register translator 1700X and registered therein. The registration of the complements of the first, second and third code digits 4, 5 and 6 respectively in the corresponding code switches in the register translator 1700X bring about operation of the rate and route switch therein to select both a series of routing digits to be utilized in the extension of the present call and a rate factor applicable to the call, as previously explained. In the present example the route switch may set up the digits 3, 3 and 4; whereby the register translator 1700X then operates to transmit the first routing digit 3, causing the primary selector 600X to respond thereto and select the group of trunks, including the trunk 780X, extending to the group of ticket repeaters, including the ticket repeater 800X, and then to select an idle trunk in this group. Assuming that the primary selector 600X seizes the particular trunk 780X extending to the particular ticket repeater 800X, the ticket repeater 800X is conditioned to receive the second routing digit 3 and to repeat it to the outgoing toll selector 513X, which is conditioned to receive the next routing digit at this time; all in the manner previously explained. The register translator 1700X then transmits the second routing digit 3 in the present series to the ticket repeater 800X; whereby the second routing digit 3 is repeated thereby to the outgoing toll selector 513X in order to bring about operation thereof to select the group of trunks, including the trunk 880B, extending to the group of trunk circuits, including the trunk circuit 50, and then to select an idle trunk in this group.

Assuming that the outgoing toll selector 513X seizes the particular trunk 880B extending to the particular trunk circuit 50, the outgoing toll selector 513X operates to apply ground potential to the control conductor C885 of the trunk 880B, thereby to complete a circuit including the contacts 846 and 852 for operating the local seizure relay R860 in the trunk circuit 50. Upon operating the local seizure relay R860 completes, at the contacts 862, an obvious path for applying ground potential to the control conductor C883 of the trunk 880A, thereby to mark the trunk 880A as busy to the toll third selectors 1406, etc., having access thereto. Also the local seizure relay R860 completes, at the contacts 864, an obvious circuit for operating the switch relay R720; and completes, at the contacts 865, a circuit, including the contacts 523, for operating the control relay R510. Upon operating the switch relay R720 completes, at the contacts 723, 727, 722′ and 723′, a loop circuit between the line relay R760 and the drying relay R750 in the trunk circuit 50 and the left-hand winding of the arrest dial relay R1320 in the ticket repeater 800X. This loop circuit extends from ground by way of the upper winding of R760, the upper winding of R750, the contacts 722′, 654, 642, 723′ and 734 to the line conductor C882; and from battery by way of the lower winding of R760, the contacts 656, the lower winding of the drying relay R750, the contacts 727, 652, 641, 723 and 731 to the line conductor C881; the line conductors C881 and C882 of the trunk 880B being connected by way of the outgoing toll selector 513X, the line conductors of the trunk 907X and the contacts 961X and 959 directly across the left-hand winding of the arrest dial relay R1320. By this time the control relay R1310 in the ticket repeater 800X has restored, interrupting, at the contacts 1311, the previously mentioned path for short circuiting the left-hand winding of the arrest dial relay R1320; whereby the winding mentioned of the arrest dial relay R1320 is energized at this time in the loop circuit above traced. When the left-hand winding of the arrest dial relay R1320 is energized in the manner traced above, the latter relay is poled not to operate; however, almost immediately thereafter the control relay R510 in the trunk circuit 50 completes its operation effecting the operation of the supervisory relay R610. Upon operating the supervisory relay R610 completes, at the contacts 612, a circuit including the contacts 865 for operating the reverse battery relay R730. Upon operating the reverse battery relay R730 reverses, at the contacts 731, 732, 733 and 734, the polarity of the line conductors C881 and C882 of the trunk 880B with respect to the upper and lower windings of the line relay R760, thereby to pole the arrest dial relay R1320 in the ticket repeater 800X to operate. Also, the line relay R760 in the trunk circuit 50 was operated incident to the completion of the above traced loop circuit and remains operated at this time. Upon operating the line relay R760 completes, at the contacts 762, the previously traced circuit for operating the hold relay R770; and since the above traced loop circuit is balanced the drying relay R750 is not operated. Further, the line relay R760 completes, at the contacts 761, the previously traced loop circuit including the left-hand winding of the answer relay R740 and the trunk line 500 extending to the near exchange C; whereby the trunk circuit in the near exchange C operates to cause the automatic switching apparatus therein to be associated with the trunk line 500; which operation consumes some time. When this loop circuit is initially completed, the left-hand winding of the answer relay R740 is energized, but the polarity of the trunk line 500 is such that the latter relay is not operated. Upon operating the arrest dial relay R1320 in the ticket repeater 800X interrupts, at the contacts 1321, the previously mentioned path for short circuiting the resistor 1322; whereby the impulse relay R960X in the ticket repeater 800X is retained in its operated position and the stop send relay R1510 in the register translator 1700X restores. Upon restoring the stop send relay R1510 blocks the transmission of the third routing digit 4 from the register translator 1700X at this time as previously explained.

When the switching apparatus in the near exchange C is associated with the trunk line 500 and is in readiness to receive a digit, battery and ground potentials in the near exchange C are reversed over the line conductors of the trunk line 500; whereby the left-hand winding of the answer relay R740 in the trunk circuit 50 is poled to operate. Upon operating the answer relay R740 effects operation of the supervisory relay R520; upon operating the supervisory relay R520 effects restoration of the control relay R510 shortly thereafter; upon restoring the control relay R510 effects restoration of the supervisory relay R610; and upon restoring the supervisory relay R610 effects restoration of the reverse battery relay R730; all in the manner previously explained. Upon restoring the reverse battery relay R730 reverses, at the contacts 731, 732, 733 and 734, the polarity of the line conductors of the trunk line 880B with respect to the upper and lower windings of the line relay R760; whereby the left-hand winding of the arrest dial relay R1320 in the ticket repeater 800X is poled to restore. Upon restoring the arrest dial relay R1320 recompletes, at the contacts 1321, the previously mentioned path for short circuiting the resistor 1322; thereby to retain operated the impulse relay R960X in the ticket repeater 800X and to effect operation of the stop send relay R1510 in the register translator 1700X. After the stop send relay R1510 reoperates the digit stop relay R1910X may restore; whereby the register translator 1700X is conditioned to transmit the third routing digit 4 in the present series. The register translator 1700X then proceeds to transmit the third routing digit 4 in the present series to the ticket repeater 800X; whereby the impulse relay R960X therein repeats the impulses of the digit over the trunk 907X, the outgoing toll selector 513X and the trunk 880B to the line relay R760 in the trunk circuit 50 in a manner substantially identical to that previously explained. The line relay R760 in the trunk circuit 50 follows the impulses of the present digit effecting operation of the digit relay R810 that, in turn, effects operation of the digit slave relay R620 that, in turn, effects operation through the first step of the shunt relay R640; all in the manner previously explained. The digit relay R810, the digit slave relay R620 and the hold relay R770 remain operated during the digit. Further the line relay R760 repeats, at the contacts 761, the impulses of the present digit over the trunk line 500 to the automatic switching apparatus in the near exchange C in order to cause corresponding operation thereof. At the conclusion of the third routing digit 4 the line relay R760 is maintained operated effecting restoration of the digit relay R810 shortly thereafter and restoration of the digit slave relay R620 after a further time interval; whereupon the shunt relay R640 is operated through its second step, interrupting, at the contacts 641 and 642, the normally completed paths for short circuiting the windings 631 and 633 of the repeater 630. In a similar manner the four numerical digits 1, 2, 3 and 4 are transmitted from the register translater 1700X to the ticket repeater 800X and then repeated thereby to the trunk circuit 50 and thence repeated thereby to the switching apparatus in the near exchange C; whereby the final stage of the switching apparatus mentioned seizes the line extending to the called subscriber substation and tests the idle or busy condition thereof in a conventional manner.

At this time the register translator 1700X and the primary register 1200X are released; the register translator 1700X having, in the meantime, caused operation of the detector 2900X and also transferred all of the items of record information to the ticket repeater 800X. When the subscriber at the called subscriber substation in the near exchange C answers the call, the final switching stage in the near exchange C switches through in order to effect the reversal of ground and battery potentials over the trunk line 500 in order to pole the left-hand winding of the answer relay R740 in the trunk circuit 50 to restore. Upon restoring the answer relay R740 effects operation of the supervisory relay R610; and upon operating the supervisory relay R610 effects operation of the reverse battery relay R730; and upon operating the reverse battery relay R730 reverses, at the contacts 731, 732, 733 and 734 the polarity of the trunk 880B with respect to the upper and lower windings of the line relay R760 in order to bring about operation of the answer relay R940X in the ticket repeater 800X; all in the manner previously explained. At this time the timing apparatus in the ticket repeater 800X begins operating in order to time the duration of the present connection; and when the subscriber at the called subscriber substation in the near exchange C replaces the receiver of the telephone instrument thereat upon its associated switchhook at the conclusion of the connection, the automatic switching apparatus in the near exchange C operates in order to reverse the polarity of the trunk line 500, poling the left-hand winding of the answer relay R740 in the trunk circuit 50 to reoperate. Upon reoperating the answer relay R740 effects the restoration of the supervisory relay R610 that, in turn, effects restoration of the reverse battery relay R730; whereby the polarity of the trunk 880B is again reversed with respect to the upper and lower windings of the line relay R760; all in the manner previously described. The answer relay R940 in the ticket repeater 800X then restores in order to arrest timing of the present call, as previously noted.

When the subscriber at the calling ordinary subscriber substation TP replaces the receiver of the telephone instrument thereat upon its associated switchhook, the previously traced loop circuit for maintaining operated the impulse relay R960X in the ticket repeater 800X is interrupted, causing the latter relay to restore and effect release of the primary selector 600X and the line switch 423X, as previously explained. Also, upon restoring, the impulse relay R960X effects restoration of the outgoing toll selector 513X; whereby ground potential is removed from the control conductor C885 of the trunk 880B and the loop circuit including the line conductors C881 and C882 of the trunk 880B is interrupted. The line relay R760 and the local seizure relay R860 in the trunk circuit 50 then restore. Upon restoring the line relay R760 interrupts, at the contacts 761, the loop circuit including the left-hand winding of the answer relay R740 and the trunk line 500 extending to the near exchange C is released marking the line extending to the called subscriber substation as idle. Also, upon restoring the line relay R760 effects the restoration of the hold relay R770 shortly thereafter. Upon restoring the hold relay R770 effects the restoration of the shunt relay R640 and the supervisory relay R520; all in the manner previously explained. Upon restoring the local seizure relay R860 recompletes, at the contacts 861, the previously traced path for applying battery potential by way of the winding of the toll seizure relay R850 to the control conductor C883 of the trunk 880A; thereby to mark the trunk 880A as idle to the toll third selectors 1406, etc., having access thereto.

The toll ticket repeater 800X then controls the printer controller allotter 4600X; whereby the printer controller 4200X may be connected to the ticket repeater 800X and all of the record information in the ticket repeater 800X is transferred to the printer controller 4200X; all in the manner previously explained. The printer controller 4200X then governs the printer link 5000X and the ticket printer 5230X and the record printer 5240X; whereby a ticket is produced in conjunction with the present call by the ticket printer 5230X and a line on the record sheet is produced in conjunction with the present call by the record printer 5240X; all in the manner previously explained. Since the calling ordinary subscriber substation TP in the central office B is rendered flat rate service the ticket produced includes a charge for the call calculated on a monetary basis; and in fact the ticket, as well as the line on the record sheet, that are produced are substantially identical to those produced in conjunction with the call from the calling ordinary subscriber substation TP in the central office B to the called subscriber substation in the remote exchange D, as previously explained.

In conjunction with the extension of the above described call from the calling ordinary subscriber substation TP in the central office B to the called subscriber substation in the near exchange C, it is pointed out that the trunk circuit 50 operates, while it is waiting for the switching apparatus in the near exchange C to be attached to the trunk line 500 and to be ready to receive a digit, to return a delay-in-send signal to the ticket repeater 800X and that the ticket repeater 800X repeats the delay-in-send signal to the register translator 1700X; whereby the timing apparatus in the register translator 1700X may be timed out in the event the delay-in-send signal persists for an abnormal time interval; which condition occurs when the switching apparatus in the near exchange C encounters an all-trunks-busy condition at this time. In the event the timing apparatus in the register translator 1700X is timed out, the present call is routed to the interceptor operator position 114X—117X, as a consequence of the register translator 1700X resetting the rate and route switch therein in order to cause the routing digits 1, 1 and 4 to be transmitted; all in the manner previously explained.

Further, in conjunction with the extension of the above described call from the calling ordinary subscriber substation TP in the central office B to the called subscriber substation in the near exchange C, it may happen that the switching apparatus in the near exchange C may encounter either an all-trunks-busy condition or a line-busy condition. In the event the final switching stage of the switching apparatus in the near exchange C tests the line extending to the called subscriber substation as being busy, busy tone current is returned over the trunk line 500 and the connection to the calling ordinary subscriber substation TP, subsequent to the release of the register translator 1700X and the primary register 1200X, in the manner described above; whereby the subscriber at the calling ordinary subscriber substation TP may release the connection in the manner previously explained.

On the other hand, in the event one of the intermediate switching stages of the switching apparatus in the near exchange C encounters an all-trunks-busy condition, the switching stage encountering the all-trunks-busy condition operates to open the loop circuit including the trunk line 500 and to cause busy tone current to be returned thereover. The busy tone current is repeated over the connection to the subscriber at the calling ordinary subscriber substation TP in the central office B, whereby the subscriber at the calling ordinary subscriber substation TP initiates the release of the connection in the manner previously explained. However, in the event the subscriber at the calling ordinary subscriber substation TP fails to initiate the release of the connection within a reasonable time interval, the call from the calling ordinary subscriber substation TP is routed to the interceptor operator position 114X—117X by the register translator 1700X. More specifically, when the loop circuit including the trunk line 500 is opened, the answer relay R740 restores, effecting operation of the supervisory relay R610 and the reverse battery relay R730 in the trunk circuit 50; all in the manner previously explained. Upon operating the reverse battery relay R730 reverses the polarity of the trunk 880B, effecting operation of the arrest dial relay R1320 in the ticket repeater 800X and the consequent restoration of the stop send relay R1510 in the register translator 1700X. In other words, the delay-in-send signal is transmitted from the trunk circuit 50 to the ticket repeater 800X and repeated thereby to the register translator 1700X; all in the manner previously explained. In the present example, further operation of the register translator 1700X is prevented, whereby the timer switch therein causes the call to be routed, as a consequence of the transmission of the routing digits 1, 1 and 4, to the interceptor operator position 114X—117X, in the manner previously explained. The subsequent answering of the call at the interceptor operator position 114X—117X and the release of the connection are the same as previously described.

*Call from a party subscriber substation in the central office B to a subscriber substation in the near exchange C*

The extension of a call from a calling party subscriber substation such, for example, as one of the party subscriber substations TS1, TS2, TS3 and TS4 in the central office B to a called subscriber substation in the near exchange C proceeds in a manner substantially identical to that described in conjunction with the extension of a call from a calling ordinary subscriber substation TP in the central office B to a called subscriber substation in the near exchange C explained above; and in the interest of brevity will not be repeated. However, it is pointed out that the operation of the primary register 1200X and the register translator 1700X to govern the detector 2900X in order to identify the particular calling party subscriber substations TS1, TS2, TS3 or TS4 is slightly different from that described immediately above in conjunction with the extension of the call from the calling ordinary subscriber substation TP in the central office B; and, in turn, is identical to that previously explained in conjunction with the extension of the call from one of the calling party subscriber substations TS1, TS2, TS3 and TS4 in the central office B to a subscriber substation in the remote exchange D.

*Call from an extended trunk service subscriber substation in the central office B to a subscriber substation in the near exchange C*

The extension of a call from a subscriber substation rendered extended trunk service such, for example, as the extended trunk service subscriber substation TX in the central office B proceeds via the subscriber line 401X and the individually associated line switch 421X, as previously explained. The line switch 421X may seize the trunk 461X extending to the primary selector 441X; and the finder F442X, individual to the primary selector 441X, may seize the primary register 1200X, all in the manner previously explained. The subscriber at the calling extended trunk service subscriber substation then proceeds to dial the directory number of the called subscriber substation in the near exchange C, which may be 456-1234. The first and second code digits 4 and 5 are registered in the corresponding code switches in the primary register 1200X; whereby the register translator allotter 1600X operates in order to assign an idle register translator such, for example, as the register translator 1700X, whereupon the register translator 1700X is connected to the primary register 1200X; all in the manner previously explained. The complements of the first and second code digits registered in the primary register 1200X are transferred to the register translator 1700X and subsequently when the third code digit, 6, and the first numerical digit, 1, are received by the primary register 1200X they are registered therein and the complements thereof are transferred to the register translator 1700X. Subsequently when the second numerical digit 2, the third numerical digit 3, and the fourth numerical digit 4 are received by the primary register 1200X they are repeated directly to the register translator 1700X. When the register translator 1700X is connected to the primary register 1200X, the special service relay in the register translator 1700X is operated since the primary selector 441X, connected to the primary register 1200X, comprises a strap shunting the resistor in series with the upper winding of the transfer relay therein. The registration of the three code digits 4, 5, and 6 in the respective code switches in the register translator 1700X effects a selective setting of the composite code switches therein, as previously explained; whereby the composite code switch, in conjunction with the operated special service relay, effect a corresponding setting of the rate and route switch in the register translator 1700X. More particularly, the composite code switch occupies a setting which would normally cause the rate and route switch to be set to a given position in order to transmit the routing digits 3, 3 and 4, which operation normally occurs when the special service relay does not occupy its operated position as is the case when the call from the ordinary subscriber substation TP was extended to a called subscriber substation in the near exchange C, as previously explained. However, since the special service relay occupies its operated position in the present example, this setting of the composite code switch brings about a modified setting of the rate and route switch to establish the routing digits 5, 3 and 4. In other words, registration of the code digits 4, 5 and 6 from the calling ordinary subscriber substation TP (without operation of the special service relay) causes the register translator 1700X to set up the routing digits 3, 3 and 4; whereas the registration of the code digits 4, 5 and 6 from the calling extended trunk service subscriber substation TX (with operation of the special service relay) causes the register translator 1700X to set up the routing digits 5, 3 and 4. The routing digits 3, 3 and 4 cause the call to be extended via the ticket repeater 800X; whereas the routing digits 5, 3 and 4 cause the call to be extended via the ordinary repeater 451X; accordingly the first call mentioned is ticketed; whereas the present call is not ticketed.

Continuing now with the present call, the register translator 1700X operates to transmit the three routing digits 5, 3 and 4 in the present series and then the four numerical digits 1, 2, 3 and 4. The primary selector 441X responds to the first routing digit 5 to select the group of trunks, including the trunk 471X, extending to the group of ordinary repeaters, including the ordinary repeater 451X, and then to select an idle trunk in this group. Assuming that the primary selector 441X seizes the particular trunk 471X extending to the particular ordinary repeater 451X, the second routing digit, 3, is transmitted from the register sender to the ordinary repeater 451X and repeated to the associated outgoing toll selector 511X; whereby the outgoing toll selector 511X operates to select the group of trunks, including the trunk 880B, extending to the group of trunk circuits, including the trunk circuit 50. Assuming that the outgoing toll selector 511X seizes the particular trunk 880B extending to the trunk circuit 50, the trunk circuit 50 operates in the manner previously explained in order to return a delay-in-send signal back to the ordinary repeater 451X and to effect seizure over the trunk line 500 of the automatic switching apparatus in the near exchange C. When the automatic switching apparatus in the near exchange C becomes associated with the trunk line 500, in the manner previously explained, the trunk circuit 50 operates to remove the delay-in-send signal back to the ordinary repeater 451X. When the ordinary repeater 451X receives the delay-in-send signal, it repeats it to the register translator 1700X; and subsequently, when the delay-in-send signal is removed to the ordinary repeater 451X, it is then removed from the register translator 1700X; the operation of the ordinary repeater 451X in conjunction with the trunk circuit 50 and the register translator 1700X in this regard being identical to that of the ticket repeater 800X, described in detail hereinbefore.

The register translator 1700X then operates to transmit the third routing digit 4 and the four numerical digits 1, 2, 3 and 4; whereby the switching apparatus in the near exchange C operates to seize the line extending to the called subscriber substation therein and immediately tests the idle or busy condition thereof. Assuming that the called subscriber substation in the near exchange C is tested as being idle at this time, the final switching stage of the switching apparatus therein operates in order to project ringing current over the line extending thereto. Subsequently, when the subscriber at the called subscriber substation in the near exchange C answers the call, the final switching stage of the switching apparatus in the near exchange C operates to interrupt the projection of ringing current over the line extending thereto and causes the polarity of the trunk line 500 to be reversed, thereby to control the trunk circuit 50 in the manner previously explained. The trunk circuit 50 then causes the polarity of the trunk 880B to be reversed, thereby to cause the ordinary repeater 451X to receive answer supervision and switch through to complete a telephone connection between the calling extended trunk service subscriber substation TX in the central office B and the called subscriber substation in the near exchange C. The release of the above described connection is under the control of the subscriber at the calling extended trunk service subscriber substation and is brought about when the subscriber thereat replaces the receiver of the telephone instrument at the calling extended trunk service subscriber substation TX upon its associated switchhook effecting release of the ordinary repeater 451X; whereby the primary selector 441X and the line switch 421X are released, as well as the outgoing toll selector 511X and the trunk circuit 50, bringing about the release of the switching apparatus in the near exchange C; in order to mark the line extending to the called subscriber substation therein as idle. Of course the present call is not ticketed since the ordinary repeater 451X is not associated with the printer controllers 422X, etc., as subscriber substations rendered extended trunk service are permitted free calls to subscriber substations in the near exchange C.

*Attempted call from a denied trunk service subscriber substation in the central office B to a subscriber substation in the near exchange C or in the remote exchange D*

Only calls which do not require translation by a register translator may be completed under the control of a calling device at a calling denied trunk service subscriber substation in the central office B. For example, the subscriber at the calling denied trunk service subscriber substation TD in the central office B may extend local calls in the central office B and calls to immediately adjacent exchanges having the codes 841, 842, 843, etc. However, the denied trunk service subscriber substation TD in the central office B may not extend calls to the near exchange C having a code 456 or the remote exchange D having the code 279, since both of these calls must be translated by a register translator. Now, assume that the subscriber at the calling denied trunk service subscriber substation TD in the central office B initiates a call; that the line switch 422X, individual to the associated subscriber line 404X, operates to seize the trunk 461X extending to the primary selector 441X; and that the finder F442X, individual to the primary selector 441X, seizes the primary register 1200X; all in the manner previously discussed. Now, assume that the subscriber at the calling denied trunk service subscriber substation TD attempts the extension of a trunk call by dialing the directory number of a called subscriber substation in the near exchange C (the code digits 4, 5 and 6) or in the remote exchange D (the code digits 2, 7 and 9). In either event when the first and second code digits 4 and 5 or the first and second code digits 2 and 7 are dialed at the calling denied trunk service subscriber substation TD they are registered in the respective code switches in the primary register 1200X in the manner previously explained. As previously noted, the calling device at the denied trunk service subscriber substation TD is of the special construction previously described; whereby two ground impulses are transmitted over the associated subscriber line 404X incident to each operation thereof by the auxiliary springs 1308. More particularly, when the finger wheel of this calling device is operated the set of auxiliary springs 1308 is operated thus to apply ground potential and then remove ground potential from the line conductors of the subscriber line 404X while the set of impulse springs 1307 is closed; when the finger wheel is then released the set of impulse springs 1307 is operated to transmit the digit; and after the set of impulse springs 1307 is reclosed subsequent to the transmission of the digit the set of auxiliary springs 1308 is again operated to apply ground potential and then to remove ground potential from the line conductors of the subscriber line 404X.

Accordingly, in the present examples, during the registration of the second code digit 5 or 7 in the second code switch in the primary register 1200X, two of the party relays therein are operated in the manner previously explained. The primary register 1200X then controls the register translator allotter 1600X; whereby an idle register translator such, for example, as the register translator 1700X, is connected to the primary register 1200X; all in the manner previously explained. When the register translator 1700X is connected to the primary register 1200X, the special service relay in the register translator 1700X is operated since the primary selector 441X, connected to the primary register 1200X, comprises the strap in multiple to the resistor in series with the upper winding of the transfer relay therein, as previously explained. Also, the operated position of the two party relays in the primary register 1200X brings about a corresponding setting of the party switch in the register translator 1700X in the manner previously explained. In the register translator 1700X when both the special service relay occupies its operated position and the party switch is operated to the position mentioned a circuit is completed for operating the denied trunk service relay in the register translator 1700X. Upon operating the denied trunk service relay in the register translator 1700X effects an arbitrary setting of the rate and route switch therein; whereby a route is selected corresponding to the routing digits 1, 1 and 6, and without reference to the setting of the composite code switch in the register translator 1700X. The register translator 1700X then transmits the three routing digits 1, 1 and 6; the primary selector 441X is governed in accordance with the first routing digit 1 to select the group of special service selectors, including the special service selector 503X, and then to select an idle special service selector in this group. Assuming that the primary selector 441X selects the special selector 503X, the second routing digit 1 causes the special service selector 503X to operate and drop back as previously explained. Subsequently, the special service selector 503X responds to the third routing digit 6 to select the corresponding group of trunks extending to the interceptor operator position 114X—117X and then to select an idle trunk in this group; thereby to indicate to the operator mentioned that the call was routed thereto as a result of a subscriber at a subscriber substation rendered denied trunk service attempting to extend a trunk call to an exchange such, for example, as the near exchange C or the remote exchange D. The operator at the interceptor operator position 114X—117X answers the call and informs the subscriber at the denied trunk service subscriber substation TD that trunk calls of the character attempted are not permitted from the denied trunk service subscriber substation TD. The subsequent release of the primary selector 441X and the special service selector 503X are brought about by the subscriber at the calling denied trunk service subscriber substation TD when he replaces the receiver of the telephone instrument thereat upon its associated switchhook in a conventional manner.

In passing it is noted that the subscriber at the calling denied trunk service subscriber substation TD in the central office may obtain connections to called subscriber substations in the near exchange C or in the remote exchange D by first routing a call to the toll switchboard 11Y and having the operator thereat extend the connection into the near exchange C or into the remote exchange D in the event the operator at the toll switchboard 11Y finds that completion of such a call is proper in view of the credit standing of the subscriber at the calling denied trunk service subscriber substation TD.

*Intercepting other calls*

Now, assume that a call has been initiated at any subscriber substation in the central office B such, for example, as the ordinary subscriber substation TP; that line switch 423X associated with the subscriber line 407X extending to the calling ordinary subscriber substation TP has seized the trunk 462X extending to the primary selector 600X; and that the finder F610X, individual to the primary selector 600X, has seized the primary register 1200X. At this time the primary register 1200X is in readiness to receive the full complement of digits dialed at the calling ordinary subscriber substation TP and indicative of either a local call requiring no translation or a trunk call requiring translation, as previously explained. Now assume that the subscriber at the calling ordinary subscriber substation TP dials several digits less than a full complement of digits and indicating that the call must be translated by a register translator. When the first and second code digits are registered in the primary register 1200X, the register translator allotter 1600X is controlled to assign an idle register translator such, for example, as the register translator 1700X; whereupon the register translator 1700X is connected to the primary register 1200X, as previously explained. When the register translator 1700X is connected to the primary register 1200X, operation of the timing apparatus in the register translator 1700X is initiated; all as previously explained. In the present example, the complements of the first four digits registered in the primary register 1200X are transmitted and registered in the register translator 1700X and the fifth, etc., digits received by the primary register 1200X are repeated directly to and registered in the register translator 1700X. However, in the present example, in view of the fact that less than a full complement of digits is registered in the register translator 1700X, the register translator 1700X cannot operate fully to transmit the necessary routing digits, if required, and the numerical digits to effect the operation of the outgoing switch train to complete the desired connection. Accordingly, the register translator 1700X transmits the routing digits, the code digits, if required, and the numerical digits that have been registered therein; all in the manner previously explained; however, the register translator 1700X is not released in the manner described in view of the fact that complete operation thereof is impossible, since it has not registered a full complement of digits. Hence, the register translator 1700X is retained in its operated position after it has transmitted all of the digits possible and is retained connected to the primary register 1200X for a time interval of thirty seconds. The normal operation of the register translator 1700X requires only a fraction of the time interval mentioned and in the event the register translator 1700X is retained connected to the primary register 1200X for thirty seconds the timer switch therein operates to time out the register translator 1700X; whereby the rate and route switch therein is released and reset to establish an arbitrary route comprising the routing digits 1, 1 and 4; whereby the primary selector 600X and the special service selector 503X are operated in the manner previously explained to route the present call to the interceptor operator position 114X—117X over a corresponding group of trunks, thereby to indicate to the operator thereat that the subscriber at the calling subscriber substation TP has failed to dial a full complement of digits or that the outgoing switch train has reached a blocked switching stage, whereby the delay-in-send signal has been received by the associated register translator for an abnormal time interval, as previously explained. The operator at the interceptor operator position 114X—117X then answers the call and advises the subscriber at the calling ordinary subscriber substation TP of the circumstance mentioned. The subscriber at the calling ordinary subscriber substation TP then releases the established connection in the manner previously explained when the receiver of the telephone instrument thereat is returned to its associated switchhook.

Again, assume that a call has been initiated at any subscriber substation in the central office B such, for example as the ordinary subscriber substation TP, that the line switch 423X associated with the subscriber line 407X extending to the calling ordinary subscriber substation TP has seized the trunk 462X extending to the primary selector 600X and that the finder F610X, individual to the primary selector 600X, has connected the primary register 1200X thereto. Now assume that the subscriber at the calling ordinary subscriber substation TP dials the directory number of a called subscriber substationed indicative of a trunk call requiring translation; when the first and second code digits are registered in the primary register 1200X, the register translator allotter 1600X is controlled to assign an idle register translator such, for example, as the register translator 1700X, whereupon the register translator 1700X is connected to the primary register 1200X. The complements of the first four digits received by the primary register 1200X are transferred to the register translator 1700X and the next three digits are repeated directly from the primary register 1200X to the register translator 1700X as previously explained. The composite code switch and the rate and route switch in the register translator 1700X are operated and after the first routing digit has been transmitted the detector start relay therein is operated. Upon operating the detector start relay in the register translator 1700X initiates operation of the detector 2900X; all in the manner previously explained; and in the event the detector 2900X fails to detect the line terminal of the subscriber line 407X extending to the calling ordinary subscriber substation TP after two complete cycles of operation thereof and consequently two complete attempts, in the manner previously explained, the detector 2900X operates to effect operation of the detector failure relay in the register translator 1700X. Upon operating the detector failure relay in the register translator 1700X effects release of the detector 2900X, as well as the release of the rate and route switch in the register translator 1700X and, further, effects an arbitrary setting of the rate and route switch mentioned to establish a route comprising the routing digits 1, 1 and 5. Further, the register translator 1700X effects the release of the primary selector 600X and then proceeds to transmit the routing digits 1, 1 and 5; whereby the primary selector 600X and the special service selector 503X are reoperated in a manner substantially identical to that previously explained. More particularly, the special service selector 503X routes the present call over an idle trunk in the corresponding group to the interceptor operator position 114X—117X, thereby to indicate to the operator thereat that the present call has been routed thereto as a consequence of the failure of the detector 2900X to detect the line terminal of the subscriber line extending to the calling subscriber substation. The operator at the interceptor operator position 114X—117X then answers the call and may then advise the subscriber at the ordinary calling subscriber substation TP to release the present connection and again to attempt the extension of the trunk call. The subsequent release of the established connection is the same as that previously described when the subscriber at the calling ordinary subscriber substation TP replaces the receiver of the telephone instrument thereat upon its associated switchhook.

Again assume that a call has been initiated at any subscriber substation in the central office B such, for example, as the ordinary subscriber substation TP; that the line switch 423X associated with the subscriber line 407X extending to the calling ordinary subscriber substation TP has seized the trunk 462X extending to the primary selector 600X; that the finder F610X, individual to the primary selector 600X has seized the primary register 1200X. Now assume that the subscriber at the calling ordinary subscriber substation TP dials as the directory number of the called subscriber substation three code digits, which in fact do not identify any called exchange; in other words, the subscriber at the calling ordinary subscriber substation TP dials a non-assigned directory number. When the first and second code digits are registered in the primary register 1200X, the register translator allotter 1600X is controlled to assign an idle register translator such, for example, as the register translator 1700X which is connected to the primary register 1200X. After the register translator 1700X is connected to the primary register 1200X, the primary register 1200X operates to transmit the complements of the first four digits registered therein to the register translator 1700X and to repeat directly the remainder of the digits to the register translator 1700X; all in the manner previously explained. The composite code switch in the register translator 1700X is set in accordance with the complements of the first three code digits registered in the register translator 1700X and occupies a position corresponding to non-assigned code; thus when operation of the rate and route switch is initiated there are no stop markings therefore extending from the composite code switch; whereby the rate and route switch is operated to its extreme coordinate positions, thereby arbitrarily to select the route, including the routing digits 1, 1 and 7, in the manner previously explained. The register translator 1700X then proceeds to transmit the three routing digits, 1, 1 and 7, in order to effect operation of the primary selector 600X and the special service selector 503X; whereby the special service selector 503X selects an idle trunk in the corresponding group extending to the interceptor operator position 114X—117X, thereby to indicate to the operator thereat that the present call has been intercepted by virtue of the fact that the subscriber at the calling subscriber substation has dialed a non-assigned code. The operator at the interceptor operator position 114X—117X then answers the call and advises the subscriber at the calling ordinary subscriber substation TP that he dialed a non-assigned directory number and he should release the present connection and again attempt the extension of the trunk call employing the directory number as listed in the telephone directory. The subsequent release of the connection proceeds in a conventional manner when the subscriber at the calling ordinary subscriber substation TP replaces the receiver of the telephone instrument thereat upon its associated switchhook.

*Conclusions*

From the foregoing it is apparent that an automatic telephone system is provided which comprises an improved switching arrangement that provides for the extension of toll calls from a toll switchboard in a distant automatic office through an automatic central office, as a tandem point, to subscriber substations in automatic exchanges in the area of the automatic central office; that provides for the extension of toll calls from an automatic dial toll switchboard in the automatic central office to subscriber substations in the automatic exchanges; and that provides for the extension of trunk calls from subscriber substations in the automatic central office to subscriber substations in the automatic exchanges; wherein the toll calls from the automatic distant office and from the automatic central office, as well as the trunk calls from the automatic central office, are routed over the same group of trunk lines extending from the automatic central office to the automatic exchanges. The trunk lines mentioned comprise trunk circuits capable of transmitting delay-in-dial and delay-in-send signals back over the originating switch train, until the switching apparatus in the automatic exchanges are in readiness to receive digits. Further, the originating switch train extending back to the toll switchboard in the automatic distant office is responsive to the reception of a delay-in-dial signal from one of the trunk circuits to give the operator at the toll switchboard therein a corresponding delay-in-dial signal; the originating switch train extending back to the automatic dial toll switchboard in the automatic central office is responsive to the reception of a delay-in-send signal from one of the trunk circuits to arrest operation of a register sender controllable from the automatic dial toll switchboard in the automatic central office; and the originating switch train extending back to the calling subscriber substation in the automatic central office is responsive to the reception of a delay-in-send signal from one of the trunk circuits to arrest operation of an ordinary register sender controllable from the calling subscriber substation in the automatic central office B.

Finally, toll calls originating at the toll switchboard in the automatic distant office, as well as toll calls originating at the automatic dial toll switchboard in the automatic central office are ticketed manually by operators at the two toll switchboards mentioned; whereas trunk calls originating at calling subscriber substations in the automatic central office are automatically ticketed and recorded by associated ticket producing and record producing apparatus disposed in the automatic central office.

The connection and arrangement of the trunk circuits 50 and 90 are disclosed and claimed in the copending divisional application of Harvey W. Balzer and John E. Ostline, Serial No. 195,734, filed November 15, 1950.

While one embodiment of the invention has been disclosed, it will be understood that various modifications may be made therein which are within the true spirit and scope of the invention.

What is claimed is:

1. In a telephone system, an operator switchboard, subscriber substations, a trunk line, automatic switching apparatus including tandem related switching stages, first and second register mechanisms, means including a key set disposed at said operator switchboard for registering digits in said first register mechanism and for connecting it over said trunk line to said switching apparatus, means including a dialing device disposed at a calling one of said subscriber substations for registering digits in said second register mechanism and for connecting it over said trunk line to said switching apparatus, each of said register mechanisms being operative when connected over said trunk line to said switching apparatus to control progressive operation of the switching stages thereof in accordance with the digits registered therein, and means responsive to a predetermined operation of an intermediate switching stage of said switching apparatus for returning a delay control over said trunk line in order to delay further control operation of the connected one of said register mechanisms.

2. In a telephone system, an office including an operator switchboard and subscriber substations, an exchange including automatic switching apparatus, a trunk line extending between said office and said exchange, first and second register senders, means including a key set disposed at said operator switchboard for registering digits in said first register sender and for connecting it to said trunk line, means including a dialing device disposed at a calling one of said subscriber substations for registering digits in said second register sender and for connecting it to said trunk line, each of said register senders being operative after connection to said trunk line to send thereover switch directing signals corresponding to the digits registered therein, means responsive to the connection of one of said register senders to said trunk line for connecting said switching apparatus thereto, means responsive to the connection of said switching apparatus to said trunk line for initiating sending operation of the connected one of said register senders in order to control the operation of said switching apparatus over said trunk line, and means responsive to a predetermined operation of said switching apparatus for returning a delay control over said trunk line in order to delay further sending operation of the connected one of said register senders.

3. In a telephone system, an office including an operator switchboard and subscriber substations and first automatic switching apparatus, an exchange including second automatic switching apparatus, a trunk line extending between said office and said exchange, first and second register senders, means including a key set disposed at said operator switchboard for registering digits in said first register sender and for connecting it to said first switching apparatus, means including a dialing device disposed at a calling one of said subscriber substations for registering digits in said second register sender and for connecting it to said first switching apparatus, each of said register senders being operative when connected to said first switching apparatus to send thereto switch directing signals corresponding to the digits registered therein in order to operate said first switching apparatus to seize said trunk line, means responsive to the operation of said first switching apparatus to seize said trunk line for arresting further sending operation of the connected one of said register senders and for initiating the connection of said second switching apparatus to said trunk line, and means responsive to the connection of said second switching apparatus to said trunk line for initiating further sending operation of the connected one of said register senders in order to control the operation of said second switching apparatus over said trunk line.

4. In a telephone system, an office including an operator switchboard and subscriber substations and first automatic switching apparatus, an exchange including second automatic switching apparatus, a trunk line extending between said office and said exchange, first and second register senders, means including a key set disposed at said operator switchboard for registering digits in said first register sender and for connecting it to said switching apparatus, means including a dialing device disposed at a calling one of said subscriber substations for registering digits in said second register sender and for connecting it to said first switching apparatus, each of said register senders being operative when connected to said first switching apparatus to send thereto switch directing signals corresponding to the digits registered therein in order to operate said first switching apparatus to seize said trunk line, means responsive to the operation of said first switching apparatus to seize said trunk line for returning a delay signal thereto and for initiating the connection of said second switching apparatus to said trunk line, means responsive to the connection of said second switching apparatus to said trunk line for arresting the return of said delay signal to said first switching apparatus, and means controlled during the return of said delay signal to said first switching apparatus for withholding further sending operation of the connected one of said register senders in order to delay the sending of switch directing signals over said trunk line.

5. In a telephone system, an office including an operator switchboard provided with a signal and an interceptor operator position and subscriber substations and first automatic switching apparatus, an exchange including second automatic switching apparatus, a trunk line extending between said office and said exchange, first and second register senders, means including a key set disposed at said operator switchboard for registering digits in said first register sender and for connecting it to said first switching apparatus, means including a dialing device disposed at a calling one of said subscriber substations for registering digits in said second register sender and for connecting it to said first switching apparatus, each of said register senders being operative when connected to said first switching apparatus to send thereto switch directing signals corresponding to the digits registered therein in order to operate said first switching apparatus to seize said trunk line, means responsive to the operation of said first switching apparatus to seize said trunk line for returning a delay signal thereto and for initiating the connection of said second switching apparatus to said trunk line, means responsive to the connection of said second switching apparatus to said trunk line for arresting the return of said delay signal to said first switching apparatus, means controlled during the return of said delay signal to said first switching apparatus for withholding further sending operation of the connected one of said register senders in order to delay the sending of switch directing signals over said trunk line, means controlled when said first register sender is connected to said first switching apparatus and responsive to the return of said delay signal during a given time interval for blocking further operation of said first register sender and for operating said signal, and means controlled when said second register sender is connected to said first switching apparatus and responsive to the return of said delay signal during a given time interval for releasing said first switching apparatus and then for extending a connection from said calling subscriber substation to said interceptor operator position.

6. In a telephone system, an operator switchboard provided with a calling device and a delay signal, subscriber substations, automatic switching apparatus including tandem related switching stages, means controllable from said operator switchboard for connecting said calling device to said switching apparatus, said calling device being selectively operative in accordance with different digits and adapted when connected to said switching apparatus to control corresponding progressive operation of the switching stages thereof, register mechanism, means controllable from a calling one of said subscriber substations for registering digits in said register mechanism and for connecting it to said switching apparatus, said register mechanism being operative when connected to said switching apparatus to control progressive operation of the switching stages thereof in accordance with the digits registered therein, and means responsive to a predetermined operation of an intermediate switching stage of said switching apparatus for operating said delay signal in the event said calling device is connected thereto and for delaying further control operation of said register mechanism in the event it is connected thereto.

7. In a telephone system, a first office including an operator switchboard provided with a calling device and a ready signal, a second office including subscriber substations, an exchange including automatic switching apparatus, a toll line extending between said first and second offices, a trunk line extending between said second office and said exchange, means controllable from said operator switchboard for connecting said calling device to said toll line and for connecting said toll line to said trunk line, said calling device being selectively operative in accordance with different digits and adapted when connected by way of said toll line to said trunk line to send thereover corresponding switch directing signals, a register sender, means controllable from a calling one of said subscriber substations for registering digits in said register sender and for connecting it to said trunk line, said register sender being operative after connection to said trunk line to send thereover switch directing signals corresponding to the digits registered therein, means responsive to the connection of said toll line to said trunk line or to the connection of said register sender to said trunk line for connecting said switching apparatus thereto, and means responsive to the connection of said switching apparatus to said trunk line for operating said ready signal in the event said toll line is connected thereto and for initiating sending operation of said register sender in the event it is connected thereto.

8. In a telephone system, a first office including an operator switchboard provided with a calling device and a delay signal, a second office including subscriber substations and first automatic switching apparatus, an exchange including second automatic switching apparatus, a toll line extending between said first and second offices, a trunk line extending between said second office and said exchange, means controllable from said operator switchboard for connecting said calling device to said toll line and for connecting said toll line to said first switching apparatus, said calling device being selectively operative in accordance with different digits and adapted when connected by way of said toll line to said first switching apparatus to send thereto corresponding switch directing signals in order to operate said first switching apparatus to seize said trunk line, a register sender, means controllable from a calling one of said subscriber substations for registering digits in said register sender and for connecting it to said first switching apparatus, said register sender being operative when connected to said first switching apparatus to send thereto switch directing signals corresponding to the digits registered therein in order to operate said first switching apparatus to seize said trunk line, means responsive to the operation of said first switching apparatus to seize said trunk line for initiating operation of said delay signal in the event said toll line is connected thereto and for arresting further sending operation of said register sender in the event it is connected thereto and for initiating the connection of said second switching apparatus to said trunk line, and means responsive to the connection of said second switching apparatus to said trunk line for arresting further operation of said delay signal in the event said toll line is connected thereto and for initiating further sending operation of said register sender in the event it is connected thereto so that operation of said second switching apparatus may then be controlled over said trunk line.

9. In a telephone system, a first office including an operator switchboard provided with a calling device and a delay signal, a second office including subscriber substations and first automatic switching apparatus, an exchange including second automatic switching apparatus, a toll line extending between said first and second offices, a trunk line extending between said second office and said exchange, means controllable from said operator switchboard for connecting said calling device to said toll line and for connecting said toll line to said first switching apparatus, said calling device being selectively operative in accordance with different digits and adapted when connected by way of said toll line to said first switching apparatus to send thereto corresponding switch directing signals in order to operate said first switching apparatus to seize said trunk line, a register sender, means controllable from a calling one of said subscriber substations for registering digits in said register sender and for connecting it to said first switching apparatus, said register sender being operative when connected to said first switching apparatus to send thereto switch directing signals corresponding to the digits registered therein in order to operate said first switching apparatus to seize said trunk line, means responsive to the operation of said first switching apparatus to seize said trunk line for returning a delay signal thereto and for initiating the connection of said second switching apparatus to said trunk line, means responsive to the connection of said second switching apparatus to said trunk line for arresting the return of said delay signal to said first switching apparatus, and means controlled during the return of said delay signal to said first switching apparatus for operating said delay signal in the event said toll line is connected thereto and for withholding further sending operation of said register sender in the event it is connected thereto in order to delay the sending of switch directing signals over said trunk line.

10. In a telephone system, telephone stations, a trunk circuit provided with an incoming trunk having line conductors and an outgoing trunk, automatic switching apparatus, a register sender, means controllable from a calling one of said telephone stations for registering digits in said register sender and for connecting it to said incoming trunk, said register sender being operative after connection to said incoming trunk to send thereover switch directing signals corresponding to the digits registered therein, means responsive to the connection of said register sender to said incoming trunk for reversing the normal polarity of the line conductors thereof and for initiating the connection of said switching apparatus to said outgoing trunk, means responsive to the connection of said switching apparatus to said outgoing trunk for restoring the normal polarity of the line conductors of said incoming trunk, means controlled during the reversal of the normal polarity of the line conductors of said incoming trunk for withholding the sending operation of said register sender connected thereto, and means included in said trunk circuit and responsive to switch directing signals received over said incoming trunk from said register sender for repeating corresponding switch directing signals over said outgoing trunk to said switching apparatus connected thereto.

11. In a telephone system, telephone stations, first and second automatic switching apparatus, a trunk circuit provided with an incoming trunk having line conductors and an outgoing trunk, a register sender, means controllable from a calling one of said telephone stations for registering digits in said register sender and for connecting it to said first switching apparatus, said register sender being operative when connected to said first switching apparatus to send thereto switch directing signals corresponding to the digits registered therein in order to operate said first switching apparatus to seize said incoming trunk, means responsive to the operation of said first switching apparatus to seize said incoming trunk for reversing the normal polarity of the line conductors thereof and for initiating the connection of said second switching apparatus to said outgoing trunk, means responsive to the connection of said second switching apparatus to said outgoing trunk for restoring the normal polarity of the line conductors of said incoming trunk, means controlled during the reversal of the normal polarity of the line conductors of said incoming trunk for withholding further sending operation of said register sender connected to said first switching apparatus, and means included in said trunk circuit and responsive to switch directing signals received over said incoming trunk by way of said first switching apparatus from said register sender for repeating corresponding switch directing signals over said outgoing trunk to said second switching apparatus connected thereto.

12. In a telephone system, a calling telephone station, first automatic switching apparatus, a trunk circuit having line conductors, second automatic switching apparatus, a called telephone station, means including a register sender controllable from said calling telephone station to register digits and then to send switch directing signals corresponding to the digits registered for extending a connection from said calling telephone station by way of said first switching apparatus and said trunk circuit and said second switching apparatus to said called telephone station so that said first and second switching apparatus are operated sequentially, means responsive to a predetermined operation of said second switching apparatus for reversing the normal polarity of the line conductors of said trunk circuit with respect to said first switching apparatus, and means responsive to the reversal of the normal polarity of the line conductors of said trunk circuit for delaying further sending of switch directing signals by said register sender in order correspondingly to delay operation of said second switching apparatus.

13. In a telephone system, a calling telephone station, first automatic switching apparatus, a trunk circuit having line conductors, second automatic switching apparatus, a called telephone station, a register sender controllable from said calling telephone station to register digits and then operative to send switch directing signals corresponding to the digits registered, means responsive to initial sending operation of said register sender for operating said first switching apparatus to extend a connection from said calling telephone station to said trunk circuit, means responsive to the extension of said connection to said trunk circuit for reversing the normal polarity of the line conductors thereof with respect to said first switching apparatus and for initiating the connection of said second switching apparatus to said trunk circuit, means responsive to the connection of said second switching apparatus to said trunk circuit for restoring the normal polarity of the line conductors thereof with respect to said first switching apparatus, means controlled during the reversal of the normal polarity of the line conductors of said trunk circuit with respect to said first switching apparatus for withholding sending operation of said register sender, and means responsive to further sending operation of said register sender for operating said second switching apparatus further to extend said connection to said called telephone station.

14. In a telephone system, a calling telephone station, first automatic switching apparatus, a trunk circuit having line conductors, second automatic switching apparatus, a called telephone station, a register sender controllable from said calling telephone station to register digits and then operative to send switch directing signals corresponding to the digits registered, means responsive to initial sending operation of said register sender for operating said first switching apparatus to extend a connection from said calling telephone station to said trunk circuit, means responsive to the extension of said connection to said trunk circuit for reversing the normal polarity of the line conductors thereof with respect to said first switching apparatus and for initiating the connection of said second switching apparatus to said trunk circuit, means responsive to the connection of said second switching apparatus to said trunk circuit for restoring the normal polarity of the line conductors thereof with respect to said first switching apparatus, means controlled during the reversal of the normal polarity of the line conductors of said trunk circuit with respect to said first switching apparatus for withholding sending operation of said register sender, means responsive to further sending operation of said register sender for operating said second switching apparatus further to extend said connection to said called telephone station, a timer, means responsive to an answering operation at said called telephone station for initiating a timing operation of said timer, and means responsive to a releasing operation at said called telephone station for arresting the timing operation of said timer.

15. In a telephone system, a calling telephone station, first automatic switching apparatus, a trunk circuit having line conductors, second automatic switching apparatus, a called telephone station, a register sender controllable from said calling telephone station to register digits and then operative to send switch directing signals corresponding to the digits registered, means responsive to initial sending operation of said register sender for operating said first switching apparatus to extend a connection from said calling telephone station to said trunk circuit, means responsive to the extension of said connection to said trunk circuit for reversing the normal polarity of the line conductors thereof with respect to said first switching apparatus and for initiating the connection of said second switching apparatus to said trunk circuit, means responsive to the connection of said second switching apparatus to said trunk circuit for restoring the normal polarity of the line conductors thereof with respect to said first switching apparatus, means controlled during the reversal of the normal polarity of the line conductors of said trunk circuit with respect to said first switching apparatus for withholding sending operation of said register sender, means responsive to further sending operation of said register sender for operating said second switching apparatus further to extend said connection to said called telephone station, means responsive to an answering operation at said called telephone station for again reversing the normal polarity of the line conductors of said trunk circuit with respect to said first switching apparatus, means responsive to a releasing operation at said called telephone station for again restoring the normal polarity of the line conductors of said trunk circuit with respect to said first switching apparatus, a timer, and means responsive to said last-mentioned reversal and subsequent restoration of the normal polarity of the line conductors of said trunk circuit with respect to said first switching apparatus for respectively initiating and arresting a timing operation of said timer.

16. In a telephone system, a calling telephone station, first automatic switching apparatus, a trunk circuit having line conductors, second automatic switching apparatus, a called telephone station, a register sender controllable from said calling telephone station to register digits and then operative to send switch directing signals corresponding to the digits registered, means responsive to initial sending operation of said register sender for operating said first switching apparatus to extend a connection from said calling telephone station to said trunk circuit, means responsive to the extension of said connection to said trunk circuit for reversing the normal polarity of the line conductors thereof with respect to said first switching apparatus and for initiating the connection of said second switching apparatus to said trunk circuit, means responsive to the connection of said second switching apparatus to said trunk circuit for restoring the normal polarity of the line conductors thereof with respect to said first switching apparatus, means controlled during the reversal of the normal polarity of the line conductors of said trunk circuit with respect to said first switching apparatus for withholding sending operation of said register sender, means responsive to further sending operation of said register sender for operating said second switching apparatus further to extend said connection to said called telephone station, an interceptor operator position, and means responsive to the presence for a given time interval of the reversal of the normal polarity of the line conductors of said trunk circuit with respect to said first switching apparatus for releasing said first switching apparatus and for extending a connection from said calling telephone station to said interceptor operator position.

17. In a telephone system, a calling telephone station, first automatic switching apparatus, a trunk circuit having line conductors, second automatic switching apparatus, a called telephone station, a register sender controllable from said calling telephone station to register digits and then operative to send switch directing signals corresponding to the digits registered, means responsive to initial sending operation of said register sender for operating said first switching apparatus to extend a connection from said calling telephone station to said trunk circuit, means responsive to the extension of said connection to said trunk circuit for reversing the normal polarity of the line conductors thereof with respect to said first switching apparatus and for initiating the connection of said second switching apparatus to said trunk circuit, means responsive to the connection of said second switching apparatus to said trunk circuit for restoring the normal polarity of the line conductors thereof with respect to said first switching apparatus, means controlled during the reversal of the normal polarity of the line conductors of said trunk circuit with respect to said first switching apparatus for withholding sending operation of said register sender, means responsive to further sending operation of said register sender for operating said second switching apparatus further to extend said connection to said called telephone station, means responsive to said second switching apparatus encountering an all-trunks-busy condition for reversing the normal polarity of the line conductors of said trunk circuit with respect to said first switching apparatus and for returning busy tone current thereto, an interceptor operator position, and means responsive to the presence for a given time interval of the reversal of the normal polarity of the line conductors of said trunk circuit with respect to said first switching apparatus for releasing said first switching apparatus and for extending a connection from said calling telephone station to said interceptor operator position.

18. In a telephone system, a calling operator switchboard, a calling subscriber substation, first automatic switching apparatus, a trunk circuit having line conductors and a control conductor, second automatic switching apparatus, a called subscriber substation, a first register sender controllable from said calling operator switchboard, a second register sender controllable from said calling substation, each of said register senders being adapted to register digits and then operative to send switch directing signals corresponding to the digits registered, means responsive respectively to initial sending operations of said first and second register senders for operating said first switching apparatus to extend connections respectively from said calling operator switchboard and from said calling subscriber substation to said trunk circuit, means responsive to the extension of said connection to said trunk circuit respectively from said calling operator switchboard and from said calling subscriber substation for initiating the connection of said second switching apparatus to said trunk circuit and respectively for applying a given potential to the control conductor of said trunk circuit and for reversing the normal polarity of the line conductors thereof, means responsive to the connection of said second switching apparatus to said trunk circiut for removing said given potential from the control conductor thereof in the event said calling operator switchboard is connected thereto and for restoring the normal polarity of the line conductors thereof in the event said calling subscriber substation is connected thereto, means controlled respectively during the application of said given potential upon the control conductor of said trunk circuit and during the reversal of the normal polarity of the line conductors of said trunk circuit for withholding sending operations of said respective first and second register senders, and means responsive respectively to further sending operations of said first and second register senders for operating said second switching apparatus further to extend said connections respectively from said calling operator switchboard and from said calling subscriber substation to said called subscriber substation.

19. In a telephone system, an office including an operator switchboard and first subscriber substations, an exchange including second subscriber's substations, a trunk line extending between said office and said exchange, automatic switching apparatus including a plurality of tandem related switching stages, means including a first register sender controllable from said operator switchboard and adapted to register digits and to send switch directing signals corresponding to the digits registered for extending a connection from said operator switchboard over said trunk line to a called one of said second subscriber substations, means including a second register sender controllable from a calling one of said first subscriber substations and adapted to register digits and to send switch directing signals corresponding to the digits registered for extending a connection from said calling first subscriber substation over said trunk line to a called one of said second subscriber substations, means responsive to a predetermined operation of an intermediate switching stage of said switching apparatus for returning a delay signal to the one of said register senders controlling operation of said switching apparatus in order to delay further operation of said switching apparatus, means responsive respectively to answering and to release operations at said called second subscriber substation for returning corresponding supervisory signals over said trunk line, signal apparatus associated with said operator switchboard, timing apparatus associated with said switching apparatus, and means responsive to said supervisory signals returned over said trunk line for selectively operating said signal apparatus in the event said connection includes said operator switchboard and for selectively operating said timing apparatus in the event said connection includes said calling first subscriber substation.

20. In a telephone system, an office including an operator switchboard and first subscriber substations, an exchange including second subscriber substations, a trunk line extending between said office and said exchange, automatic switching apparatus including a plurality of tandem related switching stages, means including a first register sender controllable from said operator switchboard and adapted to register digits and to send switch directing signals corresponding to the digits registered for extending a connection from said operator switchboard over said trunk line to a called one of said second subscriber substations, means including a second register sender controllable from a calling one of said first subscriber substations and adapted to register digits and to send switch directing signals corresponding to the digits registered for extending a connection from said calling first subscriber substation over said trunk line to a called one of said second subscriber substations, means responsive to a predetermined operation of an intermediate switching stage of said switching apparatus for returning a delay signal over said trunk line, means responsive to the return of said delay signal over said trunk line for delaying sending of switch directing signals by the one of said register senders controlling operation of said switching apparatus in order to delay further operation of said switching apparatus, means responsive respectively to answering and to release operations at said called second subscriber substation for returning corresponding supervisory signals over said trunk line, signal apparatus associated with said operator switchboard, timing apparatus associated with said switching apparatus, and means responsive to said supervisory signals returned over said trunk line for selectively operating said signal apparatus in the event said connection includes said operator switchboard and for selectively operating said timing apparatus in the event said connection includes said calling first subscriber substation.

HARVEY W. BALZER.
JOHN E. OSTLINE.

(References on following page)

REFERENCES CITED

The following references are of record in the file of this patent:

UNITED STATES PATENTS

| Number | Name | Date |
|---|---|---|
| 1,505,171 | Stearn | Aug. 19, 1924 |
| 1,576,884 | Wicks | Mar. 16, 1926 |
| 1,708,959 | Stokely | Apr. 16, 1929 |
| 1,747,224 | Carpenter | Feb. 18, 1930 |
| 1,862,537 | Hatton et al. | June 14, 1932 |
| 1,938,381 | Gillings et al. | Dec. 5, 1933 |
| 2,207,519 | Pfannschmidt | July 9, 1940 |
| 2,274,083 | Miller | Feb. 24, 1942 |
| 2,297,365 | Ostline | Sept. 24, 1942 |
| 2,331,013 | Balzer | Oct. 5, 1943 |
| 2,348,198 | Evers et al. | May 9, 1944 |
| 2,370,736 | Kittredge | Mar. 6, 1945 |
| 2,429,911 | Baker | Oct. 28, 1947 |

Certificate of Correction

Patent No. 2,569,650 October 2, 1951

HARVEY W. BALZER ET AL.

It is hereby certified that error appears in the printed specification of the above numbered patent requiring correction as follows:

Column 136, line 40, for "said switching" read *said first switching*;

and that the said Letters Patent should be read as corrected above, so that the same may conform to the record of the case in the Patent Office.

Signed and sealed this 5th day of February, A. D. 1952.

[SEAL]

THOMAS F. MURPHY,
*Assistant Commissioner of Patents.*